US012782649B2

(12) United States Patent
Elsinger et al.

(10) Patent No.: US 12,782,649 B2
(45) Date of Patent: Nov. 3, 2026

(54) OPTICAL FIBER-TO-CHIP INTERCONNECTION

(71) Applicant: Ciena Corporation, Hanover, MD (US)

(72) Inventors: Lukas Elsinger, Ghent (BE); Clinton Randy Giles, Watchung, NJ (US); Ron Zhang, Sunnyvale, CA (US); Peter James Pupalaikis, Ramsey, NJ (US); Peter Johannes Winzer, Aberdeen, NJ (US)

(73) Assignee: Ciena Corporation, Fulton, MD (US)

( * ) Notice: Subject to any disclaimer, the term of this patent is extended or adjusted under 35 U.S.C. 154(b) by 284 days.

(21) Appl. No.: 18/609,683

(22) Filed: Mar. 19, 2024

(65) Prior Publication Data

US 2025/0020877 A1 Jan. 16, 2025

Related U.S. Application Data

(62) Division of application No. 17/693,040, filed on Mar. 11, 2022, now Pat. No. 11,982,848.

(Continued)

(51) Int. Cl.
*G02B 6/42* (2006.01)
*G02B 6/43* (2006.01)

(52) U.S. Cl.
CPC ......... *G02B 6/4213* (2013.01); *G02B 6/4208* (2013.01); *G02B 6/43* (2013.01); *G02B 6/4249* (2013.01)

(58) Field of Classification Search
CPC .... G02B 6/422; G02B 6/4221; G02B 6/4222; G02B 6/4224; G02B 6/4225; G02B 6/4234
See application file for complete search history.

(56) References Cited

U.S. PATENT DOCUMENTS 4,859,012 A 8/1989 Cohn
5,475,489 A 12/1995 Gottsche
(Continued)

FOREIGN PATENT DOCUMENTS

CN 1735826 A 2/2006
CN 103827715 A 5/2014
(Continued)

OTHER PUBLICATIONS

Bernstein, [online] "New IEEE Standard Brings 200 GB/s and 400 GB/s to Data Centers," Dec. 8, 2017, retrieved on Oct. 1, 2021, retrieved from URL<https://blog.leviton.com/new-ieee-standard-brings-200-gbs-and-400-gbs-data-centers>, 2 pages.
(Continued)

*Primary Examiner* — Michael Stahl
(74) *Attorney, Agent, or Firm* — Michael Best & Friedrich LLP

(57) ABSTRACT

An apparatus includes a fiber-optic connector configured to be connected between one or more optical fibers having fiber cores and a photonic integrated circuit (PIC) including vertical-coupling elements. The fiber-optic connector includes a polarization beam splitter and a patterned birefringent plate. The polarization beam splitter splits an incident light beam from a fiber core into first and second beams having first and second polarizations, respectively. The patterned birefringent plate includes a first region (having a first optical birefringence) and a second region (having a second optical birefringence). The difference in the first and second optical birefringence is caused by (i) applying localized heating to the first region without applying localized heating to the second region to cause the first region to have a lower birefringence as compared to the second region, or (ii) applying different amounts of localized heating to the first and second regions to produce different birefringence.

19 Claims, 60 Drawing Sheets

FIG. 69

Related U.S. Application Data

(60) Provisional application No. 63/159,768, filed on Mar. 11, 2021, provisional application No. 63/225,779, filed on Jul. 26, 2021, provisional application No. 63/173,253, filed on Apr. 9, 2021, provisional application No. 63/175,021, filed on Apr. 14, 2021, provisional application No. 63/178,501, filed on Apr. 22, 2021, provisional application No. 63/192,852, filed on May 25, 2021, provisional application No. 63/208,759, filed on Jun. 9, 2021, provisional application No. 63/210,437, filed on Jun. 14, 2021, provisional application No. 63/212,013, filed on Jun. 17, 2021, provisional application No. 63/223,685, filed on Jul. 20, 2021, provisional application No. 63/245,005, filed on Sep. 16, 2021, provisional application No. 63/245,011, filed on Sep. 16, 2021, provisional application No. 63/272,025, filed on Oct. 26, 2021, provisional application No. 63/316,551, filed on Mar. 4, 2022.

(56) References Cited

U.S. PATENT DOCUMENTS

| | | | | |
|---|---|---|---|---|
| 5,926,594 | A | 7/1999 | Song et al. | |
| 6,434,291 | B1 | 8/2002 | Kessler et al. | |
| 6,587,618 | B2 | 7/2003 | Raguin et al. | |
| 6,596,201 | B1 | 7/2003 | Borrelli et al. | |
| 6,910,780 | B2 | 6/2005 | Vail et al. | |
| 7,025,511 | B2 | 4/2006 | Nakajima | |
| 7,399,125 | B1 | 7/2008 | Whaley et al. | |
| 7,505,192 | B1 | 3/2009 | Zhao et al. | |
| 7,742,566 | B2 | 6/2010 | Hopkins et al. | |
| 8,047,856 | B2 | 11/2011 | McColloch | |
| 8,079,125 | B2 | 12/2011 | Ban et al. | |
| 8,090,230 | B1 | 1/2012 | Hasharoni | |
| 8,488,921 | B2 | 7/2013 | Doany et al. | |
| 9,170,683 | B2 | 10/2015 | Drumm | |
| 9,229,169 | B2 | 1/2016 | Doany et al. | |
| 9,341,828 | B2 | 5/2016 | Budd et al. | |
| 9,366,832 | B2 | 6/2016 | Arao et al. | |
| 9,429,711 | B2 | 8/2016 | Nakagawa | |
| 9,453,723 | B1 | 9/2016 | LeMaitre et al. | |
| 9,645,316 | B1 | 5/2017 | Hasharoni | |
| 9,791,645 | B2 | 10/2017 | Meadowcroft et al. | |
| 9,897,769 | B2 * | 2/2018 | Li | G02B 6/4214 |
| 9,927,575 | B2 | 3/2018 | Goodwill | |
| 9,971,110 | B1 | 5/2018 | Hsu | |
| 10,025,043 | B2 * | 7/2018 | Vallance | G02B 6/124 |
| 10,466,427 | B2 | 11/2019 | Wang et al. | |
| 10,466,433 | B2 | 11/2019 | Epitaux et al. | |
| 10,551,575 | B2 | 2/2020 | Roth et al. | |
| 10,754,070 | B2 | 8/2020 | Masuda et al. | |
| 10,795,103 | B2 | 10/2020 | Rosenberg et al. | |
| 10,917,190 | B2 | 2/2021 | Sahni | |
| 11,153,670 | B1 | 10/2021 | Winzer | |
| 11,287,585 | B2 | 3/2022 | Winzer | |
| 11,432,056 | B1 | 8/2022 | Doerr et al. | |
| 11,567,273 | B2 | 1/2023 | Winzer | |
| 11,982,848 | B2 | 5/2024 | Elsinger et al. | |
| 12,164,157 | B2 | 12/2024 | Winzer | |
| 12,461,321 | B2 | 11/2025 | Giles et al. | |
| 2002/0028049 | A1 * | 3/2002 | Bartur | G02B 6/4202 385/92 |
| 2002/0031313 | A1 | 3/2002 | Williams | |
| 2002/0145802 | A1 | 10/2002 | Osawa | |
| 2004/0017977 | A1 | 1/2004 | Lam et al. | |
| 2004/0022487 | A1 * | 2/2004 | Nagasaka | G02B 6/4204 385/31 |
| 2004/0033016 | A1 | 2/2004 | Kropp et al. | |
| 2004/0047583 | A1 | 3/2004 | Chiba et al. | |
| 2004/0051863 | A1 | 3/2004 | Tsien et al. | |
| 2004/0202477 | A1 | 10/2004 | Nagasaka | |
| 2006/0239605 | A1 | 10/2006 | Palen et al. | |
| 2011/0064358 | A1 | 3/2011 | Nishimura | |
| 2013/0051729 | A1 | 2/2013 | Chen et al. | |
| 2013/0084039 | A1 | 4/2013 | Doany et al. | |
| 2013/0089293 | A1 | 4/2013 | Howard | |
| 2013/0094088 | A1 | 4/2013 | Merrill | |
| 2014/0119694 | A1 | 5/2014 | Abedin et al. | |
| 2014/0306131 | A1 | 10/2014 | Mack et al. | |
| 2015/0037044 | A1 | 2/2015 | Peterson | |
| 2015/0049379 | A1 | 2/2015 | Doerr et al. | |
| 2015/0125110 | A1 * | 5/2015 | Anderson | G02B 6/3897 385/14 |
| 2015/0177097 | A1 | 6/2015 | Clarke et al. | |
| 2015/0293305 | A1 | 10/2015 | Kakagawa | |
| 2016/0109659 | A1 | 4/2016 | Jiang | |
| 2016/0209610 | A1 | 7/2016 | Kurtz | |
| 2016/0231508 | A1 | 8/2016 | Butler et al. | |
| 2016/0231513 | A1 * | 8/2016 | Butler | G02B 6/3893 |
| 2016/0344156 | A1 | 11/2016 | Rothberg et al. | |
| 2016/0377821 | A1 | 12/2016 | Vallance | |
| 2017/0123164 | A1 | 5/2017 | Suematsu | |
| 2017/0131469 | A1 | 5/2017 | Kobrinsky et al. | |
| 2017/0139145 | A1 | 5/2017 | Heanue | |
| 2017/0146736 | A1 | 5/2017 | Verslegers et al. | |
| 2017/0146751 | A1 | 5/2017 | Sutherland | |
| 2017/0196459 | A1 | 7/2017 | Lam et al. | |
| 2018/0231727 | A1 | 8/2018 | Kurtz | |
| 2018/0259730 | A1 | 9/2018 | Hochberg et al. | |
| 2018/0267255 | A1 | 9/2018 | Butler et al. | |
| 2018/0288504 | A1 | 10/2018 | Yang et al. | |
| 2018/0329159 | A1 | 11/2018 | Varghese | |
| 2019/0033528 | A1 | 1/2019 | Ootorii | |
| 2019/0064457 | A1 | 2/2019 | Roth et al. | |
| 2019/0258175 | A1 | 8/2019 | Dietrich | |
| 2019/0285815 | A1 | 9/2019 | Sugiyama | |
| 2019/0312642 | A1 | 10/2019 | Neilson | |
| 2020/0132930 | A1 | 4/2020 | Bchir | |
| 2020/0158964 | A1 | 5/2020 | Winzer et al. | |
| 2020/0158967 | A1 | 5/2020 | Winzer et al. | |
| 2020/0363598 | A1 | 11/2020 | Hjartarson et al. | |
| 2021/0074677 | A1 | 3/2021 | Kwon et al. | |
| 2021/0149127 | A1 * | 5/2021 | Kurtz | G02B 6/3885 |
| 2021/0211785 | A1 | 7/2021 | Rose et al. | |
| 2021/0272944 | A1 | 9/2021 | Bchir | |
| 2021/0286140 | A1 | 9/2021 | Winzer | |
| 2021/0294052 | A1 | 9/2021 | Winzer | |
| 2021/0376950 | A1 | 12/2021 | Winzer | |
| 2021/0384989 | A1 | 12/2021 | Nagarajan et al. | |
| 2022/0141949 | A1 | 5/2022 | Devalla et al. | |
| 2022/0159860 | A1 | 5/2022 | Winzer et al. | |
| 2022/0221662 | A1 | 7/2022 | Winzer | |
| 2022/0279256 | A1 | 9/2022 | Chaouch et al. | |
| 2022/0291461 | A1 | 9/2022 | Elsinger | |
| 2022/0404566 | A1 | 12/2022 | Giles et al. | |
| 2023/0176301 | A1 | 6/2023 | Winzer | |
| 2024/0361538 | A1 * | 10/2024 | Haase | G02B 6/3829 |
| 2025/0067944 | A1 | 2/2025 | Winzer | |

FOREIGN PATENT DOCUMENTS

| | | | | |
|---|---|---|---|---|
| CN | 105705974 | A | | 6/2016 |
| CN | 108353216 | A | | 7/2018 |
| EP | 2866065 | | | 4/2015 |
| EP | 2656137 | | | 9/2015 |
| JP | 2008-191349 | A | * | 8/2008 |
| JP | 2011-043808 | A | | 3/2011 |
| JP | 2015-031787 | A | | 2/2015 |
| WO | WO 2003/036335 | | | 5/2003 |
| WO | WO 2021/170200 | | | 9/2021 |

OTHER PUBLICATIONS

Borca et al., "Buried channel waveguides in Yb-doped KY(WO4)2 crystals fabricated by femtosecond laser irradiation," Applied Surface Science, Feb. 27, 2007, 8300-8303.

Budiman et al., "Cross-sectional study of femtosecond laser bulk modification of crystalline α-quartz," Appl Phys A, Mar. 2010, 98: 849-853.

(56) References Cited

OTHER PUBLICATIONS

Chen et al., "Optical waveguides in crystalline dielectric materials produced by femtosecond-laser micromachining," Laser Photonics Rev., Mar. 2014, 2:251-275.
Chuang et al., "Theoretical and Empirical Qualification of a Mechanical-Optical Interface for Parallel Optics Links," Photonics West Optical Interconnects XV, Proc. SPIE vol. 9368, article 936825, Apr. 3, 2015, 11 pages.
De Heyen et al., "Ultra-Dense 16x56Gb/s NRZ GeSi EAM-PD Arrays Coupled to Multicore Fiber for Short-Reach 896Gb/s Optical Links," Optical Fiber Communication Conference (OFC), Mar. 19-23, 2017, 3 pages.
Dietrich et al., "In-Situ 3D Nano-Printing of Free-Form Coupling Elements for Hybrid Photonic Integration," Nature Photonics, Mar. 26, 2018, 12 pages.
Dietrich et al., "Printed freeform lens arrays on multi-core fibers for highly efficient coupling in astrophotonic systems," Optics Express, Jul. 24, 2017, 25: 18288-18295.
Extended European Search Report in European Appln. No. 21767121.3, mailed on Mar. 21, 2024, 9 pages.
Gissibl et al., "Sub-micrometre accurate free-form optics by three-dimensional printing on single-mode fibers," Nature Communications, Jun. 23, 2016, 9 pages.
Gorelik et al., "Transmission electron microscopy studies of femtosecond laser induced modifications in quartz," Appl. Phys. A, Mar. 2003, 76: 309-311.
Hughes et al., "A Single-Mode Expanded Beam Separable Fiber Optic Interconnect for Silicon Photonics," Optical Fiber Communication Conference (OFC), paper Tu2A.6, Apr. 25, 2019, 3 pages.
Imai et al., "Direct writing of optical waveguides in fused silica by the fundamental beam of an Yb:KGW femtosecond laser," OSA Continuum, Mar. 15, 2021, 4:1000-1009.
International Preliminary Report on Patentability in International Appln. No. PCT/US2021/21953, mailed Sep. 22, 2022, 20 pages.
International Preliminary Report on Patentability in International Appln. No. PCT/US2022/020031, mailed Sep. 21, 2023, 32 pages.
International Preliminary Report on Patentability in International Appln. No. PCT/US2022/072575, mailed on Dec. 7, 2023, 15 pages.
International Search Report and Written Opinion in International Appln. No. PCT/US2022/020031, mailed Aug. 17, 2022, 37 pages.
International Search Report and Written Opinion in International Appln. No. PCT/US2022/72575, mailed Aug. 9, 2022, 31 pages.
Invitation to Pay Additional Fees in International Appln. No. PCT/US2022/020031, dated May 26, 2022, 3 pages.
Itoh et al., "Ultrafast Processes for Bulk Modification of Transparent Materials," MRS Bulletin, Aug. 2006, 31:620-625.
Laplatine et al., "System-level integration of active silicon photonic biosensors," Proc. of SPIE, Jan. 2017, 16 pages.
Majumder et al., "Ultra-compact polarization rotation in integrated silicon photonics using digital metamaterials," Optical Society of America, Aug. 7, 2017, 11 pages.
Mangal et al., "Through-substrate coupling elements for silicon-photonics based short-reach optical interconnects," Proceedings of the SPIE, Optical Interconnects XIX, Mar. 4, 2019, vol. 10924, 13 pages.
Marchetti et al., "Coupling strategies for silicon photonics integrated chips," Photonics Research, Feb. 2019, 7(2):201-239.
Missinne et al., "Alignment-tolerant interfacing of a photonic integrated circuit using back side etched silicon microlenses," Proceedings of the SPIE, 2019, 10923, 8 pages.
Nambiar et al., "Grating-Assisted Fiber to Chip Coupling for SOI Photonic Circuits," Applied Sciences, article 1114, Jul. 13, 2018, 22 pages.
Nejadmalayeri et al., "Inscription of optical waveguides in crystalline silicon by mid-infrared femtosecond laser pulses," Optics Letters, May 1, 2005, 30:964-966.
Ong et al., "High positional freedom SOI subwavelength grating coupler (SWG) for 300 mm foundry fabrication," Optics Express, Oct. 29, 2018, 26(22):28773-28792.
Oton, "Long-Working-Distance Grating Coupler for Integrated Optical Devices," IEEE Photonics Journal, Feb. 2016, 8(1):1-9.
PCT International Search Report and Written Opinion in International Appln. No. PCT/US2021/021953, dated Aug. 4, 2021, 23 pages.
PCT Invitation to Pay Additional Fees in International Appln. No. PCT/US2021/021953, dated May 19, 2021, 2 pages.
Pollnau et al., "Optical waveguides in laser crystals," C. R. Physique, Aug. 8, 2006, pp. 123-137.
Raj et al., "50Gb/s Hybrid Integrated Si-Photonic Optical Link in 16nm FinFET," 2020 European Conference on Optical Communications (ECOC), Dec. 6-10, 2020, 4 pages.
Raj et al., "Design of a 50-GB/s Hybrid Integrated Si-Photonic Optical Link in 16-nm FinFET," IEEE Journal of Solid-State Circuits, Apr. 2020, 55: 1086-1095.
Rodenas et al., "High-contrast step-index waveguides in borate nonlinear laser crystals by 3D laser writing," Optics Express, Aug. 29, 2011, 19: 17820-17833.
Sacher et al., "Polarization rotator-splitters in standard active silicon photonics platforms," Optical Society of America, Feb. 10, 2014, 10 pages.
Scarcella et al., "Pluggable Single-Mode Fiber-Array-to-PIG Coupling Using Micro- Lenses," IEEE Photonics Technology Letters, Nov. 25, 2017, 29(22):1943-1946.
Wu et al. , "Freeform lens arrays for off-axis illumination in an optical lithography system," Applied Optics, Feb. 10, 2011, 50: 725-732.
Wu et al., "Thin LED collimator with free-form lens array for illumination applications," Applied Optics, Oct. 12, 2012, 51:7200-7205.
Extended European Search Report in European Appln. No. 22768127.7, mailed on Feb. 3, 2025, 12 pages.
Strange, "Optical Subassemblies," Handbook of Fiber Optic Data Communication (Third Edition), Academic Press, Jul. 5, 2008, Chapter 8, 177-191 (abstract only).

* cited by examiner

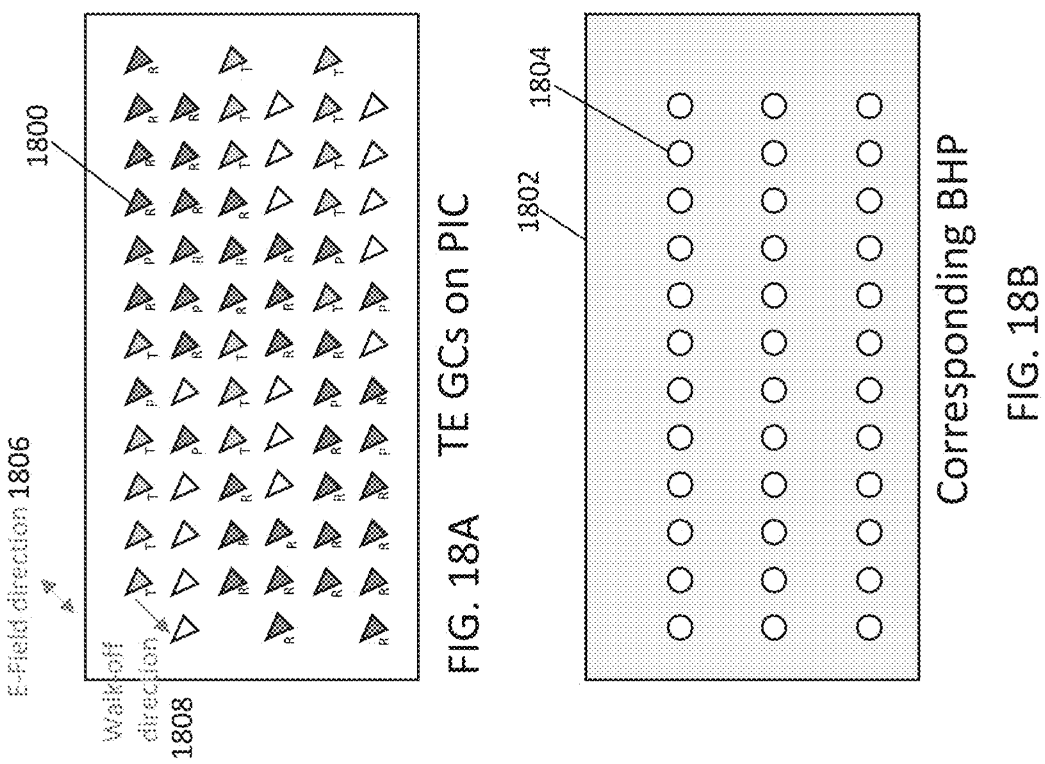
FIG. 18A
FIG. 18B
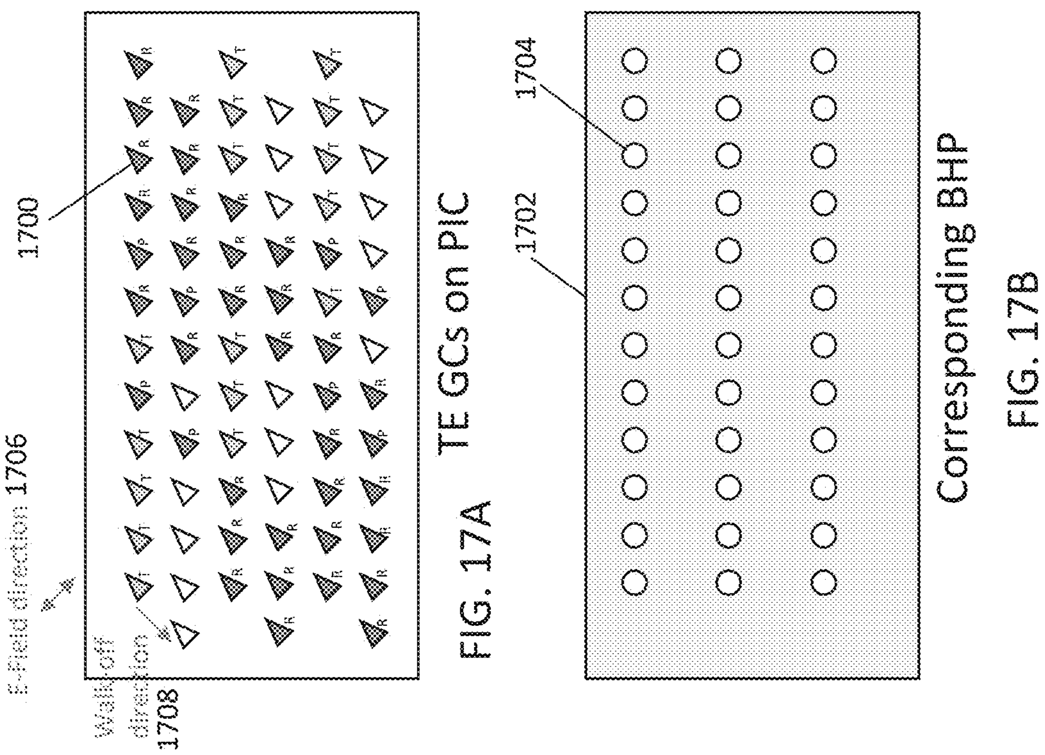
FIG. 17A
FIG. 17B

Circular holes

Rectangular

Strip holes

Multiple individual strip platelets

3100

| Lane | Center wavelength | Wavelength range |
|---|---|---|
| $L_0$ | 1271 nm | 1264.5 to 1277.5 nm |
| $L_1$ | 1291 nm | 1284.5 to 1297.5 nm |
| $L_2$ | 1311 nm | 1304.5 to 1317.5 nm |
| $L_3$ | 1331 nm | 1324.5 to 1337.5 nm |

FIG. 31A

3102

| Lane | Center frequency | Center wavelength | Wavelength range |
|---|---|---|---|
| $L_0$ | 231.4 THz | 1295.56 nm | 1294.53 to 1296.59 nm |
| $L_1$ | 230.6 THz | 1300.05 nm | 1299.02 to 1301.09 nm |
| $L_2$ | 229.8 THz | 1304.58 nm | 1303.54 to 1305.63 nm |
| $L_3$ | 229 THz | 1309.14 nm | 1308.09 to 1310.19 nm |

800 GHz spacing, 368 GHz window

FIG. 31B

3200

| Lane | Center frequency | Center wavelength | Wavelength range |
|---|---|---|---|
| $L_0$ | 235.4 THz | 1273.54 nm | 1272.55 to 1274.54 nm |
| $L_1$ | 234.6 THz | 1277.89 nm | 1276.89 to 1278.89 nm |
| $L_2$ | 233.8 THz | 1282.26 nm | 1281.25 to 1283.27 nm |
| $L_3$ | 233 THz | 1286.66 nm | 1285.65 to 1287.68 nm |
| $L_4$ | 231.4 THz | 1295.56 nm | 1294.53 to 1296.59 nm |
| $L_5$ | 230.6 THz | 1300.05 nm | 1299.02 to 1301.09 nm |
| $L_6$ | 229.8 THz | 1304.58 nm | 1303.54 to 1305.63 nm |
| $L_7$ | 229 THz | 1309.14 nm | 1308.09 to 1310.19 nm |

800 GHz spacing, 368 GHz window

FIG. 32

Side view
(Option 2)

OPTICAL FIBER-TO-CHIP INTERCONNECTION

CROSS-REFERENCE TO RELATED APPLICATION

This application is a divisional application of U.S. patent application Ser. No. 17/693,040, filed on Mar. 11, 2022, which claims priority to U.S. provisional patent application 63/159,768, filed on Mar. 11, 2021, U.S. provisional patent application 63/225,779, filed on Jul. 26, 2021, U.S. provisional patent application 63/173,253, filed on Apr. 9, 2021, U.S. provisional patent application 63/175,021, filed on Apr. 14, 2021, U.S. provisional patent application 63/178,501, filed on Apr. 22, 2021, U.S. provisional patent application 63/192,852, filed on May 25, 2021, U.S. provisional patent application 63/208,759, filed on Jun. 9, 2021, U.S. provisional patent application 63/210,437, filed on Jun. 14, 2021, U.S. provisional application 63/212,013, filed on Jun. 17, 2021, U.S. provisional patent application 63/223,685, filed on Jul. 20, 2021, U.S. provisional patent application 63/245,005, filed on Sep. 16, 2021, U.S. provisional patent application 63/245,011, filed on Sep. 16, 2021, U.S. provisional patent application 63/272,025, filed on Oct. 26, 2021, and U.S. provisional patent application 63/316,551, filed on Mar. 4, 2022. The entire contents of the above applications are incorporated by reference.

BACKGROUND

Field

Various example embodiments relate to optical communication equipment and, more specifically but not exclusively, to methods and apparatus for interconnecting arrays of optical fibers with planar photonic integrated circuits.

Description of the Related Art

This section introduces aspects that may help facilitate a better understanding of the disclosure. Accordingly, the statements of this section are to be read in this light and are not to be understood as admissions about what is in the prior art or what is not in the prior art.

As the input/output (I/O) capacities of electronic processing chips increase, electrical signals may not provide sufficient I/O capacity across the limited size of a practically viable electronic chip package. A feasible alternative may be to interconnect electronic chip packages using optical signals, which can typically be delivered with a much higher I/O capacity per unit area compared to electrical I/Os.

SUMMARY OF THE INVENTION

Disclosed herein are various embodiments of an optical system that includes one or more circular-polarization-maintaining fibers for optically coupling two or more optical or optoelectronic devices. In a general aspect, an apparatus includes: a laser configured to provide linearly polarized optical power supply light; and a quarter-wave plate to convert the linearly polarized optical power supply light to circularly polarized optical power supply light. The apparatus includes a circular-polarization-maintaining fiber configured to propagate the circularly polarized optical power supply light from the quarter-wave plate; and a polarization beam splitter configured to split the circularly polarized optical power supply light to generate first power supply light having a first polarization and second power supply light having a second polarization. The apparatus includes a first linear-polarization-maintaining fiber optically coupled to a first port of the polarization beam splitter to receive the first power supply light; and a second linear-polarization-maintaining fiber optically coupled to a second port of the polarization beam splitter to receive the second power supply light.

In another general aspect, an apparatus includes: a first laser configured to generate first linearly polarized light; and a first quarter-wave plate configured to convert the first linearly polarized light to first circularly polarized light. The apparatus includes a first circular-polarization-maintaining fiber having a first end optically coupled to the first quarter-wave plate; and a second quarter-wave plate optically coupled to a second end of the first circular-polarization-maintaining fiber. The first circular-polarization-maintaining fiber is configured to transmit the first circularly polarized light from the first quarter-wave plate to the second quarter-wave plate, and the second quarter-wave plate is configured to convert the first circularly polarized light to second linearly polarized light. The apparatus includes a first optical modulator configured to modulate the second linearly polarized light.

Implementations can include one or more of the following features. The apparatus can include a first photonic integrated circuit including circuitry that is configured to generate a first electrical signal. The first optical modulator can be part of the photonic integrated circuit, and the first optical modulator can be configured to modulate the second linearly polarized light based on the first electrical signal.

The apparatus can include: a second laser configured to generate third linearly polarized light. The first quarter-wave plate can be configured to convert the third linearly polarized light to second circularly polarized light. The apparatus can include a second circular-polarization-maintaining fiber having a first end optically coupled to the first quarter-wave plate and a second end optically coupled to the second quarter-wave plate. The second circular-polarization-maintaining fiber can be configured to transmit the second circularly polarized light from the first quarter-wave plate to the second quarter-wave plate. The second quarter-wave plate can be configured to convert the second circularly polarized light to fourth linearly polarized light. The apparatus can include a second optical modulator configured to modulate the fourth linearly polarized light.

The first laser and the second laser can be aligned such that the first linearly polarized light has a polarization direction that is substantially parallel to the polarization direction of the third linearly polarized light.

The apparatus can include a substrate. The first optical modulator and the second optical modulator can be mounted on the substrate.

The second quarter-wave plate can be at least one of edge-coupled or vertically coupled to the substrate.

In another general aspect, an apparatus includes: a first substrate; and a first laser mounted on the first substrate and configured to generate first linearly polarized light. The apparatus includes a first quarter-wave polarization rotator mounted on the first substrate and configured to convert the first linearly polarized light to first circularly polarized light. The apparatus includes a first circular-polarization-maintaining fiber having a first end optically coupled to the first quarter-wave polarization rotator. The apparatus includes a second substrate and a second quarter-wave polarization rotator mounted on the second substrate and optically coupled to a second end of the first circular-polarization-maintaining fiber. The first circular-polarization-maintaining fiber is configured to transmit the first circularly polarized light from the first quarter-wave polarization rotator to the second quarter-wave polarization rotator, and the second quarter-wave polarization rotator is configured to convert the first circularly polarized light to second linearly polarized light. The apparatus includes a first optical modulator mounted on the second substrate and configured to modulate the second linearly polarized light.

Implementations can include one or more of the following features. The first circular-polarization-maintaining fiber can be at least one of edge-coupled or vertically coupled to the second substrate.

The apparatus can include: a second laser mounted on the first substrate and configured to generate third linearly polarized light; and a third quarter-wave polarization rotator mounted on the first substrate and configured to convert the third linearly polarized light to second circularly polarized light. The apparatus can include a second circular-polarization-maintaining fiber having a first end optically coupled to the second quarter-wave polarization rotator; and a fourth quarter-wave polarization rotator mounted on the second substrate and optically coupled to a second end of the second circular-polarization-maintaining fiber. The second circular-polarization-maintaining fiber can be configured to transmit the second circularly polarized light from the third quarter-wave polarization rotator to the fourth quarter-wave polarization rotator. The fourth quarter-wave polarization rotator can be configured to convert the second circularly polarized light to fourth linearly polarized light. The apparatus can include a second optical modulator mounted on the second substrate and configured to modulate the fourth polarized light.

The first laser and the second laser can be aligned such that the first linearly polarized light has a polarization direction that is substantially parallel to the polarization direction of the third linearly polarized light.

In another general aspect, an apparatus includes: a first laser configured to generate first linearly polarized light; and a second laser configured to generate second linearly polarized light. The apparatus includes a first polarization beam splitter configured to combine the first linearly polarized light and the second linearly polarized light to generate a first linearly polarized combined light; and a first quarter-wave plate or quarter-wave polarization rotator configured to convert the first linearly polarized combined light to first circularly polarized combined light. The apparatus includes a first circular-polarization-maintaining fiber having a first end optically coupled to the first quarter-wave plate or quarter-wave polarization rotator; and a second quarter-wave plate or quarter-wave polarization rotator optically coupled to a second end of the circular polarization maintaining fiber. The first circular-polarization-maintaining fiber is configured to transmit the first circularly polarized combined light from the first quarter-wave plate or quarter-wave polarization rotator to the second quarter-wave plate or quarter-wave polarization rotator, and the second quarter-wave plate or quarter-wave polarization rotator is configured to convert the first circularly polarized combined light to second linearly polarized combined light. The apparatus includes a second polarization beam splitter configured to separate the second linearly polarized combined light to a third linearly polarized light and a fourth linearly polarized light. The apparatus includes a first optical modulator configured to modulate the third linearly polarized light; and a second optical modulator configured to modulate the fourth linearly polarized light.

Implementations can include one or more of the following features. The first linearly polarized light can have a first polarization direction, and the second linearly polarized light can have a second polarization direction that is substantially orthogonal to the first polarization direction.

The third linearly polarized light can have a third polarization direction, and the fourth linearly polarized light can have a fourth polarization direction that is substantially orthogonal to the third polarization direction.

The first circularly polarized combined light can have a right-handed circularly polarized component and a left-handed circularly polarized component.

In another general aspect, an apparatus includes: a photon source includes a first laser source and a second laser source. The photon source is configured to generate first circularly polarized combined light based on light generated by the first laser source and the second laser source. The first circularly polarized combined light has a right-handed circularly polarized component and a left-handed circularly polarized component. The apparatus includes a first circular-polarization-maintaining fiber configured to receive the first circularly polarized combined light from the photon source. The apparatus includes a modulator module including a first modulator and a second modulator. The modulator module is configured to convert the first circularly polarized combined light to third linearly polarized light and fourth linearly polarized light, the first modulator is configured to modulate the third linearly polarized light, and the second modulator is configured to modulate the fourth linearly polarized light.

Implementations can include one or more of the following features. The photon source can include a first polarization beam splitter configured to combine light generated by the first laser source and light generated by the second laser source.

The first laser source can be configured to generate first linearly polarized light, and the second laser source can be configured to generate second linearly polarized light having a polarization direction that is substantially orthogonal to the polarization direction of the first linearly polarized light.

The second laser source can include a second laser and a polarization rotator. The second laser can be configured to generate linearly polarized light having a polarization direction that is substantially parallel to the polarization direction of the first linearly polarized light, and the polarization rotator can be configured to rotate the polarization direction of the light from the second laser to cause the second linearly polarized light to have the polarization direction that is substantially orthogonal to the polarization direction of the first linearly polarized light.

The photon source can include a first quarter-wave plate configured to receive light from the polarization beam splitter. The first laser source can be configured to generate first linearly polarized light, and the second laser source can be configured to generate second linearly polarized light having a polarization direction substantially orthogonal to the polarization direction of the first linearly polarized light. The first polarization beam splitter can be configured to combine the first linearly polarized light and the second linearly polarized light to generate first linearly polarized combined light, and the first quarter-wave plate can be configured to convert the first linearly polarized combined light to the first circularly polarized combined light.

The photon source can include a first quarter-wave plate configured to receive light from the first laser source and the second laser source. The first laser source can be configured to generate first linearly polarized light, and the second laser source can be configured to generate second linearly polarized light having a polarization direction substantially orthogonal to the polarization direction of the first linearly polarized light. The first quarter-wave plate can be configured to convert the first linearly polarized light to first circularly polarized light, and convert the second linearly polarized light to second circularly polarized light. The first polarization beam splitter can be configured to combine the first circularly polarized light and the second circularly polarized light to generate the first circularly polarized combined light.

The modulator module can include a second polarization beam splitter configured to separate the first circularly polarized combined light or light derived from the first circularly polarized combined light to a first light component that is provided to the first modulator and a second light component that is provided to the second modulator.

The modulator module can include a quarter-wave plate configured to receive the first circularly polarized combined light and generate second linearly polarized combined light. The second polarization beam splitter can be configured to separate the second linearly polarized combined light to the third linearly polarized light and the fourth linearly polarized light.

The modulator module can include a quarter-wave plate configured to receive light from the second polarization beam splitter. The second polarization beam splitter can be configured to separate the first circularly polarized combined light to a first circularly polarized component and a second circularly polarized component. The quarter-wave plate can be configured to convert the first circularly polarized component to the third linearly polarized light, and convert the second circularly polarized component to the fourth linearly polarized light.

The modulator module can include a polarization rotator configured to rotate the polarization direction of the light that is provided to one of the modulators.

In another general aspect, a method includes: at a first light source, generating first circularly polarized light; and transmitting the first circularly polarized light through a first circular-polarization-maintaining fiber from the first light source to a second location. The method includes at the second location, converting the first circularly polarized light to second linearly polarized light; and modulating the second linearly polarized light.

Implementations can include one or more of the following features. Generating the first circularly polarized light can include generating first linearly polarized light, and converting the first linearly polarized light to the first circularly polarized light.

Generating the first circularly polarized light can include: generating first linearly polarized light, generating third linearly polarized light, combining the first linearly polarized light and the third linearly polarized light to generate first linearly polarized combined light, and converting the first linearly polarized combined light to the first circularly polarized light. The first circularly polarized light can include a first circularly polarized component and a second circularly polarized component.

Generating the first circularly polarized light can include: generating first linearly polarized light, generating third linearly polarized light, converting the first linearly polarized light to second circularly polarized light, converting the third linearly polarized light to third circularly polarized light, and combining the second circularly polarized light and the third circularly polarized light to generate the first circularly polarized combined light.

Converting the first circularly polarized light to second linearly polarized light can include converting the first circularly polarized light to third linearly polarized light, and separating the third linearly polarized light to fourth linearly polarized light and fifth linearly polarized light. Modulating the second linearly polarized light can include modulating the fourth linearly polarized light and modulating the fifth linearly polarized light.

Converting the first circularly polarized light to second linearly polarized light can include separating the first circularly polarized light to a first circularly polarized component and a second circularly polarized component, converting the first circularly polarized component to third linearly polarized light, can converting the second circularly polarized component to fourth linearly polarized light. Modulating the second linearly polarized light can include modulating the third linearly polarized light and modulating the fourth linearly polarized light.

In another general aspect, a method includes: using a first single quarter-wave plate to convert a first plurality of linearly polarized light to a plurality of circularly polarized light; and transmitting the plurality of circularly polarized light through a plurality of circular-polarization-maintaining fibers. The method includes converting the circularly polarized light received from the plurality of circular-polarization-maintaining fibers to a second plurality of linearly polarized light; and modulating the second plurality of linearly polarized light.

Implementations can include one or more of the following features. Converting the circularly polarized light received from the plurality of circular-polarization-maintaining fibers to the second plurality of linearly polarized light can include using a second single quarter-wave plate to convert the circularly polarized light received from the plurality of circular-polarization-maintaining fibers to the second plurality of linearly polarized light.

In another general aspect, a method includes: at a first photonic integrated circuit, generating a first plurality of linearly polarized light, and converting the first plurality of linearly polarized light to a plurality of circularly polarized light. The method includes transmitting the plurality of circularly polarized light through a plurality of circular-polarization-maintaining fibers from the first photonic integrated circuit to a second location. The method includes at the second location, converting the plurality of circularly polarized light to a second plurality of linearly polarized light; and modulating the second plurality of linearly polarized light.

Implementations can include one or more of the following features. Converting the first plurality of linearly polarized light to the plurality of circularly polarized light can include using a plurality of polarization converters to convert the first plurality of linearly polarized light to the plurality of circularly polarized light.

Converting the plurality of circularly polarized light to the second plurality of linearly polarized light can include using a plurality of polarization converters to convert the plurality of circularly polarized light to the second plurality of linearly polarized light.

In another general aspect, an apparatus includes: a light source configured to generate first linearly polarized light; and a first quarter-wave plate configured to convert the first linearly polarized light to first circularly polarized light. The apparatus includes a first circular-polarization-maintaining fiber having a first end optically coupled to the first quarter-wave plate, and a second quarter-wave plate optically coupled to a second end of the first circular-polarization-maintaining fiber. The first circular-polarization-maintaining fiber is configured to transmit the first circularly polarized light from the first quarter-wave plate to the second quarter-wave plate, and the second quarter-wave plate is configured to convert the first circularly polarized light to second linearly polarized light. The apparatus includes a first optical device that accepts the second linearly polarized light.

Implementations can include one or more of the following features. The first optical device can include at least one of a lithium niobate optical modulator, a vertical grating coupler on a photonic integrated circuit, or a modulator integrated on a photonic integrated circuit.

The light source can include a local oscillator that is configured to generate a sequence of optical pulses, and the first optical device can include a coherent optical receiver.

The light source can include a single-polarization optical transmitter and the first optical device can include a single-polarization optical receiver.

The apparatus can include a first photonic integrated circuit including circuitry that is configured to generate a first electrical signal. The first optical device can be part of the photonic integrated circuit, and the first optical device can be configured to process the second linearly polarized light based on the first electrical signal.

The apparatus can include: a second light source configured to generate third linearly polarized light. The first quarter-wave plate can be configured to convert the third linearly polarized light to second circularly polarized light. The apparatus can include a second circular-polarization-maintaining fiber having a first end optically coupled to the first quarter-wave plate and a second end optically coupled to the second quarter-wave plate. The second circular-polarization-maintaining fiber can be configured to transmit the second circularly polarized light from the first quarter-wave plate to the second quarter-wave plate. The second quarter-wave plate can be configured to convert the second circularly polarized light to fourth linearly polarized light. The apparatus can include a second optical device that accepts the fourth linearly polarized light.

The first light source and the second light source can be aligned such that the first linearly polarized light has a polarization direction that is substantially parallel to the polarization direction of the third linearly polarized light.

The apparatus can include a substrate. The first optical device and the second optical device can be mounted on the substrate.

The second quarter-wave plate can be at least one of edge-coupled or vertically coupled to the substrate.

In another general aspect, an apparatus includes: a first substrate; and a first light source mounted on the first substrate and configured to generate first linearly polarized light. The apparatus includes a first quarter-wave polarization rotator mounted on the first substrate and configured to convert the first linearly polarized light to first circularly polarized light; and a first circular-polarization-maintaining fiber having a first end optically coupled to the first quarter-wave polarization rotator. The apparatus includes a second substrate; and a second quarter-wave polarization rotator mounted on the second substrate and optically coupled to a second end of the first circular-polarization-maintaining fiber. The first circular-polarization-maintaining fiber is configured to transmit the first circularly polarized light from the first quarter-wave polarization rotator to the second quarter-wave polarization rotator, and the second quarter-wave polarization rotator is configured to convert the first circularly polarized light to second linearly polarized light. The apparatus includes a first optical device mounted on the second substrate and configured to modulate the second linearly polarized light.

Implementations can include one or more of the following features. The first circular-polarization-maintaining fiber can be at least one of edge-coupled or vertically coupled to the second substrate.

The apparatus can include: a second light source mounted on the first substrate and configured to generate third linearly polarized light; and a third quarter-wave polarization rotator mounted on the first substrate and configured to convert the third linearly polarized light to second circularly polarized light. The apparatus can include a second circular-polarization-maintaining fiber having a first end optically coupled to the second quarter-wave polarization rotator; and a fourth quarter-wave polarization rotator mounted on the second substrate and optically coupled to a second end of the second circular-polarization-maintaining fiber. The second circular-polarization-maintaining fiber can be configured to transmit the second circularly polarized light from the third quarter-wave polarization rotator to the fourth quarter-wave polarization rotator, and the fourth quarter-wave polarization rotator can be configured to convert the second circularly polarized light to fourth linearly polarized light. The apparatus can include a second optical modulator mounted on the second substrate and configured to modulate the fourth polarized light.

The first light source and the second light source can be aligned such that the first linearly polarized light has a polarization direction that is substantially parallel to the polarization direction of the third linearly polarized light.

In another general aspect, an apparatus includes: a first light source configured to generate first linearly polarized light; and a second light source configured to generate second linearly polarized light. The apparatus includes a first polarization beam splitter configured to combine the first linearly polarized light and the second linearly polarized light to generate a first linearly polarized combined light; and a first quarter-wave plate or quarter-wave polarization rotator configured to convert the first linearly polarized combined light to first circularly polarized combined light. The apparatus includes a first circular-polarization-maintaining fiber having a first end optically coupled to the first quarter-wave plate or quarter-wave polarization rotator; and a second quarter-wave plate or quarter-wave polarization rotator optically coupled to a second end of the circular polarization maintaining fiber. The first circular-polarization-maintaining fiber is configured to transmit the first circularly polarized combined light from the first quarter-wave plate or quarter-wave polarization rotator to the second quarter-wave plate or quarter-wave polarization rotator, and the second quarter-wave plate or quarter-wave polarization rotator is configured to convert the first circularly polarized combined light to second linearly polarized combined light. The apparatus includes a second polarization beam splitter configured to separate the second linearly polarized combined light to a third linearly polarized light and a fourth linearly polarized light; a first optical device configured to process the third linearly polarized light; and a second optical device configured to process the fourth linearly polarized light.

Implementations can include one or more of the following features. The first linearly polarized light can have a first polarization direction, and the second linearly polarized light can have a second polarization direction that is substantially orthogonal to the first polarization direction.

The third linearly polarized light can have a third polarization direction, and the fourth linearly polarized light can have a fourth polarization direction that is substantially orthogonal to the third polarization direction.

The first circularly polarized combined light can have a right-handed circularly polarized component and a left-handed circularly polarized component.

In another general aspect, an apparatus includes: a photon source including a first light source and a second light source. The photon source is configured to generate first circularly polarized combined light based on light generated by the first light source and the second light source, the first circularly polarized combined light has a right-handed circularly polarized component and a left-handed circularly polarized component. The apparatus includes a first circular-polarization-maintaining fiber configured to receive the first circularly polarized combined light from the photon source. The apparatus includes an optical module including a first optical device and a second optical device. The optical module is configured to convert the first circularly polarized combined light to third linearly polarized light and fourth linearly polarized light, the first optical device is configured to process the third linearly polarized light, and the second optical device is configured to process the fourth linearly polarized light.

Implementations can include one or more of the following features. The photon source can include a first polarization beam splitter configured to combine light generated by the first light source and light generated by the second light source.

The first light source can be configured to generate first linearly polarized light, and the second light source can be configured to generate second linearly polarized light having a polarization direction that is substantially orthogonal to the polarization direction of the first linearly polarized light.

The second light source can include a second light generating device and a polarization rotator, and the second light generating device can be configured to generate linearly polarized light having a polarization direction that is substantially parallel to the polarization direction of the first linearly polarized light. The polarization rotator can be configured to rotate the polarization direction of the light from the second light generating device to cause the second linearly polarized light to have the polarization direction that is substantially orthogonal to the polarization direction of the first linearly polarized light.

The photon source can include a first quarter-wave plate configured to receive light from the polarization beam splitter. The first light source can be configured to generate first linearly polarized light, and the second light source can be configured to generate second linearly polarized light having a polarization direction substantially orthogonal to the polarization direction of the first linearly polarized light. The first polarization beam splitter can be configured to combine the first linearly polarized light and the second linearly polarized light to generate first linearly polarized combined light. The first quarter-wave plate can be configured to convert the first linearly polarized combined light to the first circularly polarized combined light.

The photon source can include a first quarter-wave plate configured to receive light from the first light source and the second light source. The first light source can be configured to generate first linearly polarized light, and the second light source can be configured to generate second linearly polarized light having a polarization direction substantially orthogonal to the polarization direction of the first linearly polarized light. The first quarter-wave plate can be configured to convert the first linearly polarized light to first circularly polarized light, and convert the second linearly polarized light to second circularly polarized light. The first polarization beam splitter can be configured to combine the first circularly polarized light and the second circularly polarized light to generate the first circularly polarized combined light.

The optical module can include a second polarization beam splitter configured to separate the first circularly polarized combined light or light derived from the first circularly polarized combined light to a first light component that is provided to the first modulator and a second light component that is provided to the second optical device.

The optical module can include a quarter-wave plate configured to receive the first circularly polarized combined light and generate second linearly polarized combined light. The second polarization beam splitter can be configured to separate the second linearly polarized combined light to the third linearly polarized light and the fourth linearly polarized light.

The optical module can include a quarter-wave plate configured to receive light from the second polarization beam splitter. The second polarization beam splitter can be configured to separate the first circularly polarized combined light to a first circularly polarized component and a second circularly polarized component. The quarter-wave plate can be configured to convert the first circularly polarized component to the third linearly polarized light, and convert the second circularly polarized component to the fourth linearly polarized light.

The optical module can include a polarization rotator configured to rotate the polarization direction of the light that is provided to one of the optical devices.

In another general aspect, a method includes: at a first light source, generating first circularly polarized light; and transmitting the first circularly polarized light through a first circular-polarization-maintaining fiber from the first light source to a second location. The method includes at the second location, converting the first circularly polarized light to second linearly polarized light; and processing the second linearly polarized light.

Implementations can include one or more of the following features. Generating the first circularly polarized light can include generating first linearly polarized light, and converting the first linearly polarized light to the first circularly polarized light.

Generating the first circularly polarized light can include: generating first linearly polarized light, generating third linearly polarized light, combining the first linearly polarized light and the third linearly polarized light to generate first linearly polarized combined light, and converting the first linearly polarized combined light to the first circularly polarized light. The first circularly polarized light can include a first circularly polarized component and a second circularly polarized component.

Generating the first circularly polarized light can include: generating first linearly polarized light, generating third linearly polarized light, converting the first linearly polarized light to second circularly polarized light, converting the third linearly polarized light to third circularly polarized light, and combining the second circularly polarized light and the third circularly polarized light to generate the first circularly polarized combined light.

Converting the first circularly polarized light to second linearly polarized light can include converting the first circularly polarized light to third linearly polarized light, and separating the third linearly polarized light to fourth linearly polarized light and fifth linearly polarized light. Processing the second linearly polarized light can include processing the fourth linearly polarized light and processing the fifth linearly polarized light.

Converting the first circularly polarized light to second linearly polarized light can include separating the first circularly polarized light to a first circularly polarized component and a second circularly polarized component, converting the first circularly polarized component to third linearly polarized light, and converting the second circularly polarized component to fourth linearly polarized light. Processing the second linearly polarized light can include processing the third linearly polarized light and processing the fourth linearly polarized light.

In another general aspect, a method includes: using a first single quarter-wave plate to convert a first plurality of linearly polarized light to a plurality of circularly polarized light; and transmitting the plurality of circularly polarized light through a plurality of circular-polarization-maintaining fibers. The method includes converting the circularly polarized light received from the plurality of circular-polarization-maintaining fibers to a second plurality of linearly polarized light; and processing the second plurality of linearly polarized light.

Implementations can include one or more of the following features. Converting the circularly polarized light received from the plurality of circular-polarization-maintaining fibers to the second plurality of linearly polarized light can include using a second single quarter-wave plate to convert the circularly polarized light received from the plurality of circular-polarization-maintaining fibers to the second plurality of linearly polarized light.

In another general aspect, a method includes: at a first photonic integrated circuit, generating a first plurality of linearly polarized light, and converting the first plurality of linearly polarized light to a plurality of circularly polarized light. The method includes transmitting the plurality of circularly polarized light through a plurality of circular-polarization-maintaining fibers from the first photonic integrated circuit to a second location. The method includes at the second location, converting the plurality of circularly polarized light to a second plurality of linearly polarized light; and processing the second plurality of linearly polarized light.

Implementations can include one or more of the following features. Converting the first plurality of linearly polarized light to the plurality of circularly polarized light can include using a plurality of polarization converters to convert the first plurality of linearly polarized light to the plurality of circularly polarized light.

Converting the plurality of circularly polarized light to the second plurality of linearly polarized light can include using a plurality of polarization converters to convert the plurality of circularly polarized light to the second plurality of linearly polarized light.

In another general aspect, a data center includes any of the apparatuses described above.

In another general aspect, a method includes operating the data center described above.

In another general aspect, a method includes operating any of the apparatuses described above.

In another general aspect, a method includes assembling any of the apparatuses described above.

In another general aspect, a method includes processing data using any of the apparatuses described above.

Also disclosed herein are various embodiments of a connector assembly for optically connecting one or more optical fibers and an array of vertical coupling elements of a photonic integrated circuit (PIC).

In another general aspect, an apparatus includes: a fiber-optic connector configured to optically couple a plurality of optical fibers to a plurality of vertical coupling elements on a photonic integrated circuit, in which the fiber-optic connector includes a plurality of circularly asymmetric optical lenses configured to direct light toward the vertical coupling elements at one or more angles of incidence relative to a direction perpendicular to a main surface of the photonic integrated circuit.

In another general aspect, an apparatus includes: a fiber-optic connector configured to optically couple a plurality of optical fibers to a plurality of vertical coupling elements on a photonic integrated circuit, in which the fiber-optic connector includes a plurality of circularly asymmetric optical lenses configured to direct light from the optical fibers toward the vertical coupling elements. Each of at least some of the circularly asymmetric optical lenses is configured to direct a light beam towards the corresponding vertical coupling element at an angle of incidence relative to a direction perpendicular to a main surface of the photonic integrated circuit, and each of at least some of the circularly asymmetric optical lenses is asymmetric with respect to an optical axis that is perpendicular to the main surface of the photonic integrated circuit.

Implementations of the above apparatuses can include one or more of the following features. The plurality of circularly asymmetric optical lenses can be configured to direct light toward the vertical coupling elements at one or more angles of incidence in a range from 1° to 30° relative to the direction perpendicular to the main surface of the photonic integrated circuit.

The plurality of optical fibers can be arranged in a two-dimensional array.

The two-dimensional array can include at least 2 rows and at least 8 columns.

The spacing between two adjacent rows in the two-dimensional array can be identical to the spacing between two adjacent columns in the two-dimensional array.

The fiber-optic connector can include first optical elements configured to process light from the optical fibers to form light beams that are directed to the circularly asymmetric optical lenses.

The first optical elements can be configured to collimate light from the optical fibers to form collimated light beams that are directed to the circularly asymmetric optical lenses.

Each of at least some of the circularly asymmetric optical lenses can have a surface profile that is configured to focus the light beam to a first location on the vertical coupling element, and the circularly asymmetric optical lens can have an optical axis that passes the first location. The first optical element can be positioned and oriented relative to the circularly asymmetric optical lens such that the light beam has a first axis that is parallel to, and offset at a first distance from, the optical axis of the circularly asymmetric optical lens.

At least two circularly asymmetric optical lenses can be spaced apart at a second distance in a range from 1.5 to 4.5 times the first distance between the first axis and the optical axis, the second distance represents the distance between the optical axes of the lenses, the first and second distances being measured along a plane parallel to the main surface of the photonic integrated circuit.

The second distance can be in a range from 2 to 3.5 times the first distance.

The second distance can be in a range from 2 to 3 times the first distance.

The plurality of circularly asymmetric optical lenses can include an array of circularly asymmetric optical lenses, and each of at least some of the circularly asymmetric optical lenses can be spaced apart from a neighboring circularly asymmetric optical lens at a second distance in a range from 1.5 to 4.5 times the first distance between the first axis and the optical axis of the circularly asymmetric optical lens.

The second distance can be in a range from 2 to 3.5 times the first distance.

The second distance can be in a range from 2 to 3 times the first distance.

The first axis and the optical axis can be perpendicular to the main surface of the photonic integrated circuit.

Each of at least some of the circularly asymmetric optical lenses and the corresponding first optical element can be positioned relative to the vertical coupling element such that the first distance between the first axis and the optical axis is in a range from 10% to 150% of the full width at half maximum of the light beam received at the circularly asymmetric optical lens.

Each of at least some of the circularly asymmetric optical lenses and the corresponding first optical element can be positioned relative to the vertical coupling element such that the first distance between the first axis and the optical axis is in a range from 20% to 80% of the full width at half maximum of the light beam received at the circularly asymmetric optical lens.

Each of at least some of the circularly asymmetric optical lenses can be positioned relative to the corresponding first optical element such that the portion of the light beam received at the circularly asymmetric optical lens having an intensity greater than half maximum is entirely offset from the optical axis of the circularly asymmetric optical lens.

Each of at least some of the circularly asymmetric optical lenses can include a truncated version of a rotationally symmetric optical lens, the optical axis of the circularly asymmetric optical lens can overlap the optical axis of the rotationally symmetric optical lens, and the circularly asymmetric optical lens can be asymmetric with respect to the optical axis.

The circularly asymmetric optical lens can have a dimension that is less than 1.5 times the radius of the rotationally symmetric optical lens, the dimension of the circularly asymmetric optical lens and the radius of the rotationally symmetric optical lens can be measured along a plane parallel to the main surface of the photonic integrated circuit.

The circularly asymmetric optical lens can have a dimension that is less than 1.2 times the radius of the rotationally symmetric optical lens.

Each of at least some of the circularly asymmetric optical lenses can have a footprint that is less than 50% of a footprint of the corresponding rotationally symmetric optical lens.

Each of at least some of the circularly asymmetric optical lenses can have a dimension that is less than 1.5 times the diameter of the light beam received at the circularly asymmetric optical lens, and the diameter of the light beam can be the full width at half maximum of the light beam.

Each of at least some of the circularly asymmetric optical lenses can have a footprint having an area that is less than 2.25 times the area of the cross section of the light beam received at the circularly asymmetric optical lens, and the area of the cross section of the light beam can be calculated based on the full width at half maximum of the light beam.

Each of at least some of the circularly asymmetric optical lenses can be configured to receive the entire portion of the light beam that has an intensity at half maximum or more.

The first optical elements (e.g., 4610) can be configured to collimate light from optical fibers having end facets that are polished at an angle in a range from 1 to 30 degrees relative to a plane that is perpendicular to the optical axes of the optical fibers.

The first optical elements (e.g., 4610) can be configured to collimate light from optical fibers having end facets that are polished at an angle in a range from 4 to 15 degrees relative to the plane that is perpendicular to the optical axes of the optical fibers.

The first optical elements can be configured to collimate light from optical fibers having end facets that are polished at an angle in a range from 6 to 10 degrees relative to the plane that is perpendicular to the optical axes of the optical fibers.

The first optical elements (e.g., 4610) can include a second plurality of circularly asymmetric optical lenses configured to optically couple the optical fibers to the first plurality of circularly asymmetric optical lenses.

The second plurality of circularly asymmetric optical lenses can have surface profiles that are substantially similar to the first plurality of circularly asymmetric optical lenses.

The plurality of circularly asymmetric optical lenses can be configured to direct light toward, or receive light from, the vertical coupling elements at one or more angles of incidence in a range from 4° to 15° relative to the direction perpendicular to the main surface of the photonic integrated circuit.

The plurality of circularly asymmetric optical lenses can be configured to direct light toward, or receive light from, the vertical coupling elements at one or more angles of incidence in a range from 5° to 12° relative to the direction perpendicular to the main surface of the photonic integrated circuit.

The plurality of circularly asymmetric optical lenses can be configured to direct light toward, or receive light from, the vertical coupling elements at one or more angles of incidence in a range from 6° to 10° relative to the direction perpendicular to the main surface of the photonic integrated circuit.

The plurality of circularly asymmetric optical lenses can be configured to direct light toward, or receive light from, the vertical coupling elements at one or more offset angles in a range from 7° to 9° relative to the direction perpendicular to the main surface of the photonic integrated circuit.

Each of at least some of the circularly asymmetric optical lenses can have a circular or oval circumference.

Each of at least some of the circularly asymmetric optical lenses can have a polygonal circumference.

At least some of the circularly asymmetric optical lenses can have a same shape.

The plurality of circularly asymmetric optical lenses can include an array of rows and columns of circularly asymmetric optical lenses.

The apparatus can include the photonic integrated circuit.

The apparatus can include a first connector element configured to be mechanically and optically coupled to a second connector element that is optically coupled to the plurality of optical fibers.

The vertical coupling elements can include vertical grating couplers.

The plurality of circularly asymmetric optical lenses can include silicon lenses.

The photonic integrated circuit can include optical waveguides that are coupled to the vertical coupling elements.

The fiber-optic connector can include one or more walk-off elements configured to receive input optical beams from one or more of the fiber cores, and separate each of at least some of the input optical beams into a first optical beam component having a first polarization and a second optical beam component having a second polarization. The fiber-optic connector can include a birefringent plate having holes, in which the birefringent plate is positioned relative to the one or more walk-off elements such that each of at least some of the holes is aligned with a corresponding first optical beam component, and the birefringent plate rotates a polarization of each of at least some of the of the second optical beam components to cause the second optical beam component to have a same polarization as the corresponding first optical beam component.

The plurality of circularly asymmetric optical lenses can include a plurality of pairs of circularly asymmetric optical lenses, and each of at least some of the pairs of circularly asymmetric optical lenses can be configured to couple corresponding first and second optical beam components to a pair of vertical coupling elements.

The holes can include at least one of circular holes, square holes, rectangular holes, or strip holes.

A distance between two adjacent optical fibers can be in a range from 225 μm to 275 μm, and a distance between two adjacent circularly asymmetric optical lenses can be in a range from $100\sqrt{2}$ μm to $150\sqrt{2}$ μm.

In another general aspect, an apparatus includes: a fiber-optic connector configured to optically couple a plurality of optical fibers to a plurality of vertical coupling elements on a photonic integrated circuit, in which the fiber-optic connector includes a plurality of free-form off-axis lenses configured to direct light toward the vertical coupling elements at one or more angles of incidence relative to a direction perpendicular to a main surface of the photonic integrated circuit.

Implementations can include one or more of the following features. The plurality of free-form off-axis lenses can be configured to direct light toward the vertical coupling elements at one or more angles of incidence in a range from 1° to 30° relative to the direction perpendicular to the main surface of the photonic integrated circuit.

The plurality of optical fibers can be arranged in a two-dimensional array.

The two-dimensional array can include at least 2 rows and at least 8 columns.

The spacing between two adjacent rows in the two-dimensional array can be identical to the spacing between two adjacent columns in the two-dimensional array.

The fiber-optic connector can include first optical elements configured to process light from the optical fibers to form light beams that are directed to the free-form off-axis lenses.

The first optical elements can be configured to collimate light from the optical fibers to form collimated light beams that are directed to the free-form off-axis lenses.

Each of at least some of the free-form off-axis lenses can have a surface profile that is configured to focus the light beam to a first location on the vertical coupling element, and the free-form off-axis lens can have an optical axis that passes the first location. The first optical element can be positioned and oriented relative to the free-form off-axis lens such that the light beam has a first axis that is parallel to, and offset at a first distance from, the optical axis of the free-form off-axis lens.

In another general aspect, an apparatus includes: a fiber-optic connector configured to optically couple a plurality of optical fibers to a plurality of vertical coupling elements on a photonic integrated circuit. The fiber-optic connector includes: a plurality of first lenses configured to collimate light received from the optical fibers to generate collimated light beams, each of at least some of the first lenses having an optical axis. The fiber-optic connector includes: a plurality of free-form lenses configured to direct the collimated light beams from the plurality of first lenses toward the vertical coupling elements at one or more angles of incidence relative to a direction perpendicular to a main surface of the photonic integrated circuit. Each free-form lens has an optical axis, each of at least some of the free-form lenses is asymmetric with respect to its optical axis, and each of at least some of the free-form lenses has a focal point on its optical axis. Each of at least some of the free-form lenses is configured to receive light from a corresponding first lens, the optical axis of the free-form lens is parallel to the optical axis of the corresponding first lens, and the optical axis of the free-form lens is spaced apart at a first distance relative to the optical axis of the first lens.

Implementations can include one or more of the following features. The plurality of free-form lenses can be configured to direct the collimated light beams from the plurality of first lenses toward the vertical coupling elements at one or more angles of incidence in a range from 1° to 30° relative to the direction perpendicular to the main surface of the photonic integrated circuit.

The plurality of optical fibers can be arranged in a two-dimensional array.

The two-dimensional array can include at least 2 rows and at least 8 columns.

The spacing between two adjacent rows in the two-dimensional array can be identical to the spacing between two adjacent columns in the two-dimensional array.

Each of at least some of the free-form off-axis lenses can have a surface profile that is configured to focus the light beam to a first location on the vertical coupling element, and the free-form off-axis lens can have an optical axis that passes the first location.

At least two free-form lenses can be spaced apart at a second distance in a range from 1.5 to 4.5 times the first distance between the optical axis of the first lens and the optical axis of the free-form lens, in which the second distance represents the distance between the optical axes of the free-form lenses, and the first and second distances are measured along a plane parallel to the main surface of the photonic integrated circuit.

The second distance can be in a range from 2 to 3.5 times the first distance.

The second distance can be in a range from 2 to 3 times the first distance.

The plurality of free-form lenses can include an array of circularly free-form lenses, and each of at least some of the free-form lenses can be spaced apart from a neighboring free-form lens at a second distance in a range from 1.5 to 4.5 times the first distance between the optical axis of the first lens and the optical axis of the free-form lens.

The second distance can be in a range from 2 to 3.5 times the first distance.

The second distance can be in a range from 2 to 3 times the first distance.

The first axis and the optical axis can be perpendicular to the main surface of the photonic integrated circuit.

Each of at least some of the free-form lenses and the corresponding first lens can be positioned relative to the vertical coupling element such that the first distance between the optical axis of the first lens and the optical axis of the free-form lens is in a range from 10% to 150% of the full width at half maximum of the light beam received at the free-form lens.

Each of at least some of the free-form lenses and the corresponding first lens can be positioned relative to the vertical coupling element such that the first distance between the optical axis of the first lens and the optical axis of the free-form lens is in a range from 20% to 80% of the full width at half maximum of the light beam received at the free-form lens.

Each of at least some of the free-form lenses and the corresponding first lens can be positioned relative to the vertical coupling element such that the portion of the light beam received at the free-form lens having an intensity greater than half maximum is entirely offset from the optical axis of the free-form lens.

Each of at least some of the free-form lenses can include a truncated version of a rotationally symmetric optical lens, in which the optical axis of the free-form optical lens overlaps the optical axis of the rotationally symmetric optical lens, and the free-form lens is asymmetric with respect to the optical axis.

The free-form lens can have a dimension that is less than 1.5 times the radius of the rotationally symmetric optical lens, in which the dimension of the free-form lens and the radius of the rotationally symmetric optical lens are measured along a plane parallel to the main surface of the photonic integrated circuit.

The free-form lens can have a dimension that is less than 1.2 times the radius of the rotationally symmetric optical lens.

Each of at least some of the free-form lenses can have a footprint that is less than 50% of a footprint of the corresponding rotationally symmetric optical lens.

Each of at least some of the free-form lenses can have a dimension that is less than 1.5 times the diameter of the light beam received at the free-form lens, and the diameter of the light beam is the full width at half maximum of the light beam.

Each of at least some of the free-form lenses can have a footprint having an area that is less than 2.25 times the area of the cross section of the light beam received at the free-form lens, and the area of the cross section of the light beam is calculated based on the full width at half maximum of the light beam.

The first lenses (e.g., 4610) can be configured to collimate light from optical fibers having end facets that are polished at an angle in a range from 1 to 30 degrees relative to a plane that is perpendicular to the optical axes of the optical fibers.

The first lenses (e.g., 4610) can be configured to collimate light from optical fibers having end facets that are polished at an angle in a range from 4 to 15 degrees relative to the plane that is perpendicular to the optical axes of the optical fibers.

The first lenses can be configured to collimate light from optical fibers having end facets that are polished at an angle in a range from 6 to 10 degrees relative to the plane that is perpendicular to the optical axes of the optical fibers.

The first lenses (e.g., 4610) can include a second plurality of free-form lenses configured to optically couple the optical fibers to the first plurality of free-form lenses.

The second plurality of free-form lenses can have surface profiles that are substantially similar to the first plurality of free-form lenses.

The first plurality of free-form lenses can be configured to direct light toward, or receive light from, the vertical coupling elements at one or more angles of incidence in a range from 4° to 15° relative to the direction perpendicular to the main surface of the photonic integrated circuit.

The first plurality of circularly asymmetric optical lenses can be configured to direct light toward, or receive light from, the vertical coupling elements at one or more angles of incidence in a range from 5° to 12° relative to the direction perpendicular to the main surface of the photonic integrated circuit.

The first plurality of free-form lenses can be configured to direct light toward, or receive light from, the vertical coupling elements at one or more angles of incidence in a range from 6° to 10° relative to the direction perpendicular to the main surface of the photonic integrated circuit.

The plurality of free-form lenses can be configured to direct light toward, or receive light from, the vertical coupling elements at one or more offset angles in a range from 7° to 9° relative to the direction perpendicular to the main surface of the photonic integrated circuit.

Each of at least some of the free-form lenses can have a circular or oval circumference.

Each of at least some of the free-form lenses can have a polygonal circumference.

At least some of the free-form lenses can have a same shape.

The plurality of free-form lenses can include an array of rows and columns of free-form lenses.

The apparatus can include the photonic integrated circuit.

The apparatus can include a first connector element configured to be mechanically and optically coupled to a second connector element that is optically coupled to the plurality of optical fibers.

The vertical coupling elements can include vertical grating couplers.

The plurality of free-form lenses can include silicon lenses.

The photonic integrated circuit can include optical waveguides that are coupled to the vertical coupling elements.

The fiber-optic connector can include one or more walk-off elements configured to receive input optical beams from one or more of the fiber cores, and separate each of at least some of the input optical beams into a first optical beam component having a first polarization and a second optical beam component having a second polarization. The fiber-optic connector can include a birefringent plate having holes, in which the birefringent plate is positioned relative to the one or more walk-off elements such that each of at least some of the holes is aligned with a corresponding first optical beam component, and the birefringent plate rotates a polarization of each of at least some of the of the second optical beam components to cause the second optical beam component to have a same polarization as the corresponding first optical beam component.

The plurality of first free-form lenses can include a plurality of pairs of free-form lenses, in which each of at least some of the pairs of free-form lenses are configured to couple corresponding first and second optical beam components to a pair of vertical coupling elements.

The holes can include at least one of circular holes, square holes, rectangular holes, or strip holes.

A distance between two adjacent optical fibers can be in a range from 225 μm to 275 μm, and a distance between two adjacent circularly asymmetric optical lenses can be in a range from $100\sqrt{2}$ μm to $150\sqrt{2}$ μm.

In another general aspect, a method includes: transmitting light from a plurality of optical fibers to a plurality of first lenses; and directing a plurality of light beams from the plurality of first lenses to a plurality of circularly asymmetric optical lenses. The method includes directing, using the circularly asymmetric optical lenses, the plurality of light beams toward a plurality of vertical coupling elements on a photonic integrated circuit at one or more angles of incidence relative to a direction perpendicular to a main surface of the photonic integrated circuit.

Implementations can include one or more of the following features. Directing the plurality of light beams toward the plurality of vertical coupling elements can include directing the plurality of light beams toward the plurality of vertical coupling elements at one or more angles of incidence in a range from 1° to 30° relative to the direction perpendicular to the main surface of the photonic integrated circuit.

The plurality of optical fibers can be arranged in a two-dimensional array.

The two-dimensional array can include at least 2 rows and at least 8 columns.

The spacing between two adjacent rows in the two-dimensional array can be identical to the spacing between two adjacent columns in the two-dimensional array.

Each of at least some of the circularly asymmetric optical lenses can include a truncated version of a rotationally symmetric optical lens, in which the optical axis of the circularly asymmetric optical lens overlaps the optical axis of the rotationally symmetric optical lens, and the circularly asymmetric optical lens is asymmetric with respect to the optical axis.

Transmitting light from a plurality of optical fibers to a plurality of first lenses can include transmitting light from a plurality of optical fibers with a θ degree polish, 0<θ<30° to a second plurality of circularly asymmetric lenses.

Transmitting a plurality of light beams from the plurality of first lenses to a plurality of circularly asymmetric optical lenses can include transmitting a plurality of collimated light beams from the plurality of first lenses to the plurality of circularly asymmetric optical lenses.

In another general aspect, a method includes: transmitting light from a plurality of optical fibers to a plurality of first lenses; and directing a plurality of light beams from the plurality of first lenses to a plurality of circularly asymmetric optical lenses. The method includes directing, using the plurality of circularly asymmetric optical lenses, the light beams to a plurality of vertical coupling elements on a photonic integrated circuit. Directing the light beams to the plurality of vertical coupling elements on the photonic integrated circuit includes: directing, using each of at least some of the circularly asymmetric optical lenses, a light beam towards the corresponding vertical coupling element at an angle of incidence relative to a direction perpendicular to a main surface of the photonic integrated circuit. Each of at least some of the circularly asymmetric optical lenses is asymmetric with respect to an optical axis that is perpendicular to the main surface of the photonic integrated circuit.

Implementations can include the following feature. Directing the light beam towards the corresponding vertical coupling element can include directing the light beam towards the corresponding vertical coupling element at an angle of incidence in a range from 1° to 30° relative to the direction perpendicular to the main surface of the photonic integrated circuit.

In another general aspect, a method includes: transmitting light from a plurality of optical fibers to a plurality of first lenses; and directing a plurality of light beams from the plurality of first lenses to a plurality of free-form lenses. The method includes directing, using the free-form lenses, the plurality of light beams toward a plurality of vertical coupling elements on a photonic integrated circuit at one or more angles of incidence relative to a direction perpendicular to a main surface of the photonic integrated circuit.

Implementations can include the following feature. Directing the plurality of light beams toward the plurality of vertical coupling elements comprises directing the plurality of light beams toward the plurality of vertical coupling elements at one or more angles of incidence in a range from 1° to 30° relative to the direction perpendicular to the main surface of the photonic integrated circuit.

In another general aspect, a method includes: transmitting light from a two-dimensional array of optical fibers to a two-dimensional array of first lenses, in which each first lens has an optical axis. The method includes directing a plurality of collimated light beams from the two-dimensional array of first lenses to a two-dimensional array of free-form lenses. The method includes directing, using a two-dimensional array of free-form lenses, the collimated light beams from the array of first lenses toward a two-dimensional array of vertical grating couplers on a photonic integrated circuit at one or more angles of incidence relative to a direction perpendicular to a main surface of the photonic integrated circuit. Each free-form lens has an optical axis, each of at least some of the free-form lenses is asymmetric with respect to its optical axis, and each of at least some of the free-form lenses has a focal point on its optical axis. Each of at least some of the free-form lenses receives a collimated light beam from a corresponding first lens, the optical axis of the free-form lens is parallel to the optical axis of the corresponding first lens, and the optical axis of the free-form lens is spaced apart at a first distance relative to the optical axis of the first lens.

Implementations can include the following feature. Directing the collimated light beams from the array of first lenses toward the two-dimensional array of vertical grating couplers comprises directing the collimated light beams from the array of first lenses toward the two-dimensional array of vertical grating couplers at one or more angles of incidence in a range from 1° to 30°

In any of the apparatuses described above, the fiber-optic connector can include a second plurality of circularly asymmetric optical lenses that are not used to direct any light beam towards any vertical coupling element.

In any of the apparatuses described above, the offset distance between the first axis of the light beam and the optical axis of the circularly asymmetric optical lens can be at least 10 μm, at least 20 μm, or at least 40 μm.

In any of the apparatuses described above, the distance between the optical axis of the first lens and the optical axis of the free-form lens can be at least 10 μm, at least 20 μm, or at least 40 μm.

In another general aspect, a data center includes any of the apparatuses described above.

In another general aspect, a method of operating the data center.

In another general aspect, a method of operating any of the apparatuses described above.

In another general aspect, a method of assembling any of the apparatuses described above.

In another general aspect, a method of processing data using any of the apparatuses described above.

In another general aspect, a method of providing optical power using any of the apparatuses described above.

In another general aspect, an apparatus includes: one or more optical fibers having a plurality of fiber cores; a photonic integrated circuit including a plurality of vertical-coupling elements disposed along a main surface of the photonic integrated circuit; and a fiber-optic connector connected between the one or more optical fibers and the photonic integrated circuit to communicate light between the one or more optical fibers and the photonic integrated circuit. The fiber-optic connector includes a polarization beam splitter and a patterned birefringent plate. The polarization beam splitter is configured to split an incident light beam from a corresponding fiber core into a first beam having a first polarization and a second beam having a second polarization different from the first polarization. The patterned birefringent plate includes a first region and a second region, the first region has a first optical birefringence, the second region has a second optical birefringence that is different from the first optical birefringence, the first region is produced by applying localized heating to a portion of a birefringent plate to reduce the birefringence at the first region, the second region is not subject to the localized heating and retains its original birefringence. The polarization beam splitter is configured to direct the first beam towards the first region and direct the second beam towards the second region. The first region is configured to rotate the polarization of the first beam by a first amount, the second region is configured to rotate the polarization of the second beam by a second amount that is different from the first amount, the first and second amounts are selected to cause the first and second beams to have substantially parallel polarization after passing the patterned birefringent plate.

Implementations can include one or more of the following features. The patterned birefringent plate can be made from a single piece of birefringent material.

The first region can be an integral portion of the patterned birefringent plate, and no glue or adhesive is used to bond the first region to other portions of the patterned birefringent plate.

The patterned birefringent plate has a top surface and a bottom surface, and the first region can extend from the top surface to the bottom surface.

The patterned birefringent plate has a top surface and a bottom surface, and the first region can be positioned within the birefringent plate at a first distance from the top surface and a second distance from the bottom surface.

The patterned birefringent plate has a top surface and a bottom surface, and the first region can extend from the top surface to a location within the birefringent plate at a distance from the bottom surface.

The polarization beam splitter can be configured to cause the second polarization of the second beam to be orthogonal to the first polarization of the first beam after the first and second beams exit the polarization beam splitter. The first region can have substantially zero birefringence, and the second region can be configured to rotate the polarization of the second beam by about $90°+n\times180°$, $0\leq n$, n being an integer.

The one or more optical fibers can include an array of at least 2 rows and at least 8 columns of fiber cores. The patterned birefringent plate can include at least two first regions, each first region can have an elongated shape that extends along a direction parallel to the row direction. The second region can include the birefringent material adjacent to the first regions. The polarization beam splitter can be configured to split 8 incident light beams from 8 corresponding fiber cores of a row into 8 first beams having the first polarization and 8 second beams having the second polarization, direct the 8 first beams toward a first region, and direct the 8 second beams to the second region. Upon the 8 first beams passing through the first region and the 8 second beams passing through the second region, the 8 first beams and the 8 second beams can have substantially parallel polarization.

The one or more optical fibers can include an array of at least 2 rows and at least 8 columns of fiber cores. The patterned birefringent plate can include an array of at least 2 rows and at least 8 columns of first regions. The second region can include the birefringent material adjacent to the first regions. The polarization beam splitter can be configured to split 8 incident light beams from 8 corresponding fiber cores of a row into 8 first beams having the first polarization and 8 second beams having the second polarization different from the first polarization, direct the 8 first beams toward 8 corresponding first regions, and direct the 8 second beams towards the second region. Upon the 8 first beams passing through the 8 first regions and the 8 second beams passing through the second region, the 8 first beams and the 8 second beams can have substantially parallel polarization.

The fiber-optic connector can include a first connector part and a second connector part, the first connector part can be removably coupled to the second connector part, the first connector part can be optically coupled to the plurality of fiber cores, the second connector part can be optically coupled to the plurality of vertical-coupling elements, and both the polarization beam splitter and the patterned birefringent plate can be included in the first connector part.

The fiber-optic connector can include a first connector part and a second connector part, the first connector part can be removably coupled to the second connector part, the first connector part can be optically coupled to the plurality of fiber cores, the second connector part can be optically coupled to the plurality of vertical-coupling elements, and both the polarization beam splitter and the patterned birefringent plate can be included in the second connector part.

The fiber-optic connector can include a first connector part and a second connector part, the first connector part can be removably coupled to the second connector part, the first connector part can be optically coupled to the plurality of fiber cores, the second connector part can be optically coupled to the plurality of vertical-coupling elements, the polarization beam splitter can be included in the first connector part, and the patterned birefringent plate can be included in the second connector part.

In another general aspect, an apparatus includes: a fiber-optic connector configured to be connected between one or more optical fibers having a plurality of fiber cores and a photonic integrated circuit including a plurality of vertical-coupling elements disposed along a main surface of the photonic integrated circuit. The fiber-optic connector includes a polarization beam splitter and a patterned birefringent plate. The polarization beam splitter is configured to split an incident light beam from a corresponding fiber core into a first beam having a first polarization and a second beam having a second polarization different from the first polarization. The patterned birefringent plate includes a first region and a second region, the first region has a first optical birefringence, the second region has a second optical birefringence that is different from the first optical birefringence, the difference in the first and second optical birefringence is caused by performing at least one of (i) applying localized heating to the first region without applying localized heating to the second region to cause the first region to have a lower birefringence as compared to the second region, or (ii)

applying different amounts of localized heating to the first and second regions to cause the first region to have a first birefringence and the second region to have a second birefringence different from the first birefringence. The polarization beam splitter is configured to direct the first beam towards the first region and direct the second beam towards the second region. The first region is configured to rotate the polarization of the first beam by a first amount, the second region is configured to rotate the polarization of the second beam by a second amount that is different from the first amount, the first and second amounts are selected to cause the first and second beams to have substantially parallel polarization after passing the patterned birefringent plate.

Implementations can include the following feature. The first region can be an integral portion of the patterned birefringent plate, and no glue or adhesive is used to bond the first region to other portions of the patterned birefringent plate.

In another general aspect, an apparatus includes: a first connector part that is part of a fiber-optic connector configured to be connected between one or more optical fibers having a plurality of fiber cores and a photonic integrated circuit including a plurality of vertical-coupling elements disposed along a main surface of the photonic integrated circuit. The fiber-optic connector includes a polarization beam splitter, and the first connector part includes a patterned birefringent plate. The polarization beam splitter is configured to split an incident light beam from a corresponding fiber core into a first beam having a first polarization and a second beam having a second polarization different from the first polarization. The patterned birefringent plate includes non-uniform birefringence produced by applying localized heating to the birefringent plate to cause one or more regions of the birefringent plate to have reduced birefringence as compared to one or more other regions of the birefringent plate, resulting in at least one lower-birefringence region and at least one higher-birefringence region in the patterned birefringent plate. The polarization beam splitter is configured to direct the first beam towards a lower-birefringence region in the patterned birefringent plate and direct the second beam towards a higher-birefringence region in the patterned birefringent plate. The lower-birefringent region is configured to rotate the polarization of the first beam by a first amount, the higher-birefringent region is configured to rotate the polarization of the second beam by a second amount that is different from the first amount, the first and second amounts are selected to cause the first and second beams to have substantially parallel polarization after passing the patterned birefringent plate.

Implementations can include one or more of the following features. The lower-birefringence region can have substantially zero birefringence.

The first connector part can include the polarization beam splitter.

The lower-birefringence region can be an integral portion of the patterned birefringent plate, and no glue or adhesive is used to bond the lower-birefringence region to other portions of the patterned birefringent plate.

In another general aspect, an apparatus includes: a patterned birefringent plate that is part of a fiber-optic connector configured to be connected between one or more optical fibers having a plurality of fiber cores and a photonic integrated circuit including a plurality of vertical-coupling elements disposed along a main surface of the photonic integrated circuit. The patterned birefringent plate includes non-uniform birefringence produced by applying localized heating to the birefringent plate to cause one or more regions of the birefringent plate to have reduced birefringence as compared to one or more other regions of the birefringent plate, resulting in at least one lower-birefringence region and at least one higher-birefringence region in the patterned birefringent plate. The lower-birefringence region is configured to rotate the polarization of a first light beam by a first amount, the higher-birefringence region is configured to rotate the polarization of a second light beam by a second amount that is different from the first amount, the first and second light beams are transmitted between one or more of the plurality of fiber cores and one or more of the vertical-coupling elements.

Implementations can include one or more of the following features. The fiber-optic connector can include a first connector part removably coupled to a second connector part, the first connector part can be optically coupled to the plurality of fiber cores, the second connector part can be coupled to the vertical coupling elements, and the first connector part can include the polarization beam splitter.

The lower-birefringence region can have substantially zero birefringence and can be configured to rotate the polarization of a first light beam by a substantially zero amount.

In another general aspect, an apparatus includes: a fiber-optic connector configured to optically couple a plurality of optical fibers to a plurality of vertical coupling elements on a photonic integrated circuit. The fiber-optic connector includes: a patterned birefringent plate including a plurality of first regions and a plurality of second regions, the first regions including a material having birefringence that is different from the birefringence of the material of the second regions, the first and second regions forming an integrated piece of optical element. The fiber-optic connector is configured to enable light beams to be transmitted between the plurality of optical fibers and the plurality of vertical coupling elements, and the patterned birefringent plate is configured to modify an optical property of a selected portion of light that passes through the patterned birefringent plate.

Implementations can include the following feature. The patterned birefringent plate can be configured to modify the polarization of a first portion of the light that passes through the patterned birefringent plate by a first amount, and modify the polarization of a second portion of the light that passes through the patterned birefringent plate by a second amount.

In another general aspect, an apparatus includes: a fiber-optic connector configured to optically couple a plurality of optical fibers to a plurality of vertical coupling elements on a photonic integrated circuit. The fiber-optic connector includes a patterned birefringent plate comprising non-uniform birefringence produced by chemical etching one or more portions of a birefringent plate to cause the patterned birefringent plate to have one or more first regions of birefringent material having a first thickness and one or more second regions of birefringent material having a second thickness that is different from the first thickness. The fiber-optic connector is configured to enable light beams to be transmitted between the plurality of optical fibers and the plurality of vertical coupling elements, and the patterned birefringent plate is configured to modify an optical property of a selected portion of light that passes through the patterned birefringent plate.

Implementations can include one or more of the following features. The first region can have a dimension in a range from 50 μm to 1000 μm, the dimension is measured along a plane parallel to a top surface of the patterned birefringent plate.

The first region can have a dimension in a range from 100 μm to 600 μm, the dimension is measured along a plane parallel to a top surface of the patterned birefringent plate.

The first region can have a dimension in a range from 200 μm to 400 μm, the dimension is measured along a plane parallel to a top surface of the patterned birefringent plate.

The thickness of the birefringent material in the first region can be substantially zero.

The patterned birefringent plate can be configured to modify a polarization state of a first set of light beams that pass through the first regions relative to a polarization state of a second set of light beams that pass through the second regions of the birefringent plate.

In another general aspect, a method includes: fabricating a fiber-optic connector, including applying localized heating to a birefringent plate to produce a patterned birefringent plate. The localized heating modifies birefringence of a plurality of first regions in the birefringent plate to cause the first regions to have birefringence that is different from the birefringence of second regions that do not receive the localized heating. The method includes aligning the patterned birefringent plate to other optical components in the fiber-optic connector; and bonding the patterned birefringent plate to the other optical components in the fiber-optic connector.

In another general aspect, a method of fabricating a fiber-optic connector includes: applying localized heating to a birefringent plate to produce a patterned birefringent plate. The localized heating modifies birefringence of a plurality of first regions in the birefringent plate to cause the first regions to have birefringence that is different from the birefringence of second regions that do not receive the localized heating. The method includes attaching the patterned birefringent plate to a second component to form a fiber-optic connector that is configured to be coupled to at least one of a plurality of optical fibers or a plurality of coupling elements on a photonic integrated circuit.

Implementations can include one or more of the following features. The localized heating can cause the first regions to have reduced birefringence.

The localized heating can cause the first regions to have substantially zero birefringence.

Applying localized heating can include applying a laser beam to the first regions to locally heat the first regions.

The first regions can include elongated strips, the elongated strips can have lengthwise directions that are parallel to one another, and the strips can be spaced apart in a direction perpendicular to the lengthwise direction.

The patterned birefringent plate can include an array of at least 2 rows and at least 8 columns of first regions.

Prior to applying the localized heating, the birefringent plate can include a crystalline quartz plate having predefined birefringence, and the localized heating can produce amorphous fused silica having modified, lower, or substantially no birefringence in the first regions.

Applying localized heating can include sequentially applying localized heating to the first regions one after another.

Applying localized heating can include applying localized heating to multiple first regions in parallel.

The birefringent plate can be configured to modify a polarization state of a first set of light beams that pass through the first regions of the birefringent plate relative to a polarization state of a second set of light beams that pass through the second regions of the birefringent plate.

Applying localized heating to the birefringent plate can include applying localized heating to the birefringent plate to modify birefringence of a two-dimensional array of first regions in the birefringent plate to cause the array of first regions to have birefringence that is different from the birefringence of second regions that do not receive the localized heating, and the two-dimensional array can include at least 2 rows and at least 8 columns.

The spacing between two adjacent rows in the two-dimensional array can be identical to the spacing between two adjacent columns in the two-dimensional array.

The fiber-optic connector can be configured to be optically coupled to a two-dimensional array of optical fibers.

The fiber-optic connector can be configured to enable a first set of light beams and a second set of light beams to be transmitted between the two-dimensional array of optical fibers and a two-dimensional array of vertical coupling elements, and the birefringent plate can be configured to modify a polarization state of the first set of light beams that pass through the first regions of the birefringent plate relative to a polarization state of the second set of light beams that pass through the second regions of the birefringent plate.

The fiber-optic connector can be configured to be optically coupled to a two-dimensional array of vertical coupling elements on the photonic integrated circuit.

The fiber-optic connector can be configured to enable a first set of light beams and a second set of light beams to be transmitted between a two-dimensional array of optical fibers and the two-dimensional array of vertical coupling elements. The birefringent plate can be configured to modify a polarization state of the first set of light beams that pass through the first regions of the birefringent plate relative to a polarization state of the second set of light beams that pass through the second regions of the birefringent plate.

Each of at least some of the first regions can have a substantially circular, oval, triangular, square, or rectangular shape.

The two-dimensional array of first regions can include at least 2 parallel strips, and applying localized heating to the birefringent plate can include applying localized heating to modify birefringence of the at least 2 parallel strips in the birefringent plate to cause the at least 2 parallel strips to have birefringence that is different from the birefringence of the second regions that do not receive the localized heating.

Each strip can have a width in a range from 50 μm to 1000 μm.

Each strip can have a width in a range from 100 μm to 600 μm.

Each strip can have a width in a range from 200 μm to 400 μm.

The fiber-optic connector can be configured to be optically coupled to a plurality of vertical coupling elements on the photonic integrated circuit, and the fiber-optic connector can be configured to enable the first set of light beams and the second set of light beams to be transmitted between the plurality of optical fibers and the plurality of vertical coupling elements.

Applying the localized heating to the birefringent plate can include applying the localized heating to the birefringent plate to reduce the birefringence at the first regions.

Applying the localized heating to the birefringent plate can include applying the localized heating to the birefringent plate to reduce the birefringence at the first regions to substantially zero birefringence.

Applying the localized heating to the birefringent plate can include applying the localized heating to the birefringent plate to reduce the birefringence at the first regions such that the second set of light beams that pass through the second regions have polarization that is rotated about 90°+n×180°, 0≤n, n being an integer, relative to polarization of the first set of light beams that pass through the first regions.

The first optical connector part can include a walk-off element configured to: receive a plurality of light beams from the plurality of optical fibers, split the light beams into first beam components and second beam components, the second beam components have polarization that is orthogonal to the polarization of the first beam components, direct the first beam components toward the first regions having lower birefringence, and direct the second beam components toward the second regions having higher birefringence.

Applying the localized heating to the birefringent plate can include applying the localized heating to the birefringent plate to reduce the birefringence at the first regions such that the second set of light beams that pass through the second regions have polarization that is rotated about 90°+n×180°, 0≤n, n being an integer, relative to polarization of the first set of light beams that pass through the first regions. The walk-off element can be configured such that upon exiting the walk-off element the first beam components have first polarization, and the second beam components have second polarization that is substantially orthogonal to the first polarization. The first and second regions of the birefringent plate can be configured such that after passing the first and second regions the first beam components have polarization that is substantially parallel to the polarization of the second beam components.

The walk-off element can separate the first beam component and the second beam component along a walk-off direction, each of at least some of the first regions can have a dimension measured along a direction parallel to the walk-off direction in a range from 50 μm to 1000 μm.

Each of at least some of the first regions can have a dimension measured along a direction parallel to the walk-off direction in a range from 100 μm to 600 μm.

Each of at least some of the first regions can have a dimension measured along a direction parallel to the walk-off direction in a range from 200 μm to 400 μm.

Applying localized heating to the birefringent plate can include applying localized heating to the birefringent plate to modify birefringence of the two-dimensional pattern of first regions in the birefringent plate such that the birefringent plate is configured to modify polarization of light passing the birefringent plate in a way that is equivalent to modification of polarization of light passing a half-wave plate having openings at the two-dimensional pattern of first regions.

The birefringent plate can include a first surface and a second surface. Applying localized heating to the birefringent plate can include applying localized heating to first regions that extend from the first surface to the second surface.

The birefringent plate can include a first surface and a second surface. Applying localized heating to the birefringent plate can include applying localized heating to first regions that are positioned within the birefringent plate and spaced at a first distance from the first surface and a second distance from the second surface.

The birefringent plate can include a first surface and a second surface, and the first surface can be closer to the plurality of optical fibers relative to the second surface. Applying localized heating to the birefringent plate can include applying localized heating to first regions that extend from the first surface to a location inside the birefringent plate, and the first regions can be spaced at a distance from the second surface.

The birefringent plate can include a first surface and a second surface, and the first surface can be closer to the plurality of coupling elements relative to the second surface. Applying localized heating to the birefringent plate can include applying localized heating to first regions that extend from the second surface to a location inside the birefringent plate, and the first regions can be spaced at a distance from the first surface.

Applying localized heating can include using one or more laser beams to apply the localized heating.

In another general aspect, a method of fabricating a fiber-optic connector includes: applying one or more particle beams to a birefringent plate to locally energize regions of the birefringent plate to produce a patterned birefringent plate. The localized energizing modifies birefringence of a plurality of first regions in the birefringent plate to cause the first regions to have birefringence that is different from the birefringence of second regions that do not receive the localized energizing. The method includes attaching the patterned birefringent plate to a second component to form a fiber-optic connector that is configured to be coupled to at least one of a plurality of optical fibers or a plurality of coupling elements on a photonic integrated circuit.

In another general aspect, a method of fabricating a fiber-optic connector includes: applying localized heating to a birefringent plate to modify birefringence of a two-dimensional array of first regions in the birefringent plate to cause the array of first regions to have birefringence that is different from the birefringence of second regions that do not receive the localized heating, the array including at least 2 rows and at least 8 columns. The method includes coupling the birefringent plate to a first connector part and a second connector part to form the fiber-optic connector. The first connector part is configured to be coupled to a plurality of optical fibers, and the second connector part is configured to be coupled to a photonic integrated circuit. The first optical connector part includes a walk-off element configured to: receive a plurality of light beams from the plurality of optical fibers, and split the light beams into first beam components and second beam components, the second beam components having polarization that is orthogonal to the polarization of the first beam components. The walk-off element is configured to direct the first beam components toward the first regions having lower birefringence, and direct the second beam components toward the second regions having higher birefringence.

Implementations can include one or more of the following features. The birefringent plate can be configured to modify a polarization state of the second beam components that pass through the second regions of the birefringent plate relative to a polarization state of the first beam components that pass through the first regions of the birefringent plate.

The second connector part can be configured to be optically coupled to a two-dimensional array of vertical coupling elements on the photonic integrated circuit, and the fiber-optic connector can be configured to enable light to be transmitted between the two-dimensional array of optical fibers and the two-dimensional array of vertical coupling elements.

Applying the localized heating to the birefringent plate can include applying the localized heating to the birefringent plate to reduce the birefringence at the first regions.

Applying the localized heating to the birefringent plate can include applying the localized heating to the birefringent plate to reduce the birefringence at the first regions to substantially zero birefringence.

Applying the localized heating to the birefringent plate can include applying the localized heating to the birefringent plate to reduce the birefringence at the first regions such that the second beam components that pass through the second regions have polarization that is rotated about 90°+n×180°, 0≤n, n being an integer, relative to polarization of the first beam components that pass through the first regions.

The walk-off element can be configured such that upon exiting the walk-off element the first beam components have first polarization, and the second beam components have second polarization that is substantially orthogonal to the first polarization. The first and second regions of the birefringent plate can be configured such that after passing the first and second regions the first beam components have polarization that is parallel to the polarization of the second beam components.

The walk-off element can separate the first beam component and the second beam component along a walk-off direction, and each of at least some of the first regions can have a dimension measured along a direction parallel to the walk-off direction in a range from 50 μm to 1000 μm.

Each of at least some of the first regions can have a dimension measured along a direction parallel to the walk-off direction in a range from 100 μm to 600 μm.

Each of at least some of the first regions can have a dimension measured along a direction parallel to the walk-off direction in a range from 200 μm to 400 μm.

In another general aspect, a method of fabricating a fiber-optic connector includes: applying localized heating or localized energizing to a birefringent plate to modify birefringence of a plurality of first regions in the birefringent plate to cause each of at least some of the plurality of first regions to have a birefringence that is different from the birefringence of second regions that do not receive the localized heating or localized energizing; and attaching the birefringent plate to a first interface module and a second interface module. The first interface module is configured to be coupled to a plurality of optical fibers, the second interface module is configured to be coupled to a plurality of vertical coupling elements on a photonic integrated circuit, the birefringent plate is positioned in optical paths between the first interface module and the second interface module, and the birefringent plate is configured to modify an optical property of light differently depending on whether the light passes through the first regions or the second regions.

Implementations can include one or more of the following features. The first interface module can be configured to be coupled to a two-dimensional array of optical fibers, the two-dimensional array can include at least 2 rows and at least 8 columns, the second interface module can be configured to be coupled to a two-dimensional array of vertical coupling elements, the birefringent plate can be configured to modify a polarization state of a first set of light beams relative to a second set of light beams that are transmitted between the two-dimensional array of optical fibers and the two-dimensional array of vertical coupling elements.

After applying localized heating or localized energizing to the birefringent plate, the birefringent plate can include a plurality of first regions that have lower birefringence and a plurality of second regions that have higher birefringence, the first regions alternating with the second regions. The first interface module can include a walk-off element configured to receive a plurality of light beams from the plurality of optical fibers, split each of at least some of the light beams into a first beam component and a second beam component, direct the first beam component toward one of the first regions having the lower birefringence, and direct the second beam component toward one of the second regions having the higher birefringence.

The walk-off element can be configured such that upon exiting the walk-off element the first beam component has a first polarization, and the second beam component has a second polarization that is orthogonal to the first polarization. The first and second regions of the birefringent plate can be configured such that after passing the first and second regions the first beam component has a polarization that is parallel to the polarization of the second beam component.

The walk-off element can separate the first beam component and the second beam component along a walk-off direction, each of at least some of the first regions can have a dimension measured along a direction parallel to the walk-off direction in a range from 50 μm to 1000 μm.

Each of at least some of the first regions can have a dimension measured along a direction parallel to the walk-off direction in a range from 100 μm to 600 μm.

Each of at least some of the first regions can have a dimension measured along a direction parallel to the walk-off direction in a range from 200 μm to 400 μm.

The walk-off element can be configured to direct a first beam component of a light beam to a first region, direct a second beam component of the light beam to a second region, and a center of the first region and a center of the second region can be spaced apart at a distance in a range from 50 μm to 1000 μm.

The center of the first region and the center of the second region can be spaced apart at a distance in a range from 100 μm to 600 μm.

The center of the first region and the center of the second region can be spaced apart at a distance in a range from 200 μm to 400 μm.

In another general aspect, a method includes: generating a birefringent plate by performing: attaching a birefringent element comprising an optically birefringent material to a second optical element, and applying a removal process to remove portions of the optically birefringent material at a plurality of first regions such that after the removal process the plurality of first regions have no optically birefringent material or have optically birefringent material with reduced thickness. The method includes attaching the birefringent plate to a first connector part and a second connector part to form the fiber-optic connector. The first connector part can be configured to be coupled to a plurality of optical fibers, the second connector part can be configured to be coupled to a photonic integrated circuit, and the birefringent plate can be positioned between the first connector part and the second connector part.

Implementations can include one or more of the following features. The birefringent plate can be configured to modify a polarization state of a first set of light beams that pass through the first regions to a polarization state of a second set of light beams that pass through second regions of the optically birefringent element that have optically birefringent material with an original thickness.

Applying the removal process can include etching the optical birefringent material at the plurality of first regions.

The method can include disposing an etch stop layer between the optically birefringent element and the second optical element before etching the optical birefringent material. Etching the optical birefringent material at the plurality of first regions can include etching the optical birefringent element at the plurality of first regions until the etch stop layer is reached.

The etch stop layer can include an anti-reflective coating.

Removing portions of the optically birefringent element can include laser ablation of the optical birefringent element at the plurality of first regions.

Removing portions of the optically birefringent material can include mechanical removal of material from the optical birefringent element at the plurality of first regions.

Removing portions of the optically birefringent material at the plurality of first regions can include removing portions of the optically birefringent material at a two-dimensional array of first regions, and the two-dimensional array includes at least 2 rows and at least 8 columns.

The birefringent element can be attached to a first surface of the second optical element. Each of the first regions can have a shape substantially resembling a circle, an oval, a triangle, a square, a rectangle, or a polygon having n sides, n being an integer greater than 4, and the shape is measured along a plane parallel to the first surface of the second optical element.

Each first region can have a footprint that fits within a square having a side in a range from 50 μm to 1000 μm.

Each first region can have a footprint that fits within a square having a side in a range from 100 μm to 600 μm.

Each first region can have a footprint that fits within a square having a side in a range from 200 μm to 400 μm.

The first optical connector part can include a walk-off element configured to: receive a plurality of light beams from the plurality of optical fibers, split the light beams into first beam components and second beam components, direct the first beam components toward the first regions, and direct the second beam components toward second regions that are not subject to the removal process.

Applying the removal process can include removing the birefringent material or reducing the height of the birefringent material at the first regions such that the second set of light beams that pass through the second regions have polarization that is rotated about $90°+n\times180°$, $0\leq n$, n being an integer, relative to polarization of the first set of light beams that pass through the first regions.

The walk-off element can be configured such that upon exiting the walk-off element the first beam components have first polarization, and the second beam components have second polarization that is substantially orthogonal to the first polarization. The first and second regions of the birefringent plate can be configured such that after passing the first and second regions the first beam components have polarization that is substantially parallel to the polarization of the second beam components.

The walk-off element can separate the first beam component and the second beam component along a walk-off direction, each of at least some of the first regions can have a dimension measured along a direction parallel to the walk-off direction in a range from 50 μm to 1000 μm.

Each of at least some of the first regions can have a dimension measured along a direction parallel to the walk-off direction in a range from 100 μm to 600 μm.

Each of at least some of the first regions can have a dimension measured along a direction parallel to the walk-off direction in a range from 200 μm to 400 μm.

Applying the removal process can include applying the removal process to remove portions of the optically birefringent material at the first regions such that the birefringent plate is configured to modify polarization of light passing through the birefringent plate in a way that is equivalent to modification of polarization of light passing through a half-wave plate having openings at the first regions.

Generating the birefringent plate can include applying the removal process to generate strips of birefringent material each having an original thickness, and each strip has a width in a range from 50 μm to 1000 μm, and a length at least 2000 μm.

Each strip can have a width in a range from 100 μm to 600 μm, and a length at least 1200 μm.

Each strip can have a width in a range from 200 μm to 400 μm, and a length at least 800 μm.

In another general aspect, a method of fabricating a fiber-optic connector includes: applying a particle beam to locally energize portions of a birefringent plate to generate a patterned birefringent plate by modifying birefringence of a two-dimensional pattern of first regions in the birefringent plate to cause the first regions to have birefringence that is different from the birefringence of second regions that do not receive the localized energizing by the particle beam; and coupling the patterned birefringent plate to a second component to form the fiber-optic connector. The fiber-optic connector is configured to be coupled to at least one of a plurality of optical fibers or a plurality of vertical coupling elements on a photonic integrated circuit, and the patterned birefringent plate includes non-uniform birefringence properties with respect to light that passes through the patterned birefringent plate.

In another general aspect, a method of fabricating fiber-optic connectors includes: providing a first module including a plurality of unsingulated lens arrays; and providing a second module including a plurality of unsingulated patterned birefringent plates. Each patterned birefringent plate includes birefringent material, the patterned birefringent plate includes a plurality of first regions having reduced or no birefringence as compared to a plurality of second regions. The method includes aligning the plurality of unsingulated lens arrays in the first module to the plurality of unsingulated patterned birefringent plates in the second module; bonding the first module to the second module to form a first assembly; and cutting the first assembly to singulate the first and second modules to produce a plurality of fiber-optic connector parts. Each fiber-optic connector part includes a singulated birefringent plate and a singulated lens array.

In another general aspect, a method of fabricating fiber-optic connectors includes: providing a first module including a plurality of unsingulated first connector units. Each first connector unit is configured to be coupled to a plurality of optical fibers. The method includes providing a second module including a plurality of unsingulated patterned birefringent plates. Each patterned birefringent plate includes birefringent material, the patterned birefringent plate includes a plurality of first regions having reduced or no birefringence as compared to a plurality of second regions, and the second module has a first side and a second side. The method includes aligning the plurality of unsingulated first connector units in the first module to the plurality of unsingulated patterned birefringent plates in the second module; bonding the first module to the first side of the second module; and providing a third module comprising a plurality of unsingulated second connector units. Each second connector unit is configured to be coupled to a photonic integrated circuit. The method includes aligning the plurality of unsingulated second connector units in the third module to the plurality of unsingulated patterned birefringent plates in the second module; bonding the third module to the second side of the second module to form a first assembly; and cutting the first assembly to singulate the first, second, and third modules to produce a plurality of fiber-optic connectors. Each fiber-optic connector includes: a singulated birefringent plate, a singulated first connector unit, and a singulated second connector unit.

In another general aspect, an apparatus includes: a fiber-optic connector configured to optically couple a plurality of optical fibers to a plurality of vertical coupling elements on a photonic integrated circuit. The fiber-optic connector includes a patterned birefringent plate including an optically birefringent material, the birefringent plate having a plurality of first regions that have birefringence that is different from the birefringence of second regions, the first regions are formed by localized heating or localized energizing that modifies the birefringence of the first regions, and the second regions are not subject to the localized heating or localized energizing. The fiber-optic connector is configured to enable light beams to be transmitted between the plurality of optical fibers and the plurality of vertical coupling elements, and the patterned birefringent plate is configured to modify an optical property of a first set of the light beams relative to the optical property of a second set of the light beams.

Implementations can include one or more of the following features. The first regions can have reduced birefringence as compared to the second regions.

The first regions can have substantially zero birefringence.

The patterned birefringent plate can be configured to modify a polarization state of a first set of light beams that pass through the first regions relative to a polarization state of a second set of light beams that pass through the second regions of the birefringent plate.

The patterned birefringent plate can include a plurality of strips of birefringent material that are spaced apart from one another, the first set of light beams can pass through the plurality of strips of birefringent material, and the second set of light beams can pass through spacing between the plurality of strips of birefringent material.

The patterned birefringent element can be configured to rotate the polarization of the first set of the light beams relative to the polarization of the second set of the light beams by an amount substantially equal to $90°+n\times180°$, $0\le n$, n being an integer.

The patterned birefringent element can be configured to modify two light beams that have polarizations orthogonal to each other prior to passing through the patterned birefringent element such that the two light beams have polarizations parallel to each other after passing through the patterned birefringent element.

The patterned birefringent element can be configured to modify two light beams that have polarizations parallel to each other prior to passing through the patterned birefringent element such that the two light beams have polarizations orthogonal to each other after passing through the patterned birefringent element.

The fiber-optic connector can include one or more walk-off elements configured to receive one or more input optical beams from one or more of the optical fibers, and separate each of at least some of the input optical beams into a first optical beam component having a first polarization and a second optical beam component having a second polarization. The patterned birefringent element can be configured to modify the polarization of first optical beam component relative to the polarization of second optical beam component such that the polarization state of the first optical beam component relative to the second optical beam component changes after the first and second optical beam component pass through the patterned birefringent element.

In another general aspect, an apparatus includes: a fiber-optic connector configured to optically couple a plurality of optical fibers to a plurality of vertical coupling elements on a photonic integrated circuit. The fiber-optic connector includes a volume of birefringent material, one or more portions of the volume of birefringent material has or have modified birefringence compared to other portions of the volume of birefringent material, and light beams transmitted between the plurality of optical fibers and the plurality of vertical coupling elements pass through the volume of birefringent material. The volume of birefringent material is configured to modify a polarization state of a first set of the light beams relative to a second set of the light beams such that the polarization state of the first set of the light beams relative to the second set of the light beams changes after the first and second sets of light beams pass through the volume of birefringent material.

Implementations can include one or more of the following features. The volume of birefringent material can include a plurality of strips of birefringent material that are spaced apart from one another, the first set of light beams can pass through the plurality of strips of birefringent material, and the second set of light beams can pass through spacing between the plurality of strips of birefringent material.

The patterned birefringent element can be configured to rotate the polarization of the first set of the light beams relative to the polarization of the second set of the light beams by an amount substantially equal to $90°+n\times180°$, $0\le n$, n being an integer.

The patterned birefringent element can be configured to modify two light beams that have polarizations orthogonal to each other prior to passing through the patterned birefringent element such that the two light beams have polarizations parallel to each other after passing through the patterned birefringent element.

The patterned birefringent element can be configured to modify two light beams that have polarizations parallel to each other prior to passing through the patterned birefringent element such that the two light beams have polarizations orthogonal to each other after passing through the patterned birefringent element.

The fiber-optic connector can include one or more walk-off elements configured to receive one or more input optical beams from one or more of the optical fibers, and separate each of at least some of the input optical beams into a first optical beam component having a first polarization and a second optical beam component having a second polarization. The patterned birefringent element can be configured to modify the polarization of first optical beam component relative to the polarization of second optical beam component such that the polarization state of the first optical beam component relative to the second optical beam component changes after the first and second optical beam component pass through the patterned birefringent element.

The apparatus can include the photonic integrated circuit.

The vertical coupling elements can include vertical grating couplers.

The photonic integrated circuit can include optical waveguides that are coupled to the vertical coupling elements.

In another general aspect, a data center including the apparatus described above.

In another general aspect, a method of operating the apparatus described above.

In another general aspect, a method of operating the data center described above.

In another general aspect, a method of assembly the apparatus described above.

In another general aspect, a method of processing data using the apparatus described above.

In another general aspect, a method includes: transmitting light from a plurality of optical fiber cores to a polarization beam splitter; and at the polarization beam splitter, splitting an incident light beam from a corresponding fiber core into a first beam having a first polarization and a second beam having a second polarization different from the first polarization. The method includes directing the first and second beams toward a patterned birefringent plate comprising a first region and a second region. The first region has a first optical birefringence, the second region has a second optical birefringence that is different from the first optical birefringence, the first region is produced by applying localized heating to a portion of a birefringent plate to reduce the birefringence at the first region, the second region is not subject to the localized heating and retains its original birefringence, the first beam is directed towards the first region, the second beam is directed towards the second region. The method includes at the first and second regions, rotating the polarization of the first beam by a first amount and rotating the polarization of the second beam by a second amount that is different from the first amount, the first and second amounts are selected to cause the first and second beams to have substantially parallel polarization after passing the patterned birefringent plate.

Implementations can include one or more of the following features. The plurality of optical fiber cores can be arranged in a two-dimensional array.

The two-dimensional array can include at least 2 rows and at least 8 columns.

The spacing between two adjacent rows in the two-dimensional array can be identical to the spacing between two adjacent columns in the two-dimensional array.

This document discloses various embodiments of a connector assembly for optically connecting one or more optical fibers and an array of vertical coupling elements of a photonic integrated circuit (PIC). In a general aspect, a method includes: providing a photonic integrated circuit including a plurality of vertical-coupling elements disposed along a main surface of the photonic integrated circuit; attaching an optical subassembly to the photonic integrated circuit; removably connecting a fiber connector to a ferrule frame, wherein the fiber connector is attached to an array of optical fibers; aligning the ferrule frame to the optical subassembly using an active alignment process; and securely connecting the ferrule frame to the optical subassembly after the active alignment process.

Implementations can include one or more of the following features. The active alignment process can include: transferring light between at least one optical fiber in the array of optical fibers and the photonic integrated circuit through the optical subassembly and at least one of the vertical-coupling elements, and adjusting a position of the ferrule frame relative to the optical subassembly based on at least one characteristic of the light transferred between the at least one optical fiber and the photonic integrated circuit.

The method can include removing the fiber connector from the ferrule frame.

The ferrule frame can include an opening to allow light from the array of optical fibers to be transmitted to the optical subassembly.

The method can include passing a portion of the fiber connector through the opening of the ferrule frame and positioning an end of the fiber connector in proximity to the optical subassembly.

Removably connecting the array of optical fibers to the ferrule frame can include at least one of (i) using one or more screws to secure the array of optical fibers to the ferrule frame, (ii) using one or more clamps to secure the array of optical fibers to the ferrule frame, (iii) using one or more magnets to connect the array of optical fibers to the ferrule frame.

The array of optical fibers can include a two-dimensional array of optical fibers.

The two-dimensional array of optical fibers can include at least two rows of optical fibers.

The array of optical fibers can include at least 10 fiber cores.

The array of optical fibers can include at least 50 fiber cores.

The array of optical fibers can include at least 100 fiber cores.

The optical subassembly can include a first lens array, and the active alignment process can include projecting light from the array of optical fibers through the first lens array, including passing light from at least one of the optical fibers through a corresponding lens to a corresponding vertical-coupling element.

The optical subassembly can include a beam displacer, and the active alignment process can include projecting light from the array of optical fibers through the first lens array and the beam displacer to the at least one vertical-coupling element.

The optical subassembly can include a second lens array, and the active alignment process can include projecting light from the array of optical fibers through the first lens array, the beam displacer, and the second lens array to the at least one vertical-coupling element.

The optical subassembly can include a half wave plate, and the active alignment process can include projecting light from the array of optical fibers through the first lens array, the beam displacer, the half wave plate, and the second lens array to the at least one vertical-coupling element.

The fiber connector can include a first lens array, and the active alignment process can include projecting light from the array of optical fibers through the first lens array, including passing light from at least one of the optical fibers through a corresponding lens to a corresponding vertical-coupling element.

The optical subassembly can include a beam displacer, and the active alignment process can include projecting light from the array of optical fibers through the first lens array and the beam displacer to the at least one vertical-coupling element.

The optical subassembly can include a second lens array, and the active alignment process can include projecting light from the array of optical fibers through the first lens array, the beam displacer, and the second lens array to the at least one vertical-coupling element.

The optical subassembly can include a half wave plate, and the active alignment process can include projecting light from the array of optical fibers through the first lens array, the beam displacer, the half wave plate, and the second lens array to the at least one vertical-coupling element.

The active alignment process can include adjusting the position of the ferrule frame relative to the optical subassembly to maximize an overall efficiency of light transfer between the array of optical fibers and the photonic integrated circuit.

The ferrule frame can include at least one of glass, metal, or plastic.

The ferrule frame can include a material that is transparent or semi-transparent to ultra-violet (UV) light, and securely connecting the ferrule frame to the optical subassembly can include attaching the ferrule frame to the optical subassembly using an UV-curing adhesive.

Adjusting the position of the ferrule frame relative to the optical subassembly can include adjusting the position of the ferrule frame along a plane substantially parallel to the main surface of the photonic integrated circuit.

Adjusting the position of the ferrule frame along the plane substantially parallel to the main surface of the photonic integrated circuit can include at least one of (i) adjusting the position of the ferrule frame along an x-axis relative to the main surface of the photonic integrated circuit, (ii) adjusting the position of the ferrule frame along a y-axis relative to the main surface of the photonic integrated circuit, or (iii) rotating the ferrule frame about a z-axis relative to the main surface of the photonic integrated circuit. The x- and y-axes are substantially parallel to the main surface of the photonic integrated circuit, and the z-axis is substantially perpendicular to the main surface of the photonic integrated circuit.

Adjusting the position of the ferrule frame relative to the optical subassembly can include adjusting a distance of an end of the fiber connector relative to the optical subassembly.

Adjusting the position of the ferrule frame relative to the optical subassembly can include adjusting a tilt angle of an end surface of the fiber connector relative to the optical subassembly.

Aligning the ferrule frame to the optical subassembly can include aligning the ferrule frame to the optical subassembly with a precision of at least 10 μm accuracy.

Aligning the ferrule frame to the optical subassembly can include aligning the ferrule frame to the optical subassembly with a precision of at least 1 μm accuracy.

Aligning the ferrule frame to the optical subassembly can include aligning the ferrule frame to the optical subassembly with a precision of at least 0.1 μm accuracy.

Each of the vertical-coupling elements can include at least one of a single-polarization vertical grating coupler, a turning mirror, a polarization-diversity vertical grating coupler, a vertical cavity surface emitting laser, a surface-normal modulator, or a photodiode.

The beam displacer can include a polarization-dependent optical element.

In another general aspect, an apparatus includes: a photonic integrated circuit including a plurality of vertical-coupling elements disposed along a main surface of the photonic integrated circuit; an optical subassembly attached to the photonic integrated circuit; and a ferrule frame that is configured to enable a fiber connector to be removably connected to the ferrule frame and aligned with the optical subassembly. The fiber connector is connected to an array of optical fibers, the optical subassembly is configured to transfer light between the array optical fibers and the vertical-coupling elements on the photonic integrated circuit. The ferrule frame is aligned to the optical subassembly using an active alignment process in which light is transferred between at least one optical fiber in the array of optical fibers and the photonic integrated circuit through the optical subassembly and at least one of the vertical-coupling elements, and a position of the ferrule frame relative to the optical subassembly is adjusted based on at least one characteristic of the light transferred between the at least one optical fiber and the photonic integrated circuit. The ferrule frame is securely connected to the optical subassembly after the active alignment process.

Implementations can include one or more of the following features. The ferrule frame can enable the array of optical fibers to be aligned with the optical subassembly with a precision of at least 10 μm.

The ferrule frame can enable the array of optical fibers to be aligned with the optical subassembly with a precision of at least 1 μm.

The ferrule frame can enable the array of optical fibers to be aligned with the optical subassembly with a precision of at least 0.1 μm.

The optical subassembly can include a first lens array, and the ferrule module can be configured to align the array of optical fibers with the lens array.

The optical subassembly can include a beam displacer attached to the first lens array.

The optical subassembly can include a second lens array, the beam displacer can be positioned between the first lens array and the second lens array, and the second lens array can be positioned between the beam displacer and the vertical-coupling elements.

The optical subassembly can include a half wave plate positioned between the beam displacer and the second lens array.

The optical subassembly can include a birefringent plate having holes, and the birefringent plate can be positioned between the beam displacer and the second lens array.

The fiber connector can include a first lens array, and the ferrule module can be configured to align the first lens array with the optical subassembly.

The optical subassembly can include a beam displacer.

The optical subassembly can include a second lens array positioned between the beam displacer and the vertical-coupling elements.

The optical subassembly can include a half wave plate positioned between the beam displacer and the second lens array.

The optical subassembly can include a birefringent plate having holes, and the birefringent plate can be positioned between the beam displacer and the second lens array.

Each optical fiber can include one or more fiber cores, the optical subassembly can include at least one lens configured to communicate light with a single one of the fiber cores and a single one of the vertical-coupling elements.

Each optical fiber can include one or more fiber cores, the optical subassembly can include a plurality of optical waveguides, each optical waveguide optically connecting a respective one of the fiber cores and a respective one of the vertical-coupling elements.

At least some of the optical waveguides can be tapered.

The optical subassembly can include one or more polarization beam splitters.

The optical subassembly can include one or more polarization-rotating elements.

Each optical fiber can include one or more fiber cores, the optical subassembly can be configured to communicate light between a first number of the fiber cores and a second number of the vertical-coupling elements, and the second number can be greater than the first number.

Each of the vertical-coupling elements can include at least one of a single-polarization vertical grating coupler, a turning mirror, a polarization-diversity vertical grating coupler, a vertical cavity surface emitting laser, a surface-normal modulator, or a photodiode.

The ferrule frame can include at least one of glass, metal, or plastic.

The ferrule frame can include a material that is transparent or semi-transparent to ultra-violet (UV) light, and an UV-curing adhesive can be used to securely attach the ferrule frame to the optical subassembly.

The beam displacer can include a polarization-dependent optical element.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 14A to 18B show diagrams of examples of arrangements of grating couplers and corresponding birefringent hole plates.

FIGS. 31A to 32 are tables showing wavelength-division-multiplexed lane assignments.

DETAILED DESCRIPTION

To accommodate the growing need for chip-to-chip interconnection bandwidths, the use of optical I/Os can be beneficial.

Figure 1:
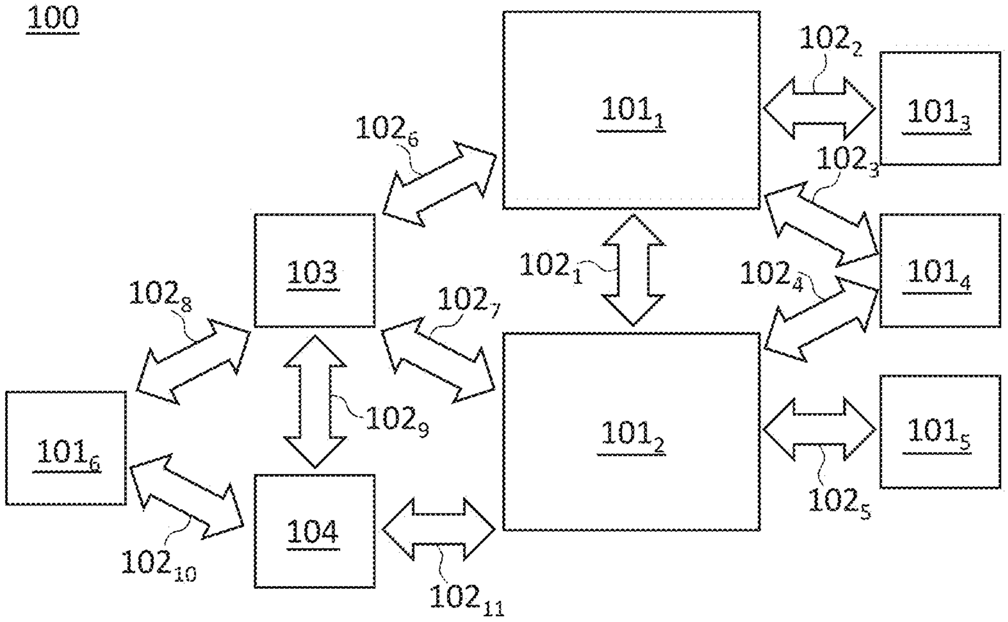
FIG. 1 shows a block diagram of an optical communication system in which at least some embodiments can be practiced.

FIG. 1 shows a block diagram of a communication system 100 in which at least some embodiments can be practiced. As shown, system 100 comprises integrated optical communication devices $\mathbf{101}_1$-$\mathbf{101}_6$ suitably interconnected by optical fibers $\mathbf{102}_1$-$\mathbf{102}_{11}$ establishing communication paths between the optical communication devices. Communication system 100 can also comprise one or more external optical power supply modules 103 producing continuous-wave (CW) light or producing one or more trains of periodic or non-periodic optical pulses for use in one or more of the integrated optical communication devices $\mathbf{101}_1$-$\mathbf{101}_6$. Some end-to-end communication paths can pass through external optical power supply modules 103 (e.g., see the shown communication path between devices $\mathbf{101}_2$ and $\mathbf{101}_6$). For example, the communication path between devices $\mathbf{101}_2$ and $\mathbf{101}_6$ can be jointly established by optical fiber links $\mathbf{102}_7$ and $\mathbf{102}_8$, whereby light from external optical power supply 103 is multiplexed onto optical fiber links $\mathbf{102}_7$ and $\mathbf{102}_8$. Some end-to-end communication paths can pass through a multiplexing unit 104 (e.g., see the shown communication path between devices $\mathbf{101}_2$ and $\mathbf{101}_6$). For example, the communication path between devices $\mathbf{101}_2$ and $\mathbf{101}_6$ can be jointly established by optical fiber links $\mathbf{102}_{10}$ and $\mathbf{102}_{11}$, whereby light from external optical power supply 103 can be multiplexed within multiplexing unit 104 onto optical fiber links $\mathbf{102}_{10}$ and $\mathbf{102}_{11}$.

Various elements of communication system 100 can benefit from the use of optical interconnects, which can use photonic integrated circuits comprising optoelectronic devices, co-packaged and/or co-integrated with electronic chips comprising integrated circuits.

As used herein, the term "photonic integrated circuit" (or PIC) should be construed to cover planar lightwave circuits (PLCs), integrated optoelectronic devices, wafer-scale products on substrates, individual photonic chips and dies, and hybrid devices. Example material systems that can be used for manufacturing various PICs can include but are not limited to III-V semiconductor materials, silicon photonics, silica-on-silicon products, silica-glass-based PLCs, polymer integration platforms, Lithium Niobate and derivatives, nonlinear optical materials, etc. Both packaged devices (e.g., wired-up and/or encapsulated chips) and unpackaged devices (e.g., dies) can be referred to as PICs.

PICs are used for various applications in telecommunications, instrumentation, and signal-processing fields. A PIC typically uses optical waveguides to implement and/or interconnect various circuit components, such as optical switches, couplers, routers, splitters, multiplexers/demultiplexers, filters, modulators, phase shifters, lasers, amplifiers, wavelength converters, optical-to-electrical (O/E) and electrical-to-optical (E/O) signal converters, etc. A waveguide in a PIC is usually an on-chip solid light conductor that guides light due to an index-of-refraction contrast between the waveguide's core and cladding. A PIC typically comprises a planar substrate onto which optoelectronic devices are grown by an additive manufacturing process and/or into which optoelectronic devices are etched by a subtractive manufacturing processes, e.g., using a multi-step sequence of photolithographic and chemical processing steps.

An "optoelectronic device" can operate on both light and electrical currents (voltages) and can include one or more of: (i) an electrically driven light source, such as a laser diode; (ii) an optical amplifier; (iii) an optical-to-electrical converter, such as a photodiode; and (iv) an optoelectronic component that can control the propagation and/or certain properties of light, such as an optical modulator or a switch. The corresponding optoelectronic circuit can additionally include one or more optical elements and/or one or more electronic components that enable the use of the circuit's optoelectronic devices in a manner consistent with the circuit's intended function. Some optoelectronic devices can be implemented using one or more PICS.

As used herein, the term "integrated circuit" (IC) should be construed to encompass both a non-packaged die and a packaged die. In a typical IC-fabrication process, dies (chips) are produced in relatively large batches using wafers of silicon or other suitable material(s). Electrical and optical circuits can be gradually created on a wafer using a multi-step sequence of photolithographic and chemical processing steps. Each wafer is then cut ("diced") into many pieces (chips, dies), each containing a respective copy of the circuit that is being fabricated. Each individual die can be appropriately packaged prior to being incorporated into a larger circuit or be left non-packaged.

The term "hybrid circuit" can refer to a multi-component circuit constructed of multiple monolithic ICs and possibly some discrete circuit components, all attached to each other to be mountable on and electrically connectable to a common base or carrier. A representative hybrid circuit can include (i) one or more packaged or non-packaged dies, with some or all of the dies including optical, optoelectronic, and/or semiconductor devices, and (ii) one or more optional discrete components, such as connectors, resistors, capacitors, and inductors. Electrical connections between the ICs, dies, and discrete components can be formed, e.g., using patterned conducting (such as metal) layers, ball-grid arrays, solder bumps, wire bonds, etc. The individual ICs can include any combination of one or more respective substrates, one or more redistribution layers (RDLs), one or more interposers, one or more laminate plates, etc.

In some embodiments, individual chips can be stacked. As used herein, the term "stack" refers to an orderly arrangement of packaged or non-packaged dies in which the main planes of the stacked dies are substantially parallel to each other. A stack can typically be mounted on a carrier in an orientation in which the main plains of the stacked dies are parallel to each other and/or to the main plane of the carrier.

A "main plane" of an object, such as a die, a PIC, a substrate, or an IC, is a plane parallel to a substantially planar surface thereof that has the largest sizes, e.g., length and width, among all exterior surfaces of the object. This substantially planar surface can be referred to as a main surface. The exterior surfaces of the object that have one relatively large size, e.g., length, and one relatively small size, e.g., height, are typically referred to as the edges of the object.

Figure 2:
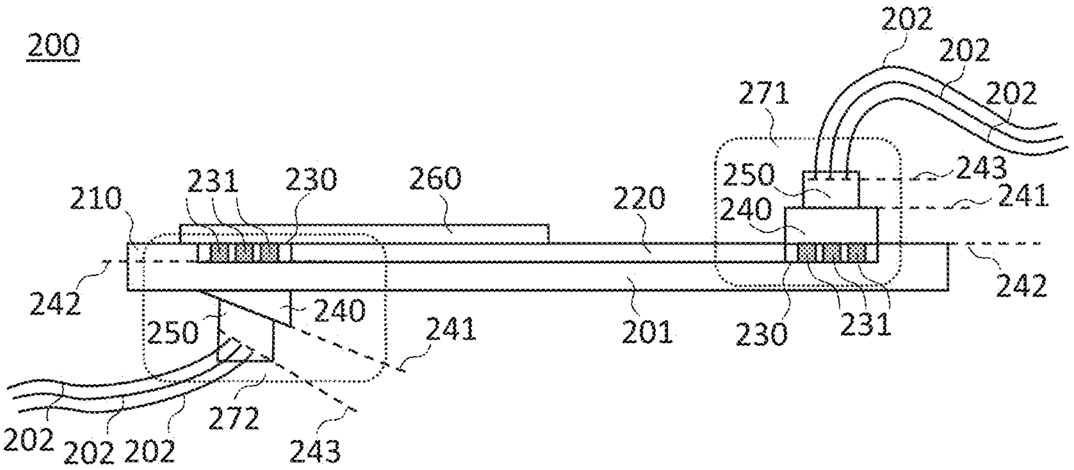
FIG. 2 shows a schematic side view of an integrated optical device that can be used in the optical communication system of FIG. 1 according to an embodiment.

FIG. 2 shows a schematic cross-sectional side view of an example integrated optical communication device 200 according to an embodiment. Device 200 can be used, e.g., to implement one or more of devices $\mathbf{101}_1$-$\mathbf{101}_6$ of FIG. 1.

Device 200 comprises a PIC 210 that is based on any suitable PIC technology/material platform, such as, without any implied limitation, Silicon Photonics, Indium Phosphide, or Lithium Niobate. PIC 210 has supported on a substrate 201 thereof suitably connected passive optical elements and/or arrays thereof, such as waveguides 220, couplers, splitters, filters, delay lines, etc., as well as optoelectronic elements and/or arrays thereof such as modulators, detectors, and tunable phase shifters. Some of these elements can be vertical-coupling elements 231, configured to couple light to/from the PIC. Herein, the "vertical" direction is a direction that is perpendicular to a main surface of the PIC. In the context of this disclosure, the term "vertical-coupling" denotes coupling at an angle that is substantially out-of-plane relative to a main surface of substrate 201, but not necessarily perpendicular to said main surface. Vertical coupling is typically implemented at angles between 0 degrees (perpendicular) and 45 degrees as measured from the surface-normal of the substrate's main surface. Vertical coupling can be performed from the top-side (e.g., the waveguide-side) of the PIC (271 in FIG. 2) or form the bottom-side (e.g., the substrate-side) of the PIC (272 in FIG. 2).

In some embodiments, vertical-coupling elements 231 can be implemented, e.g., as turning mirrors, vertical grating couplers, elephant couplers, or as 3D vertical coupling structures that are 3D-printed onto the PIC, suitably connected to passive optical elements or to optoelectronic elements. In an example embodiment, vertical-coupling elements 231 can be implemented, e.g., using any of the vertical-coupling elements disclosed in the following patent literature: US 2015/0037044, US 2015/0125110, US 2015/0293305, U.S. Pat. No. 9,927,575, US 2018/0329159, US 2019/0258175, and U.S. Pat. No. 10,025,043. All of these U.S. patents and U.S. patent application Publications are incorporated herein by reference in their entirety.

In some embodiments, vertical-coupling elements 231 can be surface-normal optoelectronic elements such as surface-normal modulators, surface-normal detectors, or surface-normal lasers, e.g., vertical-cavity surface emitting lasers (VCSELs). In an example embodiment, vertical-coupling elements 231 can be implemented, e.g., using any of the vertical-coupling elements disclosed in U.S. patents and U.S. patent application Publication(s) US 2019/0312642, U.S. Pat. Nos. 10,025,043, and 8,488,921, all of which are incorporated herein by reference in their entirety.

Vertical-coupling elements 231 can be geometrically variously arranged in arrays 230 of such vertical-coupling elements.

In some embodiments, some optical or optoelectronic elements can be spatially co-located or interspersed with some vertical-coupling elements 231 of array 230.

In some embodiments, some optical or optoelectronic elements can be located in areas of the PIC disjoint from vertical-coupling arrays 230.

Optical and optoelectronic elements of the PIC are suitably connected to electronic integrated circuits 260, such as driver amplifiers, transimpedance amplifiers, electronic control circuits, digital logic, microcontrollers, microprocessors, and/or electronic switches. Some electronic circuits can be spatially co-located or interspersed with some vertical-coupling elements of arrays 230, and some electronic circuits can be located in areas that are spatially disjoint from arrays 230. Some electronic circuits can be monolithically integrated with optical or optoelectronic elements of the PIC. Some electronic circuits can be on a separate chip from the PIC and can be electrically connected to the PIC using suitable electrical interconnect technologies, such as bond wires, balls, bumps, micro-bumps, pillars, and membranes, e.g., in the form of a stack.

Of particular interest in the context of this disclosure are connector structures 271 and 272 that enable (possibly pluggable and/or removable) connection(s) between M spatial paths of one or more optical fibers 202 as part of optical fiber links 102, and N vertical-coupling elements of an array 230 of a PIC. In some embodiments, the numbers N and M are different integers greater than one. In some other embodiments, N=M.

In the context of this disclosure, the term "spatial path" refers to an optical path through a core of a single-mode or multi-mode optical fiber, a core of a multi-core fiber, or one or more spatially coupled cores of a few-mode optical fiber configured to carry different signals in its different spatial modes. A spatial path can carry signals in one or more polarizations and/or on one or more wavelengths. In some embodiments, a spatial path can be polarization-maintaining. The one or more optical fibers 202 can comprise single-mode, multi-mode, few-mode, multi-core, and/or polarization-maintaining fibers. The one or more optical fibers 202 can comprise dispersion-shifted, dispersion-compensating, non-zero-dispersion-shifted, standard-single-mode-dispersion, and/or high-dispersion fiber. The one or more fibers 202 can be fixedly attached (e.g., glued) to connector elements 250, e.g., by positioning individual fibers in individual holes provided within connector elements 250, or by positioning individual fibers in a linear array of V-grooves and stacking multiple such linear arrays to form a 2D array. The M spatial paths of one or more fibers 202 can, as a result, form an array with a certain geometrical layout and with a certain separation of spatial paths in fiber end face planes 243. Fiber end face planes 243 can be parallel to a main surface of the PIC (e.g., as indicated in the shown details of structure 271, FIG. 2) or can be at a non-zero angle relative to a main surface of the PIC (e.g., as indicated in the shown details of structure 272, FIG. 2). In various embodiments, said angle relative to the main surface of the PIC can be appropriately chosen between 0 degrees (in which case the corresponding fiber end face plane is parallel to the main surface of the PIC) and 90 degrees (in which case the corresponding fiber end face plane is perpendicular to the main surface of the PIC).

Connector elements 240 can be fixedly attached (e.g., glued) to PIC 210, e.g., by aligning and subsequently affixing the connector elements to PIC 210 during assembly. Connector elements 240 can be attached to either of the two main surfaces of PIC 210. Connector elements 240 can be fixedly or movably attached to connector elements 250 in connector mating planes 241. Connector mating planes 241 can be parallel to a main surface of the PIC (e.g., as in structure 271 of FIG. 2) or can be at an angle relative to a main surface of the PIC (e.g., as in structure 272 of FIG. 2). Said angle relative to the main surface of the PIC can be chosen between 0 degrees (in which case the corresponding connector mating plane is parallel to the main surface of the PIC) and 90 degrees (in which case the corresponding connector mating plane is perpendicular to the main surface of the PIC). In some embodiments, connector elements 240 and 250 can comprise mechanical structures that enable elements 240 and 250 to self-align. For example, such mechanical structures can be implemented using cylindrical or conical post-and-hole arrangements, rod-and-groove arrangements, or ball-and-hole arrangements. Connector elements 240 and 250 can further comprise mechanical structures capable of holding elements 240 and 250 in place after mating, e.g., a suitable snap-on mechanism.

Either of connector elements 240 and 250 can contain one or more of: (i) reflective optical elements, such as dielectric or metallic interfaces; (ii) refractive optical elements, such as lenses or prisms; (iii) diffractive optical elements, such as gratings; (iv) birefringent optical elements, such as calcite crystals, polarization gratings, or waveplates; (v) 3D-waveguides or nanostructures written into a suitable host material, such as glass; and/or (vi) 3D-printed optical waveguides, microstructures, or nanostructures. The combination of connector elements 240 and 250 is typically designed to suitably map M spatial paths of one or more optical fibers 202 in fiber end face planes 243 to N vertical-coupling elements of array 230 in coupling plane 242. Together, the corresponding set of fibers 202, connector elements 240 and 250, and vertical coupling array 230 form a connector assembly 271 or 272. Some embodiments disclosed herein are specifically directed at providing optimized designs of connector assemblies 271 and 272, e.g., with respect to tolerances in manufacturing, assemblage, and operation. Some of such embodiments can be scalable to a relatively large number of spatial paths, e.g., M>100.

FIGS. 3A-3G illustrate configurations of one or more optical fibers 202 according to some embodiments. More specifically, FIGS. 3A-3G schematically show example cross-sectional views of one or more fibers 202 in fiber coupling planes 243 according to various embodiments.

Figure 3A:
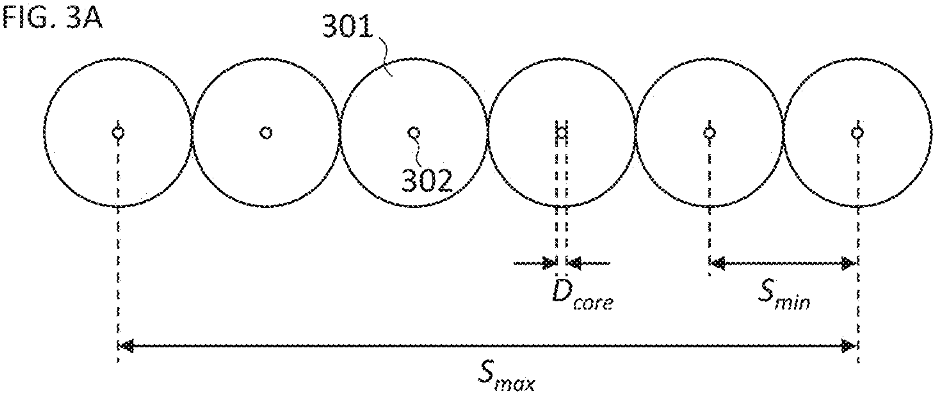
FIGS. 3A-3G schematically show various examples of one or more fibers that can be used in the optical communication system of FIG. 1 according to some embodiments.

FIG. 3A illustrates a one-dimensional (1D) array of single-core, single-mode optical fibers supporting M=6 spatial paths. Each of the shown six fibers comprises a respective cladding 301 and a respective core 302, typically made from glasses of different refractive indices such that the refractive index of the cladding is lower than the refractive index of the core to establish a dielectric optical waveguide. More complex refractive index profiles, such as index trenches, multi-index profiles, or gradually changing refractive index profiles can also be used in some embodiments. More complex geometric structures such as non-circular cores or claddings, photonic crystal structures, photonic bandgap structures, or nested antiresonant nodeless hollow core structures can also be used in some embodiments. For any of these structures, geometrical, structural, and material properties can be appropriately chosen to allow for the propagation of a single guided (e.g., transverse) mode within the operating wavelength range of system 100. In the context of this disclosure, three feature sizes are of particular interest: (i) an effective core diameter $D_{core}$, typically defined as the diameter at which the optical intensity of the mode propagating within the fiber has dropped to $1/e^2$ of its value at the core center (sometimes also referred to as the mode field diameter); (ii) a minimum core-to-core spacing $S_{min}$ within the array; and (iii) a maximum core-to-core spacing $S_{max}$ within the array. The feature sizes $D_{core}$, $S_{min}$, and $S_{max}$ corresponding to this particular embodiment are indicated in FIG. 3A.

Figure 3B:
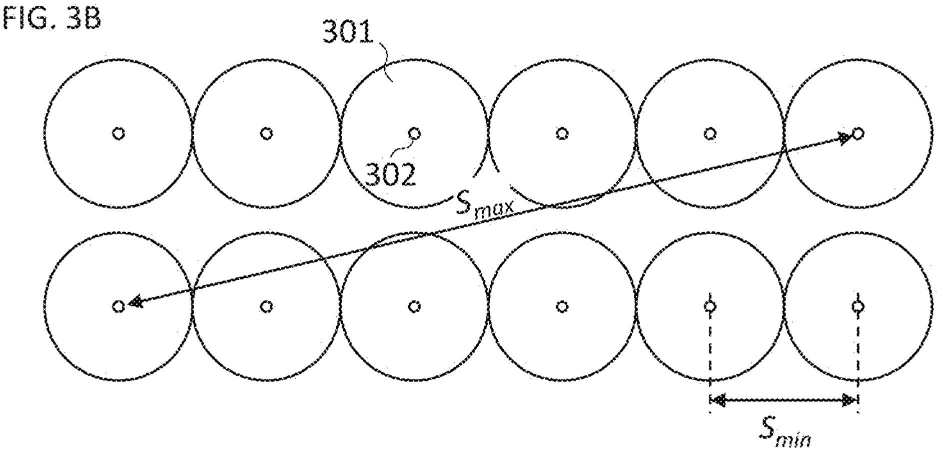

FIG. 3B illustrates a two-dimensional (2D) array of single-core, single-mode optical fibers supporting M=12 spatial paths. The feature sizes $S_{min}$ and $S_{max}$ corresponding to this particular embodiment are indicated in FIG. 3B.

Figure 3C:
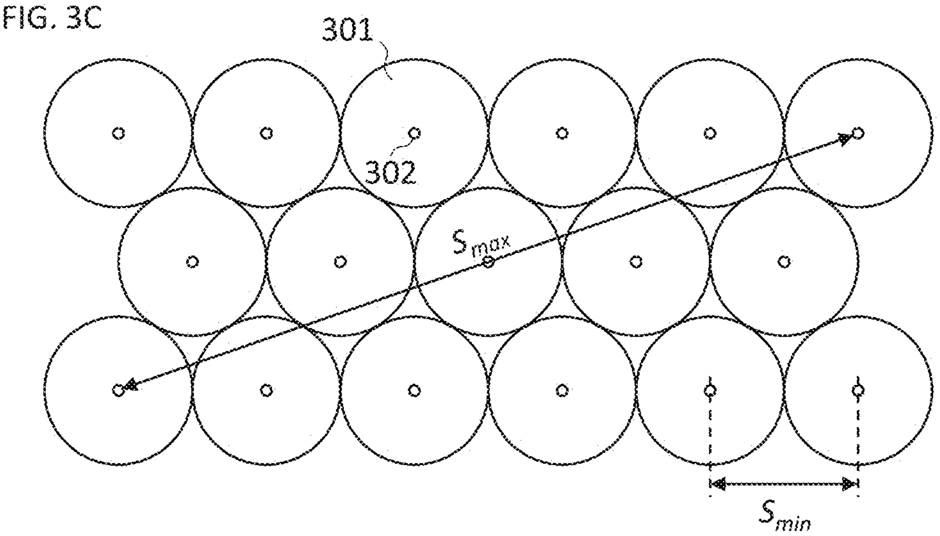

FIG. 3C illustrates a two-dimensional (2D) array of single-core, single-mode optical fibers supporting M=17 spatial paths. The feature sizes $S_{min}$ and $S_{max}$ corresponding to this particular embodiment are indicated in FIG. 3C.

Although only three example geometrical array layouts and spacings are shown in FIGS. 3A-3C, other geometrical array layouts can also be used in various alternative embodiments. Based on the provided description, a person of ordinary skill in the art will be able to make and use such other geometrical array layouts without any undue experimentation. Some embodiments can also be constructed using one or more arrays of fibers with dissimilar properties, such as a mixture of fibers with different index profiles, different effective core diameters, etc.

Figure 3D:
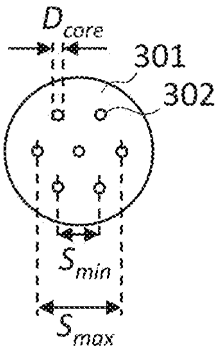

FIG. 3D illustrates a multi-core, single-mode optical fiber supporting M=7 spatial paths. The multi-core fiber comprises a cladding 301 and seven cores 302, typically made from glasses of different refractive indices such that the refractive index of the cladding is lower than the refractive index of the core. More complex refractive index profiles, such as index trenches, multi-index profiles, or gradually changing refractive index profiles, can also be used in some embodiments. More complex geometric structures, such as non-circular cores, non-circular claddings, photonic crystal structures, photonic bandgap structures, or nested antiresonant nodeless hollow core structures, can also be used. For any of these structures, geometrical, structural, and material properties can be chosen to allow for the propagation of a single guided (e.g., transverse) mode per core within the operating wavelength range of system 100. Regardless of their complexity, an effective core diameter $D_{core}$ can be defined for each core. Different cores within a fiber can have nominally identical or substantially different (e.g., by more than 10%) effective core diameters. The feature sizes $D_{core}$, $S_{min}$, and $S_{max}$ corresponding to this particular embodiment are indicated in FIG. 3D.

Figure 3E:
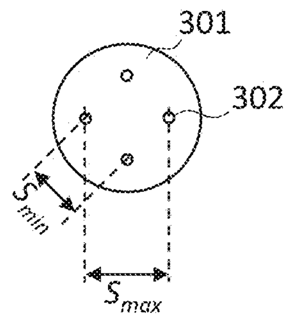

FIG. 3E illustrates a multi-core, single-mode optical fiber supporting M=4 spatial paths. The feature sizes $S_{min}$ and $S_{max}$ corresponding to this particular embodiment are indicated in FIG. 3E.

Figure 3F:
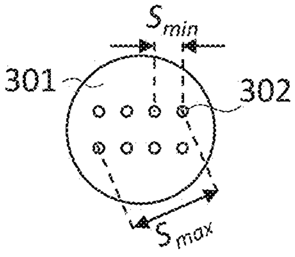

FIG. 3F illustrates a multi-core, single-mode optical fiber supporting M=8 spatial paths. The feature sizes $S_{min}$ and $S_{max}$ corresponding to this particular embodiment are indicated in FIG. 3F.

Figure 3G:
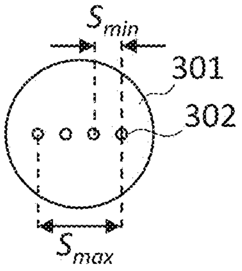

FIG. 3G illustrates a multi-core, single-mode optical fiber supporting M=4 spatial paths. The feature sizes $S_{min}$ and $S_{max}$ corresponding to this particular embodiment are indicated in FIG. 3G.

Although only four example geometrical core layouts and spacings are shown in FIG. 3D-3G, other geometrical core layouts can also be used in various alternative embodiments. Based on the provided description, a person of ordinary skill in the art will be able to make and use such other geometrical core layouts without any undue experimentation.

Figure 4:
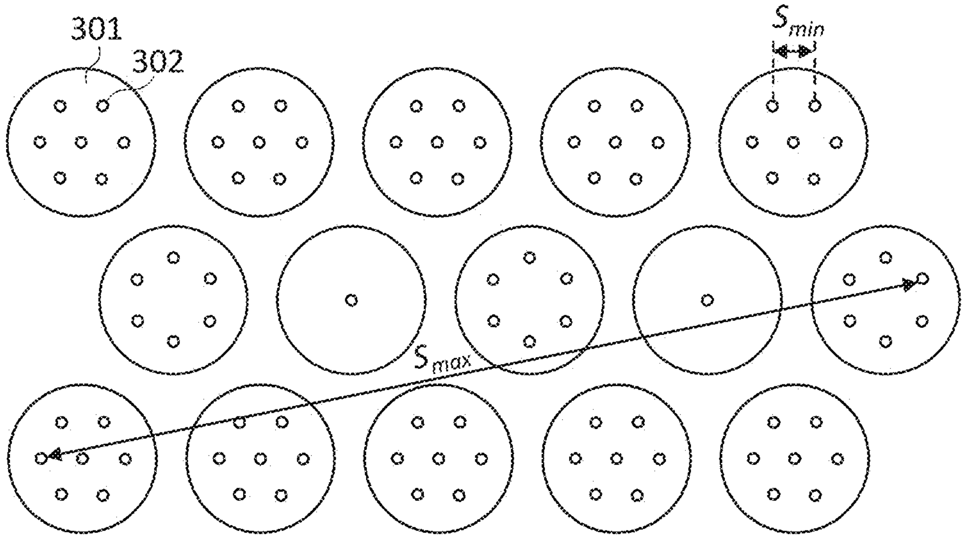
FIG. 4 schematically shows an example array of fibers that can be used in the optical communication system of FIG. 1 according to an embodiment.

FIG. 4 illustrates a configuration of one or more optical fibers 202 according to some embodiments. More specifically, FIG. 4 schematically shows an example cross-sectional view of one or more fibers 202 in fiber coupling planes 243 according to various embodiments. FIG. 4 illustrates an example two-dimensional (2D) array of multi-core, single-mode optical fibers supporting M=90 spatial paths. In some embodiments, different fibers within the array can have different respective core counts, different respective effective core diameters, and/or different respective rotational orientations. The feature sizes $S_{min}$ and $S_{max}$ corresponding to this particular embodiment are indicated in FIG. 4.

In some embodiments, some cores of some multi-core fibers shown in FIGS. 3D-3H and FIG. 4 can be designed to be substantially un-coupled, e.g., exhibit a core-to-core crosstalk lower than 20 dB over 1 km of propagation distance, or can be designed to be relatively strongly coupled. Some cores of single-core and/or multi-core fibers shown in FIGS. 3 and 4 can be designed to be few-moded or multi-moded, i.e. can be designed to propagate a relatively small number (e.g., <10) or a relatively large number (e.g., ≥10) of transverse modes.

An important additional aspect of coupling a large number of spatial paths from fibers 202 to a PIC 210 can include the consideration of relative sizes of practically usable fibers and optical, optoelectronic, and electronic elements, and their placement within the corresponding large arrays. For example, relatively close needed spacing(s) in some areas of the PIC may indicate that forming larger arrays may be difficult, which poses a difficult scalability problem. In addition, in some cases, the relative alignment of a typical fiber core and a typical vertical grating coupler may require a placement accuracy on the order of 1 micron or better to achieve low coupling losses. However, such requirements may not be compatible with the typical accuracies achieved using conventional passive alignment processes, which may disadvantageously necessitate the use of slower and/or more expensive active alignment processes.

Having studied some of the shortcomings of existing fiber-to-PIC coupling structures, I have identified and examined, through analyses, modeling, and simulations, various designs of optical coupling structures for removable fiber-to-PIC connections suitable for high-volume manufacturing of arrays supporting a large number of spatial paths. In particular, the contemplated solutions can allow for efficient coupling between M spatial paths of one or more optical fibers 202 and an array 230 of N vertical-coupling elements by implementing some or all of the following features: (i) magnifying or de-magnifying by a first factor (denoted as A) the minimum core-to-core spacing of optical fibers in fiber end face plane 243 to match the minimum spacing between vertical-coupling elements in coupling plane 242; (ii) magnifying or de-magnifying by a second factor (denoted as B) the maximum core-to-core spacing of optical fibers in fiber end face plane 243 to match the maximum spacing between vertical-coupling elements in coupling plane 242; (iii) magnifying or de-magnifying by a third factor (denoted as $C_1$) the effective core diameter of optical fibers in fiber end face plane 243 to match the effective vertical grating coupler sizes in coupling plane 242; (iv) magnifying or de-magnifying by a fourth factor (denoted as $C_2$) the effective core diameter of optical fibers in fiber end face plane 243 to achieve a substantially different (e.g., larger) effective beam diameter in connector mating plane 241 than in fiber end face plane 243; and/or (v) changing the effective cross-sectional geometrical layout of the plurality of spatial paths in at least some regions between fiber end face plane 243, connector mating plane 241, and coupling plane 242. In an example embodiment, at least some or all of the factors A, B, $C_1$, and $C_2$ can be different.

For an example of possible benefits that can be obtained, one may consider an example embodiment in which A=B=2 and $C_1$=1.5. In this particular embodiment, the scaling by $C_1$ allows for relaxed alignment tolerances of the connector component 240 to be attached to a PIC 210. The scaling by A and B allows for even more relaxed optical waveguide spacings within the PIC 210, thereby potentially lowering the waveguide-to-waveguide crosstalk and/or enabling the use of relatively large arrays.

Figure 5:
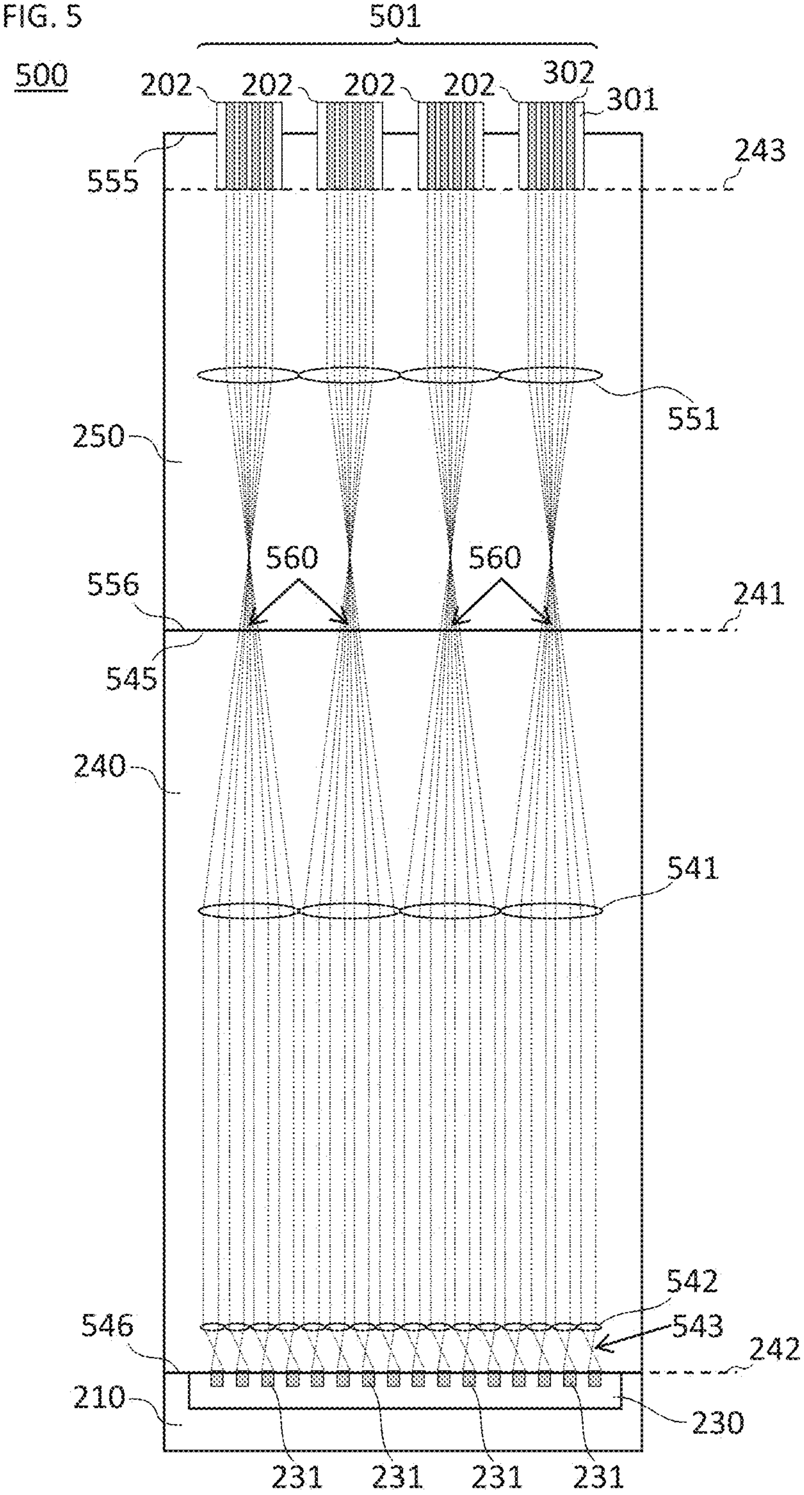
FIG. 5 shows a schematic cross-sectional side view of a fiber-to-PIC connector arrangement that can be used in the integrated optical device of FIG. 2 according to an embodiment.

FIG. 5 shows a fiber-to-PIC connector arrangement 500 that can be used in device 200 (FIG. 2) according to an embodiment. As shown, connector arrangement 500 comprises an array 501 of multi-core fibers (MCFs) 202 connected to connector element 250. The end faces of the MCFs 202 are arranged to be substantially in the same plane, i.e., fiber end face plane 243 (also see FIG. 2). Connector element 250 is further connected to connector element 240, and the interface between the two connector elements includes connector mating plane 241 (also see FIG. 2).

Connector element 250 includes one collimating lens 551 per MCF 202. In an example embodiment, collimating lenses 551 can be arranged to provide enlarged light-beam-spot sizes in connector mating plane 241. For example, an effective core diameter of 10 micron together with the focal length $f_1$ of collimating lens 551 being $f_1$=500 micron can result in an effective beam diameter of approximately 100 micron in connector mating plane 241.

Connector element 240 includes one focusing lens 541 per MCF 202. The longitudinal sizes of connector elements 240 and 250 can be selected such as to have the connector mating plane 241 at any convenient position between collimating lenses 551 and focusing lenses 541. For example, such sizes can be selected such as to achieve an expansion of the beam diameter in connector mating plane 241 by a factor of $C_2$≈10. Such expansion can be beneficial in that it can significantly simplify the connector alignment. In alternative embodiments, other longitudinal sizes can similarly be selected to realize other values of the factor of $C_2$.

In the example embodiment shown in FIG. 5, each focusing lens 541 has a focal length $f_2=2f_1$. This ratio of focal lengths results in a magnification of each MCF's entire core pattern by a factor of A=2 in coupling plane 242. For example, the minimum core-to-core spacing $S_{min}$ (e.g., see FIG. 3D) is magnified in coupling plane 242 by a factor of two as well. This magnification applies both to the spacing(s) of the MCF cores and to the characteristic mode size(s) corresponding to each individual core.

In order to independently choose the effective magnification applied to an individual spatial path, between fiber end face plane 243 and coupling plane 242, each spatial path is directed through a respective individual lens 542. For example, in the embodiment of FIG. 5, each individual lens 542 has a focal length $f_3$=70 micron and hence relatively de-magnifies by 75%. As a result the overall characteristic-mode-size magnification $C_1$=2×0.75=1.5 is achieved. The larger effective mode size in coupling pane 242 compared to fiber end face plane 243 can advantageously help to relax the positioning tolerances of connector element 240 relative to the array of vertical coupling elements 230 in coupling plane 242.

In some embodiments, some or all lenses 542 can be laterally offset from the centers of the corresponding impinging light beams. Such lateral offsets cause the light beams 543 that are directed toward the vertical-coupling elements 231 of array 230 to impinge at said coupling elements at a desired coupling angle, e.g., not necessarily along the normal with respect to the corresponding PIC's main surface. Note that the maximum core-to-core spacing is left substantially unchanged in this example, as the applied magnification occurs on a per-MCF basis, thereby implementing the B value of B≈1.

In the above-described example, the geometry-scaling parameter set {A, B, $C_1$, $C_2$} is approximately {2, 1, 1.5, 10}. However, other numerical combinations for the geometry-scaling parameter set {A, B, $C_1$, $C_2$} are also achievable, e.g., through proper selection of relevant sizes, positions, and focal lengths. From the above description, a person of ordinary skill in the art will be able to achieve such other numerical combinations, as needed, without any undue experimentation.

Furthermore, the lens system illustrated by FIG. 5 represents only one of many possible ways to perform independent array pattern scaling and mode size scaling using refractive optical elements. For example, a given array pattern scaling can take place over any distinct subset of spatial paths corresponding to fiber end face plane 243. Different subsets can have identical or different respective magnification factors. When individual subsets are differently scaled, the overall array pattern geometry of fiber end face plane 243 can be transformed to yield a geometrically dissimilar array pattern in coupling plane 242.

In some embodiments, pattern scaling can also take place over the entire set of spatial paths corresponding to fiber end face plane 243, e.g., by using a single lens element 551 that laterally spans the entire array 501, thereby yielding in coupling plane 242 a geometrically similar, scaled image of array 501, as the latter is presented to the lens system in fiber end face plane 243. An example embodiment using this design can achieve a parameter set {A, B, $C_1$, $C_2$} of {2, 2, 1.5, 10}.

In some embodiments, mode field diameter scaling can take place over any subset of spatial paths corresponding to fiber end face plane 243 and can use identical or different respective scaling (e.g., magnification) factors for different spatial paths.

In some embodiments, aspheric lenses and arrays thereof can be used. Such lenses can be manufacturable, e.g., using wafer-scale processing technologies.

In some embodiments, the functionalities of lenses 541 and 542 can be combined into a single aspheric refractive element, which can be 3D printed using technologies, such as those offered for sale by Nanoscribe of Eggenstein-Leopoldshafen, Germany.

As will be understood by people of ordinary skill in the art, setting the angle of the fibers 202 relative to the PIC's main plane as well as choosing the incidence angles of the individual light beams 543 onto vertical coupler array 230 are also possible, e.g., by mounting fibers 202 in a slanted or bent fashion within connector element 250, slanting the connector mating plane 241 at an angle relative to the PIC's main plain, and/or introducing at suitable locations within assembly 500 metallic or dielectric reflective interfaces, refractive elements, such as prisms, and/or diffractive elements such as gratings.

Figure 6:
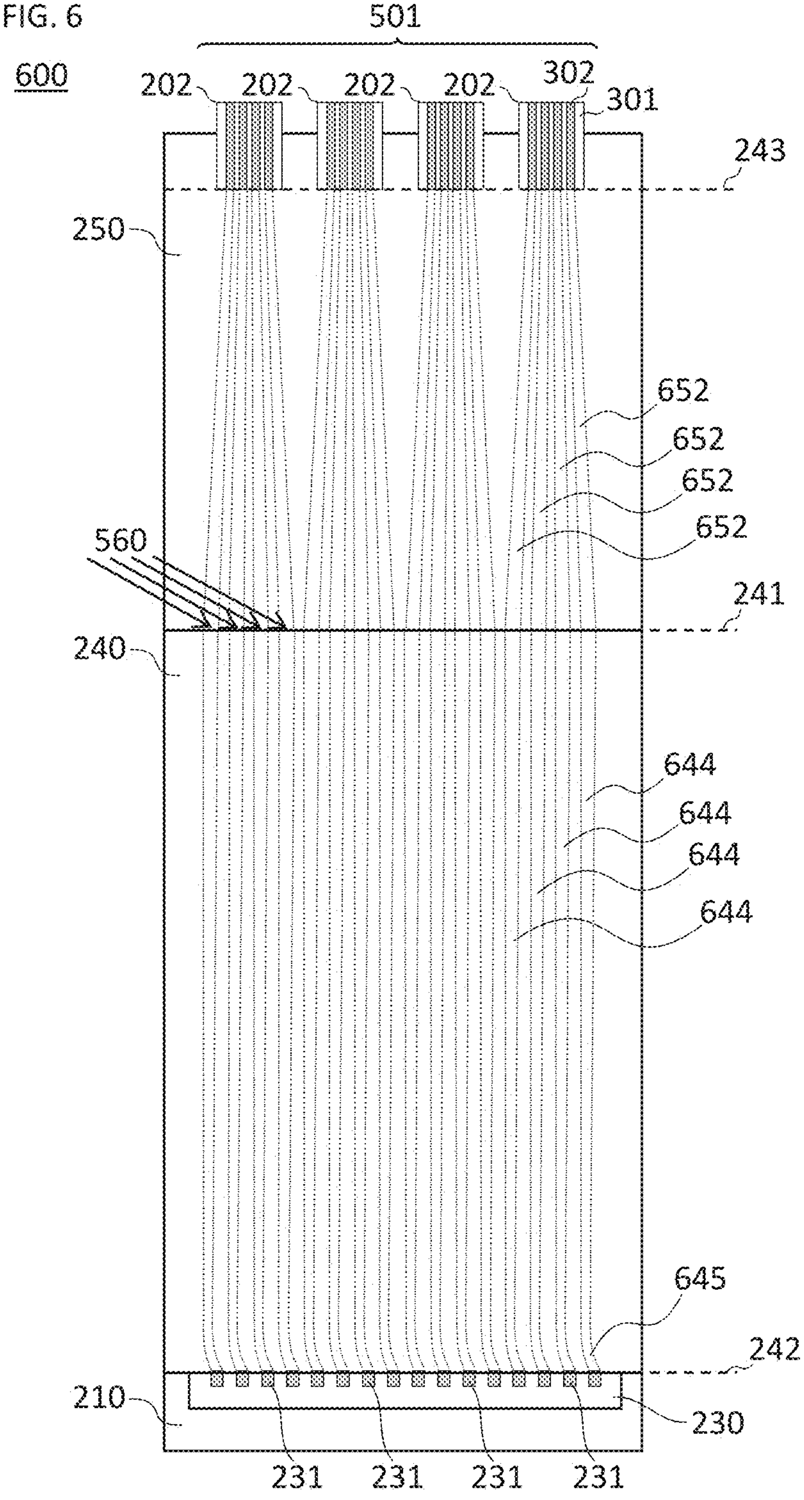
FIG. 6 shows a schematic cross-sectional side view of a fiber-to-PIC connector arrangement that can be used in the integrated optical device of FIG. 2 according to another embodiment.

FIG. 6 shows a fiber-to-PIC connector arrangement 600 that can be used in device 200 (FIG. 2) according to another embodiment. As shown, connector arrangement 600 comprises an array 501 of MCFs 202 connected to connector element 250. The end faces of the MCFs 202 are arranged to be substantially in the same plane, i.e., fiber end face plane 243 (also see FIG. 2). Connector element 250 is further connected to connector element 240, and the interface between the two connector elements includes connector mating plane 241 (also see FIG. 2).

Connector element 250 includes an array of 3D waveguides 652, formed in (e.g., optically written in) a suitable host material such as glass using a suitable technology, such as some of the products offered for sale by Optoscribe of Livingston, United Kingdom.

In some embodiments, 3D waveguides 652 written into connector element 250 can expand or suitably geometrically re-arrange the array geometry of spatial paths provided by fibers 202 at fiber end face plane 243. In the embodiment shown in FIG. 6, 3D waveguides expand the mode field diameter by a factor of $C_2$=2 between fiber end face plane 243 and connector mating plane 241.

In some embodiments, 3D waveguides 652 of connector element 250 can independently expand the mode field diameter of individual waveguides to enable an expanded-beam connection at connector mating plane 241. This can be accomplished by using taper or inverse-taper structures within 3D waveguide arrangement 652 and/or by changing one or more 3D waveguide writing parameters, such as scan speed or repetition rate of the femtosecond laser pulses used to write 3D waveguides 652, resulting in larger 3D waveguide mode field diameters.

In some embodiments, 3D waveguides 652 in connector element 250 can also introduce bend angles, e.g., to accommodate different angles of incidence of light from fibers 202, e.g., from a fiber end face plane that is not parallel to the PIC's main surface. In some embodiments, 3D-waveguide bends can be combined with reflective or refractive angle changes due to suitably placed dielectric or metallic interfaces (not explicitly shown in FIG. 6), or diffractive angle changes from suitably placed gratings (not explicitly shown in FIG. 6).

Connector element 240 can use 3D waveguides 644 some of whose mode field diameters relative to a typical fiber mode field diameter within fiber end face plane 243 are expanded at connector mating pane 241 to essentially match the mode field diameter of the corresponding waveguides of connector element 250 at connector mating plane 241.

In some embodiments, 3D waveguides 644 of connector element 240 can suitably change array size, array geometry, mode size, and incidence angles to match the respective geometric parameters at coupling plane 242.

In the example embodiment shown in FIG. 6, each waveguide mode field diameter is reduced from a magnification of $C_2$=2 at connector mating plane 241 to 75% thereof, thereby yielding an overall mode field diameter magnification from fibers 202 in fiber end face plane 243 to vertical coupler array 230 in coupling plane 242 of $C_1$=2×0.75=1.5. The larger effective mode size in coupling plane 242 compared to fiber end face plane 243 can advantageously help to relax the positioning tolerances of connector element 240 relative to the array 230 of vertical-coupling elements 231 in coupling plane 242.

In some embodiments, some or all waveguide bends 645 can establish a desired coupling angle to vertical-coupling elements 231 of array 230.

The 3D waveguide system described above should only be viewed as one of many possible embodiments that can be used to perform independent array pattern scaling, array pattern geometry transformation, spot size scaling, and angle-of-incidence adaptation. Hybrid assemblies are also possible in some embodiments and can be considered as functional equivalents of the above-described embodiments. Some embodiments can use any suitable combination of diffractive, reflective, or refractive surfaces, 3D waveguides, and 3D-printed structures within either or both of connector elements 240 and 250.

Some embodiments can be constructed to use polarization diversity optics within connector assemblies 271 and 272. For example, some cores of the one or more fibers 202 can carry signals of random polarization or can carry polarization-multiplexed signals. In addition, some vertical grating couplers can be polarization sensitive. Properly coupling dual-polarization light from one or more fibers 202 to a PIC 210 can thus benefit from polarization-diversity vertical-coupling elements, such as two-dimensional polarization-diversity vertical grating couplers. Some polarization-diversity vertical-coupling elements can have an inherently higher insertion loss compared to that of single-polarization vertical-coupling elements. Hence, replacing one polarization-diversity vertical-coupling element by a pair of single-polarization vertical-coupling elements and performing polarization-diversity outside the PIC, e.g., within connector assembly 271 and 272, can be beneficial.

Some embodiments can benefit from the use of polarization diversity optics disclosed, e.g., in U.S. Pat. No. 9,927,575, which is incorporated herein by reference in its entirety.

Figure 7:
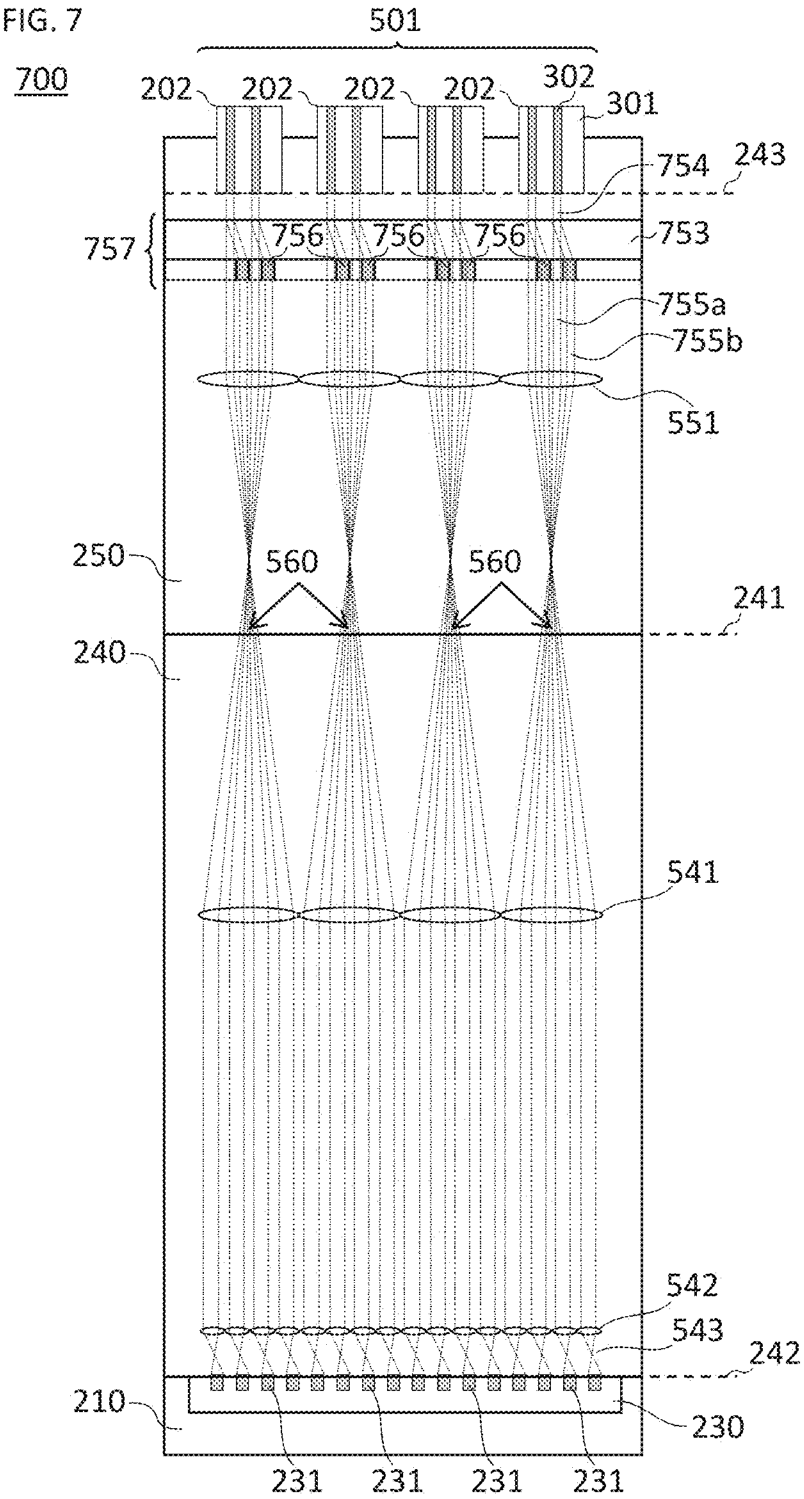
FIG. 7 shows a schematic cross-sectional side view of a fiber-to-PIC connector arrangement that can be used in the integrated optical device of FIG. 2 according to yet another embodiment.

FIG. 7 shows a fiber-to-PIC connector arrangement 700 that can be used in device 200 (FIG. 2) according to yet another embodiment. As shown, connector arrangement 700 comprises an array 501 of MCFs 202 connected to connector element 250. The end faces of the MCFs 202 are arranged to be substantially in the same plane, i.e., fiber end face plane 243 (also see FIG. 2). Connector element 250 is further connected to connector element 240, and the interface between the two connector elements includes connector mating plane 241 (also see FIG. 2).

The embodiment shown in FIG. 7 is constructed to couple M=8 spatial paths of fibers 202 in fiber end face plane 243 to N=16>M vertical-coupling elements 231 of array 230.

Connector element 250 includes one collimating lens 551 per MCF 202. In an example embodiment, collimating lenses 551 can be arranged to provide enlarged light-beam-spot sizes in connector mating plane 241. Connector element 250 further includes a polarization-diversity assembly 757.

Figure 8A:
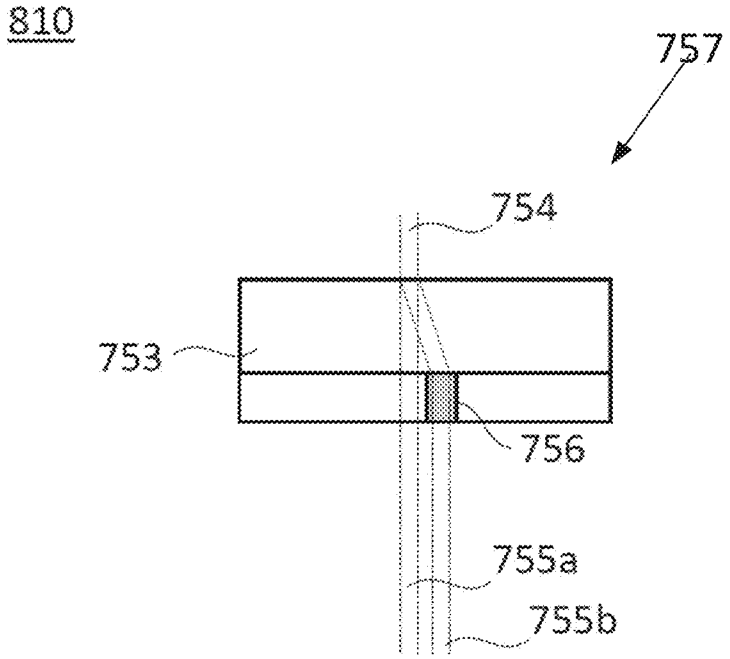
FIGS. 8A and 8B show schematic cross-sectional side views of a part of a fiber-to-PIC connector arrangement that can be used in the integrated optical device of FIG. 7 according to some embodiments.

FIG. 8A shows the schematic side-view 810 of a sub-element of polarization-diversity assembly 757 according to an embodiment. As shown, assembly 757 comprises a birefringent beam displacement element 753 (also referred to as a "walk-off element." In some embodiments, element 753 can be made of such birefringent materials as properly oriented calcite, yttrium orthovanadate ($YVO_4$), or a-BBO, such as those offered for sale by MT-Optics of Fuzhou, Fujian, China. Birefringent beam displacement element 753 operates to split an incoming beam 754 into a corresponding pair of outgoing beams 755*a* and 755*b*. As such, beams 755*a* and 755*b* contain respective light of two orthogonal polarization states of incoming beam 754. To prepare beams 755*a* and 755*b* for coupling to parallel-aligned (as opposed to orthogonally-oriented) vertical grating couplers in array 230, beam 755*b* is passed through a half-wave plate 756 to rotate the polarization of light therein. Past half-wave plate 756, beams 755*a* and 755*b* have the same polarization state and, as such, are properly conditioned to use parallel-oriented vertical grating couplers in array 230.

In an alternative embodiment, beam 755*a* (instead of beam 755*b*) can be passed through half-wave plate 756 to rotate the polarization of light therein. In various embodiments, half-wave plate 756 can be made, e.g., from quartz crystals, polymer retarder film, or can be 3D printed. In some embodiments, polarization-diversity structure 757 can be manufactured using wafer-scale optical processing and assembly.

In some embodiments, polarization-diversity structure 757 can be inserted at other places within connector elements 240 or 250 in fiber-to-PIC array connector arrangement 700, e.g., between lenses 741 and lenses 742 or between lenses 551 and lenses 541.

In some embodiments, some elements of polarization-diversity structure 757 can be functionally split and placed at different locations within connector elements 271 and 272. For example, birefringent beam displacement element 753 can be placed between fiber end face plane 243 and lenses 551, and half-wave plates 756 can be placed between lenses 541 and lenses 542.

Figure 8B:
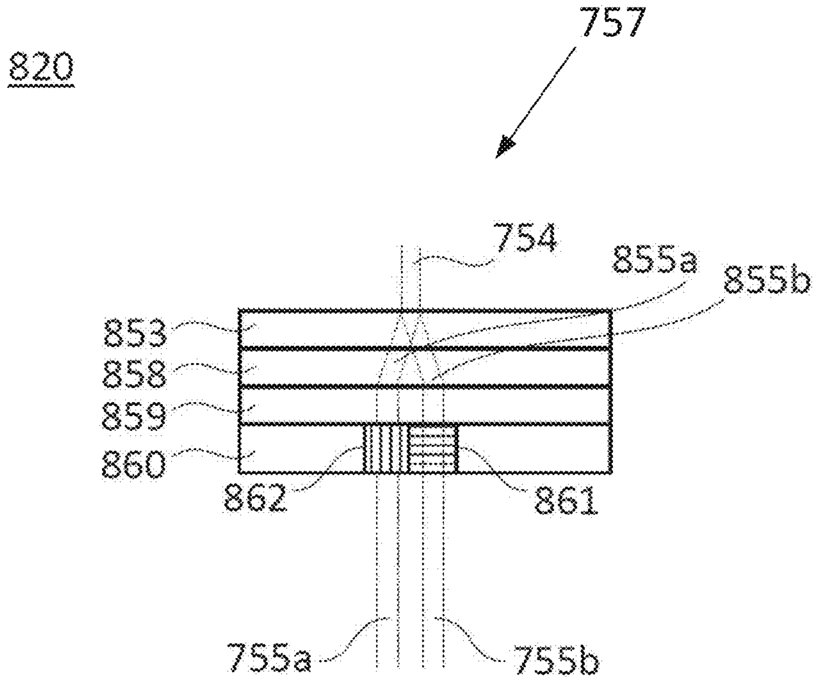

FIG. 8B shows the schematic side-view 820 of a sub-element of polarization-diversity assembly 757 according to an alternative embodiment. This particular embodiment uses a polarization-sensitive grating 853, such as offered for sale by ImagineOptix of Durham, North Carolina, USA, that operates to split incident light beam 754 into two circularly polarized beams 855*a* and 855*b* whose polarizations are mutually orthogonal. Beams 855*a* and 855*b* are directed through an optical layer 858 that has a sufficient thickness to have the beams sufficiently laterally separated. A second polarization grating 859 then operates to diffract the laterally separated beams 855*a* and 855*b* such that the beams so diffracted become parallel to the original light beam 754. A subsequent optical layer 860 comprising a quarter-wave polarization retarder element 861 and a three-quarter-wave polarization retarder element 862 then converts the polarizations of both beams 855*a* and 855*b* to the same linear polarization state. In an example embodiment, this linear polarization state is a proper polarization state for achieving efficient optical coupling of the linearly polarized beams 755*a* and 755*b* into vertical grating couplers of array 230.

Figures 8C, 8D, 8E:
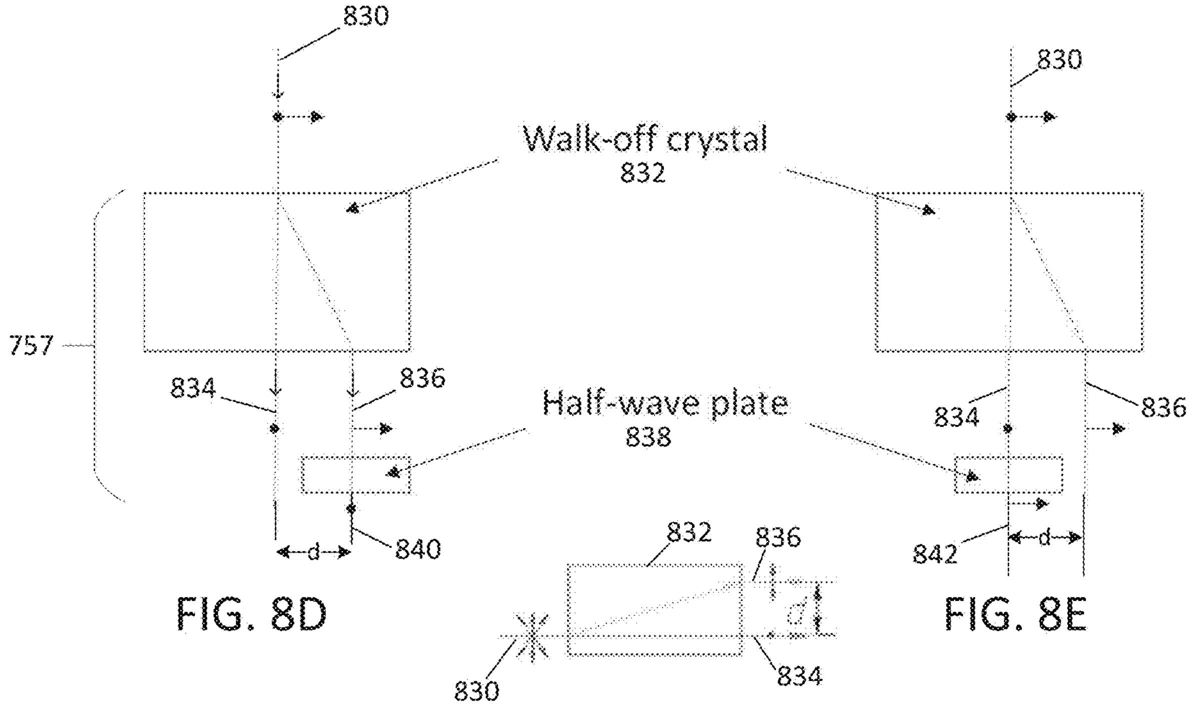
FIGS. 8C to 8E are diagrams of example operations of walk-off crystals.

The physical principle of the polarization-diversity structure 757 can be explained as follows. FIGS. 8C to 8E include diagrams that show an incoming beam 830 being split into two polarized beams by the polarization-diversity structure 757. For example, the incoming beam 830 includes two orthogonally polarized components that are spatially split by a walk-off crystal 832 into a first polarized component 834 and a second polarized component 836. Referring to FIG. 8C, the incoming beam 830 can have polarization components with arbitrary directions, and the walk-off crystal 832 separates the polarization components into a first polarized component 834 and a second polarized component 836 having polarizations that are orthogonal to each other and separated by a distance d. As shown in FIGS. 8D and 8E, the component 834 having a polarization direction perpendicular to the plane of the figure passes straight through the walk-off crystal 832, whereas the component 836 having a polarization direction parallel to the plane of the figure is displaced by a distance d relative to the component 834.

At least one of the two spatially separated polarization components 834, 836 is then rotated by a half-wave plate 838 such that the resulting polarizations of the two spatial paths are the same. In the example of FIG. 8D, the polarization of the second polarized component 836 is rotated 90° to generate a polarized component 840 such that the polarized components 834 and 840 have the same polarization. In the example of FIG. 8E, the polarization of the first polarized component 834 is rotated 90° to generate a polarized component 842 such that the polarized components 836 and 842 have the same polarization. The two spatially demultiplexed polarization components (834 and 840) or (836 and 842) are then incident on a polarization-sensitive vertical grating coupler, such as 231 in FIG. 2, to couple into a photonic integrated circuit, such as 210. In some examples, the grating coupler only responds to either TE (transverse electric) or TM (transverse magnetic) polarization. TE polarized light is characterized by its electric field being perpendicular to the plane of incidence. For TE light, the magnetic field, which is perpendicular to the electric field in isotropic materials, lies in the plane of incidence.

In some implementations, the fiber-to-PIC arrangement provides polarization management of two orthogonal polarizations between fiber(s) and polarization-dependent PIC coupling element(s), which can be vertical-coupling or edge-coupling elements that respond to, e.g., circular polarizations, linear polarizations, or any other polarization states. The examples described below use photonic integrated circuit edge-coupling elements that respond to a given linear polarization, e.g., vertical grating couplers.

In the example of FIG. 8A, both the birefringent beam displacement element 753 and the half-wave plate 756 are positioned between the fiber end face plane 243 and the connector mating plane 241. In some implementations, the birefringent beam displacement element 753 can be positioned between the fiber end face plane 243 and the connector mating plane 241, and the half-wave plate 756 can be positioned between the connector mating plane 241 and the coupling plane 242.

Figure 9:
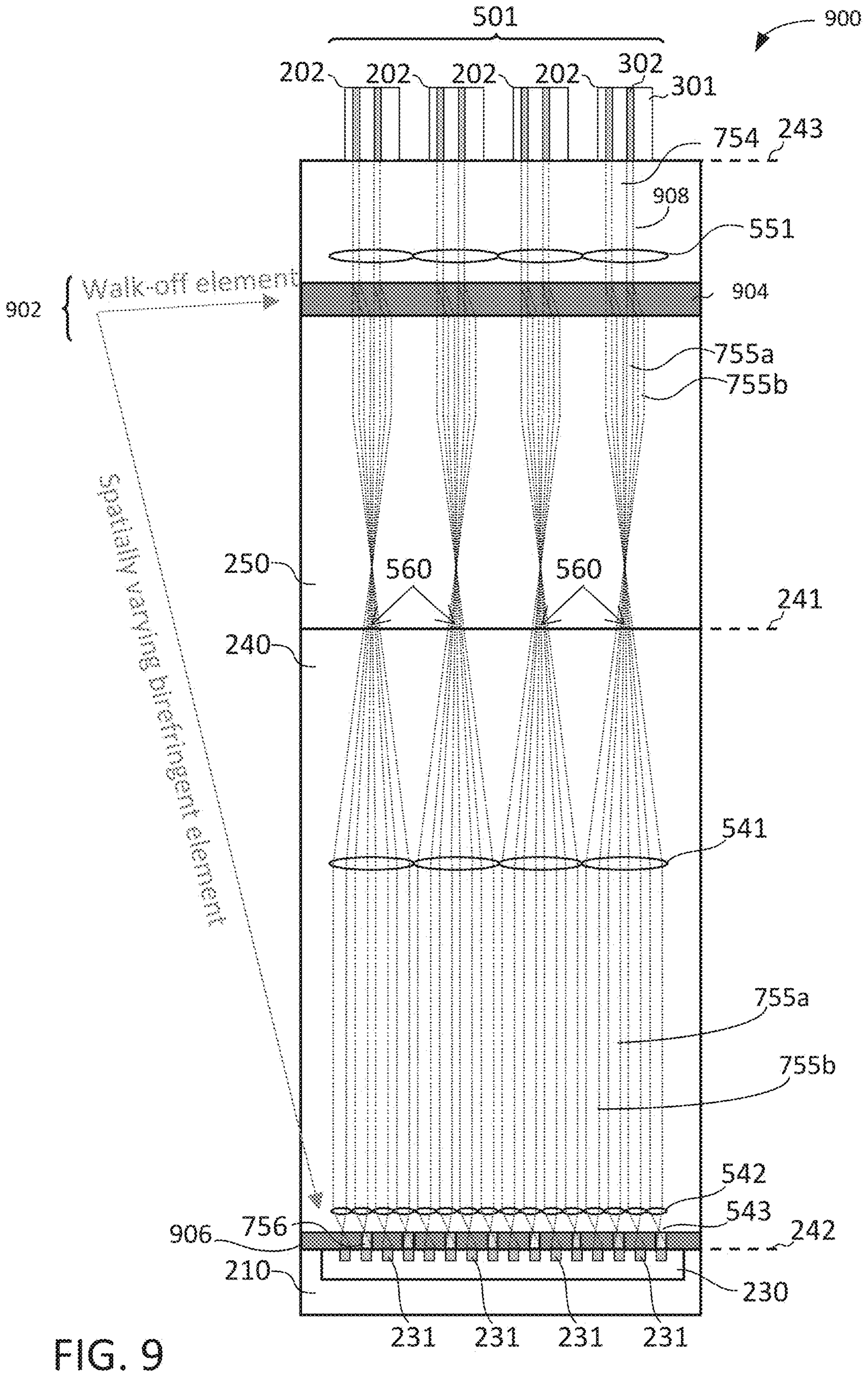
FIG. 9 is a diagram of an example of a fiber-to-PIC connector.

Referring to FIG. 9, in some implementations, a fiber-to-PIC connector 900 includes a polarization-diversity structure 902 that includes a walk-off element 904 and a spatially varying birefringent element 906, The walk-off element 904 is positioned between the collimating lens 551 and the connector mating plane 241. The spatially varying birefringent element 906 is positioned between the individual lens 542 and the coupling plane 242. For example, an incoming beam 908 from a core 302 passes the collimating lens 551 and is split by the walk-off element 904 into a pair of beams 755*a* and 755*b*. The polarization of the beam 755*a* is orthogonal to the polarization of the beam 755*b*. The beam 755*a* passes the spatially varying birefringent element 906, which rotates the polarization direction of the beam 755*a* to be the same as the polarization direction of the beam 755*b*. The two beams 755*a* and 755*b* are then coupled through the vertical-coupling elements 231 to the photonic integrated circuit 210.

In some implementations, the spatially varying birefringent element 906 or the beam displacement element 753 of FIGS. 7 and 8A can be replaced by a birefringent hole plate (BHP) in which a plate of birefringent material includes openings or holes such that light beams can pass through the holes without any change in the polarization direction, whereas the polarization direction of the light beams that pass through the birefringent material are rotated, e.g., by 90°. The birefringent hole plate can be used in combination with a walk-off element such that a light beam is split by the walk-off element into a first polarization component and a second polarization component, the first polarization component is directed through the hole in the birefringent hole plate, and the second polarization component is directed through the birefringent material, thereby producing two polarized beams that have the same polarization direction.

Figures 10A, 10B, 10C, 10D:
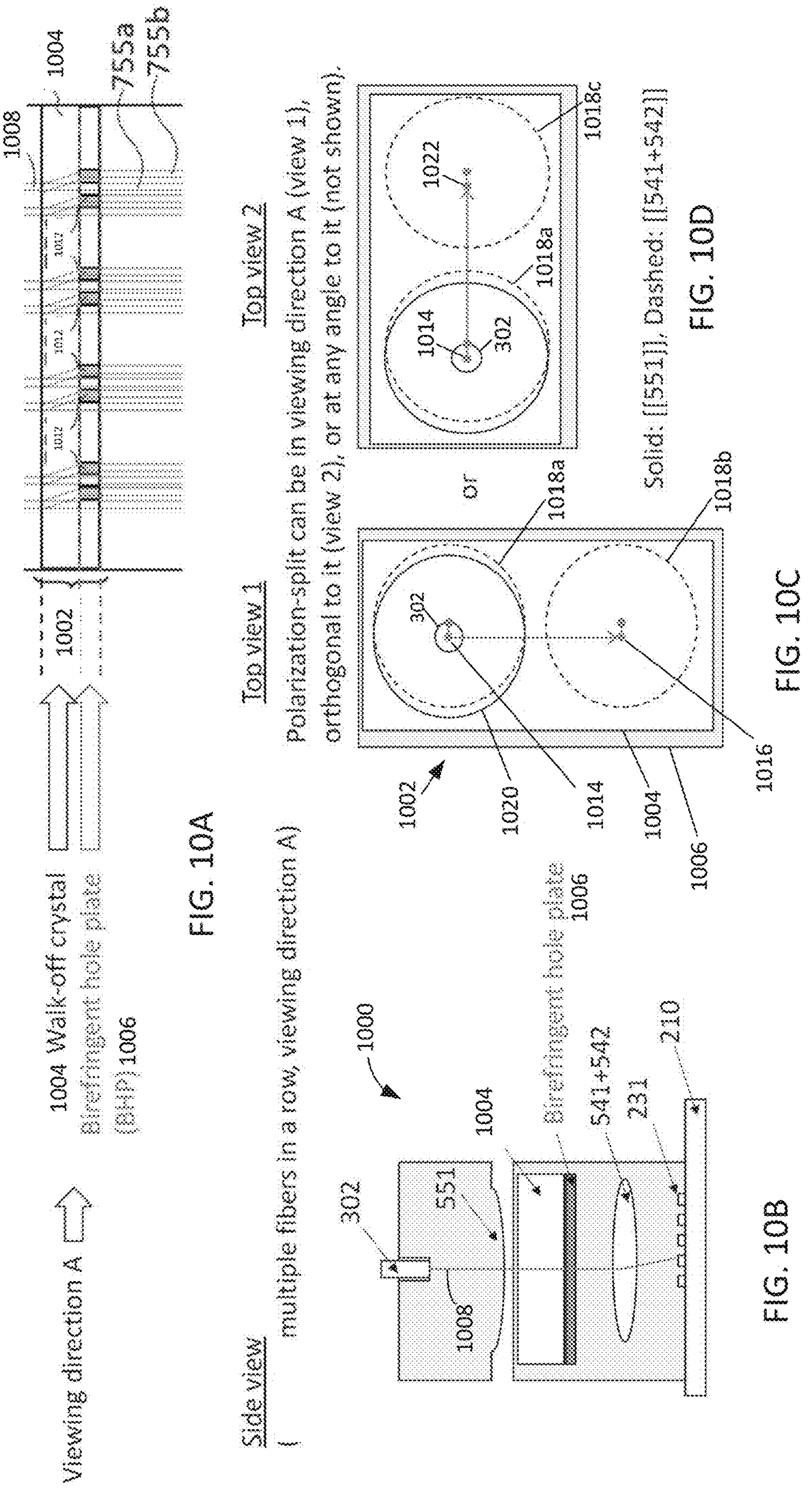
FIG. 10A is a side view of an example of a polarization-diversity assembly.
FIG. 10B is a side view of an example of a fiber-to-PIC connector.
FIGS. 10C and 10D are top views of examples of the polarization-diversity assembly.

FIGS. 10A to 10D show various views of a fiber-to-PIC connector 1000 or portions thereof. Referring to FIG. 10A, in some implementations, the fiber-to-PIC connector 1000 is configured to optically couple a row of incoming beams 1008 from a row of input fiber cores 302. The fiber-to-PIC connector 1000 includes a polarization-diversity assembly 1002 that includes a walk-off crystal 1004 and a birefringent hole plate 1006. The birefringent hole plate 1006 has birefringent material at locations 1012 that function as the half-wave plate 756 of FIGS. 7 and 8A. An incoming beam 1008 is split by the walk-off crystal 1004 into two beams 755*a* and 755*b* that initially have different polarization states (e.g., orthogonally polarized states). One of the two beams 755*a* and 755*b* is rotated by the birefringent material in the birefringent hole plate 1006 after which the two beams 755*a* and 755*b* have the same polarization state.

FIG. 10B is a side view diagram of the fiber-to-PIC connector 1000 viewed in a direction A. The incoming light beam 1008 from the core 302 passes a collimating lens 551. The walk-off crystal 1004 splits the incoming beam 1008 into two beam components, and the birefringent hole plate 1006 rotates the polarization direction of one of the beam components, resulting in two light beams having the same polarization state. The beams pass the second lens 541 and the third lens 542, and are directed to vertical coupling elements 231 on the photonic integrated circuit 210.

FIG. 10C is a top view of an example of the polarization-diversity assembly 1002 that includes the walk-off crystal 1004 and the birefringent hole plate 1006, which has a hole 1020. The walk-off crystal 1004 causes a polarization split resulting in a beam displacement in the direction A (the direction A is shown in FIG. 10A), which in this example is parallel to the row direction. The incoming light beam from the core 302 has a polarization component that is displaced by the walk-off crystal 1004 from an initial location 1014 to a second location 1016, in which the displacement direction is parallel to the row direction. The dash line 1018*a* represents the locations of a set of the second lens 541 and the third lens 542. The dash line 1018*b* represents another set of the second lens 541 and the third lens 542. The centers of the second lens 541 and the third lens 542 are offset from the center of the polarized beam components, which cause the polarized beam components to be refracted by the lenses and directed toward the vertical grating couplers at an incident angle θ in a range between 0 to 90°.

FIG. 10D is a top view of another example of the polarization-diversity assembly 1002 in which the polarization split causes a beam displacement perpendicular to the direction A (the direction A is shown in FIG. 10A). In this example, the beam displacement direction is perpendicular to the row direction. The incoming light beam from the core 302 has a polarization component that is displaced by the walk-off crystal 1004 from an initial location 1014 to a second location 1022, in which the displacement direction is perpendicular to the row direction. Each of the dash lines 1018*a* and 1018*c* represents a set of the second lens 541 and the third lens 542. The centers of the second lens 541 and the third lens 542 are offset from the center of the polarized beam components, which cause the polarized beam components to be refracted by the lenses and directed toward the vertical grating coupler at an incident angle θ in a range between 0 to 90°.

Figures 11A, 11B, 11C:
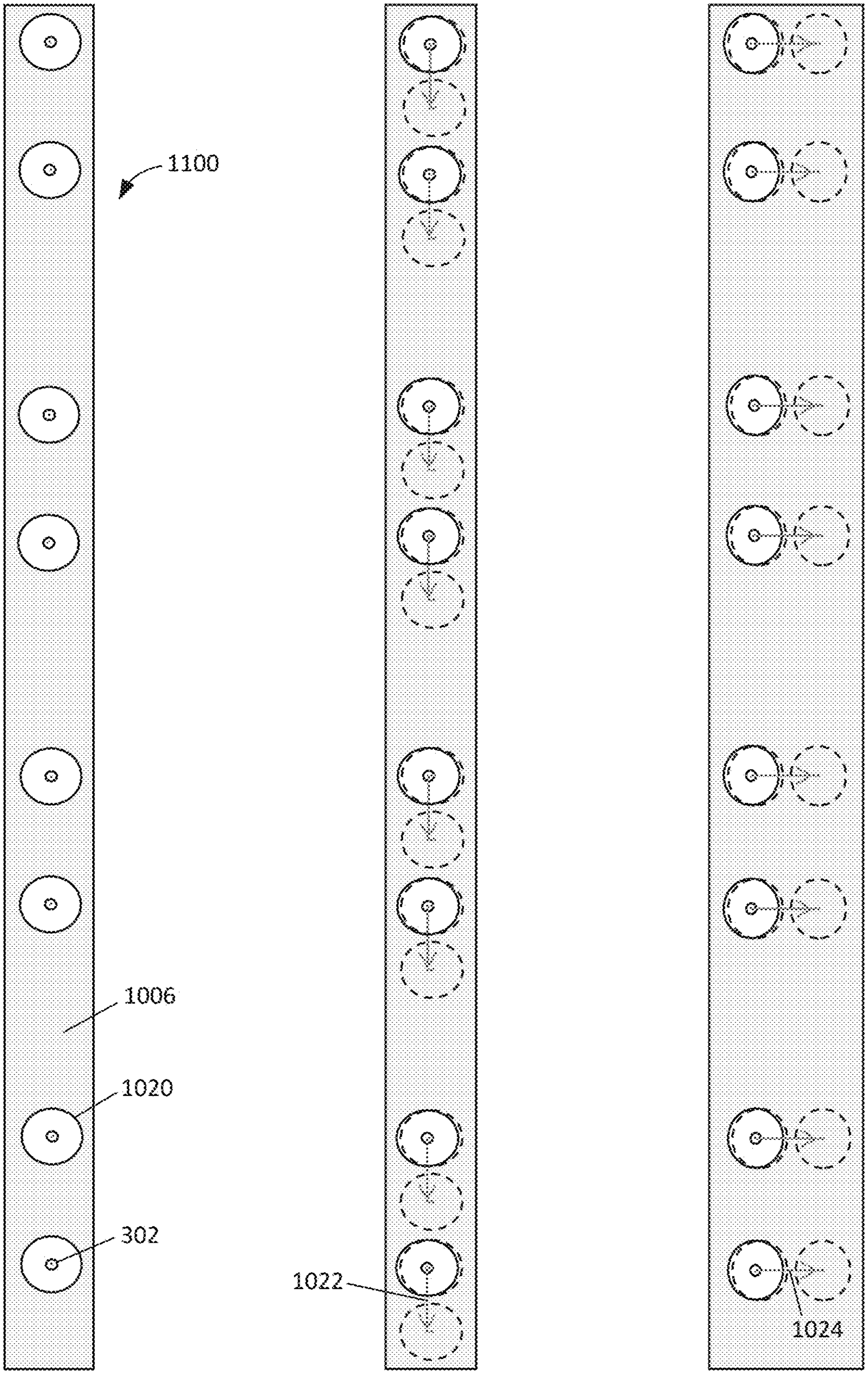
FIG. 11A is a top view of an example of a fiber-to-PIC connector.
FIGS. 11B and 11C are diagrams showing examples of directions of beam-displacements by walk-off crystals.

FIG. 11A is a top view of an example of a fiber-to-PIC connector 1100 in which a row of four pairs of fiber cores 302 are aligned with four pairs of holes 1020 of a birefringent hole plate 1006. FIG. 11B is a diagram showing an example in which the walk-off crystal 1004 displaces a polarization component of each bean in a direction 1022 parallel to the row direction. FIG. 11C is a diagram showing an example in which the walk-off crystal 1004 displaces a polarization component of each bean in a direction 1024 perpendicular to the row direction. The walk-off crystal can be designed to displace the polarization component of each beam in any predetermined direction.

In some implementations, a birefringent plate can have regions with different thicknesses such that when the two polarization components provided by the walk-off element pass two regions with different thicknesses, the resulting beams have the same polarization direction. For example, if a half-wave plate has a thickness d1, the two regions can have a difference in thickness equal to d1. A birefringent plate can have pairs of regions in which each pair includes a first region having a thickness of d1+d2 and a second region having a thickness of d2. The two orthogonally polarized beam components from the walk-off element are directed to the pair of regions, in which the polarization of one beam component is rotated 90° relative to the other beam component, resulting in two polarized beams having the same polarization direction.

Figure 12:
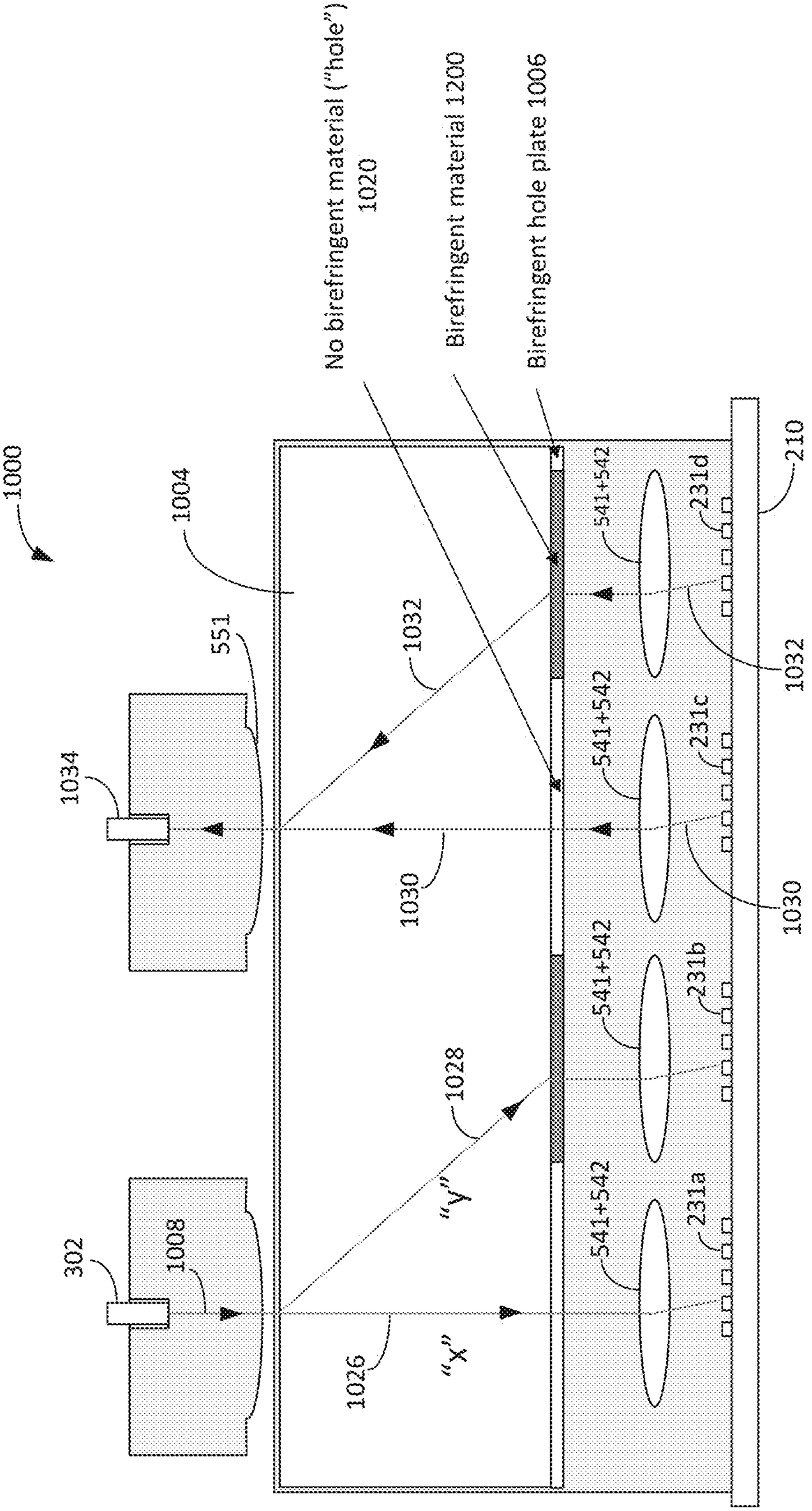
FIG. 12 is a diagram of an example of a fiber-to-PIC connector.

FIG. 12 is a diagram of an example of the fiber-to-PIC connector 1000 in which half-wave plates (e.g., 756) are implemented as a birefringent plate 1006 made of a birefringent material 1200, in which the birefringent plate 1006 includes areas that does not have birefringent material, i.e., having holes 1020. An incoming light beam 1008 from an input fiber core 302 is split by the walk-off element 1004 into a first beam component 1026 that has "x" polarization and a second beam component 1028 that has "y" polarization. The figure shows an example in which the "x" polarization is TE polarization and the "y" polarization is TM polarization. The first beam component 1026 passes the hole 1020 in the birefringent plate 1006 and maintains its polarization. The second beam component 1028 passes the birefringent material 1200 and its polarization is changed from "y" polarization to "x" polarization. The first and second beam components 1026 and 1028 having the same or parallel polarization then incident upon the grating couplers 231*a* and 231*b*, respectively. The grating couplers 231*a* and 231*b* couple the first and second beam components 1026, 1028 to the photonic integrated circuit 210. In general, the "hole" plate 1006 has a spatially-varying birefringence configured to transform the incident polarized light into the grating coupler polarization state, e.g., having the polarization state that maximizes the coupling efficiency of the grating coupler.

The fiber-to-PIC connector 1000 can combine two output optical signals from the photonic integrated circuit 210 into an output beam that is transmitted on an output fiber core. For example, the photonic integrated circuit 210 outputs two optical signals that are converted to light beams 1030 and 1032 through grating couplers 231*c* and 231*d*, respectively, in which the light beams 1030 and 1032 have the same polarization state. The light beam 1030 passes the third lens 542 and the second lens 541, then through a hole 1020 in the birefringent hole plate 1006. The light beam 1030 passes straight through the walk-off element 1004 without changing direction. The light beam 1032 passes the third lens 542 and the second lens 541, then through the birefringent material 1200 in the birefringent hole plate 1006, which rotates the polarization direction of the light beam 1032 by 90°. The light beam 1032 is displaced a distance by the walk-off element 1004 and is combined with the light beam 1030. The combined light beam passes the collimating lens 551 and is directed to an output fiber core 1034.

Figure 13A:
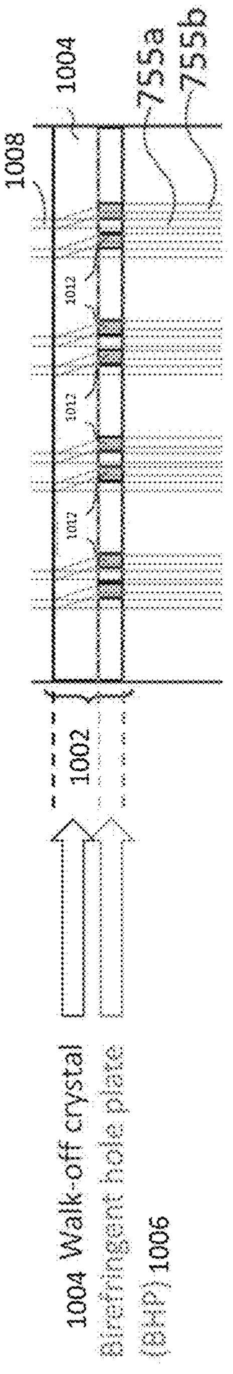
FIG. 13A is a side view of an example of a polarization-diversity assembly.
Figure 13D:
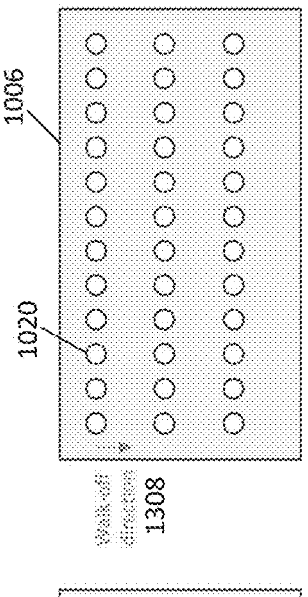
FIG. 13D is a top view of an example of an array of grating couplers.
Figure 13D:
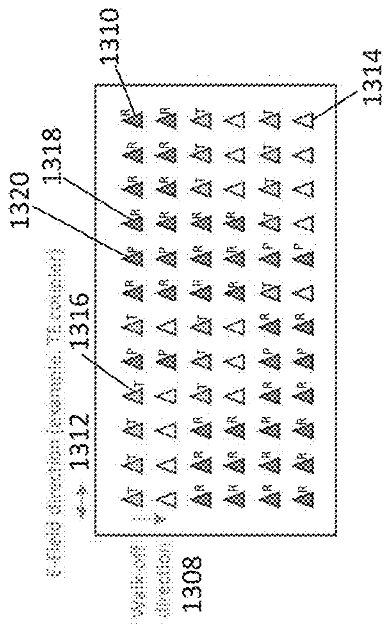
Figure 13C:
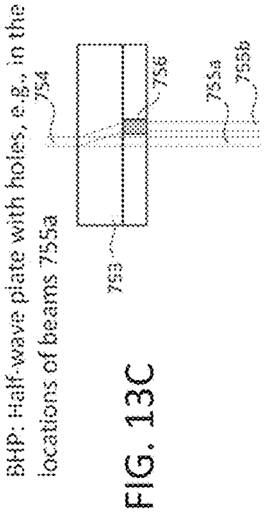
FIG. 13C is a top view of an example of a birefringent hole plate.
Figure 13B:
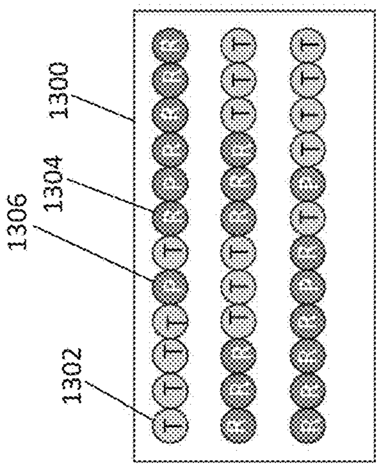
FIG. 13B is a diagram of an optical fiber connector.

FIGS. 13A to 13D are diagrams showing the relationships between an optical fiber connector, a birefringent hole plate, and grating couplers. FIG. 13A is a diagram of a fiber-to-PIC connector 1000, which is the same as that shown in FIG. 10A. FIG. 13B is a diagram of an optical fiber connector 1300 that includes transmitter fiber ports (e.g., 1302), receiver fiber ports (e.g., 1304), and optical power supply fiber ports (e.g., 1306). The circles indicate input fiber locations (e.g., 302). This example includes 3 rows of 12 fibers. For example, the rows can be spaced apart by 500 μm, and the fibers within a row can be spaced apart by 250 μm. In this example, the orange circles (e.g., 1302) represent the transmitter (TX) fiber ports, the brown circles (e.g., 1304) represent the receiver (RX) fiber ports, and the red circles (e.g., 1306) represent the optical power supply fiber ports. Additional information about optical fiber connectors is provided in U.S. provisional patent application 63/145,368, filed on Feb. 3, 2021, the entire contents of which are incorporated by reference.

FIG. 13C is a top view of an example of the birefringent hole plate 1006 having holes 1020. The holes 1020 are at the locations of the beams 755*a*. The walk-off direction is represented by an arrow 1308.

FIG. 13D is a top view of an example of an array of six rows of twelve grating couplers 1310 (231 in FIGS. 2, 5-7) mounted on top of the photonic integrated circuit. Each grating coupler 1310 is a TE coupler, in which the direction of the electric field is represented by an arrow 1312. The walk-off crystal 1004 splits each input beam into two beam components having orthogonal polarization states, and the birefringent hole plate 1006 rotates the polarization direction of one of the two beam components such that the two beam components have the same polarization state upon reaching the grating couplers 1310. Orange triangles (e.g., 1316) represent the grating couplers for the transmit (TX) signals that are output through the transmitter (TX) fiber ports 1302. If the transmit signal has a single polarization, only one grating coupler is needed for the corresponding transmitter (TX) fiber port 1302. Brown triangles (e.g., 1318) represent the grating couplers for the receive (RX) signals. Two grating couplers 1310 are needed for each corresponding receiver (RX) fiber port 1304 due to random polarization of the input signals. Red triangles (e.g., 1320) represent the grating couplers that correspond to the optical power supply fiber ports 1306. White triangles 1314 indicate that (i) grating couplers are not present at those locations, (ii) grating couplers are present at those locations but not coupled to receive or transmit optical signals, or (iii) grating couplers are connected to alignment waveguides to assist with alignment calibration.

FIGS. 14A to 18B illustrate examples of grating coupler orientations that can be used with the same fiber array show in FIG. 13B. In each of these examples, the grating couplers are of the same type, e.g., all TE grating couplers or all TM grating couplers, and the grating couplers are aligned in the same direction. FIGS. 14A to 18B show examples for TE grating couplers. The same principles can be applied to TM grating couplers with a properly adjusted birefringent hole plate.

Figure 15A:
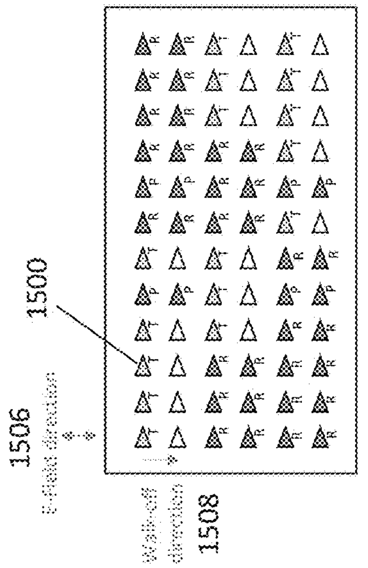
Figure 15B:
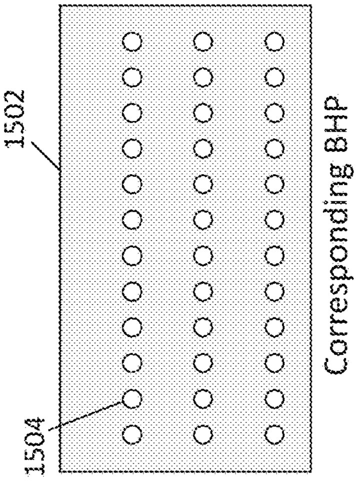
Figure 14A:
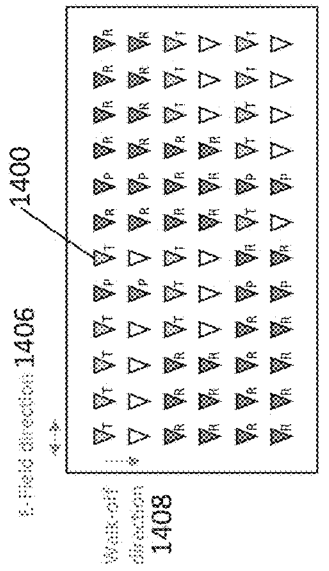
Figure 14B:
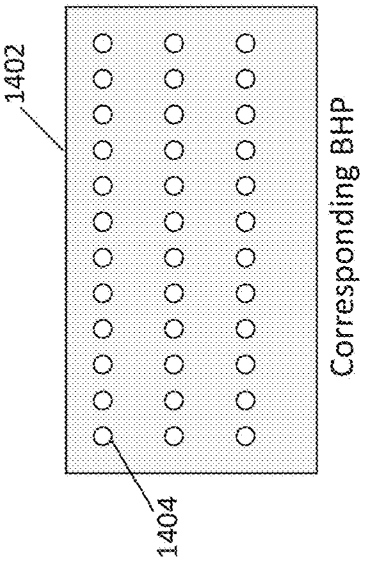

FIGS. 14A and 14B illustrate an example of an arrangement of grating couplers 1400 and a corresponding birefringent hole plate 1402 that includes holes 1404 at predefined locations. This example assumes that the walk-off element outputs optical beams with the electric field in a direction 1406. Each input optical beam is split by the walk-off element into a first beam component and a second beam component. The first beam component passes straight through the walk-off element, and the second beam component is displaced a distance from the first beam component along a walk-off direction 1408. The first beam component has electric field in the direction 1406, which is aligned with the grating coupler. The holes 1404 are positioned to allow the first beam components to pass through without affecting the polarization states. In this example, the grating couplers 1400 are oriented to maximize coupling of optical beams with the electric field in the direction 1406, FIGS. 15A and 15B illustrate an example of an arrangement of grating couplers 1500 and a corresponding birefringent hole plate 1502 that includes holes 1504 at predefined locations. This example assumes that the walk-off element outputs optical beams with the electric field perpendicular to a direction 1506. Each input optical beam is split by the walk-off element into a first beam component and a second beam component. The first beam component passes straight through the walk-off element, and the second beam component is displaced a distance from the first beam component along a walk-off direction 1508. The second beam component has electric field in the direction 1506, which is aligned with the grating coupler. The holes 1504 are positioned to allow the second beam components to pass through without affecting the polarization states. In this example, the grating couplers 1500 are oriented to maximize coupling of optical beams with the electric field in the direction 1506.

Figure 16A:
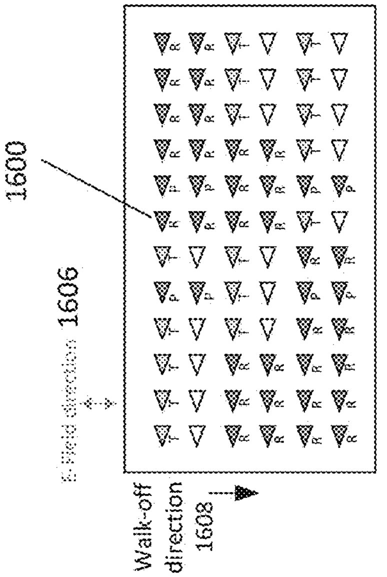
Figure 16B:
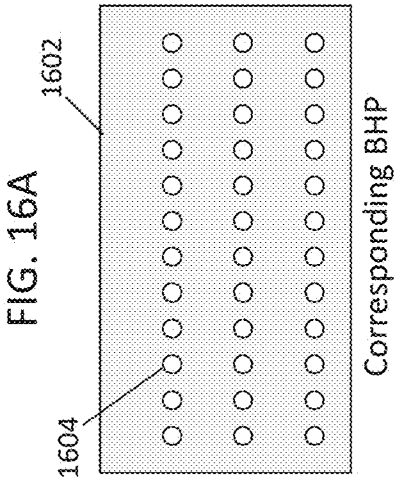

FIGS. 16A and 16B illustrate an example of an arrangement of grating couplers 1600 and a corresponding birefringent hole plate 1602 that includes holes 1604 at predefined locations. This example assumes that the walk-off element outputs optical beams with the electric field perpendicular to a direction 1606. Each input optical beam is split by the walk-off element into a first beam component and a second beam component. The first beam component passes straight through the walk-off element, and the second beam component is displaced a distance from the first beam component along a walk-off direction 1608. The second beam component has electric field in the direction 1606, which is aligned with the grating coupler. The holes 1604 are positioned to allow the second beam components to pass through without affecting the polarization states. In this example, the grating couplers 1600 are oriented to maximize coupling of optical beams with the electric field in the direction 1606.

FIGS. 17A and 17B illustrate an example of an arrangement of grating couplers 1700 and a corresponding birefringent hole plate 1702 that includes holes 1704 at predefined locations. This example assumes that the walk-off element outputs optical beams with the electric field parallel to a direction 1706. Each input optical beam is split by the walk-off element into a first beam component and a second beam component. The first beam component passes straight through the walk-off element, and the second beam component is displaced a distance from the first beam component along a walk-off direction 1708. The first beam component has electric field in the direction 1706, which is aligned with the grating coupler. The holes 1704 are positioned to allow the first beam components to pass through without affecting the polarization states. In this example, the grating couplers 1700 are oriented to maximize coupling of optical beams with the electric field in the direction 1706.

FIGS. 18A and 18B illustrate an example of an arrangement of grating couplers 1800 and a corresponding birefringent hole plate 1802 that includes holes 1804 at predefined locations. This example assumes that the walk-off element outputs optical beams with the electric field perpendicular to a direction 1806. Each input optical beam is split by the walk-off element into a first beam component and a second beam component. The first beam component passes straight through the walk-off element, and the second beam component is displaced a distance from the first beam component along a walk-off direction 1808. The second beam component has electric field in the direction 1806, which is aligned with the grating coupler. The holes 1804 are positioned to allow the second beam components to pass through without affecting the polarization states. In this example, the grating couplers 1800 are oriented to maximize coupling of optical beams with the electric field in the direction 1806.

FIGS. 13A to 13D, 14A, 14B, 15A, 15B, 16A, 16B, 17A, 17B, 18A, and 18B show examples of various orientations of grating couplers and corresponding birefringent hole plates. The orientation of the grating couplers can depend on, e.g., the optical waveguide routing layout. The grating couplers can have orientations different from the examples above. For example, it is possible to select the orientation of the grating couplers based on a desired optical waveguide layout, then orient the walk-off element so that the beam components output from the walk-off element are either parallel or orthogonal to the direction of electric field with maximum coupling efficiency by the grating coupler. The birefringent hole plate is designed such that the holes are positioned at locations where the beam components do not require rotation of the polarization direction to achieve maximum coupling efficiency of the grating coupler.

FIGS. 19A to 20C illustrate examples of grating coupler orientations that can be used with the same fiber array show in FIG. 13B. In these examples, some grating couplers are positioned at locations that are aligned in-between the fiber core locations to achieve a higher density. The grating couplers are of the same type, e.g., TE grating couplers or TM grating couplers, and the grating couplers are aligned in the same direction. FIGS. 19A to 20C show examples for TE grating couplers. The same principles can be applied to TM grating couplers with a properly adjusted birefringent hole plate.

Figure 19A:
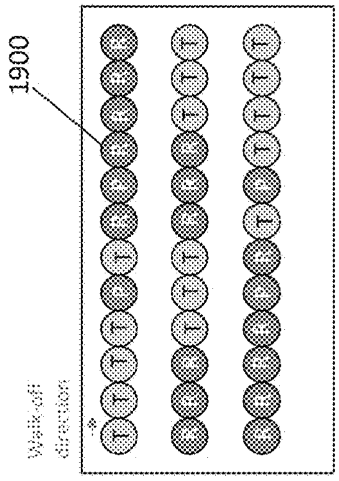
FIGS. 19A to 20C show diagrams of examples of arrangements of fiber ports, corresponding birefringent hole plates, and corresponding arrangements of grating couplers.
Figure 19B:
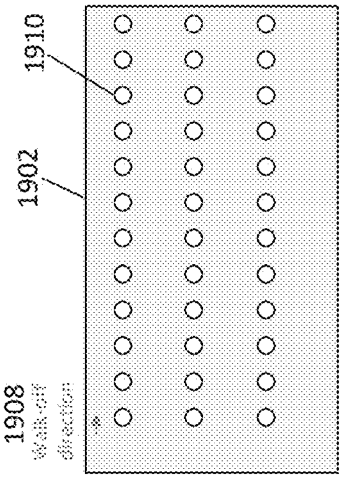
Figure 19C:
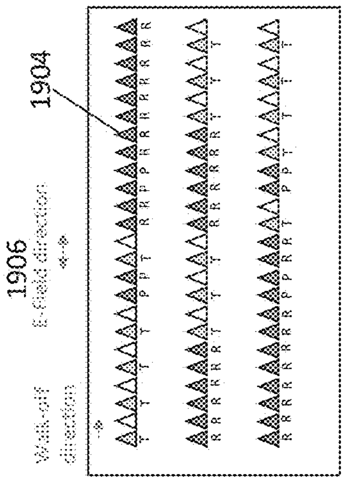

FIGS. 19A to 19C are diagrams of an example of an arrangement of fiber ports 1900, a birefringent hole plate 1902 having holes 1910 at predefined locations, and an arrangement of grating couplers 1904. This example assumes that the walk-off element outputs optical beams with the electric field perpendicular to a direction 1906. Each input optical beam is split by the walk-off element into a first beam component and a second beam component. The first beam component passes straight through the walk-off element, and the second beam component is displaced a distance from the first beam component along a walk-off direction 1908. The second beam component has an electric field in the direction 1906. In this example, the grating couplers 1904 are oriented to maximize coupling of optical beams with the electric field in the direction 1906, Because the polarization of the second beam component is already aligned with the grating coupler, the holes 1910 are positioned to allow the second beam components to pass through without changing the polarization state. FIG. 19A shows an arrangement of three rows of 12 fiber ports 1900. The walk-off direction 1908 is parallel to the row direction.

Some of the grating couplers are positioned at locations that are aligned in-between the locations of the fiber ports 1900 to achieve a higher density. For example, the distance between two adjacent grating couplers 1904 can be about half the distance between two adjacent fiber cores in a row.

Figure 20A:
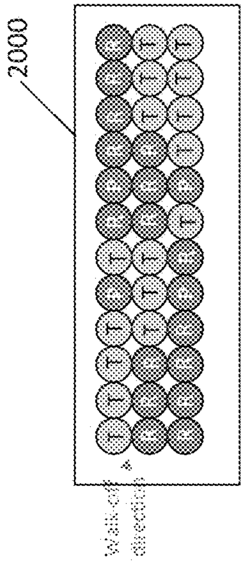
Figure 20B:
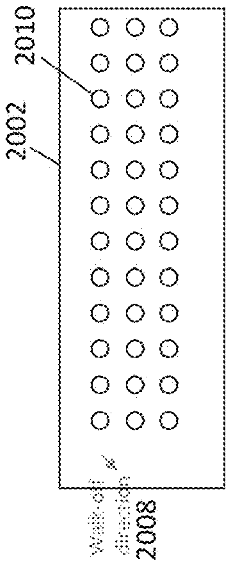
Figure 20C:
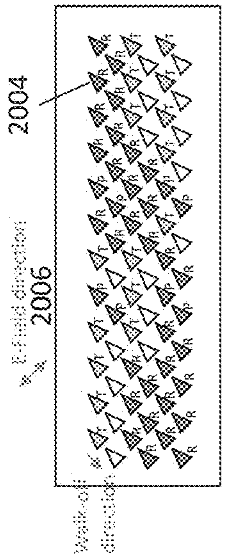

FIGS. 20A to 20C are diagrams of an example of an arrangement of fiber ports 2000, a birefringent hole plate 2002 having holes 2010 at predefined locations, and an arrangement of grating couplers 2004. This example assumes that the walk-off element outputs optical beams with the electric field parallel to a direction 2006. Each input optical beam is split by the walk-off element into a first beam component and a second beam component. The first beam component passes straight through the walk-off element, and the second beam component is displaced a distance from the first beam component along a walk-off direction 2008. The first beam component has electric field in the direction 2006. In this example, the grating couplers 2004 are oriented to maximize coupling of optical beams with the electric field in the direction 2006, Because the polarization of the first beam component is already aligned with the grating coupler, the holes 2010 are positioned to allow the first beam components to pass through without changing the polarization state. FIG. 20A shows an arrangement of three rows of 12 fiber ports. The walk-off direction 2008 is at an angle (e.g., 45°) relative to the row direction. Some of the grating couplers are positioned at locations that are aligned in-between the locations of the fiber ports 2000 to achieve a higher density. In the example of FIG. 20A, the distance between adjacent fiber cores in a row is the same as the distance between adjacent fiber cores in a column. For example, the distance between two adjacent grating couplers 2004 can be about 70% of the distance between two adjacent fiber cores in a row.

Figure 21A:
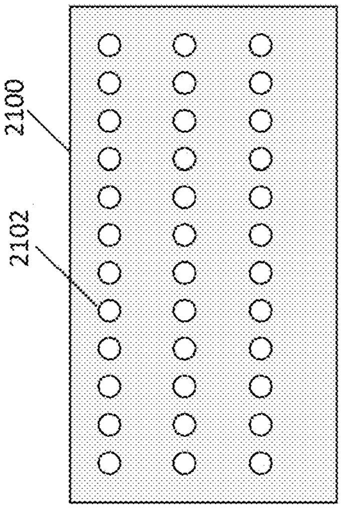
FIGS. 21A to 21D are diagrams of examples of birefringent hole plates.
Figure 21B:
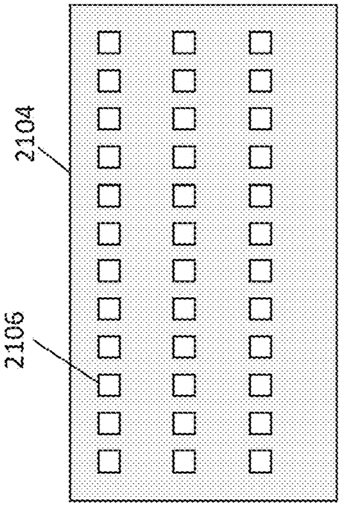
Figure 21C:
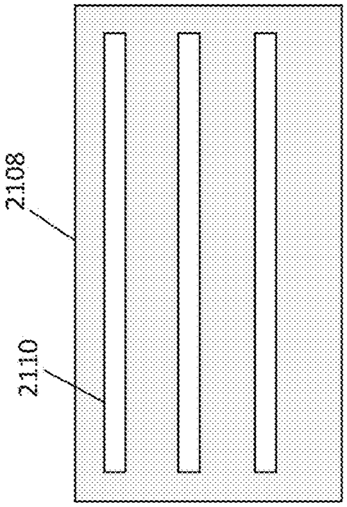
Figure 21D:
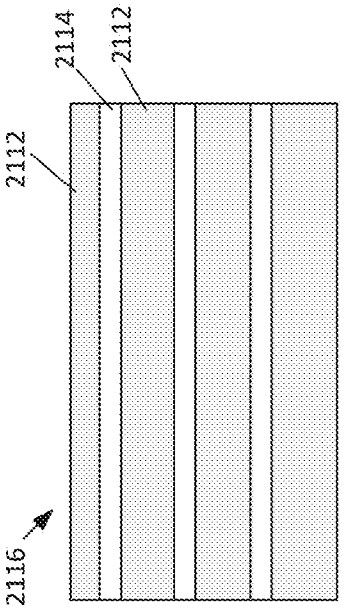

Referring to FIGS. 21A to 21D, a birefringent hole plate can have holes having one or more of various shapes. FIG. 21A is a diagram of an example of a birefringent hole plate 2100 that has holes 2102 with a circular shape. FIG. 21B is a diagram of an example of a birefringent hole plate 2104 that has holes 2106 with a square shape. FIG. 21C is a diagram of an example of a birefringent hole plate 2108 that has strip holes 2110. In some examples, the holes can have a rectangular shape. FIG. 21D is a diagram of an example of a birefringent hole plate 2116 that includes multiple individual strip platelets 2112 that are spaced apart, in which the space 2114 between the strip platelets 2112 form the "holes" of the birefringent hole plate 2116. In some implementations, the holes of the birefringent hole plate can have a combination of different shapes, and the shapes can have arbitrary geometries.

In general, micro-optic systems can include multiple optical elements, including optically birefringent elements that are employed to modify the polarization of light. In some applications, a patterned birefringent element can have non-uniform birefringence across an area to vary the polarization modification induced by the element. An example is a half-wave plate (HWP) in which an array of vias is drilled through the element so the polarization of light passing through the vias is unchanged while light passing through the half-wave plate material may experience a change in polarization.

In some implementations, a patterned birefringent plate can be generated by bonding birefringent elements to a second element in the micro-optic system in which a pattern is generated in the birefringent elements after bonding through processes such as etching, mechanical removal, laser cutting, laser ablation, etc. The patterned birefringent plate has non-uniform birefringence across a plane in which light passes through so that different portions of light pass through different portions of the patterned birefringent plate having difference birefringence. The patterned birefringent plate can affect an optical property of different portions of the light differently. So example, the patterned birefringent plate can rotate the polarization of a first portion of light by a first amount and rotate the polarization of a second portion of light by a second amount.

Another approach to generating a patterned birefringent plate having patterns in the birefringent material is to modify the birefringence of the birefringent element with no or minimal removal of material. An example is using local laser heating to generate patterns of modified birefringence in a material such as crystalline quartz. Heating of crystalline quartz to near its melting point can disrupt the crystalline structure, producing fused silica which has an amorphous structure with no birefringence. Patterned localized heating to generate regions of fused silica within the crystalline quartz can have an effect similar to forming holes or strips in the birefringent hole plates shown in FIGS. 21A to 21D. In some examples, one or more particle beams, such as electron beams, can energize the crystalline quartz to modify its birefringence.

Figure 50:
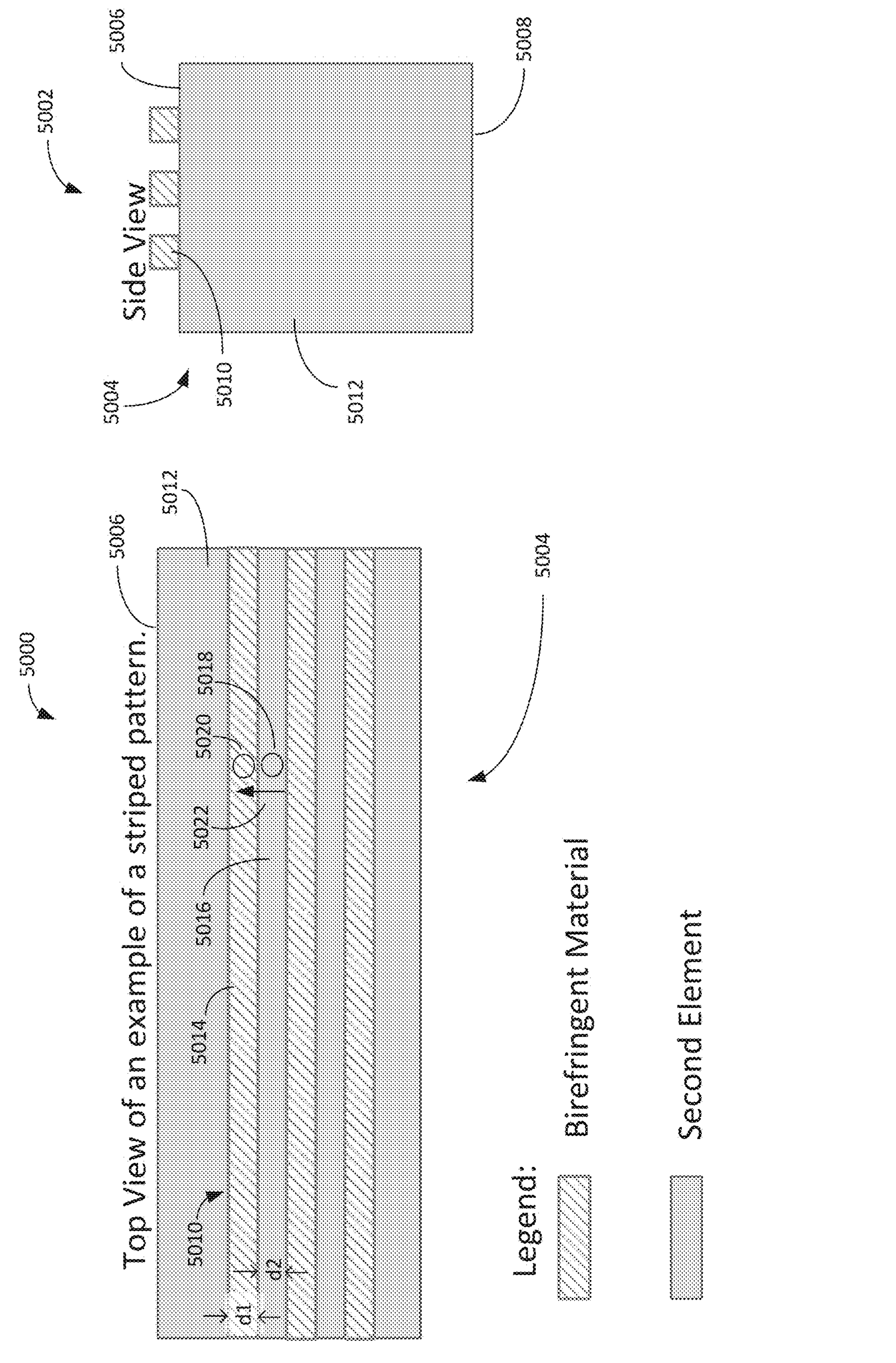
FIG. 50 shows a top view and a side view of an example of a patterned birefringent plate.

FIG. 50 shows a top view 5000 and a side view 5002 of an example of a patterned birefringent plate 5004 in which a patterned birefringent element is attached to a second element. The patterned birefringent plate 5004 has non-uniform birefringence across a plane parallel to the top surface of the patterned birefringent plate 5004, and exhibits non-uniform birefringence properties with respect to light that passes through the patterned birefringent plate 5004 by entering the top side 5006 (or the bottom side 5008) and exiting the bottom side 5008 (or the top side 5006) of the patterned birefringent plate 5004.

In some implementations, an optically birefringent element 5010 is bonded to a second optical element 5012, and a pattern is formed in the optically birefringent element 5010. In some implementations, a pattern is formed in the optically birefringent element 5010 first, then the patterned optically birefringent element 5010 is bonded to the second optical element 5012. In the example shown in FIG. 50, the patterned birefringent element 5010 can be generated by the removal of birefringent material. This removal can be achieved by a variety of methods including, e.g., mechanical removal, laser ablation, and etching. The etching can be, e.g., liquid-phase etching (also referred to as wet chemical etching) or plasma-phase etching (also referred to as dry etching). The removal process can be controlled to prevent removal of material from the second optical element 5012, for example, by using an etch stop layer at the interface between the birefringent material 5010 and the second element 5012. For example, the etch stop layer can be an anti-reflective coating that enhances the transmission of light between the birefringent material 5010 and the second optical element 5012, in which the anti-reflective coating is also resistant to the etching.

In some implementations, the use of a chemical etching process to remove the birefringent material instead of using mechanical drilling to generate openings in the birefringent material has the advantage that the patterned birefringent element 5010 thus produced is relatively clean without significant debris that may occur when mechanical drilling is used to generate the openings. This beneficial feature is significant when the patterns in the birefringent element 5010 has small dimensions. In the example shown in FIG. 50, the patterned optically birefringent element 5010 includes a plurality of strips of birefringent material 5014 extending parallel to one another. In the regions between the strips of birefringent material 5014, the birefringent material has been etched away.

In some implementations, the width d1 of each strip of birefringent material 5014 is substantially equal to the width d2 of the etched region 5016 between the strips of birefringent material 5014. The widths d1 and d2 are selected to be slightly larger than the diameter of the light beams that pass through the strip of birefringent material 5014 and the etched region 5016. In some examples, the width d1 can also be different from the width d2.

For example, a light beam from an optical fiber core can be split by a birefringent beam displacement element, walk-off element, polarization-sensitive grating (e.g., 753 of FIGS. 7 and 8A, 853 of FIG. 8B, 832 of FIGS. 8C to 8E, 904 of FIG. 9, 1004 of FIGS. 10A to 10C, 12, and 13A, 2306 of FIG. 23, 2408 of FIG. 24A, 2906 of FIG. 29, 3008 of FIG. 30, 3400 of FIGS. 34A and 34B, 3512 of FIG. 35, 3908 of FIG. 39, 4002 of FIG. 40) into a first beam component 5018 (e.g., similar to 834 or 2308) and a second beam component 5020 (e.g., similar to 836 or 2310), in which the first and second beam components 5018, 5020 are separated in the walk-off direction 5022. The walk-off element can be designed such that after exiting the walk-off element, the first beam component 5018 has a polarization that is orthogonal to the polarization of the second beam component 5020. The walk-off element directs the first beam component 5018 towards the etched region 5016, and directs the second beam component 5020 towards the strip of birefringent material 5014. The strip of birefringent material 5014 changes the polarization of the second beam component 5020, while the first beam component 5018 passes through the etched region 5016 without any change in polarization. The thickness of the patterned optically birefringent element 5010 can be selected such that the patterned optically birefringent element 5010 is functionally equivalent to a half-wave plate having openings at the etched regions 5016. In this example, the polarization of the second beam component 5020 is rotated 90°+n×180°, 0≤n, n being an integer. After passing the patterned optically birefringent element 5010, the polarization of the first beam component 5018 becomes parallel to the polarization of the second beam component 5020.

The birefringent beam displacement element, walk-off element, or polarization-sensitive grating can also be used as a beam combiner to combine the beam components emitted from the vertical coupling elements and passed through the patterned optically birefringent element 5010 into one light beam that is transmitted to a corresponding optical fiber core.

In the example of FIG. 50, the birefringent material is completely etched away in the etched region 5016. In some implementations, the birefringent material is partially etched, such that the polarization of the first beam component 5018 is also rotated by the remaining birefringent material in the etched region 5016. The un-etched strip of birefringent material 5014 has a greater thickness and the polarization of the second beam component 5020 is rotated by a greater amount. The depth of the etching can be selected such that the polarization of the second beam component 5020 is rotated 90°+n×180°, 0≤n, n being an integer, relative to the polarization of the first beam component 5018.

In some implementations, the light beams from the optical fiber cores upon reaching the patterned optically birefringent element 5010 can have a diameter in a range from 49 μm to 999 μm, and the width d1 of each strip of birefringent material 5014 and the width d2 of the etched region 5016 can be in a range from 50 μm to 1000 μm. In some examples, the light beams from the optical fiber cores upon reaching the patterned optically birefringent element 5010 can have a diameter in a range from 99 μm to 599 μm, and the width d1 of each strip of birefringent material 5014 and the width d2 of the etched region 5016 can be in a range from 100 μm to 600 μm. In some examples, the light beams from the optical fiber cores upon reaching the patterned optically birefringent element 5010 can have a diameter in a range from 199 μm to 399 μm, and the width d1 of each strip of birefringent material 5014 and the width d2 of the etched region 5016 can be in a range from 200 μm to 400 μm.

The arrangement of the parallel strips of birefringent material 5014 and the etched regions 5016 correspond to the arrangement of the optical fibers that are coupled to the fiber-optic connector. For example, the optical fibers can be arranged in a two-dimensional array having at least 2 rows and at least 8 columns. The etched regions can include at least 2 parallel strips of etched regions. The patterned optically birefringent element 5010 shown in FIG. 50 includes 3 parallel strips of birefringent material 5014 and can be used in a fiber-optic connector for coupling an array of 3 rows of optical fibers to a corresponding array of vertical coupling elements on the photonic integrated circuit.

In some implementations, the etched regions can have a shape substantially resembling a circle, an oval, a triangle, a square, a rectangle, or a polygon having n sides, n being an integer greater than 4, and the shape is measured along a plane parallel to the top surface of the second optical element 5012. In this example, the size of the etched regions are selected to be slightly larger than the size of the light beams. For example, each of the etched region can have a dimension measured along a direction parallel to the walk-off direction in a range from 50 μm to 1000 μm. For example, each of the etched region can have a dimension measured along a direction parallel to the walk-off direction in a range from 100 μm to 600 μm. For example, each of the etched region can have a dimension measured along a direction parallel to the walk-off direction in a range from 20 μm to 400 μm.

The arrangement of the etched regions correspond to the arrangement of the optical fibers that is coupled to the fiber-optic connector. For example, the optical fibers can be arranged in a two-dimensional array having at least 2 rows and at least 8 columns. In this example, the etched regions can also be arranged in a two-dimensional array having at least 2 rows and at least 8 columns.

The dimensions for the etched regions or strips of birefringent material are provided as examples only. It is understood that the etch regions and the strips of birefringent material can have larger dimensions, e.g., when larger optical fiber cores are used, when the optical fiber cores are spaced farther apart from one another, and/or when the vertical coupling elements are spaced farther apart from one another.

The half-wave plate or birefringent hole plate of FIGS. 7, 9, 10A, 11A, 11B, 11C, 12, 13A, 13C, 14B, 15B, 16B, 17*b*, 18B, 19B, 20B, 21A-21D, 23, 28, 29. 30, 35, 36, 38-40, and 49 can be replaced by a patterned birefringent plate in which some of the birefringent material is removed by etching, similar to the patterned birefringent plate 5004 of FIG. 50. For example, fabricating the fiber-to-PIC connector 700 includes fabricating the connector element 250. Fabricating the connector element 250 includes fabricating a patterned birefringent plate, and attaching the birefringent plate to another optical element, e.g., an optical element that includes the array of collimating lenses 551. Fabricating the fiber-to-PIC connector 900 includes fabricating the connector element 240. Fabricating the connector element 240 includes fabricating a patterned birefringent plate, and attaching the birefringent plate to another optical element, e.g., an optical element that includes the array of second lenses 541 and the array of third lenses 542.

The fiber-to-PIC connector (e.g., 700, 900) will also be referred to as a fiber-optic connector, and the connector element (e.g., 240, 250) will also be referred to as a fiber-optic connector part. Thus, in some implementations, fabricating a fiber-optic connector includes generating a patterned birefringent plate by attaching a birefringent element to a second optical element, and applying a removal process (e.g., etching process) to remove portions of the optically birefringent material at a plurality of first regions such that after the removal process the plurality of first regions have no optically birefringent material or have optically birefringent material with reduced thickness. Fabricating the fiber-optic connector further includes attaching the patterned birefringent plate to another connector part (e.g., a connector part that includes the array of collimating lenses 551 or the array of second lenses 541 and the array of third lenses 542).

Figure 51:
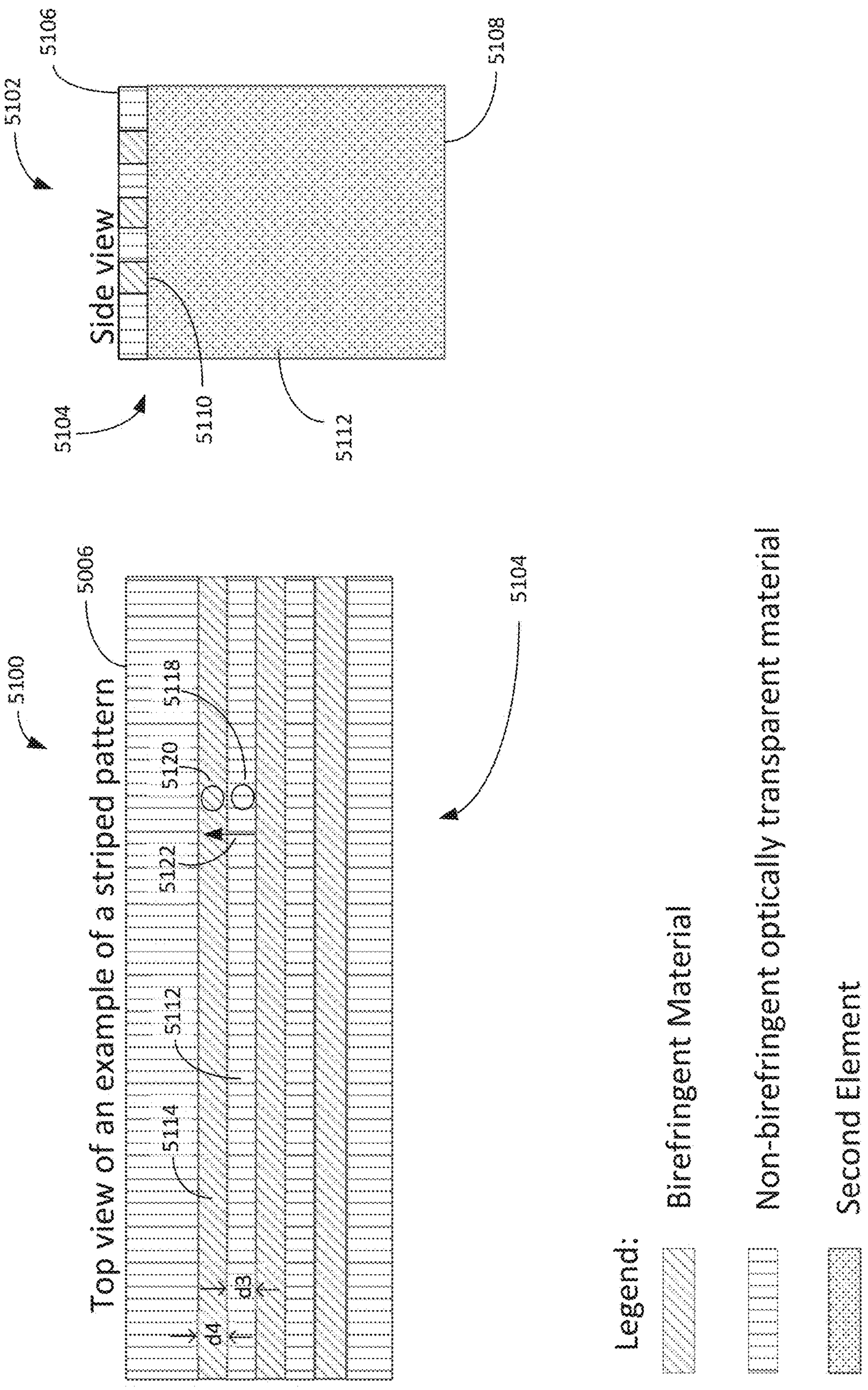
FIG. 51 shows a top view and a side view of another example of a patterned birefringent plate.

FIG. 51 shows a top view 5100 and a side view 5102 of an example of a patterned birefringent plate 5104 in which a patterned optically birefringent element 5110 is attached to a second optical element 5112. The birefringent plate 5104 has non-uniform birefringence across a plane parallel to the top surface of the birefringent plate 5104, and exhibits non-uniform birefringence properties with respect to light that passes through the birefringent plate 5104 by entering the top side 5106 (or the bottom side 5108) and exiting the bottom side 5108 (or the top side 5106) of the birefringent plate 5104.

In some implementations, an optically birefringent element 5110 without pattern is bonded to the second optical element 5112, and the pattern is generated in the optically birefringent element 5110 after bonding to the second optical element 5112. In some implementations, a pattern is formed in the optically birefringent element 5110 to produce a patterned optically birefringent element 5110, and the patterned optically birefringent element 5110 is bonded to the second optical element 5112. The patterns are selected for specific applications, in which the patterns can include the degree and orientation of the optical birefringence varying across the patterned optically birefringent element 5110.

In some implementations, a birefringent pattern can be generated by localized heating of a birefringent material to modify the material properties, resulting in altered, reduced or substantially no birefringence. Either no material is removed in the localized heating process, or only a small amount of material is removed in the localized heating process. For example, localized laser heating can be applied to crystalline quartz (which has a birefringence property) to produce areas of amorphous fused silica having modified, low, or substantially no birefringence. In some examples, the laser is sequentially applied to the various regions one after another to sequentially produce the areas having lower birefringence. In some examples, multiple laser beams (e.g., by using multiple laser sources or splitting each of one or more laser beams into multiple beams) are applied to the various regions in parallel to produce the areas having lower birefringence in parallel.

Here, a material is considered to have substantially no birefringence if it rotates the polarization of light by, e.g., less than 5°, or in some examples less than 1°. For example, the inverse process can also be used in which localized heating of a non-birefringent material can generate regions of birefringence.

In the example of FIG. 51, the localized heating is applied to first regions 5112 (in the shape of parallel strips) of the optically birefringent element 5110 to cause the first regions 5112 to have reduced or substantially no birefringence. After the localized heating, the optically birefringent element 5110 has a striped pattern that includes first regions 5112 alternating with second regions 5114, in which the first regions 5112 include parallel strips of material having low or no birefringence, and the second regions 5114 include parallel strips of the birefringent material that maintains its birefringence.

In some implementations, the use of localized heating to reduce the birefringence of the material instead of using mechanical drilling to generate openings in the birefringent material has the advantage that the patterned birefringent element thus produced is relatively clean without significant debris that may occur when mechanical drilling is used to generate the openings. This beneficial feature is significant when the patterns in the birefringent element 5110 has small dimensions. In the example shown in FIG. 51, the patterned optically birefringent element 5110 includes a plurality of strips of birefringent material 5114 extending parallel to one another. In the regions 5112 between the strips of birefringent material 5114, localized heating has been applied to reduce the birefringence, e.g., to substantially no birefringence.

In some implementations, the width d3 of each strip of material having reduced or no birefringence in the first regions 5112 is substantially equal to the width d4 of the strip of birefringent material in the second regions 5114. The widths d3 and d4 are selected to be slightly larger than the diameter of the light beams that pass through the strip in the first region 5112 and the strip in the second region 5114. In some examples, the width d3 is different from the width d4.

For example, a light beam from an optical fiber core can be split by a birefringent beam displacement element, walk-off element, or polarization-sensitive grating (e.g., 753 of FIGS. 7 and 8A, 853 of FIG. 8B, 832 of FIGS. 8C to 8E, 904 of FIG. 9, 1004 of FIGS. 10A to 10C, 12, and 13A, 2306 of FIG. 23, 2408 of FIG. 24A, 2906 of FIG. 29, 3008 of FIG. 30, 3400 of FIGS. 34A and 34B, 3512 of FIG. 35, 3908 of FIG. 39, 4002 of FIG. 40) into a first beam component 5118 (e.g., similar to 834 or 2308) and a second beam component 5120 (e.g., similar to 836 or 2310), in which the first and second beam components 5118, 5120 are separated in the walk-off direction 5122. The walk-off element can be designed such that after exiting the walk-off element, the first beam component 5118 has a polarization that is orthogonal to the polarization of the second beam component 5120. The walk-off element directs the first beam component 5118 towards the first region 5112 having reduced or substantially no birefringence, and directs the second beam component 5120 towards the second region 5114 that maintains its birefringent property. The birefringent material in the second region 5114 changes the polarization of the second beam component 5120 by a first amount, while the first beam component 5018 passes through the first region 5112 without any change in polarization (if the first region 5112 has substantially no birefringence) or with a smaller amount of change in polarization (if the first region 5112 has reduced birefringence). The thickness of the patterned optically birefringent element 5110 and the thickness of the first region 5112 that is subject to localized heating can be selected such that the patterned optically birefringent element 5110 is functionally equivalent to a half-wave plate having openings at the first regions 5110. In this example, the polarization of the second beam component 5120 is rotated 90°+n×180°, 0≤n, n being an integer relative to the polarization of the first beam component 5118. After passing the patterned optically birefringent element 5110, the polarization of the first beam component 5118 becomes parallel to the polarization of the second beam component 5120.

The birefringent beam displacement element, walk-off element, or polarization-sensitive grating can also be used as a beam combiner to combine the beam components emitted from the vertical coupling elements and passed through the patterned optically birefringent element 5110 into one light beam that is transmitted to a corresponding optical fiber core.

In some implementations, the light beams from the optical fiber cores upon reaching the patterned optically birefringent element 5110 can be in a range from 49 μm to 999 μm, and the width d4 of each strip of birefringent material in the second region 5114 and the width d3 of the strip of material having reduced or substantially no birefringence in the first region 5112 can be in a range from 50 μm to 1000 μm. In some examples, the light beams from the optical fiber cores upon reaching the patterned optically birefringent element 5110 can be in a range from 99 μm to 599 μm, and the width d4 of each strip of birefringent material in the second region 5114 and the width d3 of the strip of material having reduced or substantially no birefringence in the first region 5112 can be in a range from 100 μm to 600 μm. In some examples, the light beams from the optical fiber cores upon reaching the patterned optically birefringent element 5010 can be in a range from 199 μm to 399 μm, and the width d4 of each strip of birefringent material in the second region 5114 and the width d3 of the strip of material having reduced or substantially no birefringence in the first region 5112 can be in a range from 200 μm to 400 μm.

The arrangement of the parallel strips of birefringent material in the second regions 5114 and the parallel strips of material having reduced or substantially no birefringence in the first regions 5112 correspond to the arrangement of the optical fibers that are coupled to the fiber-optic connector. For example, the optical fibers can be arranged in a two-dimensional array having at least 2 rows and at least 8 columns. In this example, the locally heated regions, i.e., the first regions 5112, can include at least 2 parallel strips of material having reduced or substantially no birefringence. The patterned optically birefringent element 5110 shown in FIG. 51 includes 3 parallel strips of material having reduced or substantially no birefringence and can be used in a fiber-optic connector for coupling an array of 3 rows of optical fibers to a corresponding array of vertical coupling elements on the photonic integrated circuit.

In some implementations, each of the locally heated regions can have a shape substantially resembling a circle, an oval, a triangle, a square, a rectangle, or a polygon having n sides, n being an integer greater than 4, and the shape is measured along a plane parallel to the top surface of the second optical element 5112. In this example, the size of the locally heated regions are selected to be slightly larger than the size of the light beams. For example, each of the locally heated region can have a dimension measured along a direction parallel to the walk-off direction in a range from 50 μm to 1000 μm. For example, each of the locally heated region can have a dimension measured along a direction parallel to the walk-off direction in a range from 100 μm to 600 μm. For example, each of the locally heated region can have a dimension measured along a direction parallel to the walk-off direction in a range from 200 μm to 400 μm.

The arrangement of the locally heated regions correspond to the arrangement of the optical fibers that is coupled to the fiber-optic connector. For example, the optical fibers can be arranged in a two-dimensional array having at least 2 rows and at least 8 columns. In this example, the locally heated regions can also be arranged in a two-dimensional array having at least 2 rows and at least 8 columns.

The dimensions for the locally heated regions or strips resulting in reduced or substantially no birefringence are provided as examples only. It is understood that the etch regions and the strips of birefringent material can have larger dimensions, e.g., when larger optical fiber cores are used, when the optical fiber cores are spaced farther apart from one another, and/or when the vertical coupling elements are spaced farther apart from one another.

The half-wave plate or birefringent hole plate of FIGS. 7, 9, 10A, 11A, 11B, 11C, 12, 13A, 13C, 14B, 15B, 16B, 17*b*, 18B, 19B, 20B, 21A-21D, 23, 28, 29. 30, 35, 36, 38-40, and 49 can be replaced by a patterned birefringent plate in which localized heating is applied to some regions of the birefringent material to reduce the birefringence, similar to the patterned birefringent plate 5104 of FIG. 51. For example, fabricating the fiber-to-PIC connector 700 includes fabricating the connector element 250. Fabricating the connector element 250 includes fabricating a patterned birefringent plate, and attaching the birefringent plate to another optical element, e.g., an optical element that includes the array of collimating lenses 551. For example, fabricating the fiber-to-PIC connector 900 includes fabricating the connector element 240. Fabricating the connector element 240 includes fabricating a patterned birefringent plate, and attaching the birefringent plate to another optical element, e.g., an optical element that includes the array of second lenses 541 and the array of third lenses 542.

Thus, in some implementations, fabricating a fiber-optic connector includes applying localized heating to a birefringent plate to produce a patterned birefringent plate, in which the localized heating modifies birefringence of a plurality of first regions in the birefringent plate to cause the first regions to have birefringence that is different from the birefringence of second regions that do not receive the localized heating. Fabricating the fiber-optic connector further includes attaching the patterned birefringent plate to another connector part (e.g., a connector part that includes the array of collimating lenses 551 or the array of second lenses 541 and the array of third lenses 542).

Referring to FIGS. 52A to 52D, in some implementations, a pattern of modified, reduced, or substantially zero birefringence can be generated within the volume of a birefringent element. The inverse is possible in which a birefringent pattern is generated within the volume of a non-birefringent element.

Figures 52A, 52B, 52C, 52D:
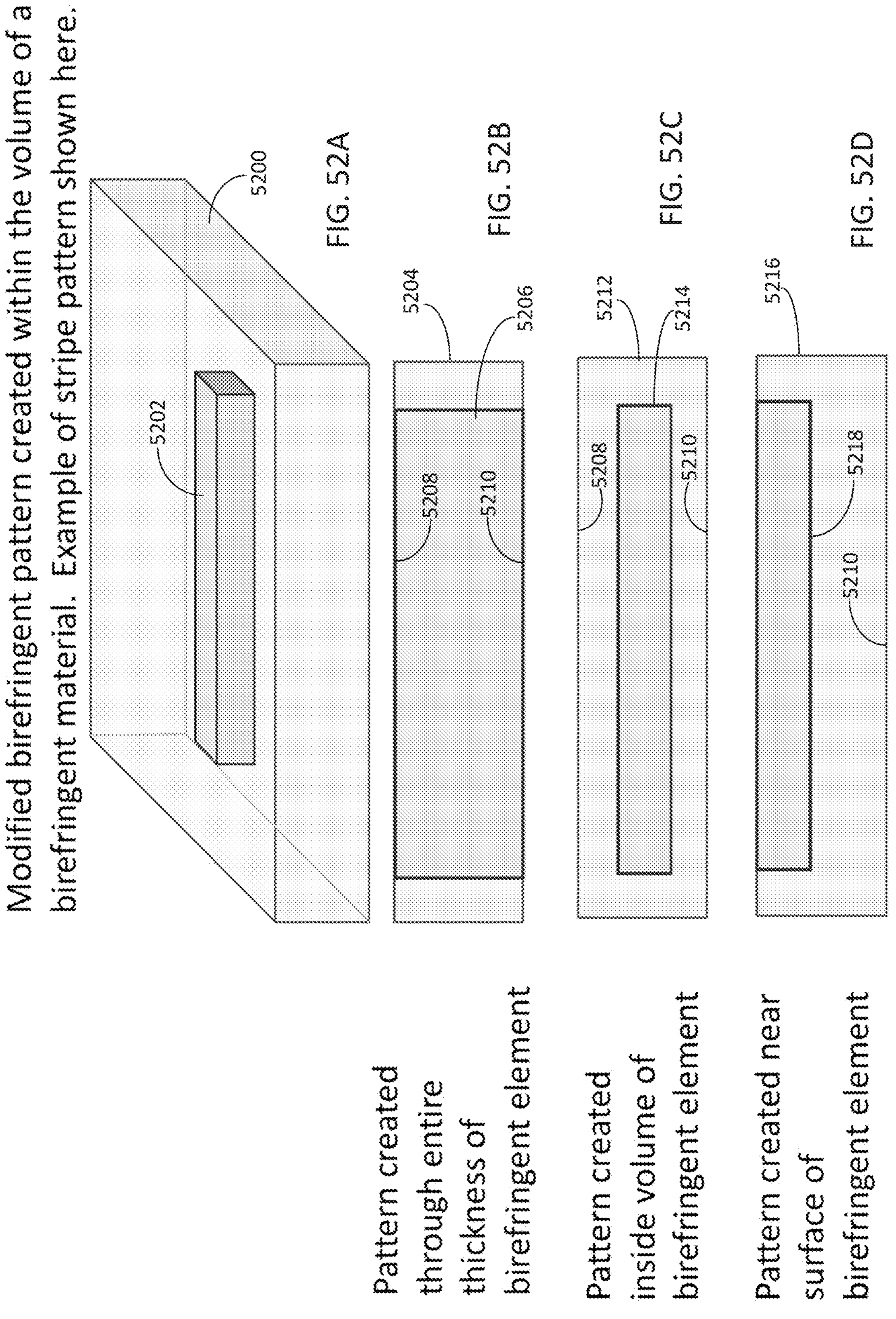
FIG. 52A is a perspective view of an example of a patterned birefringent plate.
FIGS. 52B to 52D are side views of examples of patterned birefringent plates.

FIG. 52A is a perspective view of an example of a patterned birefringent plate 5200 that includes a stripe pattern of modified birefringence. A strip of material 5202 having reduced or no birefringence is generated within the volume of the patterned birefringent plate 5200.

In some implementations, the modified birefringence pattern can be generated through the entire thickness of the birefringent element. FIG. 52B is a side view of an example of a patterned birefringent plate 5204 in which a strip of material 5206 having reduced or no birefringence extends from a top surface 5208 to a bottom surface 5210 of the patterned birefringent plate 5204.

In some implementations, the modified birefringence pattern can be generated inside the volume of the birefringent element. FIG. 52C is a side view of an example of a patterned birefringent plate 5212 in which a strip of material 5214 having reduced or no birefringence is positioned within the volume of the patterned birefringent plate 5212 at a first distance from the top surface 5208 and a second distance from the bottom surface 5210 of the patterned birefringent plate 5212.

In some implementations, the modified birefringence pattern can be generated near the surface of the birefringent element. FIG. 52D is a side view of an example of a patterned birefringent plate 5216 in which a strip of material 5218 having reduced or no birefringence extends from a top surface 5208 to a location at a distance from the bottom surface 5210 of the patterned birefringent plate 5216.

The different types of patterns shown in FIGS. 52B to 52D can be generated by focusing a laser beam at different depths in the volume of the birefringent plate to locally heat the birefringent material at different depths. In these examples, the locally heated region (e.g., 5206, 5214, 5218) is an integral portion of the patterned birefringent plate, and no glue or adhesive is used to bond the locally heated region to other portions of the patterned birefringent plate.

Figures 53A, 53B, 53C:
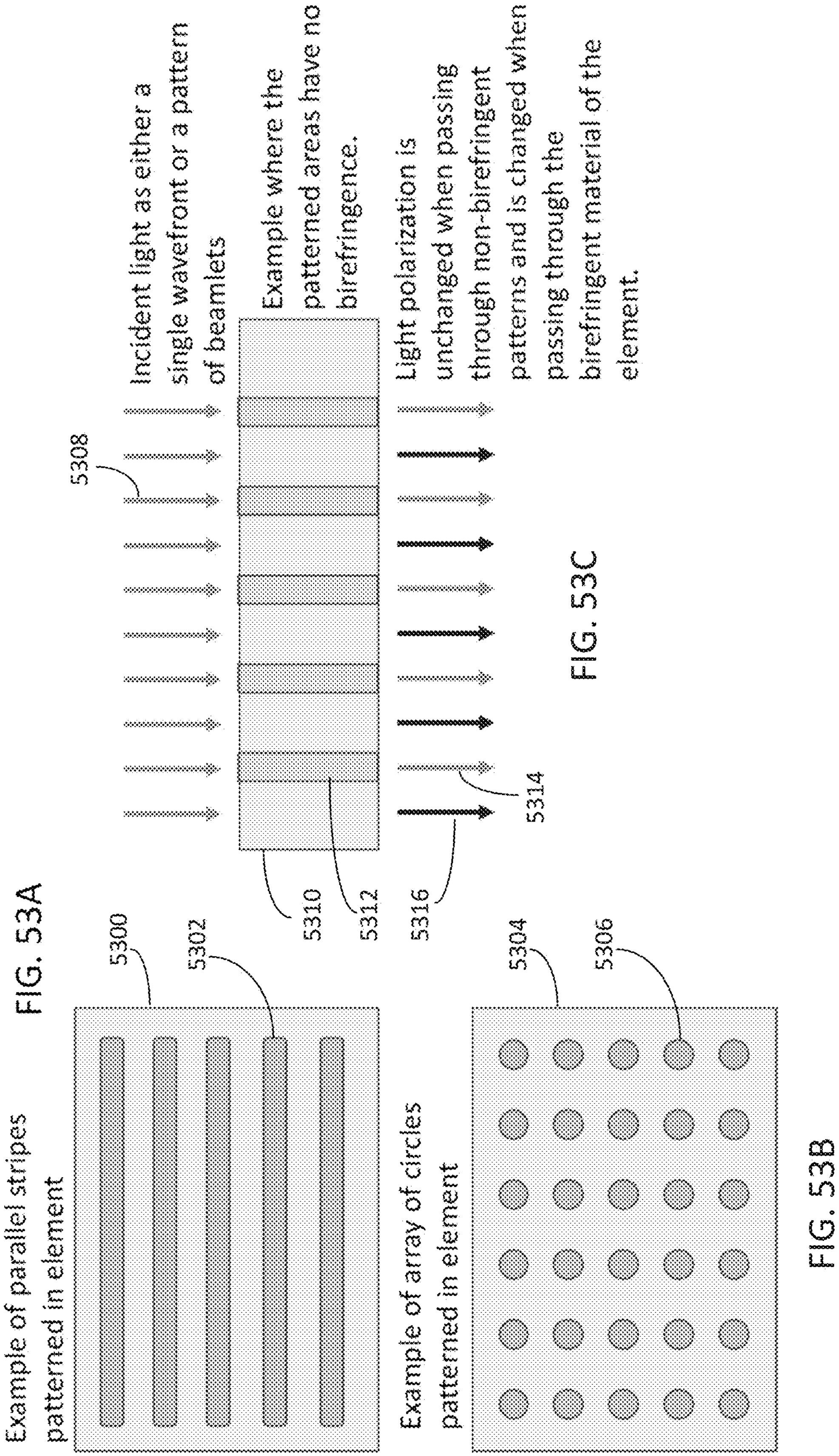
FIGS. 53A and 53B are diagrams showing examples of birefringent plates that have patterns generated in the birefringent element.
FIG. 53C is a diagram showing incident light passing through a patterned birefringent plate.

FIGS. 53A and 53B are diagrams showing examples of birefringent plates that have patterns generated in the birefringent element. FIG. 53A shows an example of a birefringent plate 5300 having parallel stripes 5302 patterned in the birefringent element. FIG. 53B shows an example of a birefringent plate 5304 having an array of circles 5306 patterned in the birefringent element.

FIG. 53C is a diagram showing incident light 5308 passing through a patterned birefringent plate 5310 that includes first regions 5312 having a pattern of material with zero birefringence. For example, the incident light 5308 can be either a single wavefront or a pattern of beamlets. The polarization of light 5314 is unchanged when passing through non-birefringent patterns 5312. The polarization of light 5316 is changed when passing through the birefringent material of the birefringent plate 5310.

In some implementations, a process of fabricating a fiber-optic connector part (e.g., connector element 250 of FIG. 7 or connector element 240 of FIG. 9) includes applying localized heating or localized energizing to a birefringent plate (e.g., 5104) to modify birefringence of a two-dimensional pattern of first regions (e.g., 5112) in the birefringent plate to cause the first regions to have birefringence that is different from the birefringence of second regions (e.g., 5114) that do not receive the localized heating or localized energizing. The process includes coupling the birefringent plate to a second optical component (e.g., 5112) to form a fiber-optic connector part that is configured to be coupled to at least one of a plurality of optical fibers or a plurality of vertical coupling elements on a photonic integrated circuit, and the birefringent plate comprises non-uniform birefringence properties with respect to light that passes through the birefringent plate.

For example, the birefringent plate can be configured to modify a polarization state of a first set of light beams (e.g., 5118) that pass through the first regions of the birefringent plate relative to a polarization state of a second set of light beams (e.g., 5120) that pass through the second regions of the birefringent plate.

For example, the localized heating or localized energizing can be applied to the birefringent plate to modify birefringence of a two-dimensional array of first regions in the birefringent plate to cause the array of first regions to have birefringence that is different from the birefringence of second regions that do not receive the localized heating, and the two-dimensional array includes at least 2 rows and at least 8 columns.

For example, the spacing between two adjacent rows in the two-dimensional array can be identical to the spacing between two adjacent columns in the two-dimensional array.

For example, the fiber optic connector part can be configured to be optically coupled to a two-dimensional array of optical fibers.

For example, the fiber optic connector part can be configured to be optically coupled to a two-dimensional array of vertical coupling elements on the photonic integrated circuit.

For example, the fiber-optic connector part can be configured to enable the first set of light beams and the second set of light beams to be transmitted between the two-dimensional array of optical fibers and the two-dimensional array of vertical coupling elements. The birefringent plate can be configured to modify a polarization state of a first set of light beams that pass through the first regions of the birefringent plate relative to a polarization state of a second set of light beams that pass through the second regions of the birefringent plate.

For example, each of at least some of the first regions can have a substantially circular, oval, triangular, square, or rectangular shape.

For example, the two-dimensional pattern of first regions can include at least 2 parallel strips of first regions. Applying localized heating to the birefringent plate can include applying localized heating to modify birefringence of the at least 2 parallel strips of first regions in the birefringent plate to cause the at least 2 parallel strips of first regions to have birefringence that is different from the birefringence of the second regions that do not receive the localized heating.

In some examples, each strip of first region has a width in a range from 50 μm to 1000 μm. In some examples, each strip of first region has a width in a range from 100 μm to 600 μm. In some examples, each strip of first region has a width in a range from 200 μm to 400 μm.

For example, the fiber-optic connector part can be configured to be optically coupled to a plurality of vertical coupling elements on the photonic integrated circuit, and the fiber-optic connector is configured to enable the first set of light beams and the second set of light beams to be transmitted between the plurality of optical fibers and the plurality of vertical coupling elements.

For example, applying the localized heating or localized energizing to the birefringent plate can include applying the localized heating or localized energizing to the birefringent plate to reduce the birefringence at the first regions.

For example, applying the localized heating or localized energizing to the birefringent plate can include applying the localized heating or localized energizing to the birefringent plate to reduce the birefringence at the first regions to substantially zero birefringence.

For example, applying the localized heating or localized energizing to the birefringent plate can comprises applying the localized heating or localized energizing to the birefringent plate to reduce the birefringence at the first regions such that the second set of light beams that pass through the second regions have polarization that is rotated about $90° + n \times 180°$, $0 \le n$, n being an integer, relative to polarization of the first set of light beams that pass through the first regions.

For example, the fiber-optic connector part can include a walk-off element configured to:

receive a plurality of light beams from the plurality of optical fibers, split the light beams into first beam components and second beam components, the second beam components have polarization that is orthogonal to the polarization of the first beam components, direct the first beam components toward the first regions having lower birefringence, and direct the second beam components toward the second regions having higher birefringence.

For example, applying the localized heating or localized energizing to the birefringent plate can include applying the localized heating or localized energizing to the birefringent plate to reduce the birefringence at the first regions such that the second set of light beams that pass through the second regions have polarization that is rotated about 90°+n×180°, 0≤n, n being an integer, relative to polarization of the first set of light beams that pass through the first regions. The walk-off element can be configured such that upon exiting the walk-off element the first beam components have a first polarization, and the second beam components have a second polarization that is substantially orthogonal to the first polarization. The first and second regions of the birefringent plate can be configured such that after passing the first and second regions the first beam components have polarization that is substantially parallel to the polarization of the second beam components.

For example, the walk-off element can separate the first beam component and the second beam component along a walk-off direction, each of at least some of the first regions can have a dimension measured along a direction parallel to the walk-off direction in a range from 50 μm to 1000 μm.

For example, each of at least some of the first regions can have a dimension measured along a direction parallel to the walk-off direction in a range from 100 μm to 600 μm.

For example, each of at least some of the first regions can have a dimension measured along a direction parallel to the walk-off direction in a range from 200 μm to 400 μm.

For example, applying localized heating or localized energizing to the birefringent plate can include applying localized heating or localized energizing to the birefringent plate to modify birefringence of the two-dimensional pattern of first regions in the birefringent plate such that the birefringent plate is configured to modify polarization of light passing the birefringent plate in a way that is equivalent to modification of polarization of light passing a half-wave plate having openings at the two-dimensional pattern of first regions.

For example, the birefringent plate includes a first surface and a second surface. Applying localized heating to the birefringent plate can include applying localized heating to first regions that extend from the first surface to the second surface. See the example of birefringent plate 5204 in FIG. 52B.

For example, the birefringent plate includes a first surface and a second surface. Applying localized heating or localized energizing to the birefringent plate can include applying localized heating or localized energizing to first regions that are positioned within the birefringent plate and spaced at a first distance from the first surface and a second distance from the second surface. See the example of birefringent plate 5212 in FIG. 52C.

For example, the birefringent plate includes a first surface and a second surface. Applying localized heating or localized energizing to the birefringent plate can include applying localized heating or localized energizing to first regions that extend from the first surface to a location inside the birefringent plate, the first regions are spaced at a distance from the second surface. See the example of birefringent plate 5216 in FIG. 52D.

For example, one or more laser beams can be used to apply the localized heating.

For example, one or more particle beams can be used to apply the localized energizing.

During fabrication of the fiber-optic connector part, various optical components in the fiber-optic connector need to be properly aligned to ensure that light beams from the optical fibers can be properly transmitted to the vertical coupling elements on the photonic integrated circuit. For example, to fabricate the connector element 250, the array of collimating lens 551 needs to be aligned with the polarization diversity assembly 757. Aligning the optical components takes time, so it is preferable to manufacture the fiber-optic connector parts in a way that the time spent on aligning the optical components is reduced.

In some implementations, a process for manufacturing a plurality of fiber-optic connector parts includes aligning and bonding multiple optical components in parallel to form an assembly, then cutting the assembly to singulate the individual fiber-optic connector parts. For example, a first substrate having multiple un-singulated first optical components is aligned and bonded with a second substrate having multiple un-singulated second optical components to form an assembly that includes the first substrate and the second substrate. The assembly is then cut to singulate the individual fiber-optic connector part that includes the first and second optical components.

In some implementations, a process for fabricating fiber-optic connector parts includes: providing a first module having a plurality of unsingulated lens arrays; and providing a second module having a plurality of unsingulated patterned birefringent plates. Each patterned birefringent plate includes birefringent material, the patterned birefringent plate includes a plurality of first regions having reduced or no birefringence as compared to a plurality of second regions. The process includes aligning the plurality of unsingulated lens arrays in the first module to the plurality of unsingulated patterned birefringent plates in the second module; bonding the first module to the second module to form a first assembly; and cutting the first assembly to singulate the first and second modules to produce a plurality of fiber-optic connector parts. Each fiber-optic connector part comprises a singulated birefringent plate and a singulated lens array.

In some implementations, using similar principles described above, the patterned birefringent plate can be configured to be equivalent to a quarter-wave plate with holes.

In some implementations, the array of grating couplers can include a first subset of grating couplers that are used to couple optical signals between the fiber cores and the photonic integrated circuit, and a second subset of grating couplers that are not used to couple optical signals between the fiber cores and the photonic integrated circuit. The second subset of grating couplers can be used for alignment purposes.

Figure 22:
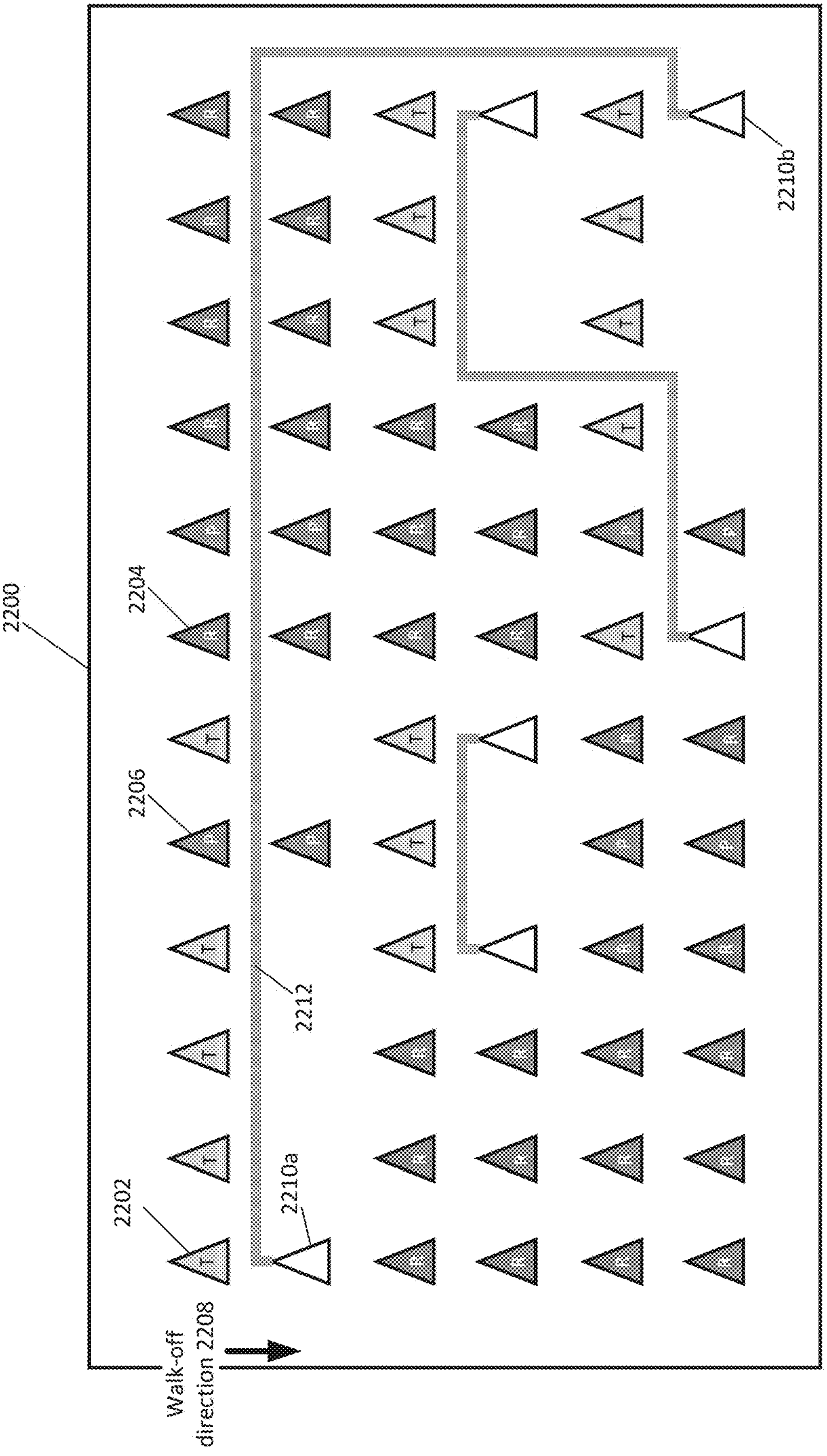
FIG. 22 is a diagram of an array of grating couplers that enables active alignment during assembly.

Referring to FIG. 22, an array of grating couplers 2200 includes transmit-grating couplers 2202 for coupling output or transmit optical signals, receive-grating couplers 2204 for coupling input or receive optical signals, and optical power supply-grating couplers 2206 for coupling optical power supply light. This example assumes a walk-off direction 2208. The array of grating couplers 2200 includes unused transmit-grating couplers, e.g., 2210*a* and 2210*b*, that can be connected by waveguides, e.g., 2212, to enable active alignment during assembly. The term "unused transmit-grating coupler" refers to a grating coupler that is not used to couple optical signals between the fibers and the photonic integrated circuit. For example, the "unused transmit-grating coupler is positioned adjacent to another transmit-grating coupler, in which the unused transmit-grating coupler is displaced from the second transmit-grating coupler along the walk-off direction.

The photonic integrated circuit can be designed such that a light signal is output from the photonic integrated circuit to the grating coupler 2210*a*, and a photodetector detects light received from the grating coupler 2210*b*. During assembly of the photonic integrated circuit with the fiber-to-PIC connector, the light received from the grating coupler 2210*b* is monitored to optimize alignment of the fiber-to-PIC connector to the photonic integrated circuit, e.g., by finding an alignment between the photonic integrated circuit and the fiber-to-PIC connector that achieves the highest efficiency of light transfer from the light output port of the photonic integrated circuit to the grating coupler 2210*a* and from the grating coupler 2210*b* to the photodetector.

By using the unused transmit-grating couplers within the array of grating couplers for alignment purposes, there is no need to increase the overall footprint of the array of grating couplers. The geometric size of the array of grating couplers can be preserved. In the example of FIG. 22, the array of grating couplers occupy an overall rectangular footprint. The geometric size of the array does not need to be extended beyond the rectangular footprint in order to provide grating couplers for alignment purposes.

Silicon photonics integrated circuits can have a limit (e.g., soft limit) in the optical power they can handle. Excess optical power may result in nonlinear excess waveguide losses. The optical power on the photonic integrated circuit is kept below certain values to avoid excess nonlinear waveguide losses. A fiber core can carry optical power supply light that has a power greater than the power that can be properly handled by the photonic integrated circuit. An optical power supply light splitter can split the optical power supply light from a fiber core into two or more optical power supply beams, such that each optical power supply beam has a power level appropriate for the photonic integrated circuit.

Figure 23:
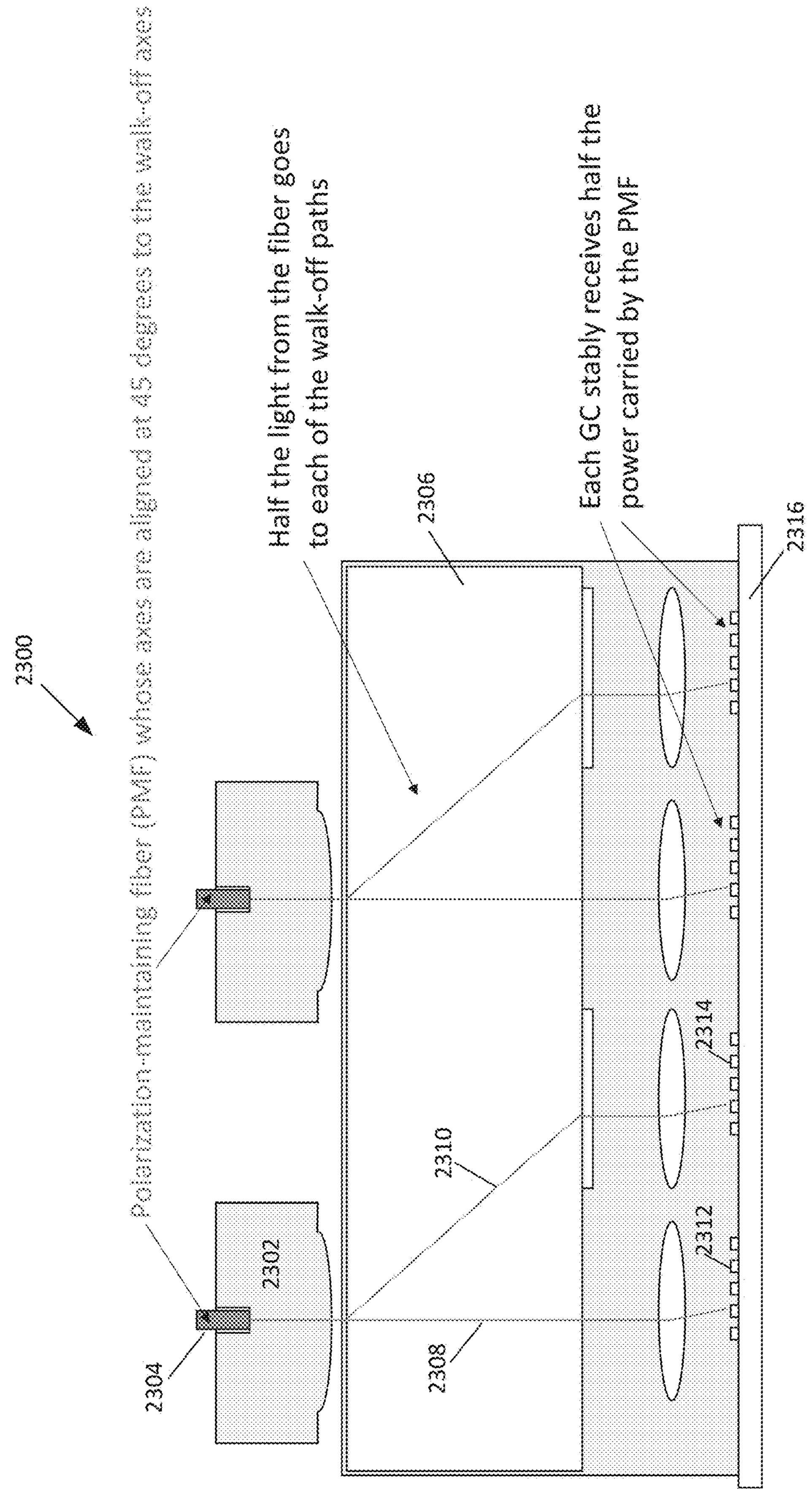
FIG. 23 is a diagram of an example of a fiber-to-PIC connector.

Referring to FIG. 23, in some implementations, a fiber-to-PIC connector 2300 includes an optical power supply fiber port configured to receive optical power supply light 2302 from a polarization-maintaining fiber (PMF) 2304 whose axis is aligned at 45° relative to the walk-off axis of a walk-off element 2306. The walk-off element 2306 causes half of the light from the fiber 2304 to go to each of the walk-off paths, resulting in a first optical power supply beam 2308 and a second optical power supply beam 2310. The first optical power supply beam 2308 is coupled by a first grating coupler 2312 to a photonic integrated circuit 2316, and the second optical power supply beam 2310 is coupled by a second grating coupler 2314 to the photonic integrated circuit 2316. Each grating coupler stably receives half of the power carried by the polarization-maintaining fiber 2304. This way, the polarization-maintaining fiber 2304 can carry optical power supply light having a power that is twice the amount of power that can be properly handled by the photonic integrated circuit 2316.

Figure 24B:
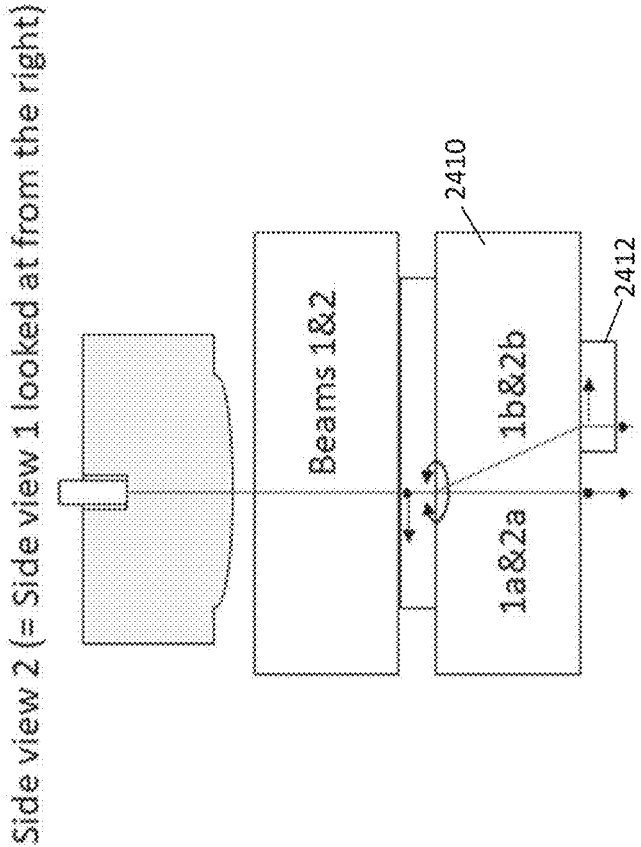
FIGS. 24A and 24B are side view of examples of a fiber-to-PIC connector.
Figure 24A:
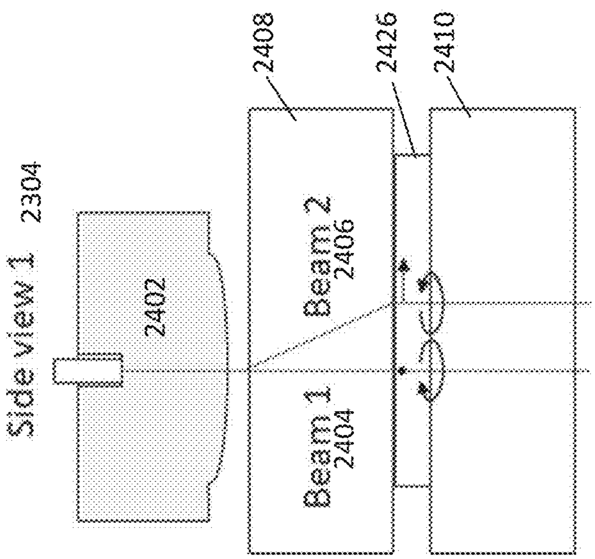
Figure 24C:
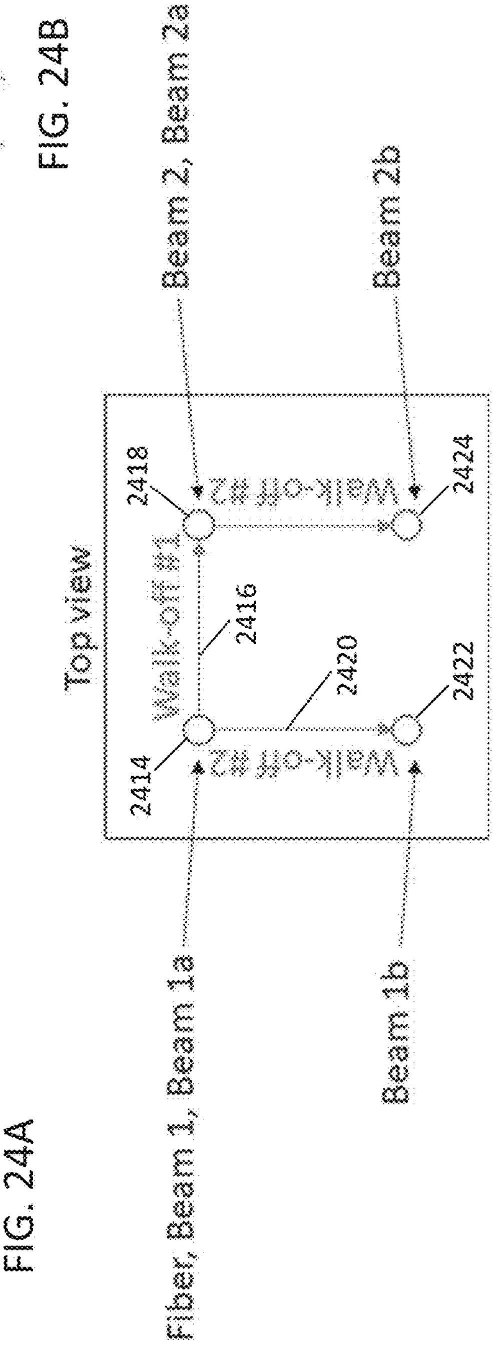
FIG. 24C is a diagram of an example of walk-off directions in the fiber-to-PIC connector.

Referring to FIG. 24A to 24C, in some implementations, an optical power supply beam from the polarization-maintaining fiber 2304 can be split into four beams to allow the polarization-maintaining fiber 2304 to carry optical power supply light having a power that is four times the amount of power that can be properly handled by the photonic integrated circuit 2316.

FIG. 24A is a side view of a fiber-to-PIC connector 2400 that includes an optical power supply fiber port configured to receive an optical power supply beam 2402 from a polarization-maintaining fiber (PMF) 2304 whose axis is aligned at 45° relative to the walk-off axis of a first walk-off element 2408. The first walk-off element 2408 causes half of the light from the fiber 2304 to go to each of the walk-off paths, resulting in beam 1 (2404) and beam 2 (2406). A quarter-wave plate 2426 turns the linearly polarized beam 1 and beam 2 into circularly polarized beams. A second walk-off element 2410 performs a second polarization split of the light beams 1 and 2. As a result, beam 1 is split into beam 1*a* and beam 1*b*, whereas beam 2 is split into beam 2*a* and beam 2*b*. This results in a 1:4 power split. The second walk-off element 2410 is rotated at an angle θ (e.g., 90°) relative to the first walk-off element 2408 such that the walk-off direction of the second walk-off element 2410 is at the angle θ relative to the walk-off direction of the first walk-off element 2408. A subsequent birefringent hole plate rotates the polarizations of some of the beams to ensure that the polarization directions of all of the beams are properly aligned with the grating couplers.

FIG. 24B is a second side view of the fiber-to-PIC connector 2400. The second side view is the first side view of FIG. 24A looked at from the right. As shown in FIG. 24B, the second walk-off element 2410 causes half of the light from beam 1 (2404) to go to each of the walk-off paths, resulting in a first beam 1*a* and a second beam 1*b*. The second walk-off element 2410 causes half of the light from beam 2 (2406) to go to each of the walk-off paths, resulting in a third beam 2*a* and a fourth beam 2*b*. A half-wave plate 2412 rotates the second beam 1*b* and the fourth beam 2*b* so that the first beam 1*a*, the second beam 1*b*, the third beam 2*a*, and the fourth beam 2*b* have the same polarization direction.

FIG. 24C is a diagram showing a position 2414 of the optical power supply light 2402 that is received from the polarization-maintaining fiber (PMF) 2304. The first walk-off element 2408 causes beam 2 (2406) to be displaced in the first walk-off to a position 2418. Beam 1 remains at the same position 2414 as the optical power supply light 2402. The second walk-off element 2410 causes beam 1*b* to be displaced in the second walk-off 2420 to a position 2422. Beam 1*a* remains at the same position 2414 as beam 1 (2402). The second walk-off element 2410 causes beam 2*b* to be displaced in the second walk-off 2420 to a position 2424. Beam 2*a* remains at the same position 2418 as beam 2 (2406).

Beams 1*a*, 1*b*, 2*a*, 2*b* are coupled by four grating couplers to a photonic integrated circuit. Each grating coupler stably receives one-fourth of the power carried by the polarization-maintaining fiber 2304. This way, the polarization-maintaining fiber 2304 can carry optical power supply light having a power that is four times the amount of power that can be properly handled by the photonic integrated circuit.

In some examples, instead of using a quarter-wave plate 2426, the second walk-off element 2410 can be aligned at 45° relative to the first walk-off element 2408 to achieve the same splitting effect.

In some implementations, a third walk-off element is used to split the four beams 1*a*, 1*b*, 2*a*, 2*b* into eight beams. This allows the polarization-maintaining fiber 2304 to carry optical power supply light having a power that is eight times the amount of power that can be properly handled by the photonic integrated circuit.

It is possible to use additional walk-off elements to further split the light beams to allow the polarization-maintaining fiber 2304 to carry optical power supply light having greater power, such as 16, 32, 64, 128, or greater, times the amount of power that can be properly handled by the photonic integrated circuit.

Figure 25:
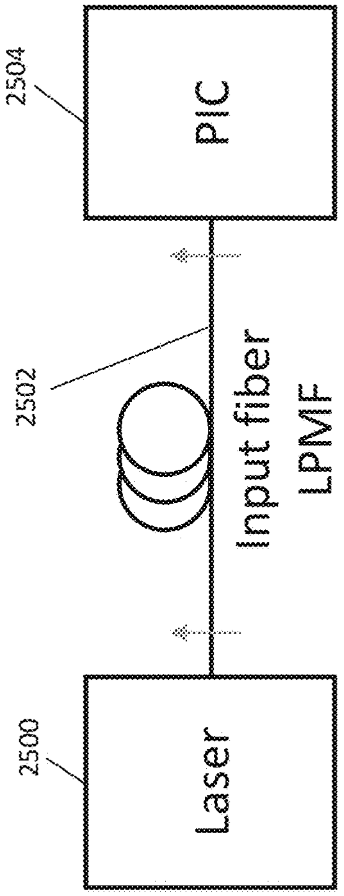
FIG. 25 is a diagram of an example of an optical power supply that provides optical power through a single optical fiber.

Referring to FIG. 25, coupling an optical power supply to a photonic integrated circuit can require careful polarization alignment because modulators on the photonic integrated circuit can be polarization-sensitive, i.e., only efficiently modulate one fixed linear polarization of light. A laser 2500 can emit linearly-polarized light, and a linear-polarization-maintaining fiber (LPMF) 2502 can be used to connect the external optical power supply 2500 to a photonic integrated circuit 2504.

Figure 26:
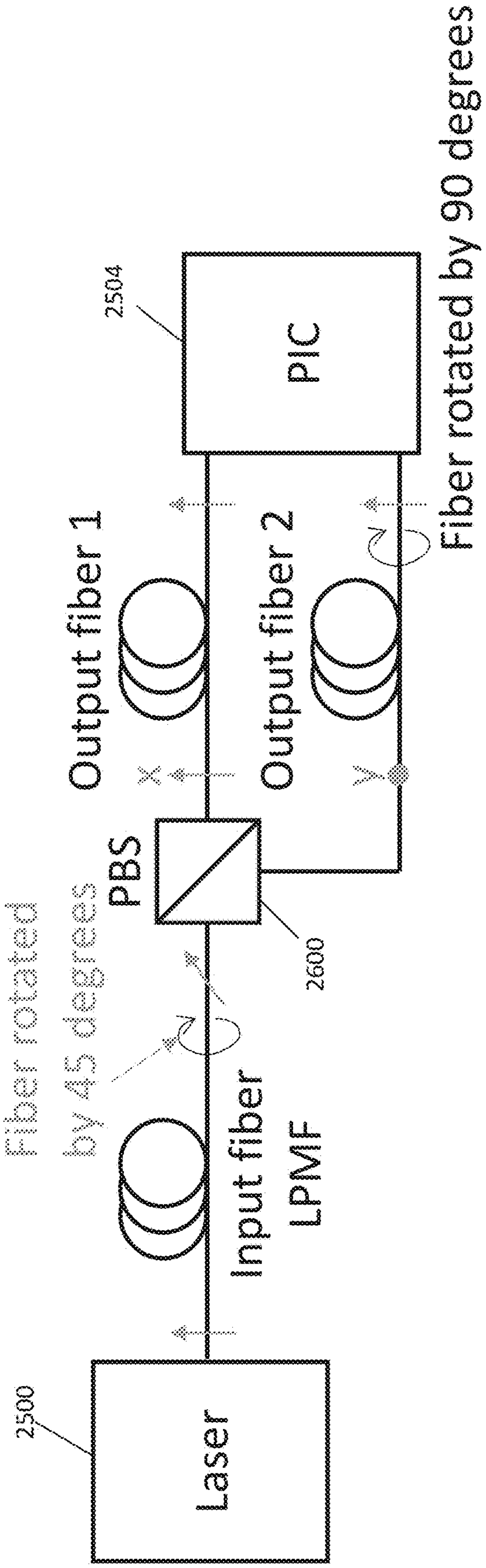
FIGS. 26 and 27 are diagrams of examples of optical power supplies that provide optical power through multiple optical fibers.

Referring to FIG. 26, if one needs more than one power supply input, one can orient the LPMF 2502 at 45 degrees relative to a polarization beam splitter (PBS) 2600, thereby achieving a 1:2 optical power split of optical supply power at the PBS 2600. In this example, equal power split may require accurate angular alignment of the LPMF 2502 at the laser 2500 and at the PBS 2600, which can increase the cost of packaging the components.

Figure 27:
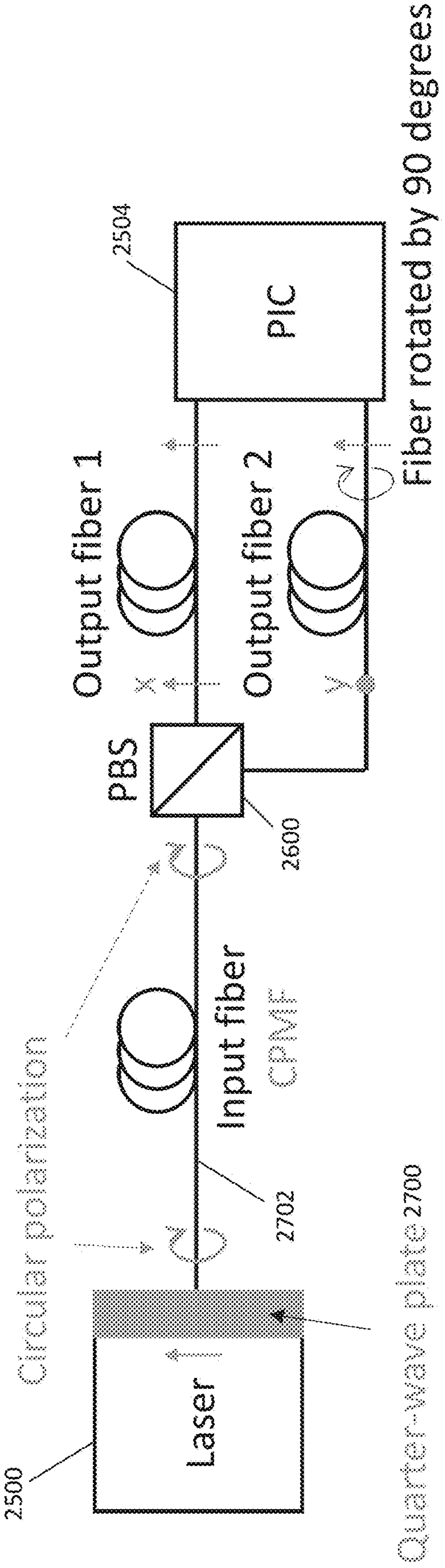

In some implementations, a circularly-polarized fiber can be used as a distribution fiber for an optical power supply. Referring to FIG. 27, a quarter-wave plate 2700 is provided at the laser 2500 to change the polarization state of the laser output from linear to circular. A circular polarization maintaining fiber (CPMF) 2702 transmits the circular polarized light from the quarter-wave plate 2700 to the polarization beam splitter 2600. Since circular polarization is a superposition of two linear polarizations, the PBS 2600 still performs a 1:2 power split. An advantage of this design is that the CPMF 2702 can be mounted to the laser 2500 and to the PBS 2600 at any rotational angle, reducing the alignment or packaging cost. This general architecture applies to other polarization splitting interfaces as well, including a 2D grating coupler.

For example, the circular polarization maintaining fiber 2702 can be made of a spun birefringent optical fiber generated by spinning a polarization-maintaining preform during the draw process. The fiber is designed to preserve circular polarization: If the input light is right-handed circularly polarized, the output light will also be right-handed circularly polarized; and if the input light is left-handed circularly polarized, the output light will also be left-handed circularly polarized. Circular polarization can be viewed as the superposition of two linear polarizations with a defined phase angle (e.g., 90°) between them. The circular polarization maintaining fiber 2702 preserves the phase angle (e.g., 90°) difference between the two linear polarizations as these two linear polarizations travel down the fiber.

Figure 28:
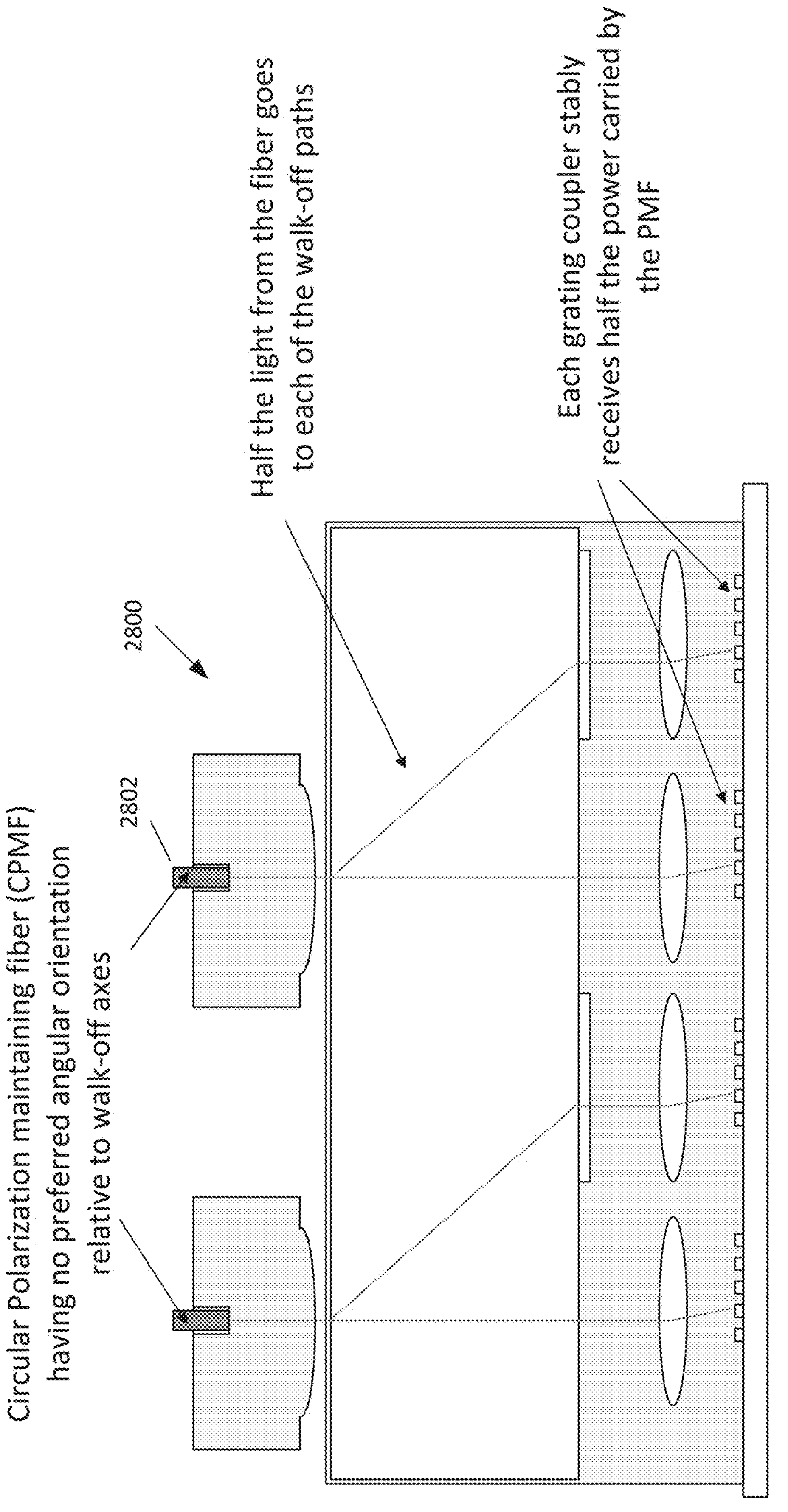
FIG. 28 is a diagram of an example of a fiber-to-PIC connector.

Referring to FIG. 28, a fiber-to-PIC connector 2800 (same as the connector 2300 of FIG. 23) receives optical power supply light from circular-polarization maintaining fibers 2802. The CPMF fibers 2802 can be attached relative to the walk-off crystal at any random angle to perform the indicated power split.

The techniques described above for the examples of FIGS. 27 and 28 can also be used to perform polarization splitting at the input to an edge-coupling interface.

Figure 29:
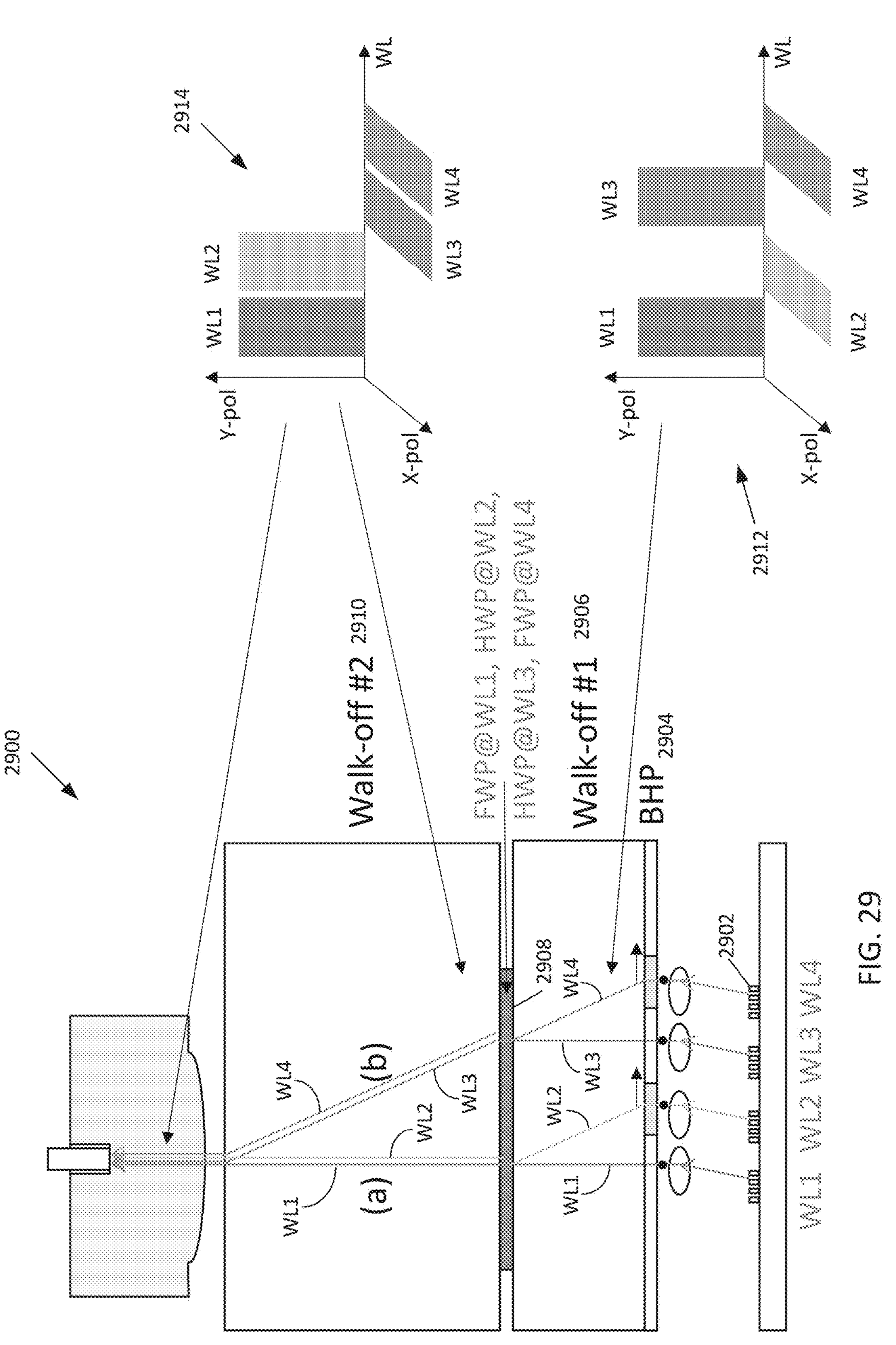
FIGS. 29 and 30 are diagrams of wavelength division multiplexers.

FIG. 29 shows a diagram of a WDM multiplexer 2900. In this example, the WDM multiplexer 2900 can multiplex 4 wavelengths. The same principle can be used to design a WDM multiplexer that can multiplex N wavelengths, in which N is an integer greater than 4. For example, the WDM multiplexer 2900 can operate as follows. Four grating couplers 2902 emit 4 signals at different optical wavelengths (WLs), and all in the same polarization. A birefringent hole plate 2904 rotates 2 of the 4 WLs, e.g., WL2 and WL4. A graph 2912 shows the polarization directions of WL1, WL2, WL3, and WL4 after passing the birefringent hole plate 2904. A first walk-off element 2906 combines the two polarizations (reverse operation from the polarization splitting in above embodiments). A waveplate 2908 shown in red is a higher-order (relatively thick) waveplate whose thickness is designed so as to:

- Not change the polarization of WL1 ("full-wave plate at WL1");
- Rotate the polarization of WL2 by 90 degrees ("half-wave plate at WL2");
- Rotate the polarization of WL3 by 90 degrees ("half-wave plate at WL2"); and
- Not change the polarization of WL4 ("full-wave plate at WL4").

A graph 2914 shows the polarization directions of WL1, WL2, WL3, and WL4 after passing the waveplate 2908. A second walk-off element 2910 combines the beams (a) at WL1+WL2 of one polarization and (b) at WL3+WL4 of the orthogonal polarization. The second walk-off element 2910 has a thickness that is about twice the thickness of the first walk-off element 2906 because the displacement between the two beams being combined by the second walk-off element 2910 is about twice the displacement between the two beams being combined by the first walk-off element 2904.

Figure 30:
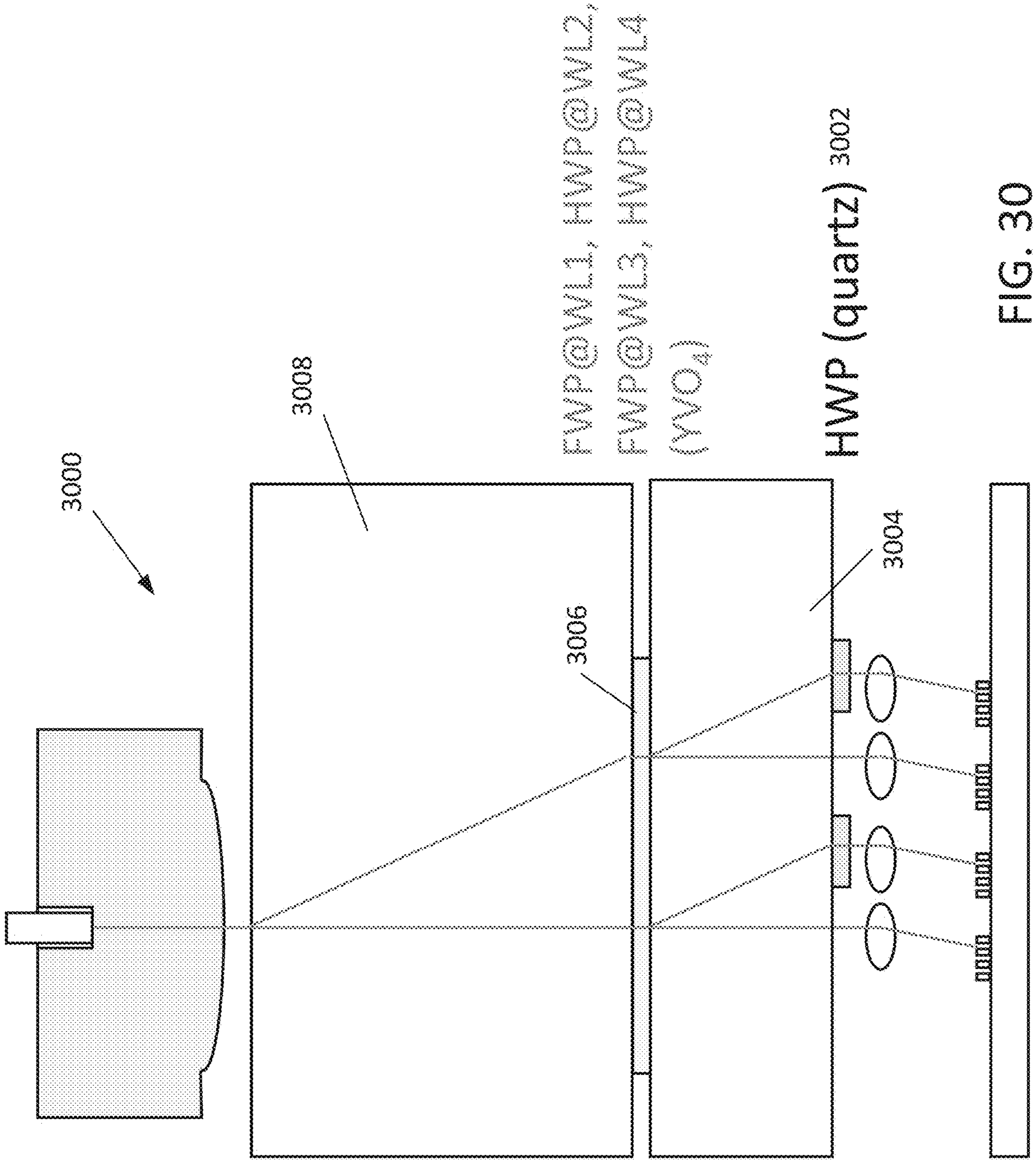

FIG. 30 is a diagram of an example of a WDM multiplexer 3000 that includes quartz half-wave plates 3002 and a yttrium orthovanadate ($YVO_4$) waveplate 3006.

Referring to FIG. 31A, a table 3100 shows 200GBASE-FR4 wavelength-division-multiplexed lane assignments. Referring to FIG. 31B, a table 3102 shows 200GBASE-LR4 wavelength-division-multiplexed lane assignments. These lanes provide 800 GHz spacing with 368 GHz window. The center wavelengths of lanes $L_0$, $L_1$, $L_2$, and $L_3$ in tables 3100 and 3102 can correspond to the wavelengths WL1, WL2, WL3, and WL4 in FIGS. 29 and 30.

Referring to FIG. 32, a table 3200 shows 400GBASE-FR8 wavelength-division-multiplexed lane assignments. The center wavelengths of the eight lanes in Table 3200 can be used in a WDM multiplexer that has three walk-off elements that multiplex eight different wavelengths.

The fiber-to-PIC connectors described above can be oriented such that the optical axis is parallel or perpendicular (or at any other angle) to the top surface of the photonic integrated circuit. The optical axis of the fiber-to-PIC connector refers to the optical axis of the walk-off elements and the birefringent hole plate.

Figures 33A, 33B:
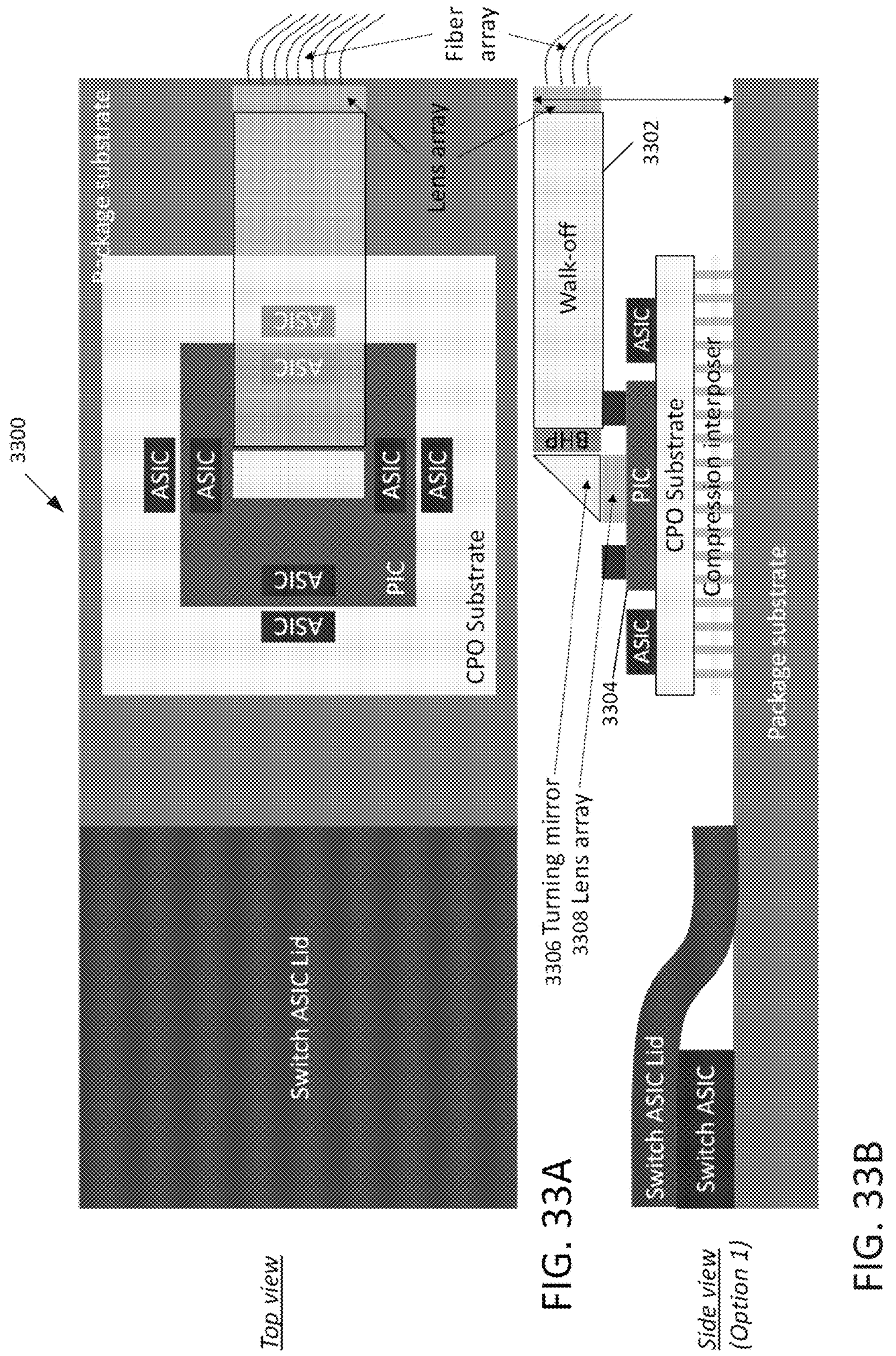
FIG. 33A is a top view of an example of an optoelectronic device.
FIGS. 33B and 33C are side views of example configurations for the optoelectronic device.

FIG. 33A is a top view of an example of an optoelectronic device 3300. FIG. 33B is a side view of a first configuration for the optoelectronic device 3300, in which a fiber-to-PIC connector has an optical axis parallel to the top surface of a photonic integrated circuit 3304. A lens array 3308 couples light beams that propagate in directions perpendicular to the top surface of the PIC 3304, and a turning mirror 3306 modifies the propagation directions of the light beams.

Figure 33C:
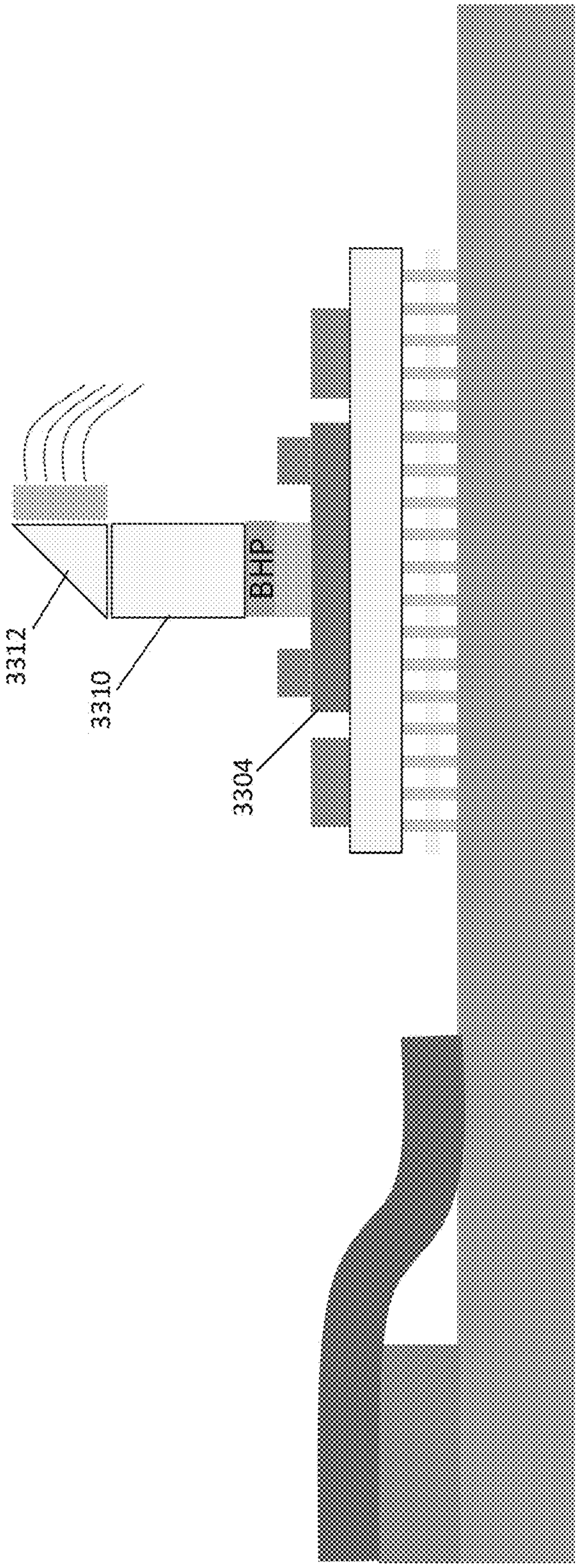

FIG. 33C is a side view of a second configuration for the optoelectronic device 3300, in which a fiber-to-PIC connector 3310 has an optical axis perpendicular to the top surface of the photonic integrated circuit 3304. The walk-off elements output light beams that propagate in directions perpendicular to the top surface of the PIC 3304. A turning mirror 3312 modifies the propagation directions of the light beams. In the examples of FIGS. 33A to 33C, the turning mirror (e.g., 3306, 3312) changes the directions of the light beams to enable horizontal fiber attachment, i.e., at the attachment locations, the fibers extend parallel to the top surface of the photonic integrated circuit.

Figure 34A:
FIG. 34A is a side view of an example of a fiber-to-PIC connector.

FIG. 34A is a side view of a fiber-to-PIC connector 3400 that optically couples optical fibers 3402 to a PIC 3404. The fiber-to-PIC connector 3400 enables edge coupling of the optical signals.

Figure 34B:
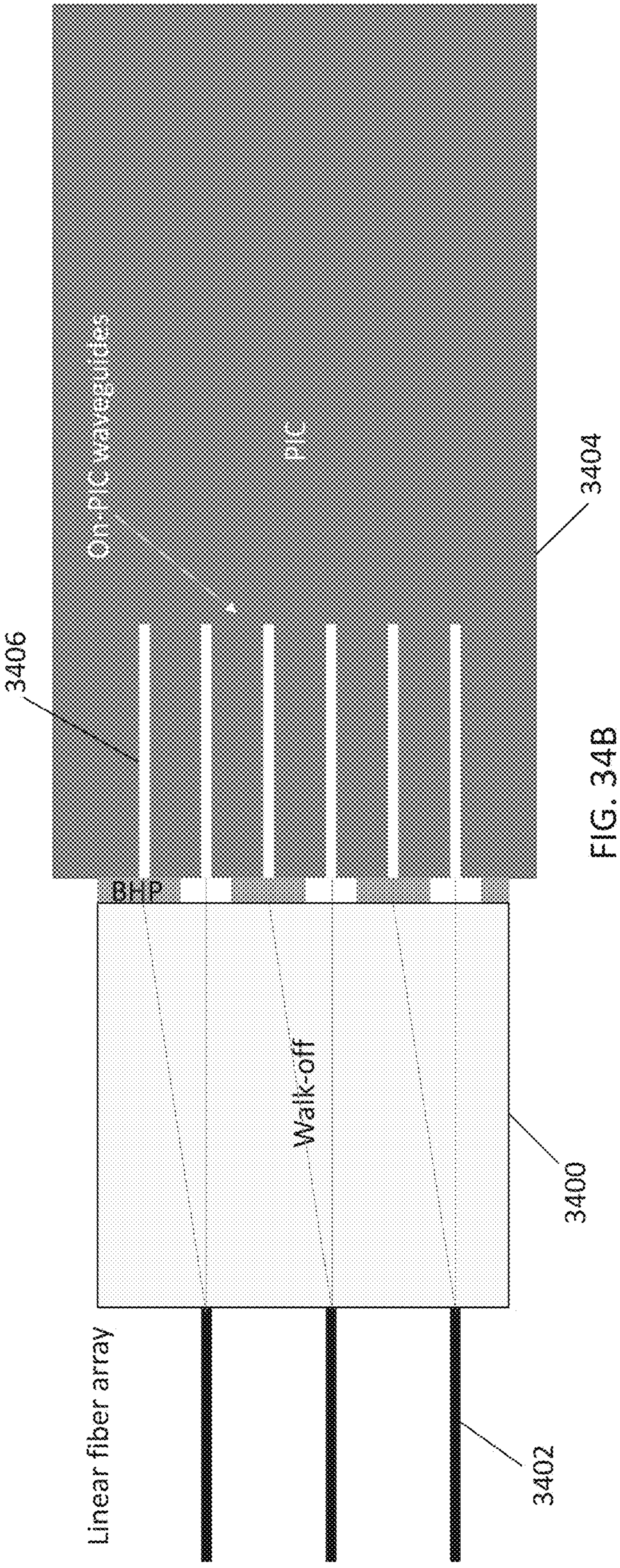
FIG. 34B is a top view of an example of the fiber-to-PIC connector.

FIG. 34B is a top view of the fiber-to-PIC connector 3400 that optically couples the optical fibers 3402 to the PIC 3404. The fiber-to-PIC connector 3400 enables edge coupling of the optical signals to on-PIC waveguides 3406.

In some implementations, a fiber-to-PIC connector can include a filter-based WDM demultiplexer and/or multiplexer. Such a fiber-to-PIC connector can convert a single row of N fibers to an N×2M array of grating couplers, in which M is the number of wavelengths being used.

Figure 35:
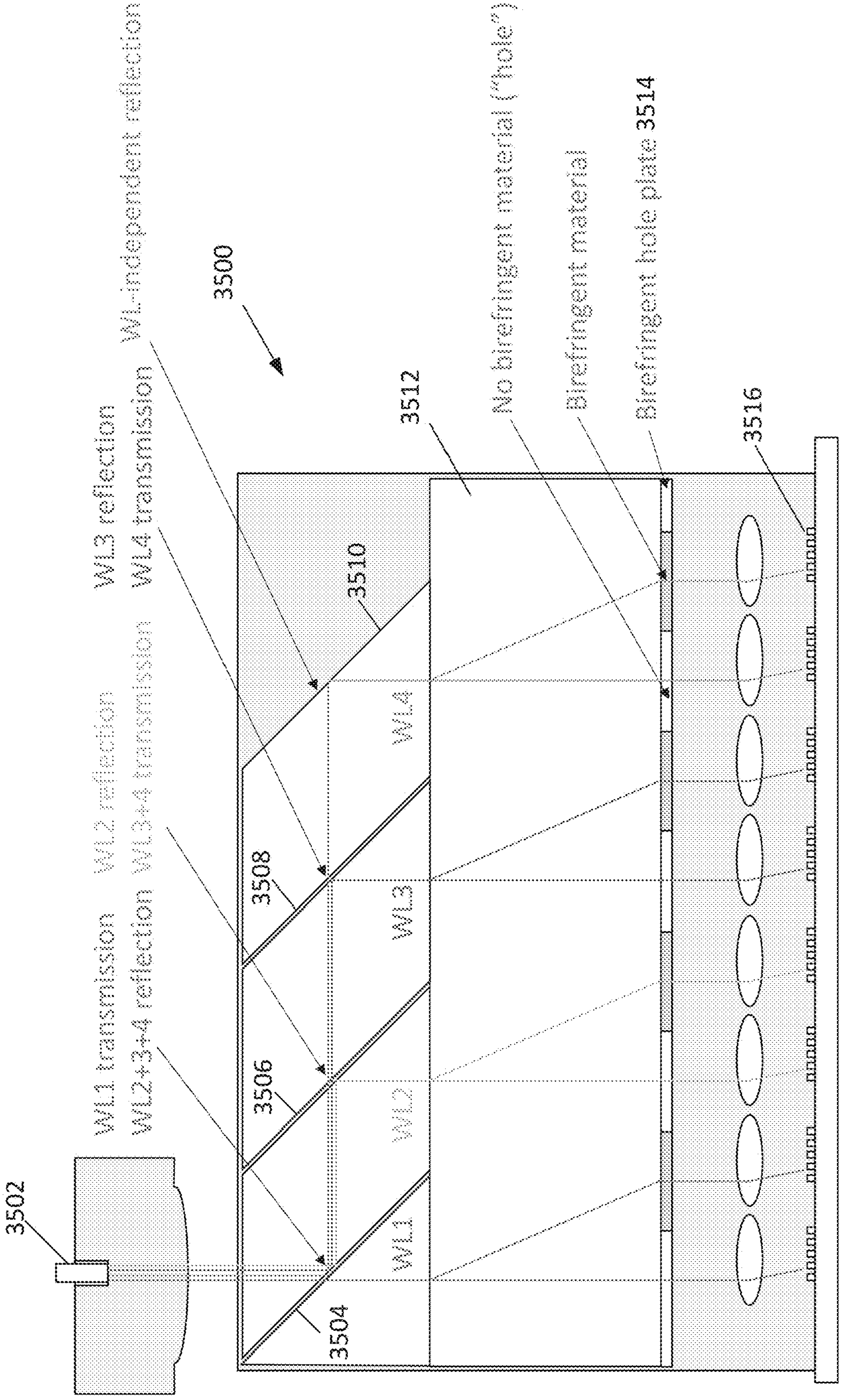
FIG. 35 is a diagram of an example of a fiber-to-PIC connector that can process wavelength division multiplexed optical signals.

The fiber-to-PIC connector can include wavelength division multiplexers and/or demultiplexers. FIG. 35 is a side view of an example of a fiber-to-PIC connector 3500 that receives wavelength division multiplexed (WDM) optical signals from, or transmits WDM optical signals to, an optical fiber 3502. In this example, the WDM signals in the optical fiber 3502 include four wavelengths WL1, WL2, WL3, and WL4. Although the side view of FIG. 35 shows one fiber 3502, it is understood that there are more fibers staggered behind the fiber shown.

A first filter 3504 allows optical signals having wavelength WL1 to pass, and reflects optical signals having wavelengths WL2, WL3, and WL4. A second filter 3506 reflects optical signals having wavelength WL2, and allows optical signals having wavelengths WL3 and WL4 to pass. A third filter 3508 reflects optical signals having wavelength WL3 and allows optical signals having wavelength WL4 to pass. A wavelength-independent mirror 3510 reflects optical signals having wavelength WL4.

When the fiber-to-PIC connector 3500 is used as a demultiplexer, a WDM optical signal having components having wavelengths WL1, WL2, WL3, and WL4 (two polarizations for each wavelength) is separated by the filters 3504, 3506, and 3508 into four optical signals, each having one wavelength. The four single-wavelength optical signals pass a walk-off element 3512 and a birefringent hole plate 3514, resulting in eight optical signals having the same polarization state that are properly aligned to the grating couplers 3516. When the fiber-to-PIC connector 3500 is used as a multiplexer, the optical signals having wavelengths WL1, WL2, WL3, and WL4 from the grating couplers 3516 pass the birefringent hole plate 3514 and the walk-off element 3512, and are directed by the filters 3504, 3506, 3508, and mirror 3510 to the fiber 3502.

Figure 36:
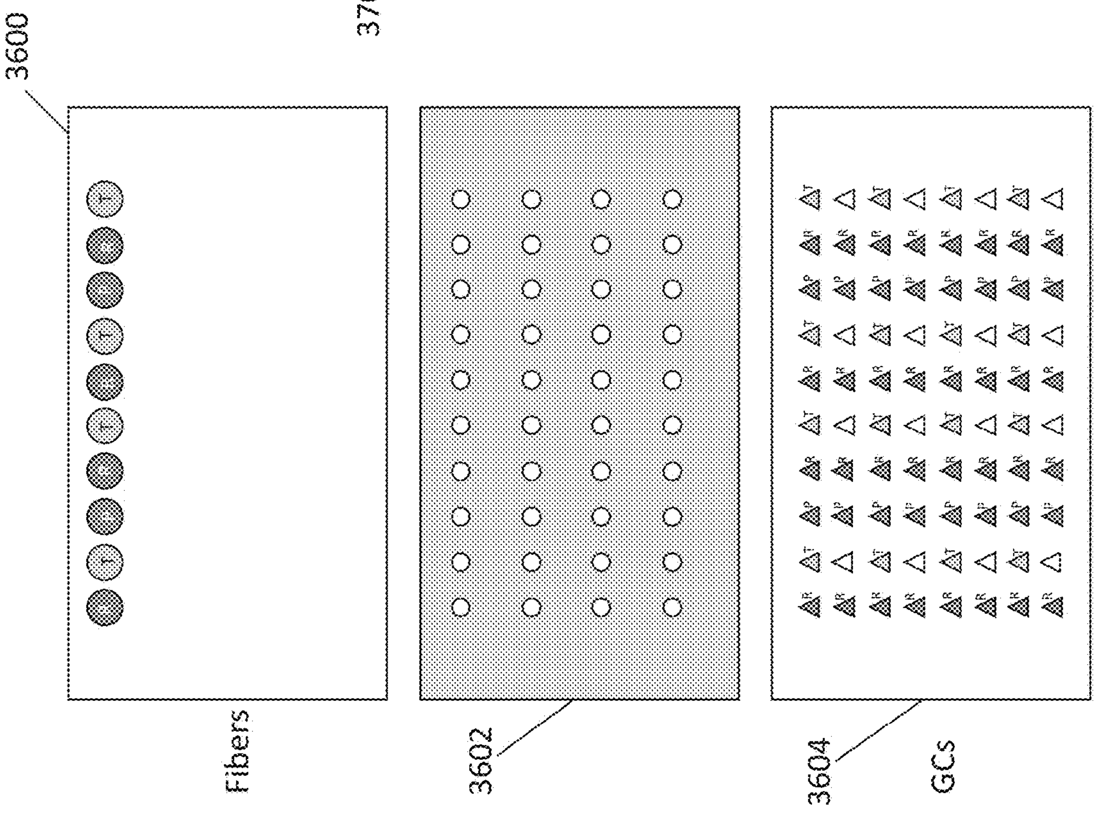
FIG. 36 shows diagrams of examples of an arrangement of fiber ports, a corresponding birefringent hole plate, and a corresponding array of grating couplers.

FIG. 36 shows diagrams of examples of an arrangement of fiber ports 3600, a birefringent hole plate 3602, and an array of grating couplers 3604. For demultiplexing, a WDM optical signal from each fiber port 3600 is split into eight optical signals having four different wavelengths. For multiplexing, eight optical signals having four different wavelengths from the grating couplers 3604 are multiplexed into a WDM optical signal and directed to the fiber port 3600.

Figure 37:
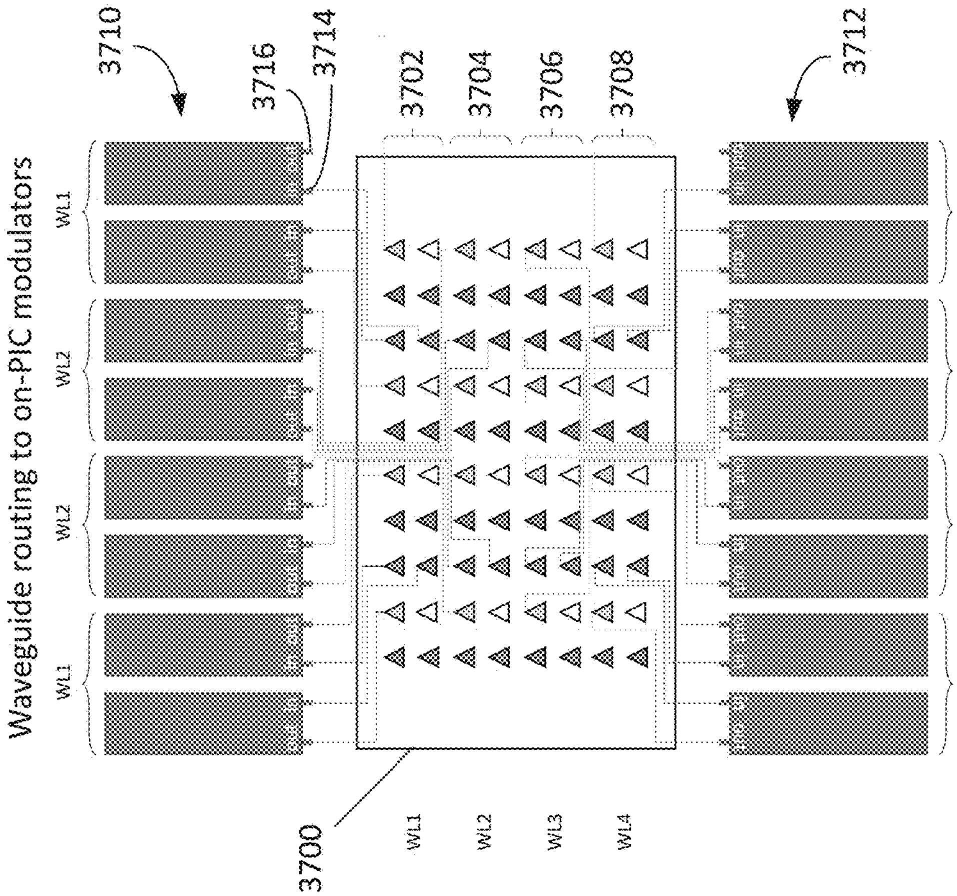
FIG. 37 is a diagram showing an example of waveguide routing from grating couplers to on-PIC modulators.

FIG. 37 is a diagram showing an example of waveguide routing from the grating couplers to on-PIC modulators. Two rows of grating couplers 3702 process optical signals having the wavelength WL1. The next two rows of grating couplers 3704 process optical signals having the wavelength WL2. The next two rows of grating couplers 3706 process optical signals having the wavelength WL3. The next two rows of grating couplers 3708 process optical signals having the wavelength WL4.

A first set of modulators 3710 process optical signals having wavelengths WL1 and WL2. A second set of modulators 3712 process optical signals having wavelengths WL3 and WL4. Each modulator has an input port 3714 that receives optical power supply light, and an output port 3716 for outputting transmit signals. In this example, the grating couplers that process wavelengths WL1 and WL2 are on a first side of the array of grating couplers near the first set of modulators 3710. The grating couplers that process wavelengths WL3 and WL4 are on a second side of the array of grating couplers near the second set of modulators 3712. This avoids crossing of the waveguides and makes it easier to design the waveguide routing.

Figure 38:
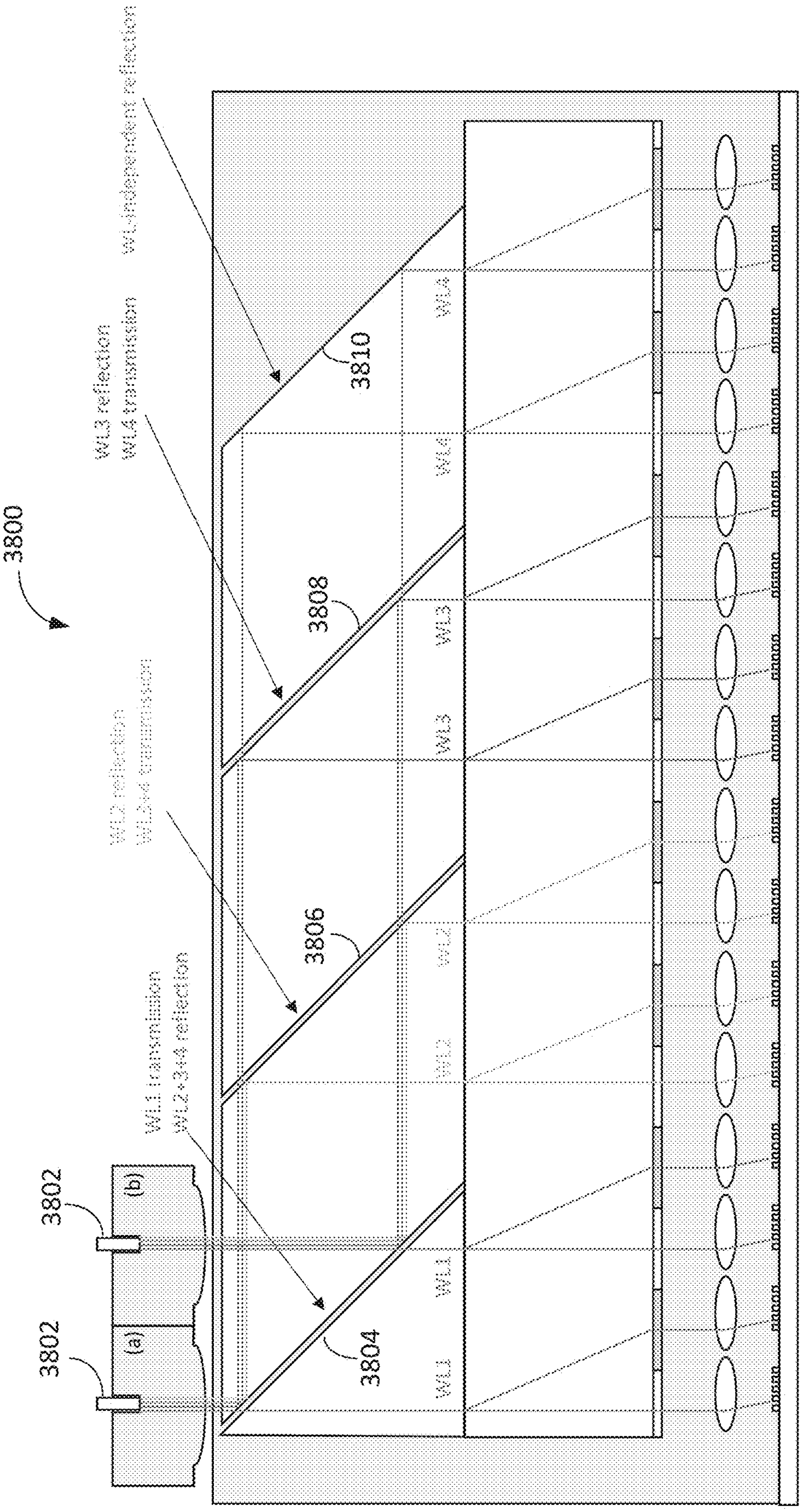
FIG. 38 is a diagram of an example of a fiber-to-PIC connector that can process wavelength division multiplexed optical signals from multiple rows of optical fibers.

Referring to FIG. 38, in some implementations, a fiber-to-PIC connector 3800 is configured to couple to multiple rows of optical fibers 3802. The figure shows a side view of the fiber-to-PIC connector 3800, in which two fibers 3802 from two rows are shown. It is understood that there are more fibers staggered behind the fibers shown. The connector 3800 can convert K rows of N fibers (e.g., fiber (a), fiber (b)) to an N×2MK array of grating couplers, in which M represents the number of wavelengths being used. In this example, M=4 wavelengths are used.

The fiber-to-PIC connector 3800 includes a first filter 3804 that allows optical signals having wavelength WL1 to pass, and reflects optical signals having wavelengths WL2, WL3, and WL4. A second filter 3806 reflects optical signals have wavelength WL2, and allows optical signals having wavelengths WL3 and WL4 to pass. A third filter 3808 reflects optical signals have wavelength WL3 and allows optical signals having wavelength WL4 to pass. A wavelength-independent mirror 3810 reflects optical signals have wavelength WL4. The filters 3804, 3806, and 3808 are sufficiently large to enable processing of the light beams from the two fibers 3802. In this example, the two input beams are split into 16 beams that are directed to the grating couplers.

Figure 39:
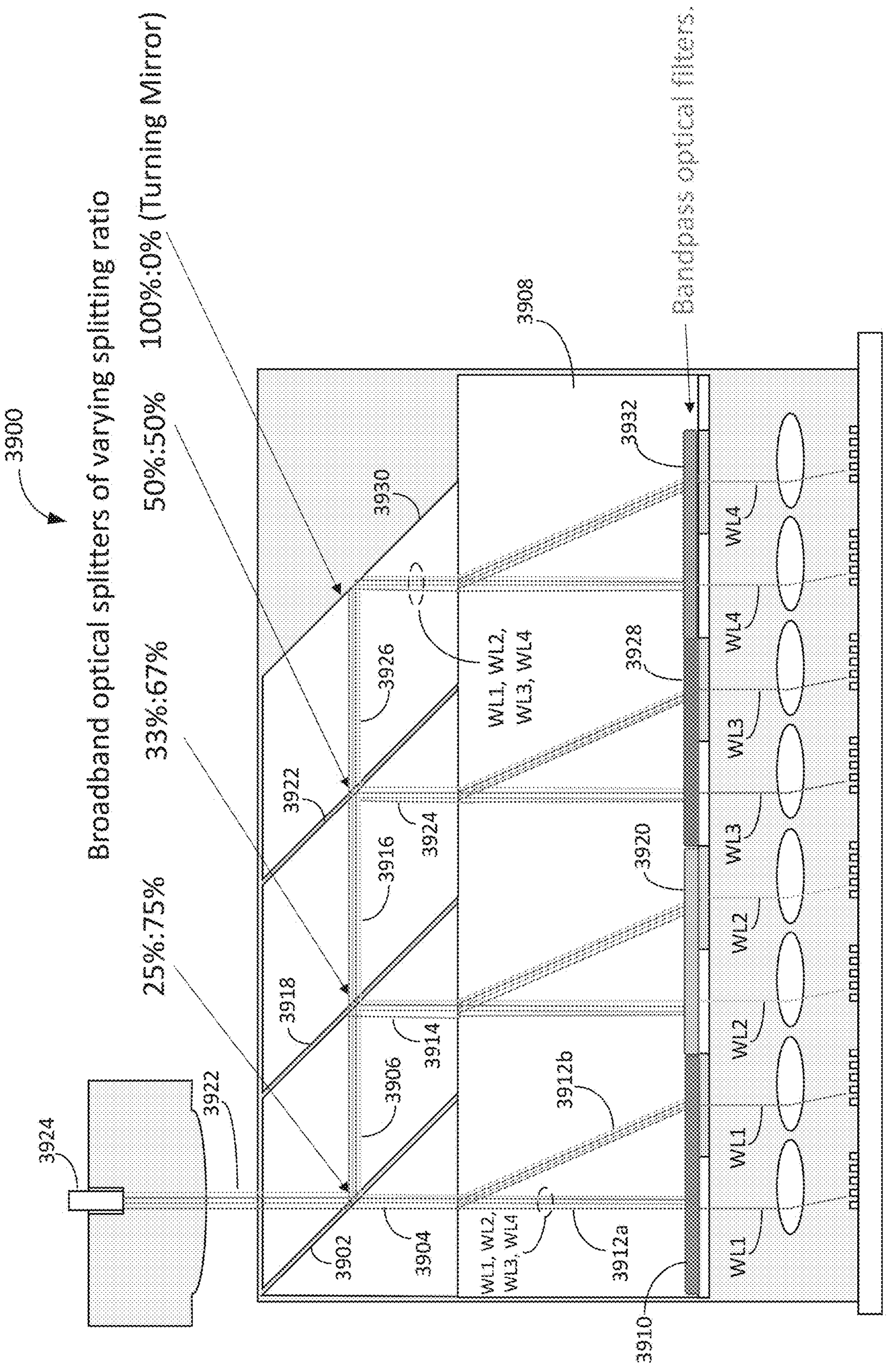
FIG. 39 is a diagram of an example of a fiber-to-PIC connector that includes a filter-based wavelength division demultiplexer and multiplexer.

FIG. 39 is a diagram of an example of a fiber-to-PIC connector 3900 that includes a filter-based wavelength division demultiplexer and multiplexer, which includes broadband optical splitters of varying splitting ratio and bandpass optical filters. The fiber-to-PIC connector 3900 includes a first broadband optical splitter that has a 25%: 75% splitting ratio, such that 25% of the light passes the splitter to form a beam 3904, and 75% of the light is reflected to form a beam 3906. The beam 3904 passes a walk-off element 3908 that splits the beam 3904 into two polarized beam 3912*a* and 3912*b*. The polarized beams 3912*a*, 3912*b* are filtered by a first bandpass optical filter 3910 that allows wavelength WL1 to pass through.

The beam 3906 is directed towards a second broadband optical splitter 3918 that has a 33%: 67% splitting ratio, such that 33% of the beam 3906 is reflected by the splitter 3918 to form a beam 3914, and 67% of the beam 3906 passes through the splitter 3918 to form a beam 3916. The beam 3914 has about 75%×33%=25% of the power of the input beam 3922 from the fiber 3924. The beam 3916 has about 75%×67%=50% of the power of the input beam 3922. The beam 3914 passes the walk-off element 3908, which splits the beam 3914 into two polarized beams that are filtered by a second bandpass optical filter 3920 that allows wavelength WL2 to pass through.

The beam 3916 is directed towards a third broadband optical splitter 3922 that has a 50%: 50% splitting ratio, such that 50% of the beam 3916 is reflected by the splitter 3922 to form a beam 3924, and 50% of the beam 3916 passes through the splitter 3922 to form a beam 3926. Each of the beams 3924 and 3926 has about 50%×50%=25% of the power of the input beam 3922. The beam 3924 passes the walk-off element 3908, which splits the beam 3924 into two polarized beams that are filtered by a third bandpass optical filter 3928 that allows wavelength WL3 to pass through.

The beam 3926 is directed towards a turning mirror 3930 that reflects 100% of the beam 3926 towards the walk-off element 3908, which splits the beam 3926 into two polarized beams that are filtered by a fourth bandpass optical filter 3932 that allows wavelength WL4 to pass through.

In some implementations, the bandpass optical filters 3910, 3920, 3928, and 3932 can be used in the multiplexer and demultiplexer of FIGS. 35 and 38 to lower inter-channel crosstalk.

Figure 40:
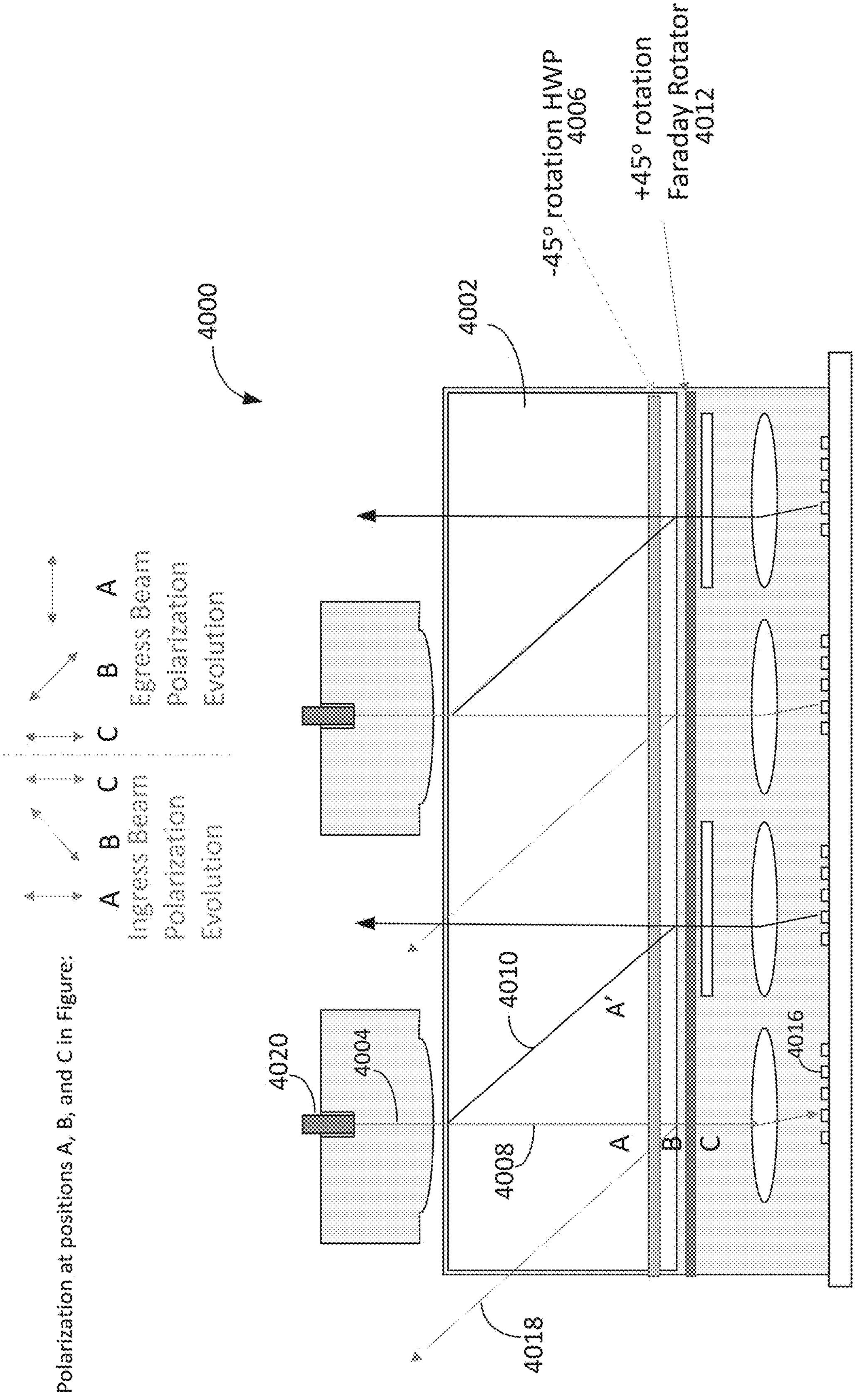
FIG. 40 is a diagram of an example of a fiber-to-PIC connector that includes an isolator.

In some implementations, non-reciprocal optical elements can be used to form an isolator. Referring to FIG. 40, a fiber-to-PIC connector 4000 includes an isolator such that light leaving the photonic integrated circuit (egress, blue arrows) does not retrace the input (ingress) optical path (red arrows) and consequently does not couple back into optical fibers. The principle also applies to the greyed-out orthogonal polarization.

An incoming beam 4004 is split by a walk-off element 4002 into a first ingress beam 4008 having a polarization A and a second ingress beam 4010 having a polarization A'. A −45° rotation half-wave plate 4006 rotates the polarization of the first ingress beam 4008 to have a polarization B. The first ingress beam 4008 then passes a +45° faraday rotator 4012 to have a polarization C, which is aligned with a grating coupler 4016. The polarization directions A, B, and C are shown in a diagram 4014 at the upper part of the figure.

An egress beam initially has a polarization C. The egress beam passes the +45° faraday rotator 4012 to have a polarization B. The walk-off element 4002 changes the propagation direction of the egress beam to become beam 4018 that does not retrace the input (ingress) optical path and consequently does not couple back into the optical fiber 4020.

Figure 41:
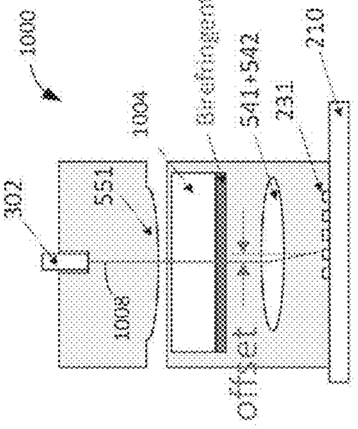
FIG. 41 is a side view of an example of a fiber-to-PIC connector.

Referring to FIG. 41, which is similar to FIG. 10B, the incoming beam 1008 from the fiber core 302 passes the collimating lens 551 and is split by the walk-off crystal 1004 into two beams 755*a* and 755*b* (see FIG. 10A), which pass the birefringent hole plate 1006, the second lens 541, and the third lens 542, and are directed to the vertical coupling elements 231 on the photonic integrated circuit 210 at an angle of incidence θ. In some implementations, the angle of incidence θ can be in a range, e.g., from 1° to 30°, 1° to 16°, or 4° to 12°, or about 8°, depending on the design of the vertical coupling elements 231, which can be, e.g., vertical grating couplers.

In some implementations, each third lens 542 is a rotationally symmetric spherical lens. In order to direct the light beams (e.g., 755*a* and 755*b*) toward the grating couplers at the desired angle of incidence θ, the fiber core 302, the collimating lens 551, the walk-off crystal 1004, the birefringent hole plate 1006, and the second lens 541 are positioned relative to the third lens 542 such that each light beam propagates along a beam path that is parallel to the optical axis of the third lens 542, and the center axis of the beam path is spaced apart at an offset distance from the optical axis of the third lens 542. The grating coupler 231 is positioned near the focal plane of the third lens 542, and the optical axis of the third lens 542 passes the location on the grating coupler 231 where the light beam is intended to be focused, i.e., the focal point. The light beam is refracted by the third lens 542 toward the focal point with an angle of incidence θ. The offset distance and the focal distance of the third lens 542 are selected to achieve the desired angle of incidence θ. For example, increasing the offset distance and/or reducing the focal distance of the third lens 542 results in a greater angle of incidence θ.

In the example above, in order to achieve the desired offset between the center axis of the light beam and the optical axis of the third lens 542, the diameter of the light beam is made smaller than the diameter of the third lens 542. In an optical system in which the propagating beam is centered on the optical axis, rotationally symmetric spherical lens shapes provide adequate area usage when arranged in an array. However, in case of an off-axis beam as described above and shown in FIG. 41, only a fraction of the lens area is used, depending on the offset of the beam from the optical axis. In case of large beam offsets, only a small fraction of the lens area is used, which limits the density of individual beams being propagated through a system of lens arrays.

One aspect of robust optical system design relates to the diameter of the optical beams traversing the system. Too small beam diameters result in too quickly diverging optical beams, which limits the longitudinal distance over which collimated beams can be propagated. For example, a beam of diameter of 100 μm at a wavelength of 1.5 μm results in a beam of diameter about 138 μm over a propagation distance of 5 mm. It is therefore important to make collimated beams wide enough in order to propagate them through optical systems (e.g., the fiber-to-PIC connector 1000 of FIGS. 10A, 10B, 12, 13A) without excessive broadening. In dense arrays, such as the examples shown in FIGS. 20A to 20C, beam diameters are upper-bounded by the distance between adjacent beams within the array.

In some implementations, to improve the area usage, increase the density of individual beams propagated through the system of lens arrays, and increase the beam diameters to the extent possible, an array of circularly asymmetric or rotationally asymmetric optical lenses are provided in which each rotationally asymmetric optical lens has a surface profile similar to a conventional rotationally symmetric optical lens that is truncated such that only the part of the rotationally symmetric optical lens that is intersected by the offset light beam is implemented. This allows the unused area of the conventional lens to be available for use by other rotationally asymmetric optical lenses in the array, thereby increasing the density of individual beams, as compared to using an array of conventional rotationally symmetric optical lenses.

The following describes examples of an array of circularly asymmetric or rotationally asymmetric optical lenses configured to couple an array of incoming beams to an array of vertical coupling elements, e.g., grating couplers, on an active layer of a photonic integrated circuit at an angle of incidence, e.g., in a range from 1° to 30°, 1° to 16°, or 4° to 12°, or about 8°, depending on the design of the vertical coupling elements. For example, if the grating couplers are designed to emit light at an angle θ relative to the normal direction of the main surface of the photonic integrated circuit, then the circularly asymmetric optical lenses are designed such that the incoming beams are focused onto the grating couplers with an angle of incidence equal to θ. The grating couplers are design to reduce the amount of reflection at the interface between the grating couplers and the optical waveguides coupled to the grating couplers.

For example, the circularly asymmetric optical lenses can be free-form optical lenses, which can be free-form off-axis optical lenses. The circularly asymmetric optical lenses can be made by, e.g., grayscale lithography and subsequent etching or 3D printing. The circularly asymmetric optical lenses can be made of, e.g., silicon, glass, or a polymer-based material.

Figure 42:
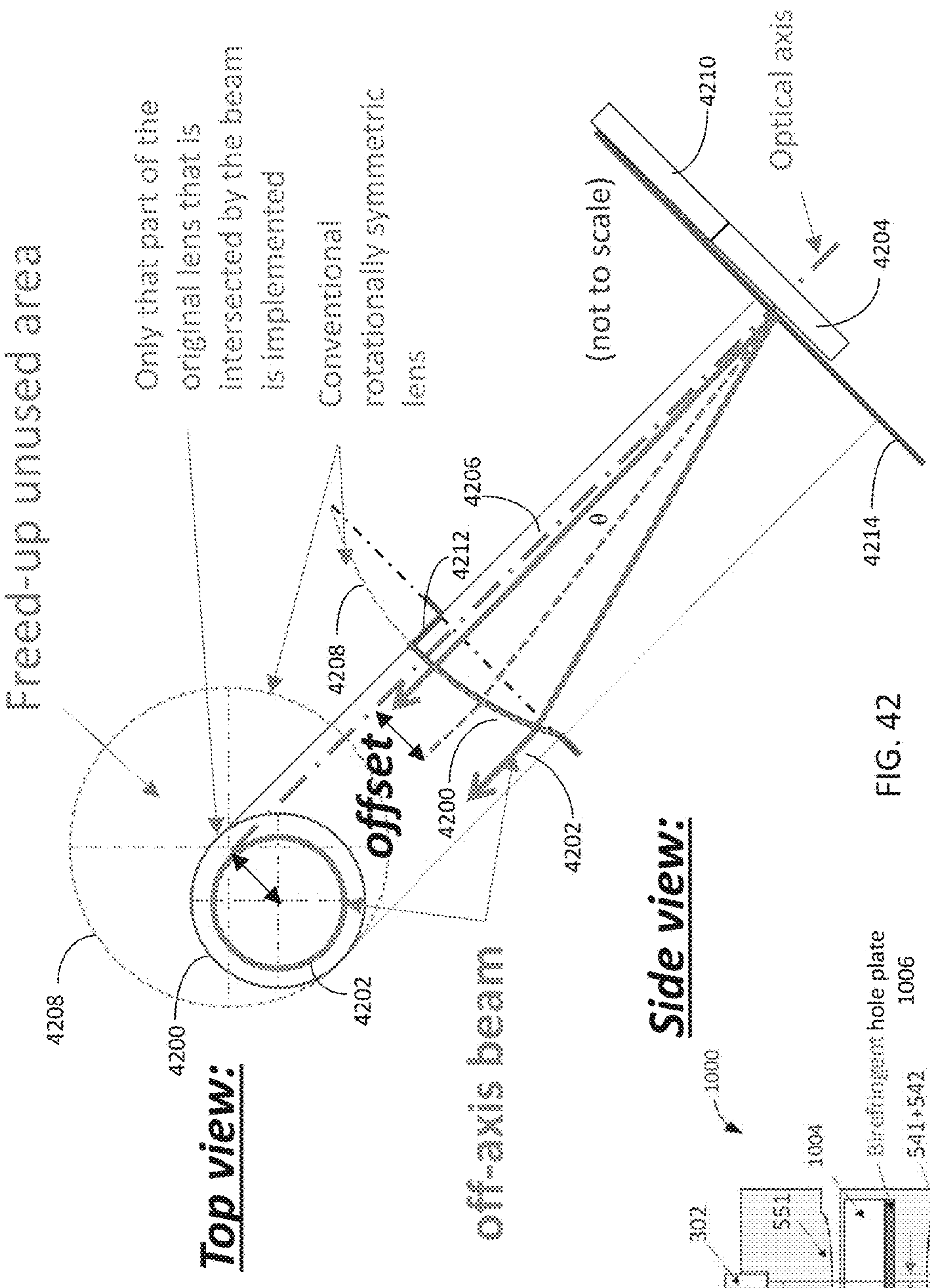
FIG. 42 is a top view and a side view of an example of a circularly asymmetric (or rotationally asymmetric) optical lens.

FIG. 42 shows a top view and a side view of an example of a circularly asymmetric (or rotationally asymmetric) optical lens 4200 that focuses an offset light beam 4202 onto a vertical coupling element 4204 at an angle of incidence θ. The vertical coupling element 4204 can be, e.g., a vertical grating coupler, which can be positioned near the focal plane 4214 of the circularly asymmetric optical lens 4200. The vertical coupling element 4204 is coupled to an optical waveguide 4210 that carries the light received at the vertical coupling element 4204 to other parts of the photonic integrated circuit. An array of the circularly asymmetric optical lens 4200 can be used in, e.g., the fiber-to-PIC connector 1000.

The circularly asymmetric optical lens 4202 is circularly asymmetric, or rotationally asymmetric, with respect to an optical axis 4206. The circularly asymmetric optical lens 4202 can be regarded as implementing only a portion of a circularly symmetric optical lens 4208, shown in dashed lines, that is intersected by the offset light beam 4202. The circularly symmetric optical lens 4208 is rotationally symmetric with respect to the optical axis 4206. In the example shown in FIG. 42, the dimension of the circularly asymmetric optical lens 4200 (measured along a direction parallel to the main surface of the photonic integrated circuit and on a plane that aligns with the optical axis 4206) is slightly larger than the radius of the circularly symmetric lens 4208. In some implementations, depending on the offset between the light beam 4202 and the optical axis 4206, the dimension of the circularly asymmetric optical lens 4200 can be, e.g., 80%, 70%, 60%, 50%, 40%, 30%, or 20%, or any value in the range from 20% to 80% of the diameter of the circularly symmetric lens 4208. By using a smaller circularly asymmetric optical lens 4200 that occupies a smaller area as compared to the circularly symmetric lens 4208, the freed-up space can be used by other circularly asymmetric optical lenses, enabling a higher density of light beams 4202 to be coupled to a correspondingly higher density of grating couplers 4204.

The description above relates to how the circularly asymmetric lens 4200 focuses the light beam 4202 onto the grating coupler 4204 at an angle of incidence θ. The same principle operates in the reverse, i.e., the grating coupler 4204 can emit light toward the circularly asymmetric lens 4200 at an exit angle θ, and the circularly asymmetric lens 4200 collimates the light to form a collimated light beam that is coupled to the corresponding optical fiber core (e.g., 302).

In the example of FIG\. 42, the circularly asymmetric optical lens 4200 has a circular outer circumference as viewed in the direction of the beam path, as if a circular cutout was made from the circularly symmetric lens 4208. A circularly asymmetric optical lens does not necessarily have a circular outer circumference or footprint. The outer circumference or footprint of the circularly asymmetric optical lens can be, e.g., a circle, an oval, a square, a rectangle, a polygon, or any arbitrary shape. The circumference of each circularly asymmetric optical lens 4200 is designed such that the circularly asymmetric lens 4200 can receive as much of the light beam 4202 as possible to achieve a desired signal-to-noise ratio, while adjacent circularly asymmetric optical lenses 4200 are packed as dense as possible without causing interference or crosstalk between adjacent beams.

In some implementations, the circumference or footprint of the circularly asymmetric optical lens 4200 corresponds to the cross-sectional shape of the offset light beam 4202. For example, if the offset light beam 4202 has a circular or oval cross-section, the circularly asymmetric optical lens 4202 is also designed to have a corresponding circular or oval circumference or footprint.

The circularly asymmetric lens 4200 includes an upper surface having a profile or curvature that matches the surface profile or curvature of the circularly symmetric lens 4208. The surface profile or curvature of the circularly asymmetric lens 4200 can correspond to the curvature of a spherical lens. The surface profile or curvature of the circularly asymmetric lens 4200 can correspond to the curvature of an aspherical lens, e.g., in order to correct one or more optical aberrations. For example, in a wavelength divisional multiplexed system, the light beam 4202 carries multiple wavelengths, and the circularly asymmetric optical lenses having aspherical surface profiles can be designed to correct chromatic aberrations to maximize the coupling efficiency at the grating couplers. Such circularly asymmetric optical lenses can be made using techniques that are used to produce free-form lenses.

The circularly asymmetric lens 4200 has an edge 4212 along the outer circumference, which is outside of the area intersected by the light beam 4200. The edge 4212 can be parallel to the optical axis 4206, sloped at an angle relative to the optical axis 4206, have a step shape, or an arbitrary shape.

In some implementations, the light beam 4202 is a Gaussian beam, and the area of the light beam 4200 refers to the region having an intensity that is at least half of the peak intensity of the light beam 4202. The edge of the light beam 4202 having an intensity that is less than half of the peak intensity can extend to or beyond the circumference of the circularly asymmetric lens 4200, so the reflection and/or refraction at the edge 4212 are taken into account in the design of the overall array of circularly asymmetric lenses 4200. The geometry of each individual circularly asymmetric lens 4200 and the spacing between adjacent circularly asymmetric lenses 4200 are selected so that the interference and/or cross-talk between the light beams are negligible.

Figure 43:
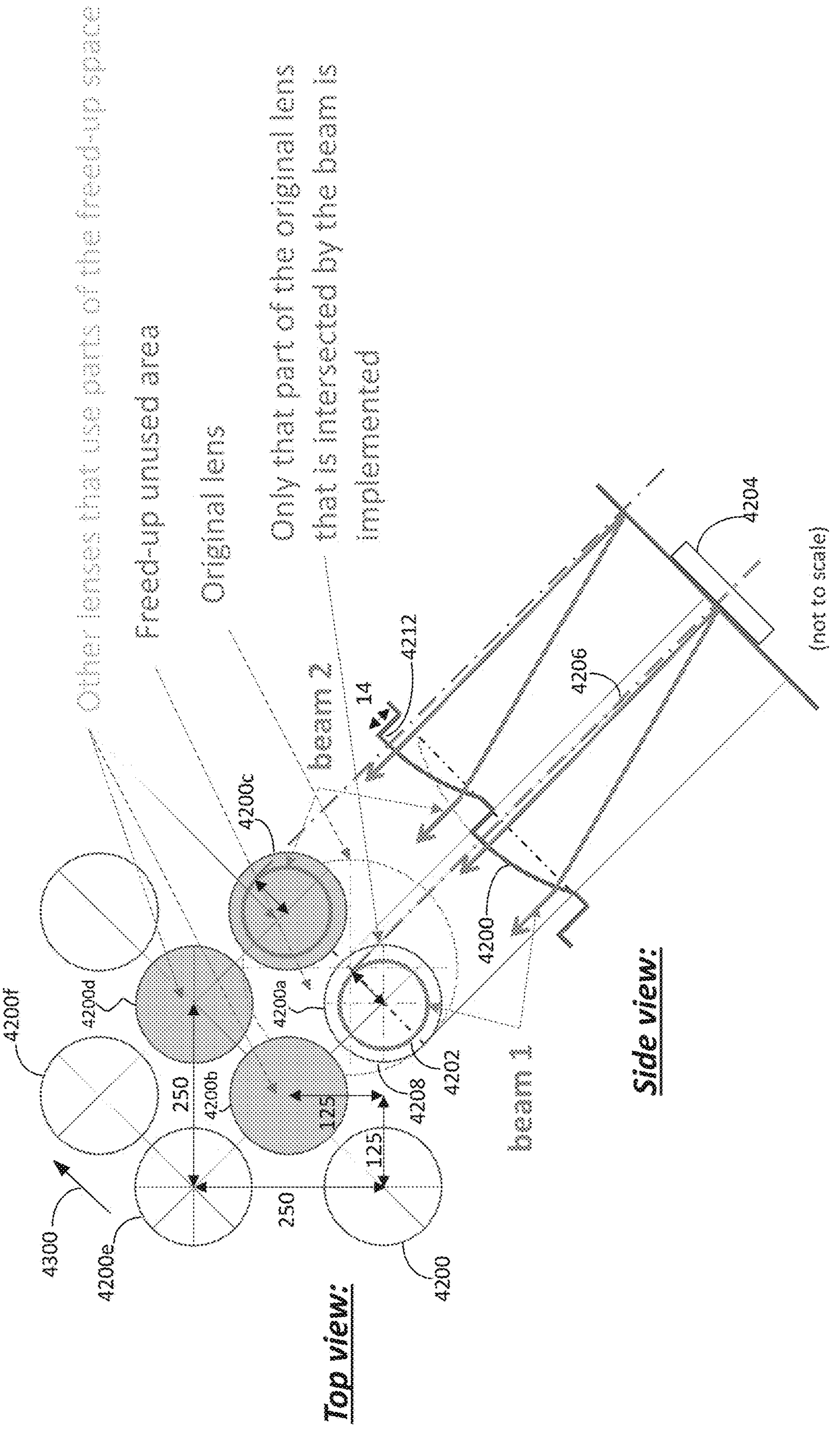
FIG. 43 is a diagram showing a top view and a side view of an array of circularly asymmetric optical lenses

FIG. 43 is a diagram showing a top view and a side view of an array of circularly asymmetric optical lenses 4200 that focus the light beams 4202 toward the vertical grating couplers 4204 at an angle of incidence θ that matches the design of the grating couplers 4204 so as to increase the coupling efficiency at the grating couplers 4204 and reduce the reflections at the interfaces between the grating couplers 4204 and the optical waveguides 4210.

The circularly asymmetric lens 4200*a* occupies a fraction of the area of a conventional circularly symmetric lens 4208 shown in dashed lines. The circularly asymmetric lens 4200 implements a portion of the rotationally symmetric optical lens 4208 that is intersected by the offset light beam 4202. The freed-up unused area is used by other circularly asymmetric lenses 4200. In this example, the adjacent circularly asymmetric lenses 4200*b*, 4200*c*, 4200*d* overlap the area of the circularly symmetric lens 4208, so packing the light beams 4202 as densely as shown in FIG. 43 would be difficult if an array of circularly symmetric lens 4208 were used.

In this example, the distance between adjacent optical fiber cores 302 is about 250 μm, and the distance between two nearest adjacent circularly asymmetric lenses 4200 is about $125\sqrt{2}$ μm. The edge 4212 near the optical axis 4206 has a step height of about 14 μm. The walk-off direction of the walk-off crystal 1004 is in the diagonal direction represented by the arrow 4300. For example, an optical beam from an optical fiber core 302 aligned with a circularly asymmetric lens 4200*e* is split off by the wall-off crystal 1004 into two beams that are aligned with the circularly asymmetric lens 4200*e* and a circularly asymmetric lens 4200*f*, which focus the two beams toward two corresponding grating couplers at the specified angle of incidence.

Figure 44:
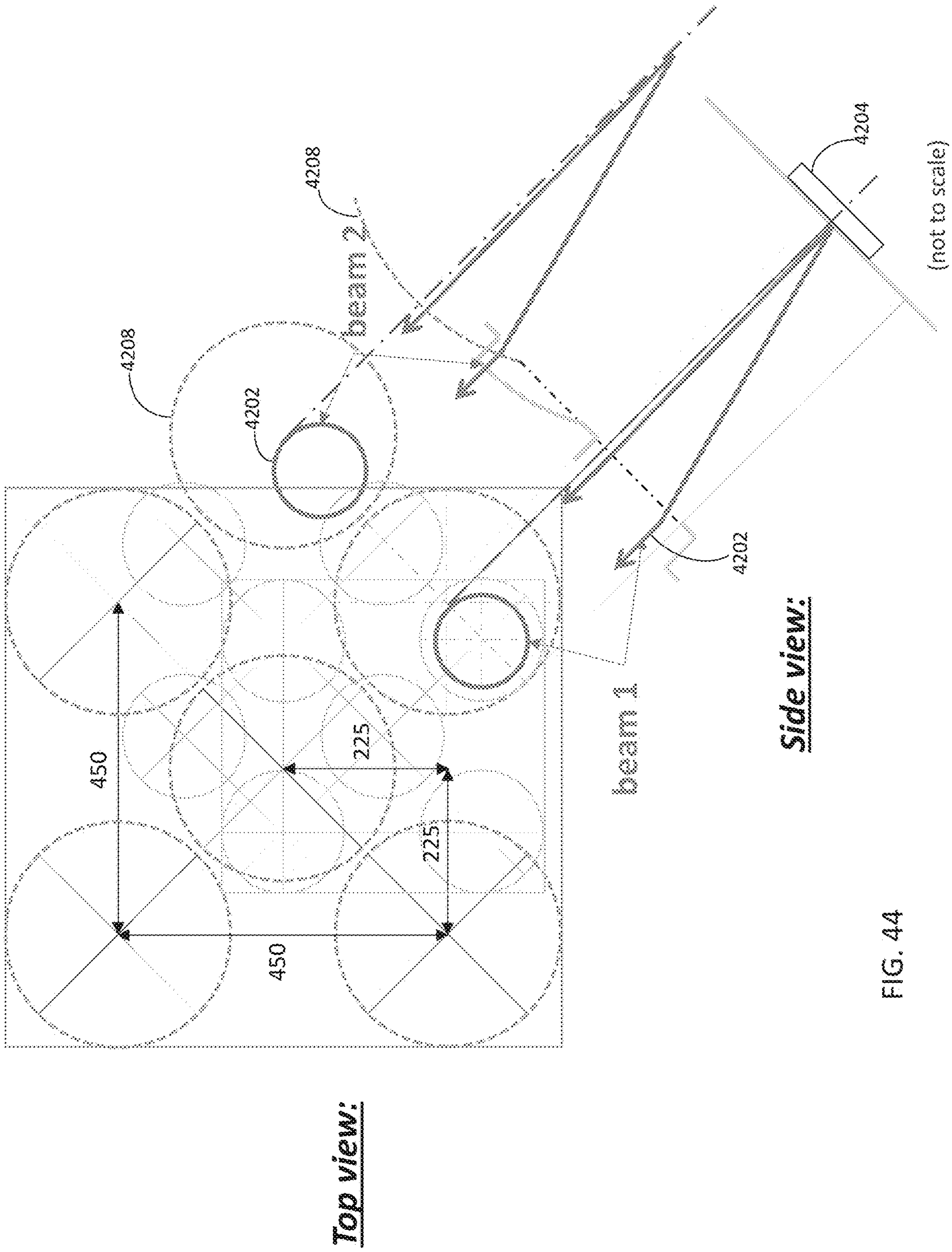
FIG. 44 is a diagram showing a top view and a side view of an array of circularly symmetric optical lenses

FIG. 44 is a diagram showing a top view and a side view of an array of circularly symmetric optical lenses 4208 that focus the light beams 4202 toward the vertical grating couplers 4204 at an angle of incidence θ that matches the design of the grating couplers 4204 so as to increase the coupling efficiency at the grating couplers 4204 and reduce the reflections at the interfaces between the grating couplers 4204 and the optical waveguides 4210. The diameter of the light beam 4202 is less than half of the diameter of the circularly symmetric optical lens 4208. If a fiber-to-PIC connector uses the array of circularly symmetric optical lenses 4208, the distance between the optical fiber cores 302 will be about 450 μm, and the distance between two nearest adjacent circularly symmetric lenses 4208 will be about 225 $\sqrt{2}$ μm. A comparison of FIGS. 43 and 44 shows the advantage of the array of circularly asymmetric lens 4200 in that the array of circularly asymmetric lens 4200 allow the light beams 4202 to be more densely packed without reducing the cross-section size of the light beams, allowing the optical fiber cores 302 to be more densely packed so that more optical fiber cores can be packed inside an optical fiber cable of a given size, and enabling higher data throughput for an optical communication system that has a finite area (e.g., area in the front and/or rear panel) allocated for connecting to optical fiber cables.

Off-axis optical beams commonly occur when coupling light from and to a photonic integrated circuit (PIC) using grating couplers. These devices implemented on the PIC can in principle be designed for arbitrary emission angles. However, usually off-axis designs are preferred (for example emission at 8 degrees), because this allows to reduce the reflection of the component. For many applications of PICs a low reflection or high return loss of the grating coupler is desirable in order to achieve the intended functions.

Figures 45A, 45B:
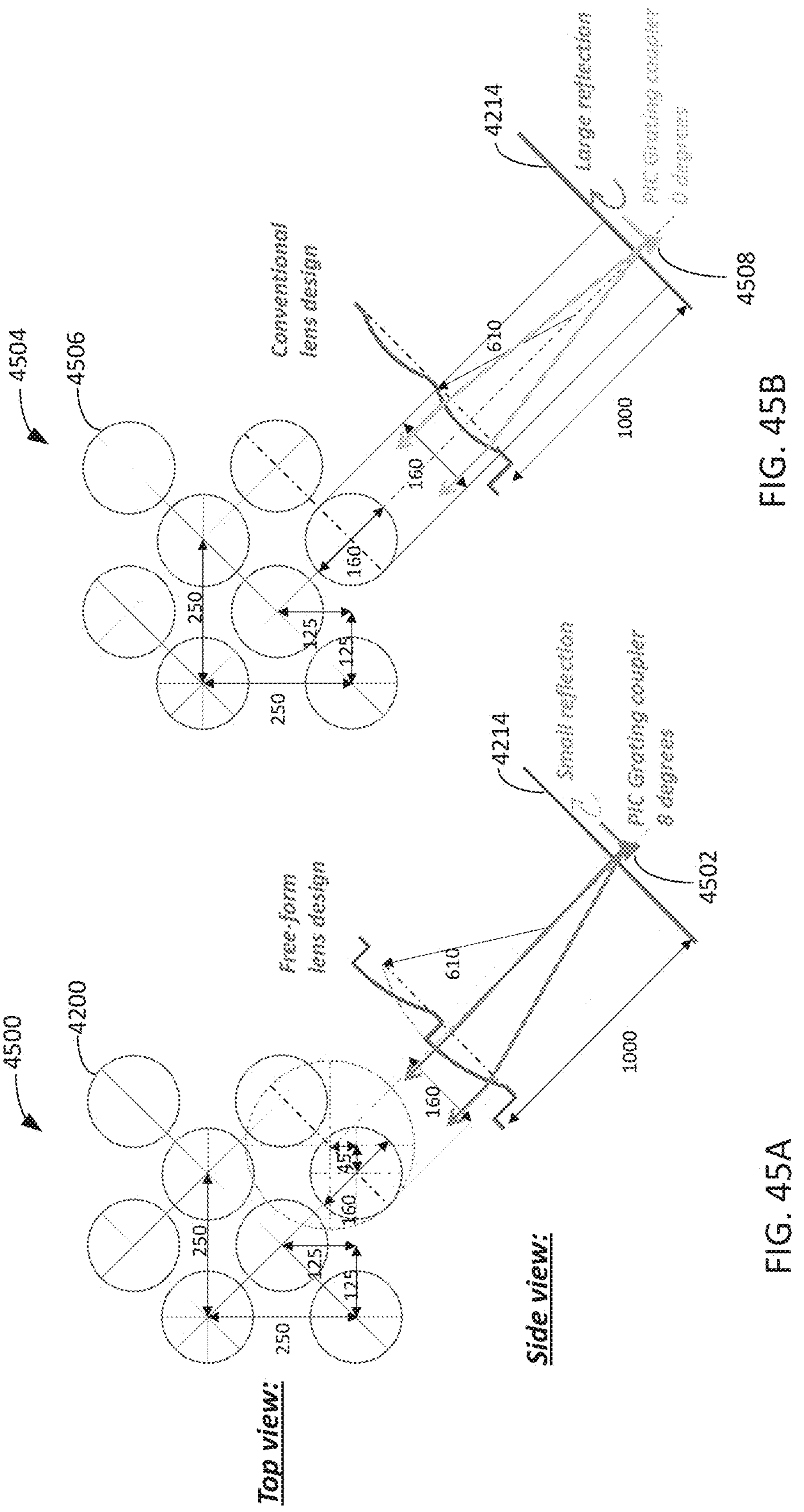
FIG. 45A is a diagram showing an example of a fiber-to-PIC connector that uses an array of circularly asymmetric optical lenses.
FIG. 45B is a diagram showing an example of a fiber-to-PIC connector that uses an array of circularly symmetric optical lenses

FIG. 45A is a diagram showing an example of a fiber-to-PIC connector 4500 that uses an array of circularly asymmetric optical lenses 4200. The fiber-to-PIC connector 4500 is used for coupling optical fibers to a photonic integrated circuit that has grating couplers 4502 that emit light beams at an exit angle θ, e.g., in a range from 1° to 30°, or about 8°. When lightwave signals are transmitted from optical waveguides to the grating couplers 4502, the reflection can be smaller (as compared to the example shown in FIG. 45B).

In this example, similar to the example of FIG. 43, the distance between adjacent optical fiber cores 302 is about 250 μm, and the distance between two nearest adjacent circularly asymmetric lenses 4200 is about 125$\sqrt{2}$ μm. Each circularly asymmetric lens 4200 has a circular circumference (as viewed in the direction of the beam path) that has a diameter of about 160 μm, and the offset distance between the geometric center of the circularly asymmetric lens 4200 (as viewed along the direction of the beam path) and the optical axis is about 45$\sqrt{2}$ μm. The radius of the surface curvature of the circularly asymmetric lens 4200 is about 610 μm. The distance between the circularly asymmetric lens 4200 and the focal plane 4214 is about 1 mm. The parameter values listed above are merely examples, other values can also be used.

FIG. 45B is a diagram showing an example of a fiber-to-PIC connector 4504 that uses an array of circularly symmetric optical lenses 4506. The fiber-to-PIC connector 4504 is used for coupling optical fibers to a photonic integrated circuit that has grating couplers 4508 that emit light beams vertically, i.e., at an exit angle θ=0. When lightwave signals are transmitted from optical waveguides to the grating couplers 4508, the reflection can be larger (as compared to the example shown in FIG. 45A).

In this example, the distance between adjacent optical fiber cores 302 is about 250 μm, and the distance between two nearest adjacent circularly symmetric lenses 4506 is about 125$\sqrt{2}$ μm. Each circularly symmetric lens 4506 has a diameter of about 160 μm. The radius of the surface curvature of the circularly symmetric lens 4506 is about 610 μm. The distance between the circularly asymmetric lens 4506 and the focal plane 4214 is about 1 mm. The parameter values listed above are merely examples, other values can also be used.

In some implementations, the end facets of fiber arrays (FAs) are polished at an angle, e.g., in a range of 4° to 12°, or about 8 degrees, to achieve a high return loss. Therefore, when interfacing a PIC with a fiber array via a micro-optic assembly that includes lens arrays and other optical components, on-axis designs are less preferred. On the other hand, implementing an off-axis design with the same diameter of the collimated beam using an array of conventional lenses, restricts the density of the array. Hence, the array of circularly asymmetric lenses (e.g., 4200) is a solution that enables a dense array of collimated beams for a high return loss interface from the photonic integrated circuit to the fiber array.

Figure 46A:
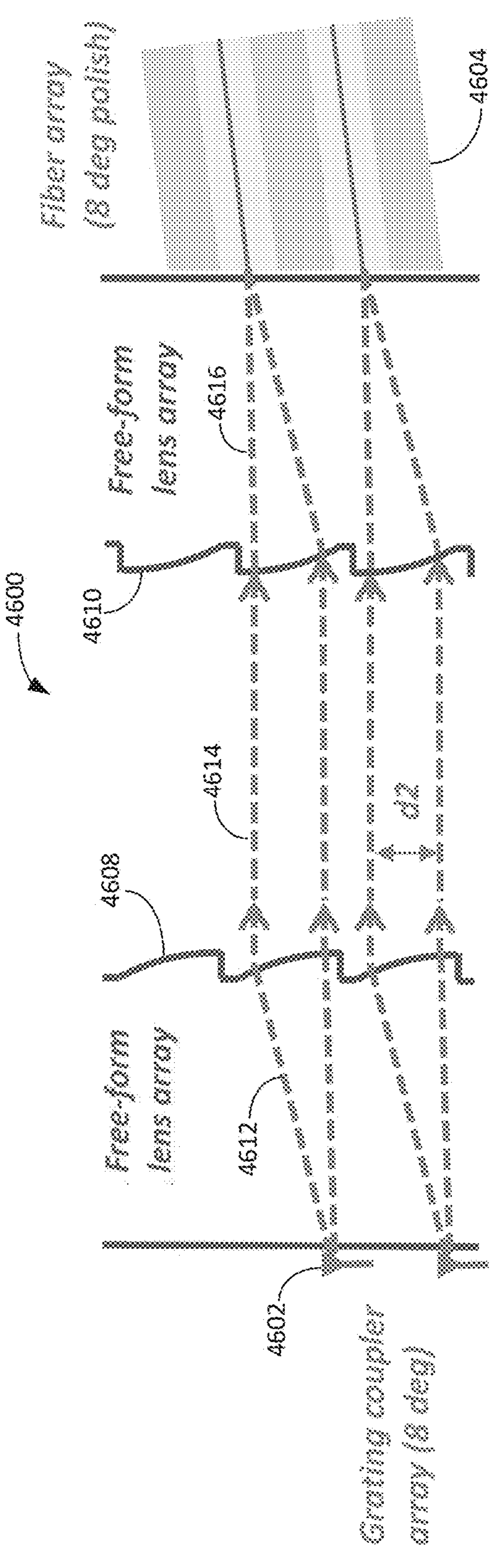
FIGS. 46A and 46B are diagrams showing examples of fiber-to-PIC connectors that each couples an array of grating couplers to a fiber array with end facets polished at an angle.
Figure 46B:
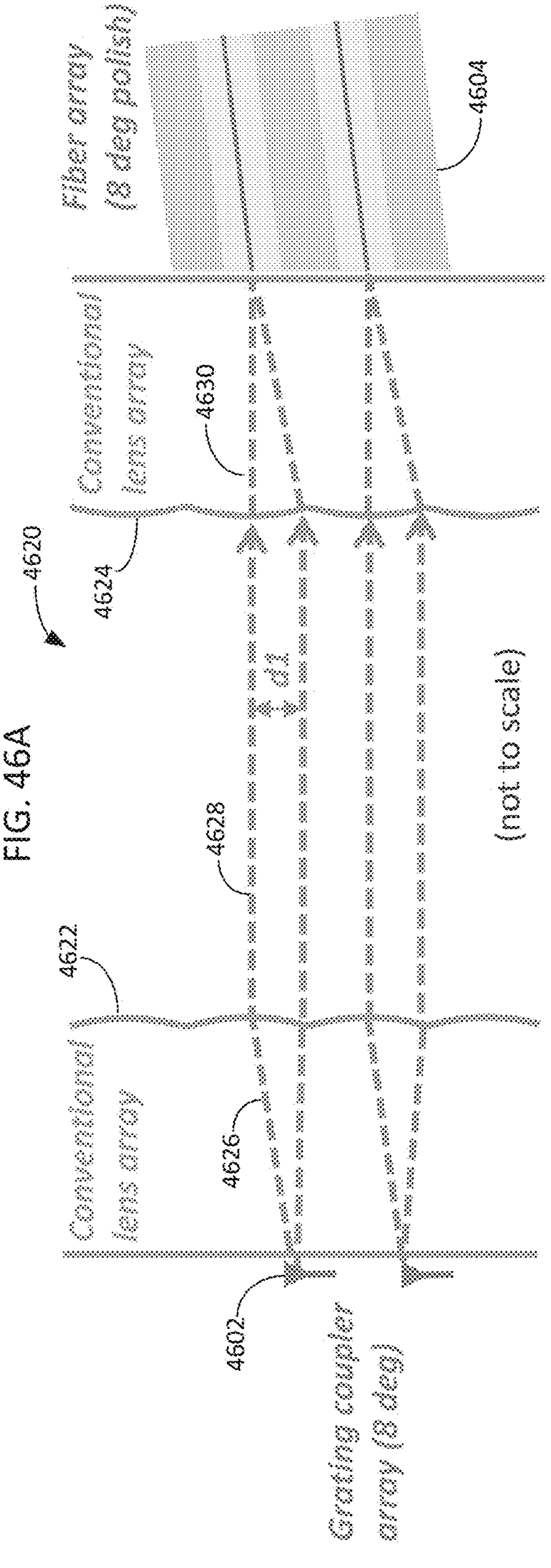

FIGS. 46A and 46B show diagrams that illustrate how the array of circularly asymmetric lenses (e.g., 4200), which can be free-form lenses, enables a larger beam diameter d2>d1 compared to a design with conventional array of circularly symmetric lenses (e.g., 4208) that has the same density of beams.

FIGS. 46A and 46B illustrate how an array of circularly asymmetric lenses enable larger beam diameters as compared to a design using an array of conventional circularly symmetric lenses that has the same density of light beams.

FIG. 46A is a diagram showing an example of a fiber-to-PIC connector 4600 that couples an array of grating couplers 4602 to a fiber array 4604 with end facets polished at an angle of about 8 degrees. The fiber-to-PIC connector 4600 includes a first array of circularly asymmetric lenses 4608 and a second array of circularly asymmetric lenses 4610. For example, the first array of circularly asymmetric lenses 4608 can have the same surface curvature as that of the second array of circularly asymmetric lenses 4610, except that the concave surfaces of the lenses 4608 face the concave surfaces of the lenses 4610. The first array of circularly asymmetric lenses 4608 receive light 4612 emitted from the grating couplers 4602 at an exit angle of 8°, and collimate the light 4612 to produce collimated light beams 4614. The second array of circularly asymmetric lenses 4610 focus the collimated light beams 4614 toward the optical fiber cores of the fiber array 4604, in which the paths of the focused light beams 4616 are at an angle of 8° relative to the paths of the collimated light beams 4614. This way, the focused light beams 4616 are aligned with the optical fiber cores of the fiber array 4604. The diameter of the collimated light beams 4614 is d2.

FIG. 46B is a diagram showing an example of a fiber-to-PIC connector 4620 that couples an array of grating couplers 4602 to a fiber array 4604 with end facets polished at an angle of about 8 degrees. The fiber-to-PIC connector 4620 includes a first array of circularly symmetric lenses 4622 and a second array of circularly symmetric lenses 4624. The first array of circularly symmetric lenses 4622 can have the same surface curvature as that of the second array of circularly symmetric lenses 4624, except that the concave surfaces of the lenses 4622 face the concave surfaces of the lenses 4624. The first array of circularly symmetric lenses 4622 receive light 4626 emitted from the grating couplers 4602 at an exit angle of 8°, and collimate the light 4612 to produce collimated light beams 4628. Each light beam 4626 only intersects a fraction of the corresponding circularly symmetric lens 4622. The second array of circularly symmetric lenses 4624 focus the collimated light beams 4628 toward the optical fiber cores of the fiber array 4604, in which the paths of the focused light beams 4630 are at an angle of 8° relative to the paths of the collimated light beams 4628. This way, the focused light beams 4628 are aligned with the optical fiber cores of the fiber array 4604. The diameter of the collimated light beams 4628 is d1. Because only fractions of the circularly symmetric lenses 4622 and 4624 are used to process (e.g., refract) the light beams 4626 and 4628, the light beams 4628 have smaller diameters as compared to the light beams 4614, i.e., d1<d2. The increased beam diameter d2 significantly relaxes the assembly tolerances of the micro-optic system resulting in an improved manufacturability.

Figure 47:
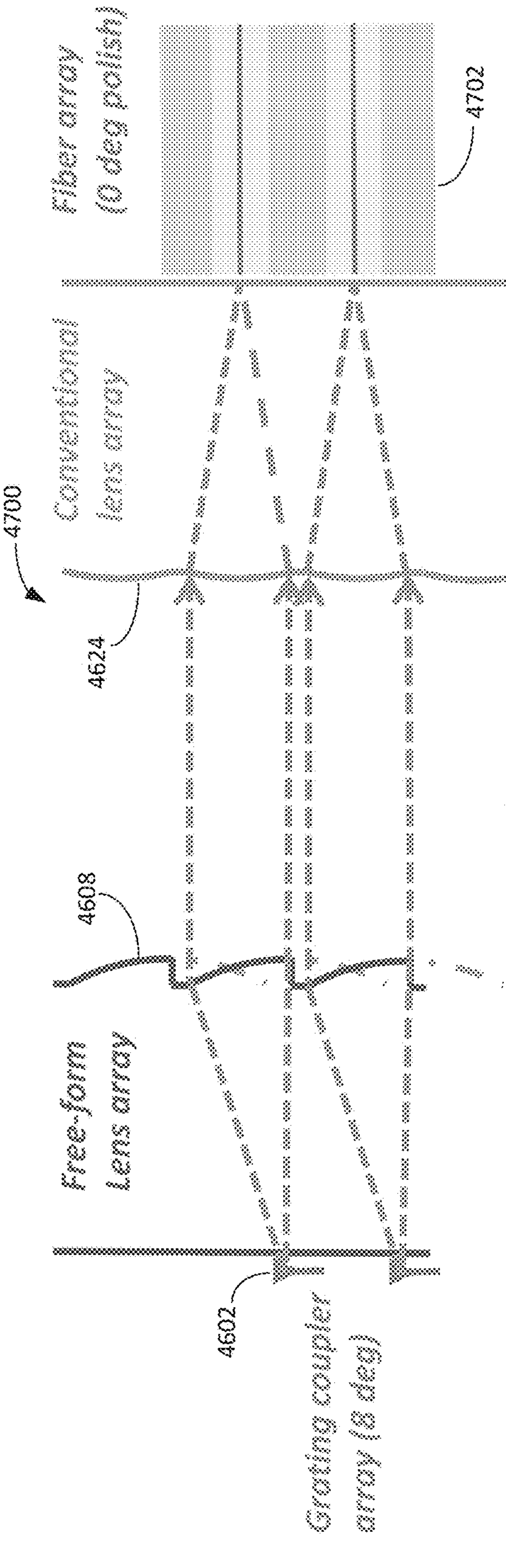
FIG. 47 is a diagram of an example of a fiber-to-PIC connector that includes an array of circularly asymmetric lenses and an array of circularly symmetric lenses.

Referring to FIG. 47, in some implementations, an array of circularly asymmetric lenses can be combined with a conventional lens array (an array of circularly symmetric lenses) when interfacing an array of grating couplers on a PIC that emit at an angle of 8 degrees with a fiber array polished at an angle of 0 degree. For example, a fiber-to-PIC connector 4700 is configured to couple an array of grating couplers 4602 to a fiber array 4702 with 0 degree polish. The fiber-to-PIC connector 4700 includes a first array of circularly asymmetric lenses 4608 that collimate the light from the grating couplers 4602, and a second array of circularly symmetric lenses 4624 that focus the collimated light beams toward the optical fiber cores of the fiber array 4702.

Figure 48:
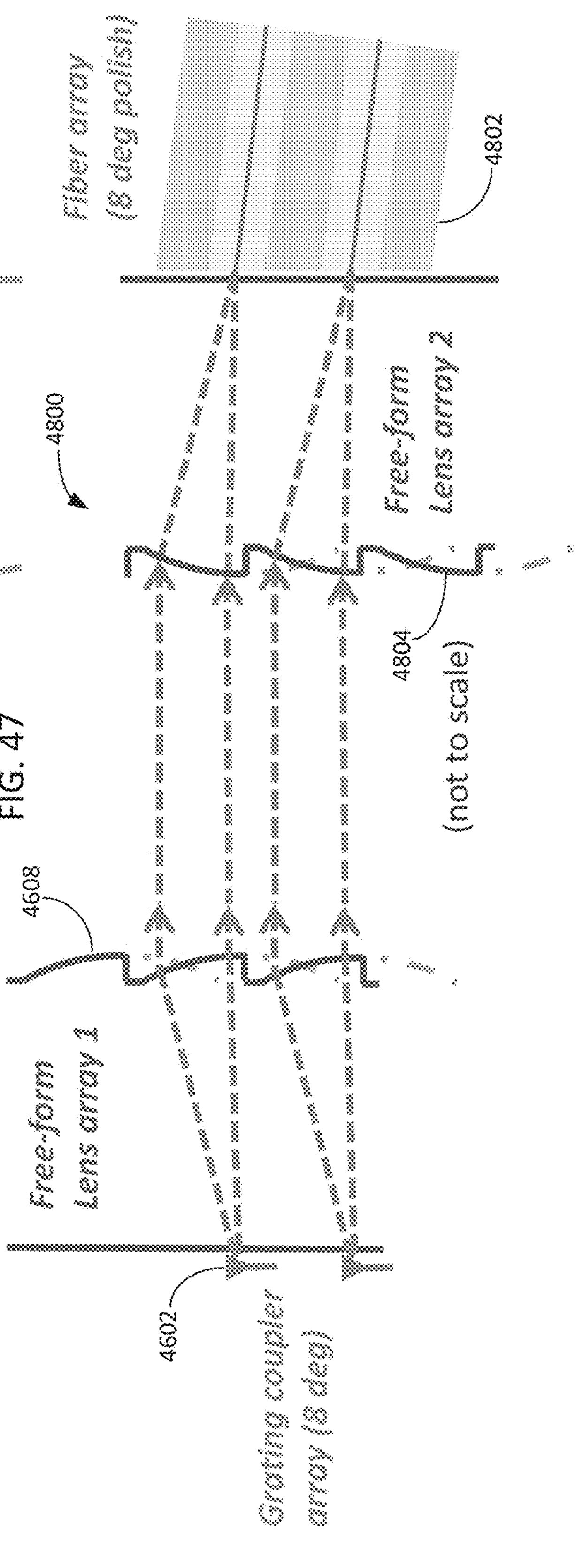
FIG. 48 is a diagram of an example of a fiber-to-PIC connector that includes an assembly of two different arrays of circularly asymmetric lenses.

Referring to FIG. 48, in some implementations, an assembly of two different (mirror-symmetric) versions of the array of circularly asymmetric lenses are combined to interface an array of grating couplers on a PIC that emit at an angle of 8 degrees with a fiber array polished at an angle of −8 degrees. For example, a fiber-to-PIC connector 4800 is configured to couple an array of grating couplers 4602 to a fiber array 4802 with −8 degree polish. The fiber-to-PIC connector 4800 includes a first array of circularly asymmetric lenses 4608 that collimate the light from the grating couplers 4602, and a second array of circularly asymmetric lenses 4804 that focus the collimated light beams toward the optical fiber cores of the fiber array 4802. In this example, the second array of circularly asymmetric lenses 4804 is mirror-symmetric relative to the first array of circularly asymmetric lenses 4608.

Figure 49:
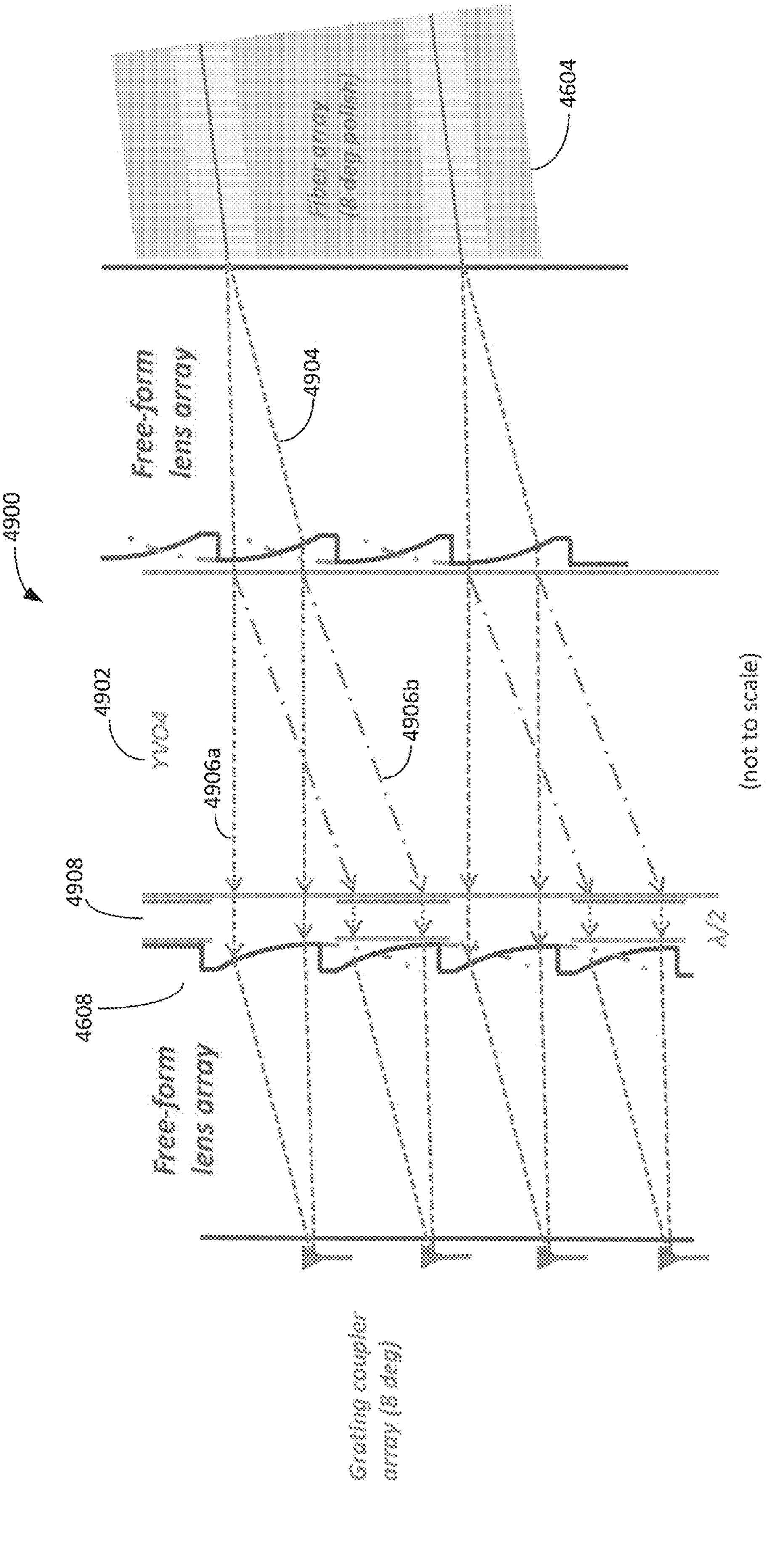
FIG. 49 is a diagram of an example of a fiber-to-PIC connector that includes two arrays of circularly asymmetric lenses, a walk-off crystal, and a birefringent hole plate.

Referring to FIG. 49, in some implementations, two identical arrays of circularly asymmetric lenses are used for a smart connector assembly as previously described. In this example, a fiber-to-PIC connector 4900 includes a second array of circularly asymmetric lenses 4610 that collimates the light emitted from the fiber array 4604 with 8° polish. The fiber-to-PIC connector 4900 includes a walk-off crystal 4902 that splits the incoming collimated beam 4904 into two beam components 4906*a* and 4906*b*, which pass through a birefringent hole plate 4908 (which can be a half-wave plate with openings) in which one beam component has its polarization rotated 90° so that the two beam components 4906*a* and 4906*b* have the same polarization direction. The beam components 4906*a* and 4906*b* are focused by the array of circularly asymmetric lenses 4608 toward the array of grating couplers 4602 at the appropriate angle of incidence.

In this example, only for the first lens array 4608 nearer to the grating coupler array 4602 the full density of the collimated beams is required. Only every second lens is used in the second array of lenses 4610 facing the fiber array 4604. Thus, the second lens array can also be implemented as an array of conventional circularly symmetric lenses. In some implementations, the fiber array is implemented with a 0 degree polish, then the second array of lenses facing the fiber array is implemented as an array of conventional circularly symmetric lenses as shown in the example of FIG. 47.

The following describes examples of using circular polarization maintaining fibers (CPMF) to transmit light from lasers to modulators.

Figure 54:
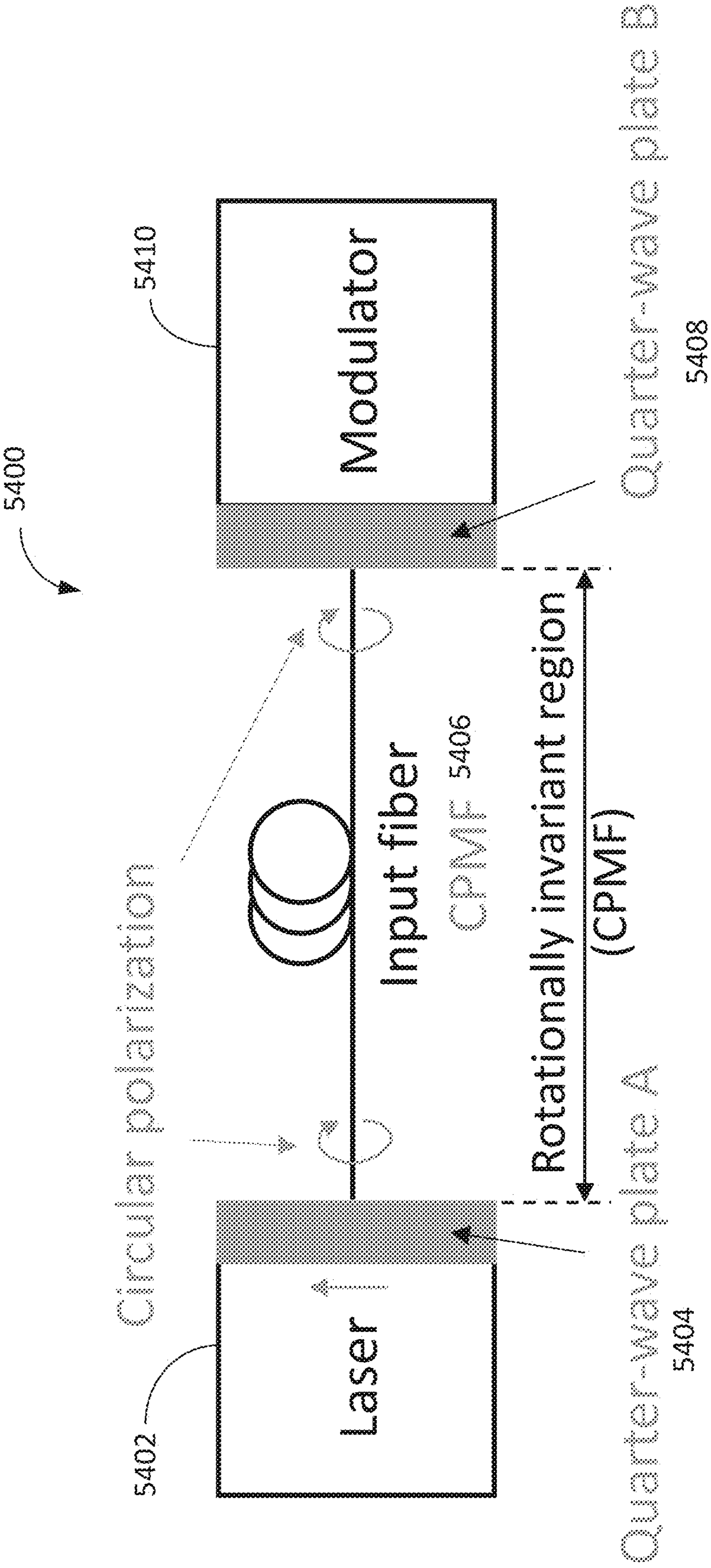
FIGS. 54 to 60 are diagrams of examples of optoelectronic data processing systems that use circular polarization maintaining fibers.

Referring to FIG. 54, in some implementations, an optoelectronic data processing system 5400 includes a laser 5402, a first quarter-wave plate 5404, a circular polarization maintaining fiber (CPMF) 5406, a second quarter-wave plate 5408, a modulator 5410, and other data processing modules not shown in the figure. The laser 5402 provides optical power supply light to the modulator 5410. The laser 5402 generates linearly polarized light, and the first quarter-wave plate 5404 converts the linearly polarized light to circularly polarized light.

While the examples described in FIGS. 54 to 60 use one or more circular polarization maintaining fibers as a mechanism to couple a "laser" to a "modulator," the described technique can be used to generally couple any first device emitting a linear state of polarization to any second device intended to receive a linear state of polarization. The first linearly polarized device does not have to be a laser but can be any device emitting linearly polarized light. The second linearly polarized device does not have to be a modulator but can be any device that preferably accepts linearly polarized light. Examples of the second linearly polarized device include: (a) A lithium niobate optical modulator; (b) a vertical grating coupler on a photonic integrated circuit; (c) a modulator integrated on a photonic integrated circuit. For example, the first linearly polarized device can be a local oscillator that generates a sequence of optical pulses, and the second linearly polarized device can be a coherent optical receiver. For example, the first linearly polarized device can be a single-polarization optical transmitter, and the second linearly polarized device can be a single-polarization optical receiver.

The circular polarization maintaining fiber (CPMF) 5406 transmits the circularly polarized light from the first quarter-wave plate 5404 to the second quarter-wave plate 5408 while maintaining the polarization state of the circularly polarized light. The region between the first quarter-wave plate 5404 and the second quarter-wave plate 5408 forms a rotationally invariant region. The term "rotationally invariant region" in this context refers to a region that includes one or more segments of circular polarization maintaining fiber that are connected to each other as well as to the first and second quarter-wave plates through optical connections. Due to the circular polarization maintaining nature of the circular polarization maintaining fiber, these connections do not have to be rotationally aligned. The second quarter-wave plate 5408 converts the circularly polarized light to linearly polarized light that is passed to the modulator 5410. The modulator 5410 can be, e.g., part of a photonic integrated circuit 2504 (FIG. 27) or part of any other optoelectronic module.

An advantage of this design is that the circular polarization maintaining fiber 5406 can be mounted to the first quarter-wave plate 5404 and the second quarter wave plate 5408 at any rotational angle, reducing the alignment or packaging cost. The two ends of the circular polarization maintaining fiber 5406 can be randomly rotated without an effect on the linear polarization orientation generated after the second quarter-wave plate 5408, as long as the linear polarization of the laser 5402 is oriented correctly with respect to the first quarter-wave plate 5404, and the second quarter-wave plate 5408 is oriented correctly with respect to the modulator 5410. The critical rotational alignment is not at the ends of the optical fiber, but rather at the quarter-wave plates 5404 and 5408. Because the quarter-wave plates 5404 and 5408 are attached to the laser 5402 and the modulator 5410, respectively, during device assembly, this is overall likely to be more convenient and/or cheaper than making sure that the optical fiber is rotationally aligned at each fiber connector along the way.

Figure 55:
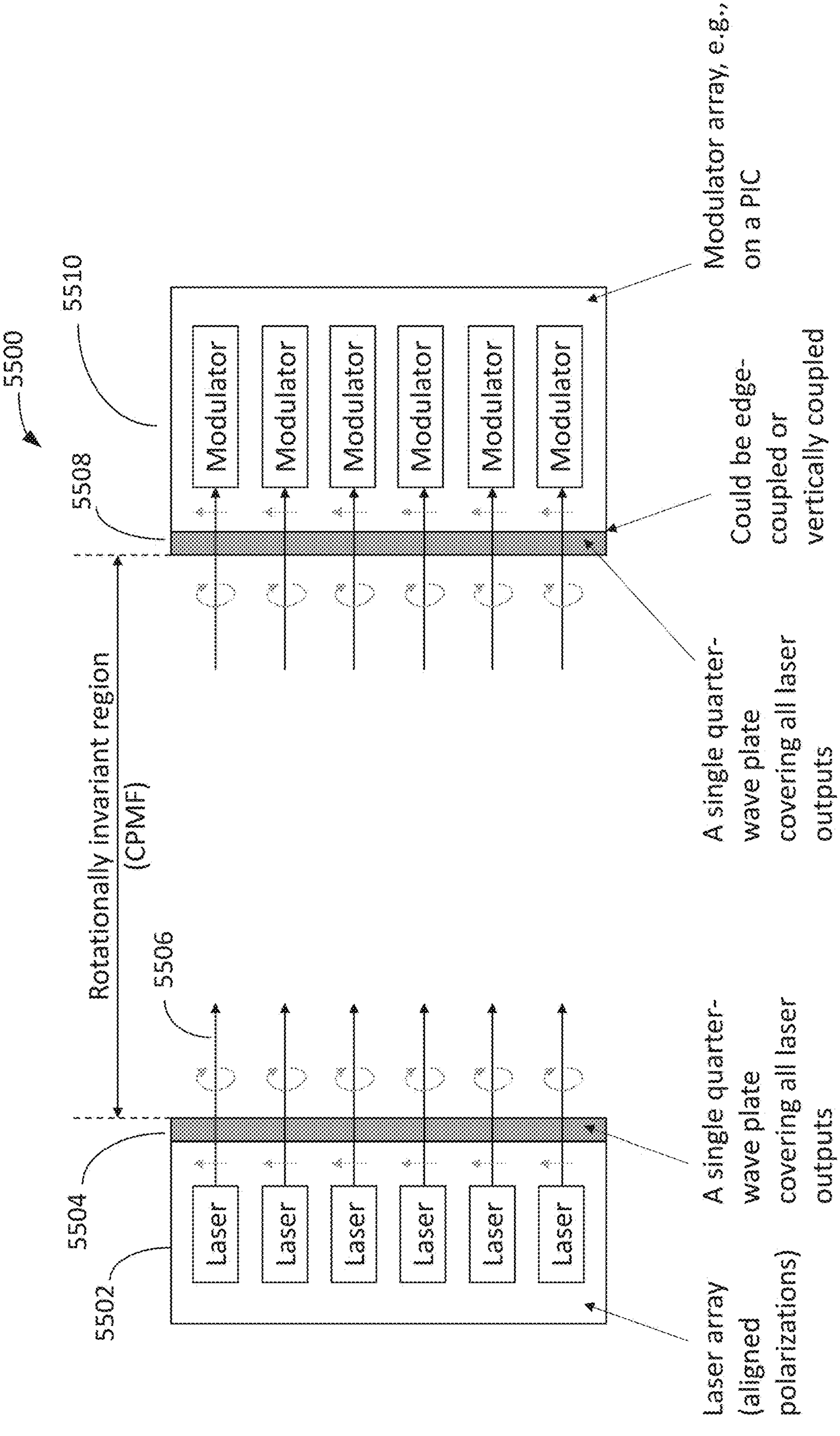

Referring to FIG. 55, in some implementations, an optoelectronic data processing system 5500 includes a laser array 5502, a first single quarter-wave plate 5504, a plurality of circular polarization maintaining fibers (CPMFs) 5506, a second single quarter-wave plate 5508, a modulator array 5510, and other data processing modules not shown in the figure. The laser array 5502 includes a plurality of lasers that have aligned polarizations, and can have the same wavelength or different wavelengths. The laser array 5502 provides optical power supply light to the modulator array 5510. The modulator array 5510 includes a plurality of modulators, which can be disposed on, e.g., a photonic integrated circuit. The circular polarization maintaining fibers (CPMFs) 5506 transmit light from the laser array 5502 to the modulator array 5510, in which the light from each laser is transmitted through one of the polarization maintaining fibers 5506 to a corresponding modulator.

The first single quarter-wave plate 5504 covers all laser outputs and converts the linearly polarized laser outputs to respective circularly polarized light. Each of the circular polarization maintaining fibers (CPMFs) 5506 transmits circularly polarized light from the first single quarter-wave plate 5504 to the second single quarter-wave plate 5508. The second single quarter-wave plate 5508 converts the circularly polarized light from all of the circular polarization maintaining fibers 5506 to linearly polarized light that are passed to respective modulators. The second single quarter-wave plate 5508 can be edge-coupled or vertically coupled to the photonic integrated circuit that includes the array of modulators. The region between the first single quarter-wave plate 5504 and the second single quarter-wave plate 5508 forms a rotationally invariant region.

Each of the lasers in the laser array 5502 generates linearly polarized light. A first laser generates a first linearly polarized light, and a second laser generates a second linearly polarized light. When we say that the first laser and the second laser have aligned polarizations, we mean that the first linearly polarized light has a polarization direction that is substantially parallel to the polarization direction of the second linearly polarized light. The term "substantially parallel" is meant to take into account tolerances in the manufacturing and/or assembling process. For example, in some contexts, two directions can be "aligned" or "substantially parallel" when the angle between the two directions is within 10°, or within 5°, or within 1°. Similarly, in some contexts, two directions can be "substantially orthogonal" when the angle between the two directions is within a range of 80° to 100°, or within a range of 85° to 95°, or within a range of 89° to 91°.

An advantage of this design is that each of the circular polarization maintaining fibers 5506 can be mounted to the first single quarter-wave plate 5504 and the second single quarter wave plate 5508 at any rotational angle, reducing the alignment or packaging cost.

Figure 56:
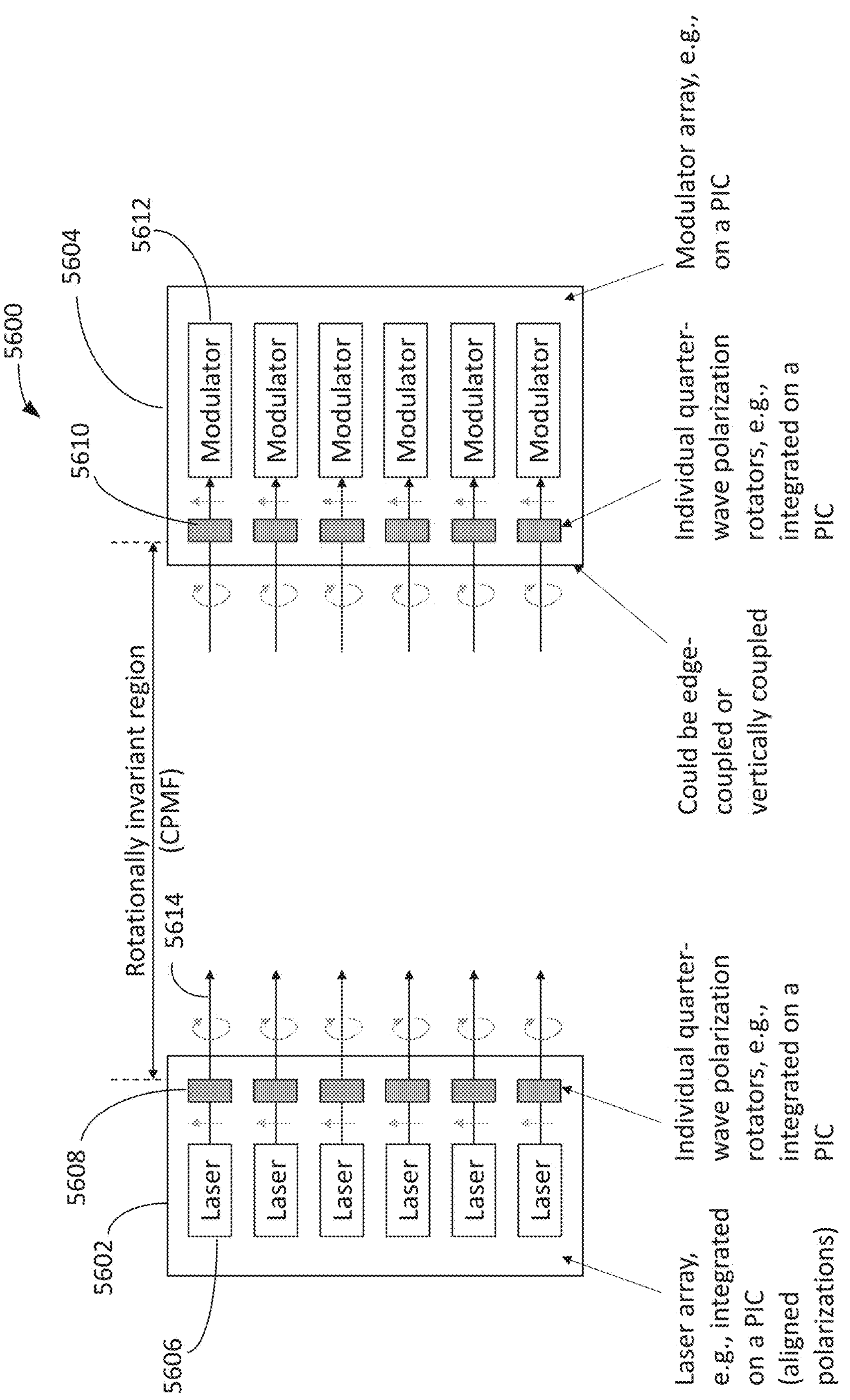

Referring to FIG. 56, in some implementations, an optoelectronic data processing system 5600 includes a first photonic integrated circuit 5602 and a second photonic integrated circuit 5604. The first photonic integrated circuit 5602 includes an array of lasers 5606 and a first array of individual quarter-wave polarization rotators 5608. The second photonic integrated circuit 5604 includes a second array of individual quarter-wave polarization rotators 5610 and an array of modulators 5612. The array of lasers 5606 provide optical power supply light to the array of modulators 5612.

A plurality of circular polarization maintaining fibers (CPMFs) 5614 are optically coupled to the first array of individual quarter-wave polarization rotators 5608 and the second array of individual quarter-wave polarization rotators 5610. The region between the first array of individual quarter-wave polarization rotators 5608 and the second array of individual quarter-wave polarization rotators 5610 forms a rotationally invariant region. The circular polarization maintaining fibers 5614 can be edge-coupled or vertically coupled to the photonic integrated circuit 5604. The laser 5606 generates linearly polarized light that is converted to circularly polarized light by the first individual quarter-wave polarization rotator 5608. The circularly polarized light is transmitted by the circular polarization maintaining fiber 5614 to the second individual quarter-wave polarization rotator 5610, which converts the circularly polarized light to linearly polarized light that is passed on to the modulator 5612.

In the example above, the array of lasers 5606 and the array of individual quarter-wave polarization rotators 5608 can be integrated on a substrate or a module that is different from a photonic integrated circuit. Similarly, the array of individual quarter-wave polarization rotators 5610 and the array of modulators 5612 can be integrated on a substrate or a module that is different from a photonic integrated circuit.

An advantage of this design is that the circular polarization maintaining fibers 5614 can be mounted to the first individual quarter-wave polarization rotators 5608 and the second photonic integrated circuit 5604 at any rotational angle, reducing the alignment or packaging cost.

The following describes examples in which a single circular polarization maintaining fiber is used to transmit photon supply light to two modulators.

Figure 57:
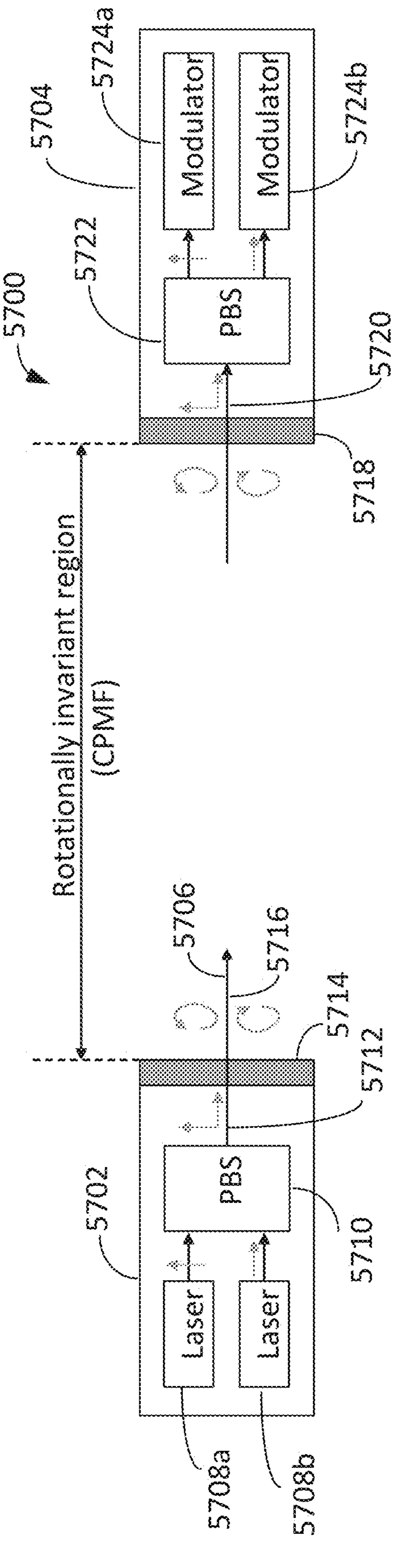

Referring to FIG. 57, in some implementations, an optoelectronic data processing system 5700 includes an optical power supply source 5702 and a photonic integrated circuit 5704, in which a circular polarization maintaining fiber 5706 is optically coupled between the optical power supply source 5702 and the photonic integrated circuit 5704. The region between the optical power supply source 5702 and the photonic integrated circuit 5704 forms a rotationally invariant region.

The optical power supply source 5702 includes a first laser *5708a* and a second laser *5708b*. The first laser *5708a* generates a first laser light having a first linear polarization, and the second laser *5708b* generates a second laser light having a second linear polarization. For example, the first linear polarization can be substantially orthogonal to the second linear polarization. The first and second laser lights are combined at a polarization beam splitter 5710 to generate a first combined light 5712 having a first component and a second component, in which the first component has the first linear polarization and the second component has the second linear polarization. A first quarter-wave plate 5714 converts the first combined light 5712 to second combined light 5716, which in this example is a circularly polarized combined light. The second combined light 5716 includes a first component having a first circular polarization (e.g., right-handed circular polarization) and a second component having a second circular polarization (e.g., left-handed circular polarization). The first component (having the first linear polarization) of the first combined light 5712 is converted by the quarter-wave plate 5714 to the first component (having the first circular polarization) of the second combined light 5716. The second component (having the second linear polarization) of the first combined light 5712 is converted by the quarter-wave plate 5714 to the second component (having the second circular polarization) of the second combined light 5716.

The photonic integrated circuit 5704 includes a quarter-wave plate 5718 that receives the second combined light 5716 transmitted by the circular polarization maintaining fiber 5706, and converts the second combined light 5716 to third combined light 5720. The third combined light 5720 includes a first component that has a first linear polarization and a second component that has a second linear polarization, in which the second linear polarization is substantially orthogonal to the first linear polarization. The quarter-wave plate 5718 converts the first component (having the first circular polarization) of the second combined light 5716 to the first component (having the first linear polarization) of the third combined light 5720. The quarter-wave plate 5718 converts the second component (having the second circular polarization) of the second combined light 5716 to the second component (having the second linear polarization) of the third combined light 5720. A polarization beam splitter 5722 splits the third combined light 5720 into first light having the first linear polarization and second light having the second linear polarization. The first light is sent to a first modulator 5724*a*, and the second light is sent to a second modulator 5724*b*.

An advantage of this design is that the circular polarization maintaining fiber 5706 can be mounted to the first quarter-wave plate 5714 and the second quarter-wave plate 5718 at any rotational angle, reducing the alignment or packaging cost.

Figure 58:
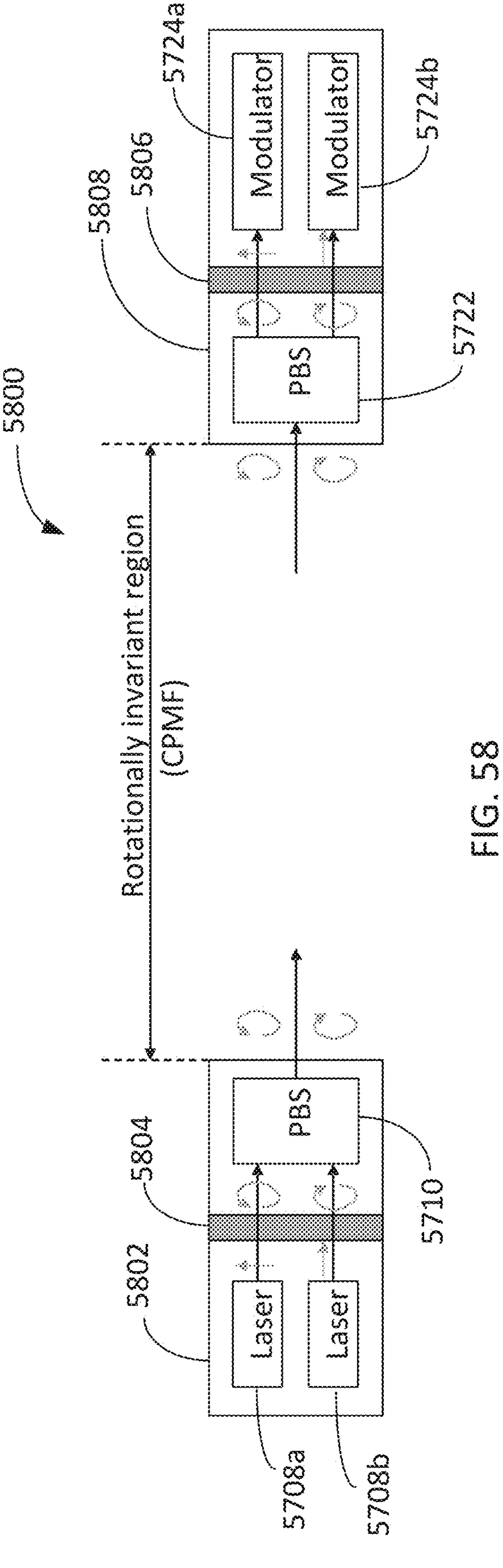

Referring to FIG. 58, in some implementations, an optoelectronic data processing system 5800 includes an optical power supply source 5802 and a photonic integrated circuit 5806, in which a circular polarization maintaining fiber 5706 is optically coupled between the optical power supply source 5802 and the photonic integrated circuit 5806. The region between the optical power supply source 5802 and the photonic integrated circuit 5806 forms a rotationally invariant region. In the optical power supply source 5802, a quarter-wave plate 5804 is positioned between the lasers 5708*a* and 5708*b* and the polarization beam splitter 5710. In the photonic integrated circuit 5806, the quarter-wave plate 5808 is positioned between the polarization beam splitter 5722 and the modulators 5724*a* and 5724*b*. In this example, at the optical power supply source 5802, the linearly polarized lights from the lasers 5708*a* and 5708*b* are converted to circularly polarized lights before being combined by the polarization beam splitter 5710. At the photonic integrated circuit 5806, the polarization beam splitter 5722 splits the light from the circular polarization maintaining fiber 5706 into two circularly polarized lights, which are converted by the quarter-wave plate 5808 into two linearly polarized lights that are sent to the modulators 5724*a* and 5724*b*.

Figure 59:
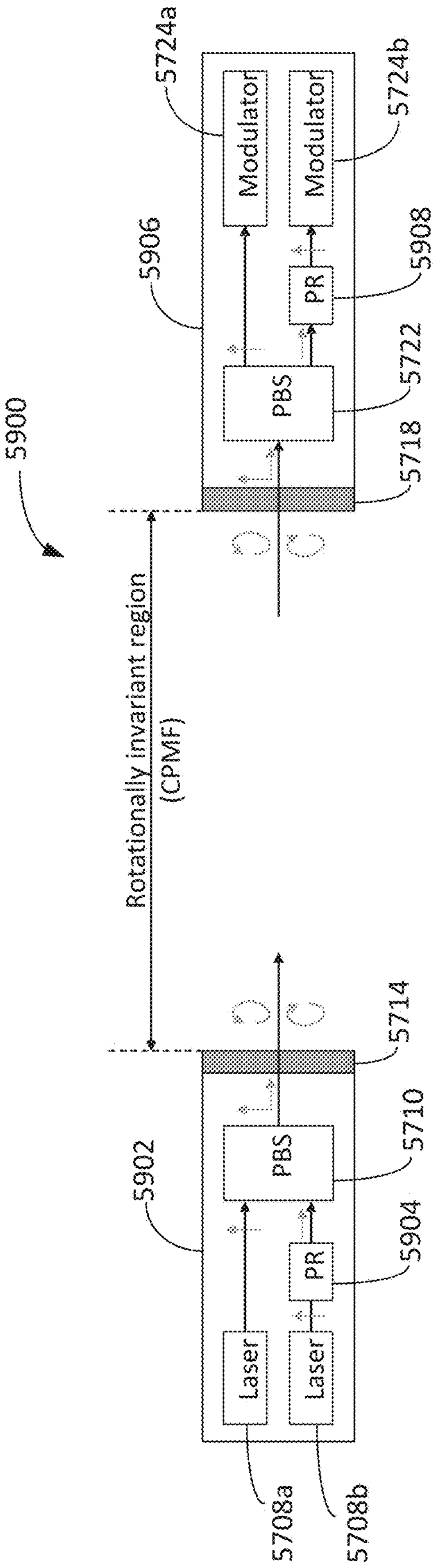

Referring to FIG. 59, in some implementations, an optoelectronic data processing system 5900 includes an optical power supply source 5902 and a photonic integrated circuit 5906, in which a circular polarization maintaining fiber 5706 is optically coupled between the optical power supply source 5902 and the photonic integrated circuit 5906. The region between the optical power supply source 5902 and the photonic integrated circuit 5906 forms a rotationally invariant region. The optical power supply source 5902 includes a first laser 5708*a* and a second laser 5708*c* that have the same linear polarization, i.e., the polarization direction of the linearly polarized light generated by the first laser 5708*a* is substantially parallel to the polarization direction of the linearly polarized light generated by the second laser 5708*b*. A polarization rotator 5904 is provided to rotate the polarization of the light output from the second laser 5708*c* by 90° before being combined with the light from the first laser 5708*a* at the polarization beam splitter 5710.

At the photonic integrated circuit 5906, a polarization rotator 5908 is provided to rotate the polarization of one of the light output from the polarization beam splitter by 90° before being sent to a modulator 5724*c*. The modulator 5724*c* and the modulator 5724*a* are configured to receive light having the same linear polarization. By comparison, in the examples of FIGS. 57 and 58, the modulators 5724*a* and 5724*b* are configured to receive light having different linear polarizations (e.g., polarizations that are orthogonal to each other).

Figure 60:
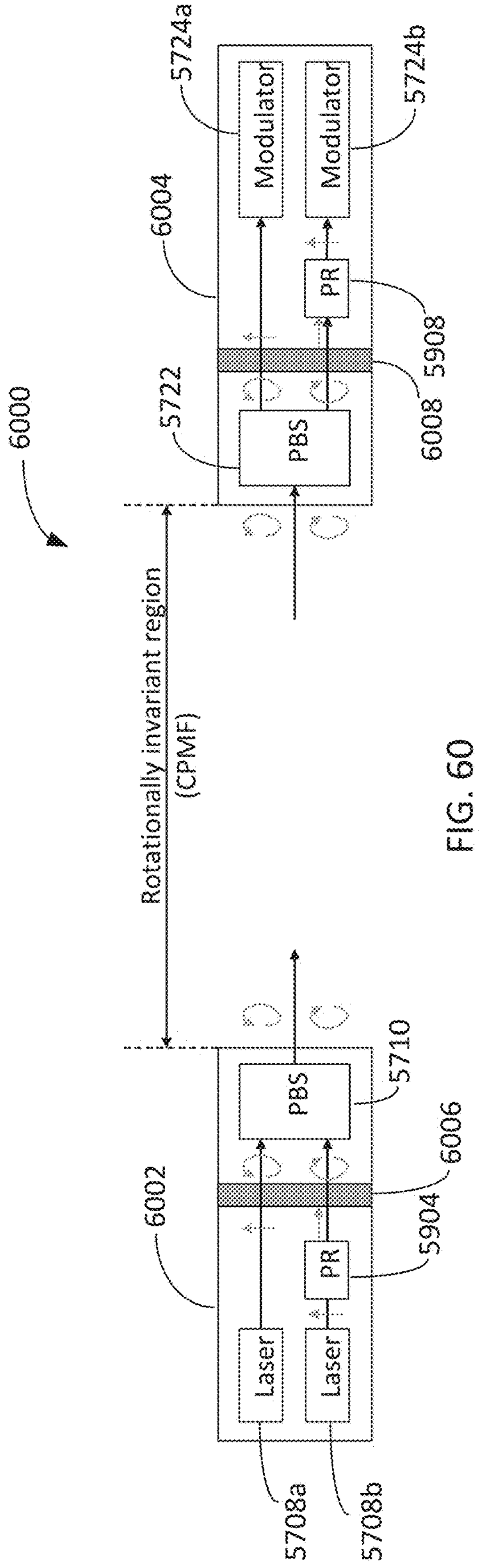

Referring to FIG. 60, in some implementations, an optoelectronic data processing system 6000 includes an optical power supply source 6002 and a photonic integrated circuit 6004, in which a circular polarization maintaining fiber 5706 is optically coupled between the optical power supply source 6002 and the photonic integrated circuit 6004. The region between the optical power supply source 6002 and the photonic integrated circuit 6004 forms a rotationally invariant region. At the optical power supply source 6002, a quarter-wave plate 6006 is positioned upstream of the polarization beam splitter 5710, and downstream of the polarization rotator 5904 and the laser 5708*a*. In the photonic integrated circuit 6004, the polarization beam splitter 6008 is positioned downstream of the polarization beam splitter 5722, and upstream of the polarization rotator 5908 and the modulator 5724*a*.

Figure 61:
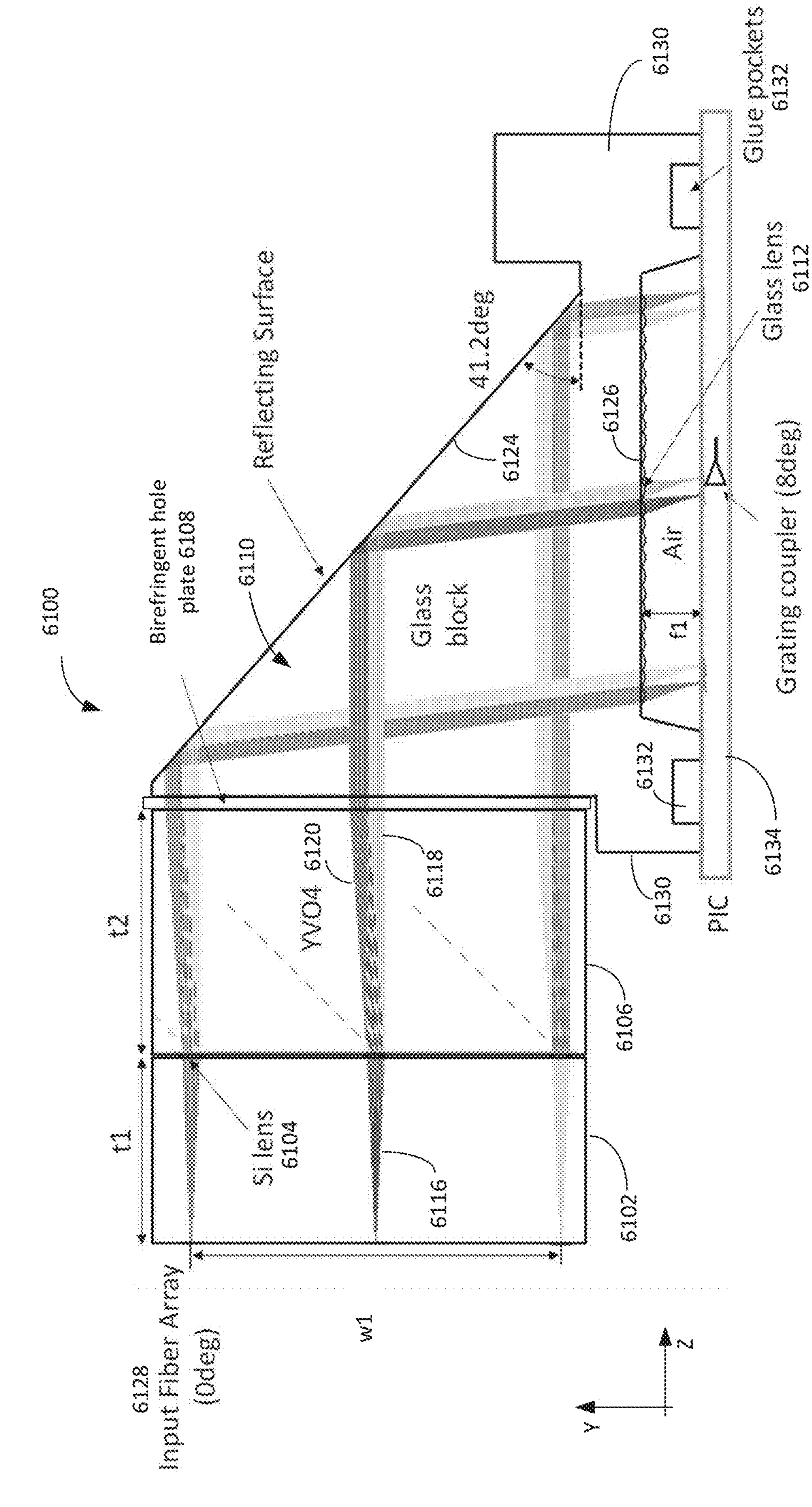
FIGS. 61 to 64 are diagrams of examples of fiber-to-photonic integrated circuit connectors.

FIG. 61 is a side view of an example of a fiber-to-PIC connector 6100 that couples an input fiber array to a photonic integrated circuit. The fiber-to-PIC connector 6100 enables horizontal fiber attachment, i.e., at the attachment locations, the fibers extend parallel to the top surface of the photonic integrated circuit. The diagram shows a ray tracing simulation of the design using a silicon lens array for coupling to an input fiber array. The fiber-to-PIC connector 6100 enables incoming light beams to be directed at the vertical coupling elements on the photonic integrated circuit at an angle of incidence θ1 that maximizes the coupling efficiency of the vertical coupling elements. The angle of incidence θ1 can be in a range, e.g., from 1° to 30°, 1° to 16°, or 4° to 12°, or about 8°, depending on the design of the vertical coupling elements. The vertical coupling elements can be, e.g., vertical grating couplers. The fiber-to-PIC connector 6100 also enables outgoing light beams to be emitted from the vertical coupling elements at the angle θ1 and be coupled to the horizontally oriented fibers of the input fiber array.

In some implementations, the fiber-to-PIC connector 6100 includes a first lens array 6102 having an array of lenses 6104, a birefringent beam displacement element (or walk-off element) 6106, a birefringent hole plate 6108, a turning mirror 6110 having a reflecting surface 6124, and a second lens array 6112. The first lens array 6102 can be made of, e.g., silicon. Each lens in the array 6102 is formed by a curved interface to another material with different refractive index. An input fiber array 6128 is vertically coupled to the first lens array 6102 with, e.g., a 0° incidence angle. The turning mirror 6110 can be, e.g., a glass prism block.

A light beam 6116 from an input fiber of the fiber array 6128 is collimated by a corresponding lens 6104 in the first lens array 6102. The first lens array 6102 is attached to the birefringent beam displacement element 6106 using, e.g., an optical adhesive. The birefringent beam displacement element 6106 separates the collimated light beam into a first beam component 6118 that has a first polarization and a second beam component 1028 that has a second polarization. For example, the second polarization can be rotated 90° relative to the first polarization. The birefringent beam displacement element 6106 can be made of a birefringent material, e.g., properly oriented calcite, yttrium orthovanadate ($YVO_4$), or a-BBO. The birefringent beam displacement element 6106 separates the second beam component 6120 from the first beam component 6118 by a walk-off distance.

In some implementations, the birefringent hole plate 6108 can include regions that have a birefringent material, and regions that have openings (or regions without the birefringent material), similar to the birefringent hole plate 1006 (FIG. 13C), 1402 (FIG. 14B), 1502 (FIG. 15B), 1602 (FIG. 16B), 1702 (FIG. 17B), 1802 (FIG. 18B), 1902 (FIG. 19B), 2002 (FIG. 20B), 2100 (FIG. 21A), 2104 (FIG. 21B), 2108 (FIG. 21C), 2116 (FIG. 21D), or 3602 (FIG. 36). In some implementations, the birefringent hole plate 6108 can include regions that have a birefringent material, and regions that have non-birefringent optically transparent material, similar to the patterned birefringent plate 5004 (FIG. 50) or 5104 (FIG. 51).

The first beam component 6118 passes through an opening or a non-birefringent optically transparent material in the birefringent hole plate 6108 and maintains its polarization. The second beam component 6120 passes through the birefringent material of the birefringent hole plate 6108, which causes its polarization to rotate 90° and have a polarization parallel to the first beam component 6118.

The reflecting surface 6124 is at an angle θ2 relative to the plane of the main surface of a photonic integrated circuit 6134. The turning mirror 6110 redirects the first and second beam components 6118, 6120 toward the photonic integrated circuit 6134. The angle θ2 is also referred to as the turning mirror angle. The first and second beam components 6118, 6120 pass through corresponding lenses of a second lens array 6112, which focus the first and second beam components 6118 and 6120 toward corresponding grating couplers 6122 (only one is shown in the figure) at the incidence angle θ1. For example, θ2=41.2°, and θ1=8°. Depending on the design of the grating couplers 6122, the angles θ1 and θ2 can also be other values in order to maximize the coupling efficiency to the grating couplers 6122.

For example, the second lens array 6112 can be made of glass. The second lens array 6112 is attached to a lower surface 6126 of the glass prism block of the turning mirror 6110. The lower surface 6126 is at a distance f1 from the grating couplers 6122, in which f1 is approximately equal to the focal distance of the lenses in the second lens array 6112. For example, the turning mirror 6110 includes one or more support portions 6132 that define glue pockets 6132, and the turning mirror 6110 is secured to the photonic integrated circuit 6134 by applying glue inside the glue pockets 6132.

The input fiber array 6128 can include a two-dimensional arrangement (e.g., two-dimensional array) of input fibers. The first lens array 6102 can have a two-dimensional arrangement of lenses 6104 that correspond to the two-dimensional arrangement of fibers in the input fiber array 6128. The photonic integrated circuit can have a two dimensional arrangement (e.g., two-dimensional array) of grating couplers. The fiber-to-PIC connector 6100 couples the light beams from at least some of the fibers of the input fiber array 6128 to at least some of the grating couplers 6122 on the photonic integrated circuit 6134.

The dimensions of the first lens array 6102, the birefringent beam displacement element 6106, and the turning mirror 6110 depend on, e.g., the dimensions of the input fiber array 6128, the dimensions of the area occupied by the grating couplers 6122, and the spacing between the grating couplers 6122. The first lens array 6102 has a thickness of t1, and the birefringent beam displacement element 6106 has a thickness of t2. For example, t1 can be about 1.4 mm and t2 can be about 1.8 mm. For example, the air gap f1 can be about 0.4 mm. Increasing t1 will increase the diameter of the collimated beam components 6118 and 6120. Increasing t2 will increase the walk-off distance between the first and second beam components 6118 and 6120. The distance between a pair of grating couplers that receive the first and second beam components 6118, 6120 is d1. A larger d1 corresponds to a larger t2, and conversely, a smaller d1 corresponds to a smaller t2.

For case of illustration, in the example of FIG. 61, the input fibers extend along the z-direction at the location where the input fibers couple to the first lens array 6102. For example, the input fiber array 6128 includes rows and columns of fibers, in which the row direction extends along the x-direction, and the column direction extends along the y-direction. The dimension of the input fiber array 6128 in the y direction is w1, which can be, e.g., 2.75 mm. The distance w1 refers to the distance between the optical axis of a fiber core of an input fiber positioned at the top row, and the optical axis of a fiber core of an input fiber positioned at the bottom row. The input fiber array 6128 has a footprint measured along a plane parallel to the x-y plane. The grating couplers have a footprint measured along the top surface of the photonic integrated circuit 6134, in which the top surface is parallel to the x-z plane. For example, the dimension of the footprint of the input fiber array 6128 in the y-direction roughly corresponds to the dimension of the footprint of the grating couplers in the z-direction, and the dimension of the footprint of the input fiber array 6128 in the x-direction roughly corresponds to the dimension of the footprint of the grating couplers in the x-direction.

In the example of FIG. 61, the turning mirror angle (for example 41.2°) is optimized so that the light beams propagate at a non-zero angle relative to the optical axis of the lenses of the second lens array 6112, causing the light beams to be coupled to the grating couplers 6122 on the photonic integrated circuit 6134 at an optimized angle of, e.g., 8°. This allows for larger beam diameters compared to using off-axis beams in combination with conventional lenses. The birefringent beam displacement element 6106 can be placed at different positions in the propagation path of the light beams. In some implementations, the turning mirror 6110 and the second lens array 6112 are made from a single block of glass or silicon. In some examples, the second lens array 6112 is made separately from the turning mirror 6110 and attached to the turning mirror 6110.

Figure 62:
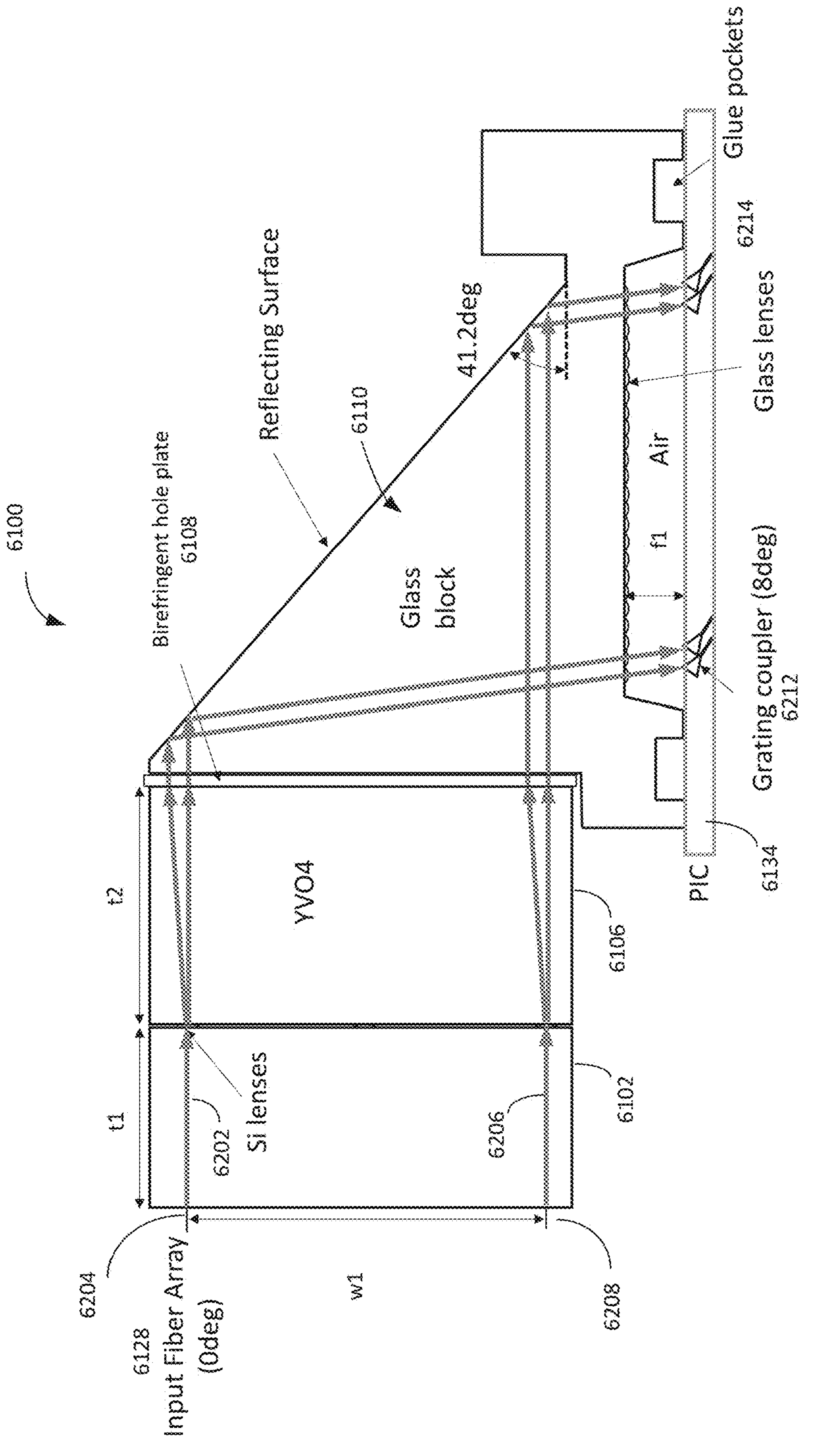

FIG. 62 shows the fiber-to-PIC connector 6100 coupled between the input fiber array 6128 and the photonic integrated circuit 6134. The figure shows the propagation paths of a first input light beam 6202 from a first input fiber 6204, and a second input light beam 6206 from a second input fiber 6208. The first input fiber 6204 and the second input fiber 6208 are part of the input fiber array 6128. The first input light beam 6202 is separated into two beam components that are coupled to a first pair of grating couplers 6212. The second input light beam 6206 is separated into two beam components that are coupled to a second pair of grating couplers 6214. In the reverse direction, the light beams output from the first pair of grating couplers 6212 are coupled to the first input fiber 6204, and the light beams output from the second pair of grating couplers 6214 are coupled to the second input fiber 6208.

Figure 63:
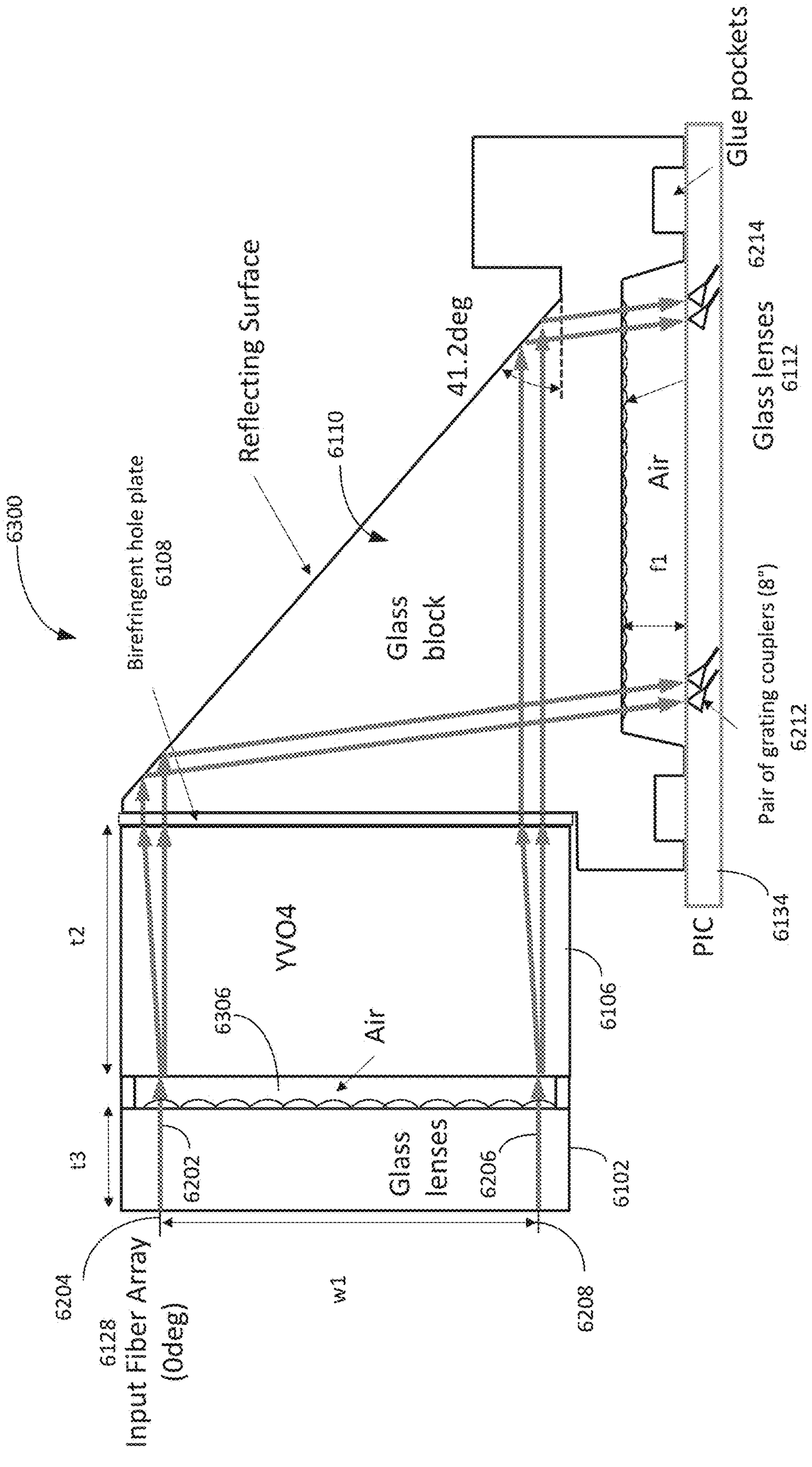

FIG. 63 shows an example of a fiber-to-PIC connector 6300 coupled to a photonic integrated circuit 6134. The fiber-to-PIC connector 6300 includes a first lens array 6302 that has a two-dimensional arrangement (e.g., two-dimensional array) of glass lenses 6304. The fiber-to-PIC connector 6300 includes a birefringent beam displacement element (or walk-off element) 6106, a birefringent hole plate 6108, a turning mirror 6110, and a second lens array 6112, similar to those of the fiber-to-PIC connector 6100. An air gap 6306 is provided between the first lens array 6104 and the birefringent beam displacement element 6106. The first lens array 6104 is attached to the birefringent beam displacement element 6106 through coupling elements 6308 at the edges of the first lens array 6104 using, e.g., an optical adhesive. The first lens array 6104 has a thickness of t3, in which t3 can be, e.g., 0.6 mm.

The figure shows the propagation paths of a first input light beam 6202 from a first input fiber 6204, and a second input light beam 6206 from a second input fiber 6208. The first input fiber 6204 and the second input fiber 6208 are part of the input fiber array 6128. The first input light beam 6202 is separated into two beam components that are coupled to a first pair of grating couplers 6212. The second input light beam 6206 is separated into two beam components that are coupled to a second pair of grating couplers 6214. In the reverse direction, the light beams output from the first pair of grating couplers 6212 are coupled to the first input fiber 6204, and the light beams output from the second pair of grating couplers 6214 are coupled to the second input fiber 6208.

Comparing the examples shown in FIGS. 62 and 63, one advantage of silicon lenses in the fiber-to-PIC connector 6100 is that glue can be used right on top of the lens because of the high refractive index of silicon. Because glass and glue can have a similar refractive index, the air gap is provided for the glass lenses to preserve the lens performance. Glass lenses can have other advantages, for example, assembly becomes easier because the glass lenses are transparent to visible light. The first lens array 6102 includes an array of small silicon lenses formed on a silicon block, and the first lens array 6302 includes an array of small glasses lenses formed on a glass block. The silicon and glass blocks shown in FIGS. 62 and 63 have different thicknesses due to different optical path lengths in materials with different refractive indices. The dimensions in the figures are chosen so that the optical assembly has an approximate 1:1 magnification for imaging the fiber mode to the grating coupler on the photonic integrated circuit.

Figure 64:
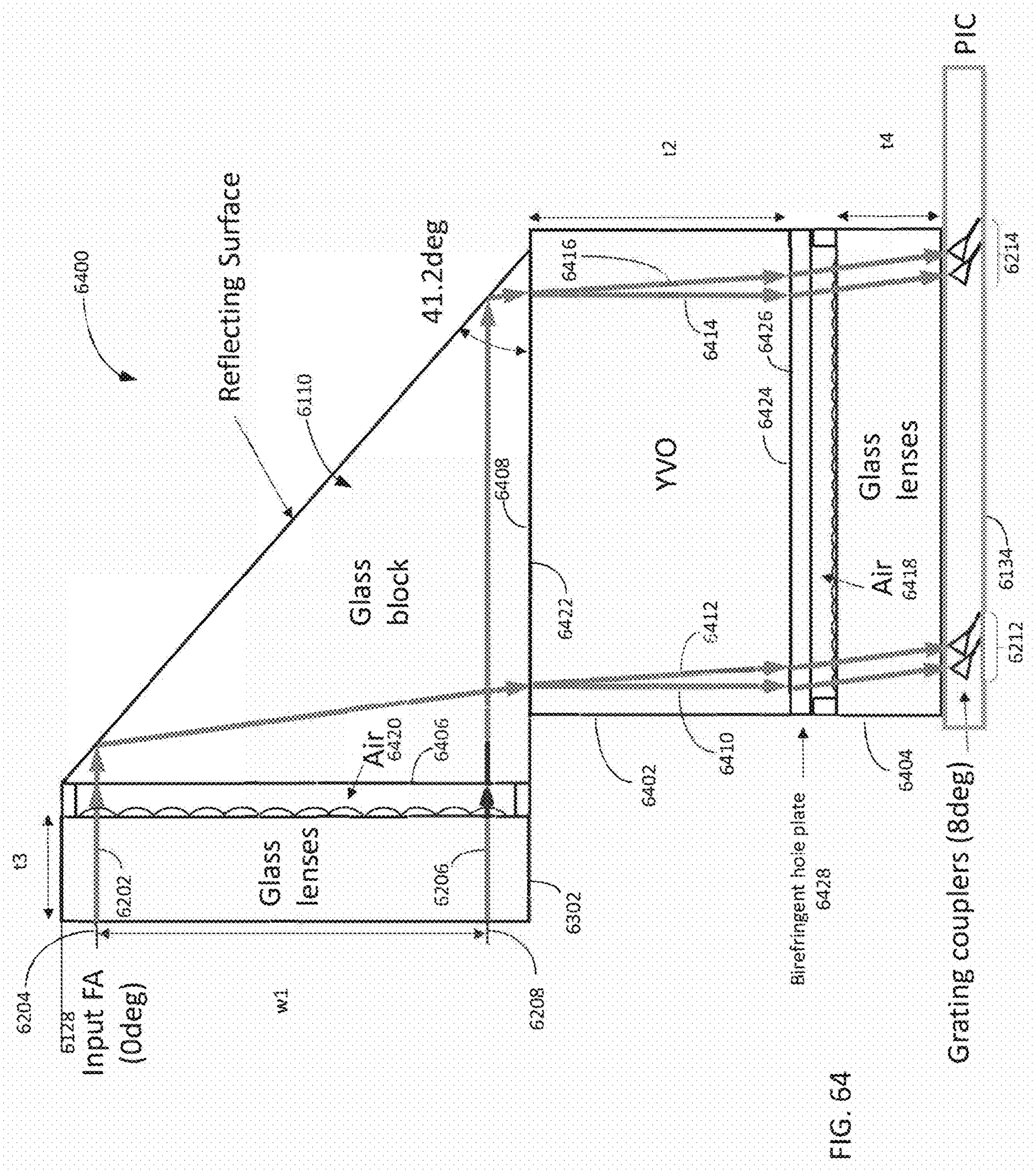

FIG. 64 shows an example of a fiber-to-PIC connector 6400 coupled between an input fiber array 6128 and a photonic integrated circuit 6134. The fiber-to-PIC connector 6400 includes a first lens array 6302, a turning mirror 6110, a birefringent beam displacement element 6402, a birefringent hole plate 6426, and a second lens array 6404. In this example, the first lens array 6302 is coupled to a first face 6406 of the turning mirror 6110. A second face 6408 of the turning mirror 6110 is coupled to a first face 6422 of the birefringent beam displacement element 6402. An air gap 6420 is provided between the lenses of the first lens array 6302 and the first face 6406 of the birefringent beam displacement element 6402. The birefringent beam displacement element 6402 has a second face 6424 that is coupled to the birefringent hole plate 6426. The birefringent hole plate 6426 is positioned between the second face 6424 of the birefringent beam displacement element 6402 and the second lens array 6404. The birefringent hole plate 6426 can include regions that have a birefringent material, and regions that have openings (or regions without the birefringent material, or regions that have non-birefringent optically transparent material) similar to the birefringent hole plate 6108 of FIGS. 61-63.

An air gap 6418 is provided between the birefringent hole plate 6426 and the lenses of the second lens array 6404. For example, the second lens array 6404 includes an array of glass lenses formed on a glass block. The thickness of the glass block is t4, which can be, e.g., 0.6 mm. For example, the thickness of the glass block for the first lens array 6302 and the thickness of the glass block for the second lens array 6404 can be substantially the same.

For example, a first input light beam 6202 from a first input fiber 6204 is redirected by the turning mirror 6110 towards the birefringent beam displacement element 6402, which separates the first input light beam 6202 into a first beam component 6410 and a second beam component 6412. After passing the birefringent beam displacement element 6402, the second beam component 6412 has a polarization that is, e.g., 90° relative to the polarization of the first beam component 6410. The birefringent hole plate 6426 rotates the polarization of the second beam component 6412 by 90°. After passing the birefringent hole plate 6426, the first and second beam components 6410, 6412 have parallel polarization. Corresponding lenses in the second lens array 6404 focus the first and second beam components 6410, 6412 to a first pair of grating couplers 6212 with an incidence angle of, e.g., 8°. A second input light beam 6206 from a second input fiber 6208 is redirected by the turning mirror 6110 towards the birefringent beam displacement element 6402, which separates the second input light beam 6206 into a first beam component 6414 and a second beam component 6416 that have, e.g., orthogonal polarization. After passing through the birefringent hole plate 6426, the first and second beam components 6414, 6416 have parallel polarization. Corresponding lenses in the second lens array 6404 focus the first and second beam components 6414, 6416 to a second pair of grating couplers 6214 with an incidence angle of, e.g., 8°. The light beams output from the first pair of grating couplers 6212 are coupled to the first input fiber 6204, and the light beams output from the second pair of grating couplers 6214 are coupled to the second input fiber 6208.

The following describes a mechanism for accurately aligning an array of optical fibers to a photonic integrated circuit to improve the efficiency of light coupling between the fiber array and the photonic integrated circuit. A novel assembly approach is used in which the final critical alignment and bond is performed actively with a ferrule frame that is bonded to an optical subassembly stack. The ferrule frame is a high precision component that is the connection interface for the optical fiber array.

Figure 65:
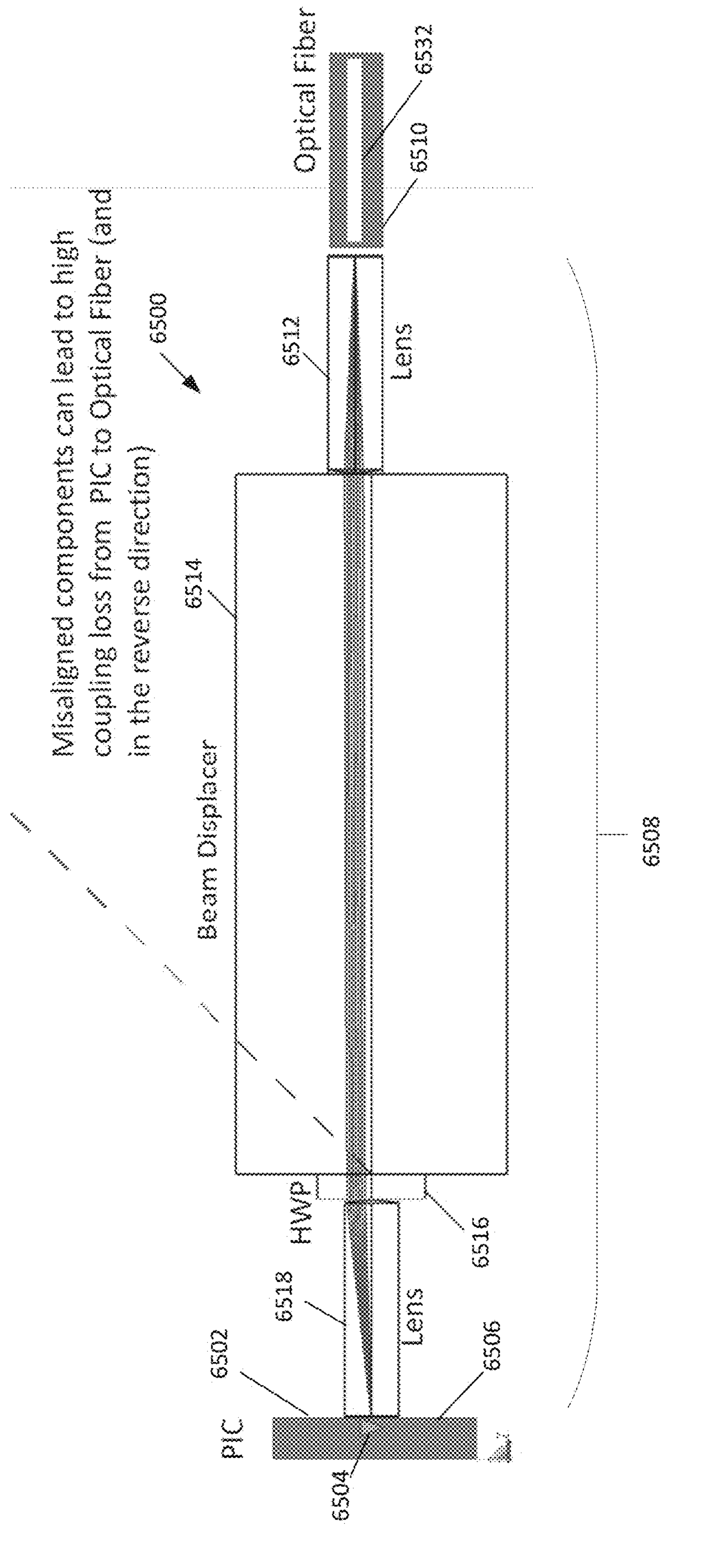
FIG. 65 is a diagram of an example of a co-packaged optical module and an optical path for a light beam between a vertical-coupling element and a fiber core.

FIG. 65 shows an example of a co-packaged optical module 6500 that can be part of an optoelectronic device or system, e.g., any one of the communication devices $\mathbf{101}_1$ to $\mathbf{101}_6$. The co-packaged optical module 6500 includes a photonic integrated circuit 6502 that has vertical-coupling elements 6504 disposed along a main surface 6506 of the photonic integrated circuit 6502. The co-packaged optical module 6500 includes an optical fiber to photonic integrated circuit optical subassembly 6508 for coupling light from an array of optical fibers 6510 to the photonic integrated circuit 6502. The figure shows the optical path for a single beam between a single vertical-coupling element 6504 and a single fiber core 6532 in the optical fiber 6510. There can be multiple fiber cores 6532 and multiple vertical-coupling elements 6504.

In this example, the optical subassembly 6508 includes a first lens array 6512, a beam displacer 6514, a half wave plate 6516, and a second lens array 6518. The figure shows one of the lenses in the first lens array 6512 and one of the lenses in the second lens array 6518.

Simulations of the coupling performance of this arrangement at 1550 nm and 1310 nm signal wavelengths show that low loss can be achieved when the components are accurately positioned, e.g., with sub-micron accuracy. For different configurations of the optical fibers and the optical subassembly, different alignment accuracies may be required. A combination of active and passive alignment methods can be used to achieve the required alignment accuracy.

Figure 66:
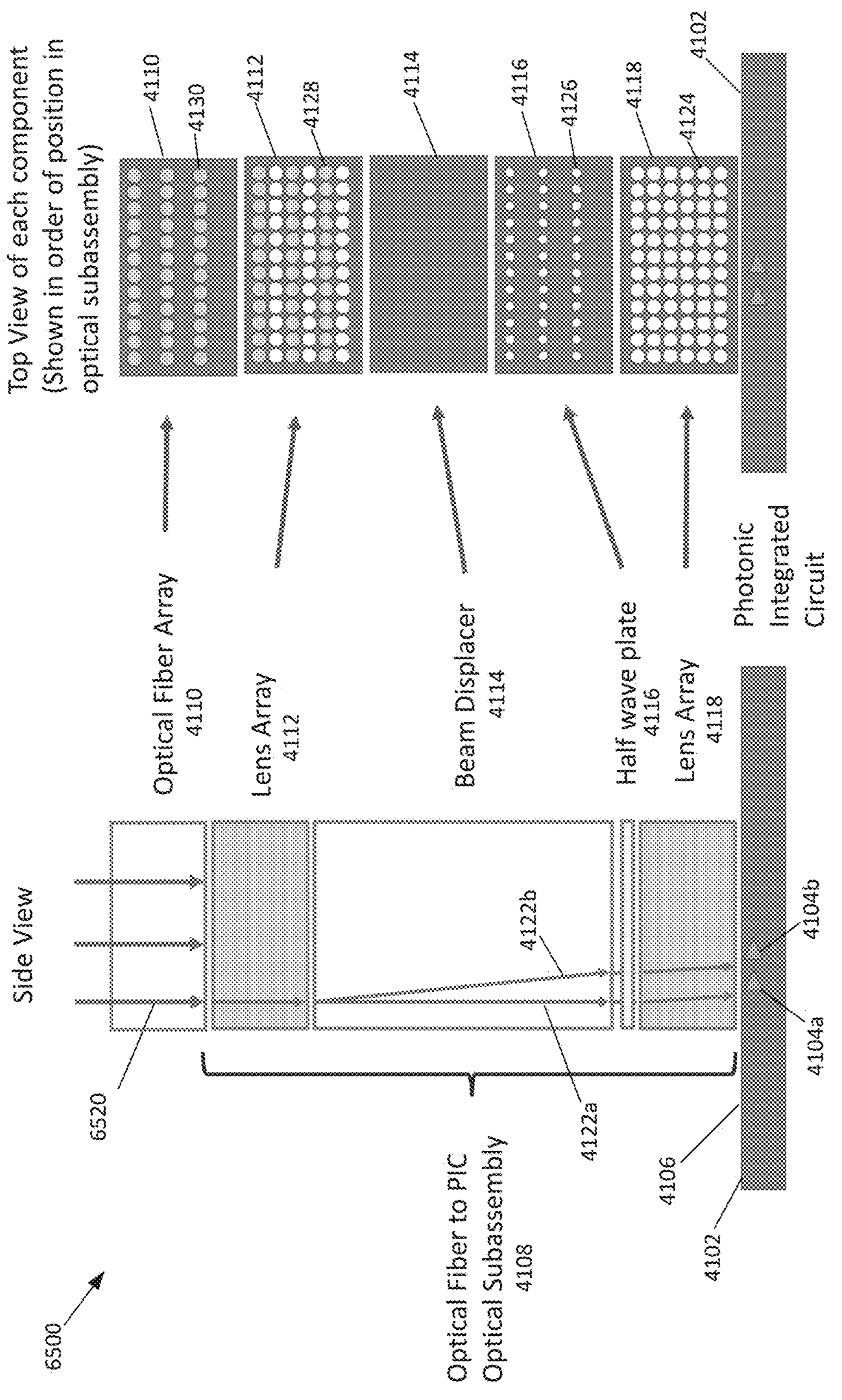
FIG. 66 shows a side view and a top view of an example of the co-packaged optical subassembly.

Referring to FIG. 66, the left portion of the figure shows a side view of the co-packaged optical module 6500 that can achieve low coupling loss between the array of optical fibers 6510 and the vertical-coupling elements 6504. The right portion of the figure shows the top view of each component the co-packaged optical module 6500, shown in order of position in optical subassembly. For example, the vertical-coupling elements 6504 can be grating couplers. The figure shows one of many stack arrangements that can be used, in which different stack arrangements can have different stack components depending on the application.

In some embodiments, the photonic integrated circuit 6502 can be similar to the photonic integrated circuit 210 of FIG. 12, and the vertical-coupling elements 6504 can be similar to the vertical coupling elements 231. Each vertical-coupling element 6504 can include, e.g., a single-polarization vertical grating coupler, a turning mirror, a polarization-diversity vertical grating coupler, a vertical cavity surface emitting laser, a surface-normal modulator, a photodiode, or any combination of the above. The second lens array 6518 can include an array of lenses 6524. For example, the second lens array 6518 can be similar to the lens array 541, the lens array 542, or a combination of the lens array 541 and the lens array 542. The half wave plate 6516 can be similar to the birefringent hole plate 1006. For example, the half wave plate 6516 can be made of a birefringent material with holes 6526. Light that passes through the birefringent material changes polarization state, whereas light that passes through the holes does not change polarization state. The beam displacer 6514 can be similar to the walk-off crystal 1004, which splits an incoming beam into a corresponding pair of outgoing beams that contain respective light of two orthogonal polarization states of the incoming beam. The first lens array 6512 can have an array of lenses 6528, which can be similar to the lenses 551. The array of fibers 6510 can include an array of fiber cores 6530, which can be similar to the cores 302 and/or 1034.

In some implementations, a light beam 6520 from a fiber core 6530 is projected by a lens in the first lens array 6512 toward the beam displacer 6514, which splits the light beam into a first beam component 6522*a* that has “x” polarization and a second beam component 6522*b* that has “y” polarization, similar to the example shown in FIG. 12. For example, the “x” polarization can be TE polarization and the “y” polarization can be TM polarization. The grating couplers 6504*a* and 6504*b* couple the first and second beam components 6522*a*, 6522*b* to the photonic integrated circuit 6502. In the example in which the vertical-coupling elements 6504 include single-polarization vertical grating couplers, the half wave plate 6516 can have a spatially-varying birefringence configured to transform the incident polarized light into the grating coupler polarization state, e.g., having the polarization state that maximizes the coupling efficiency of the grating coupler.

Figure 67B:
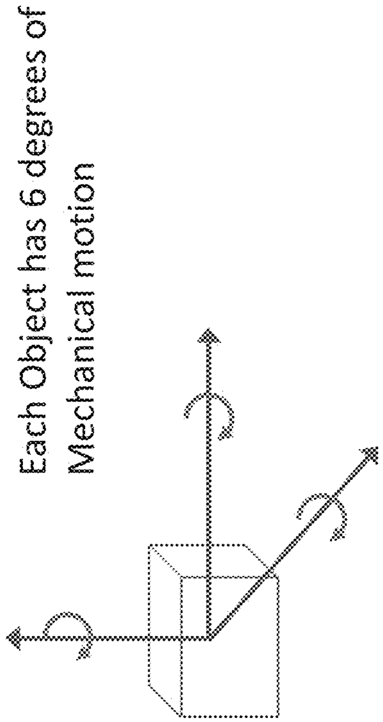
FIGS. 67A and 67B are diagrams showing that components in the optical subassembly can have several degrees of mechanical motion.
Figure 67A:
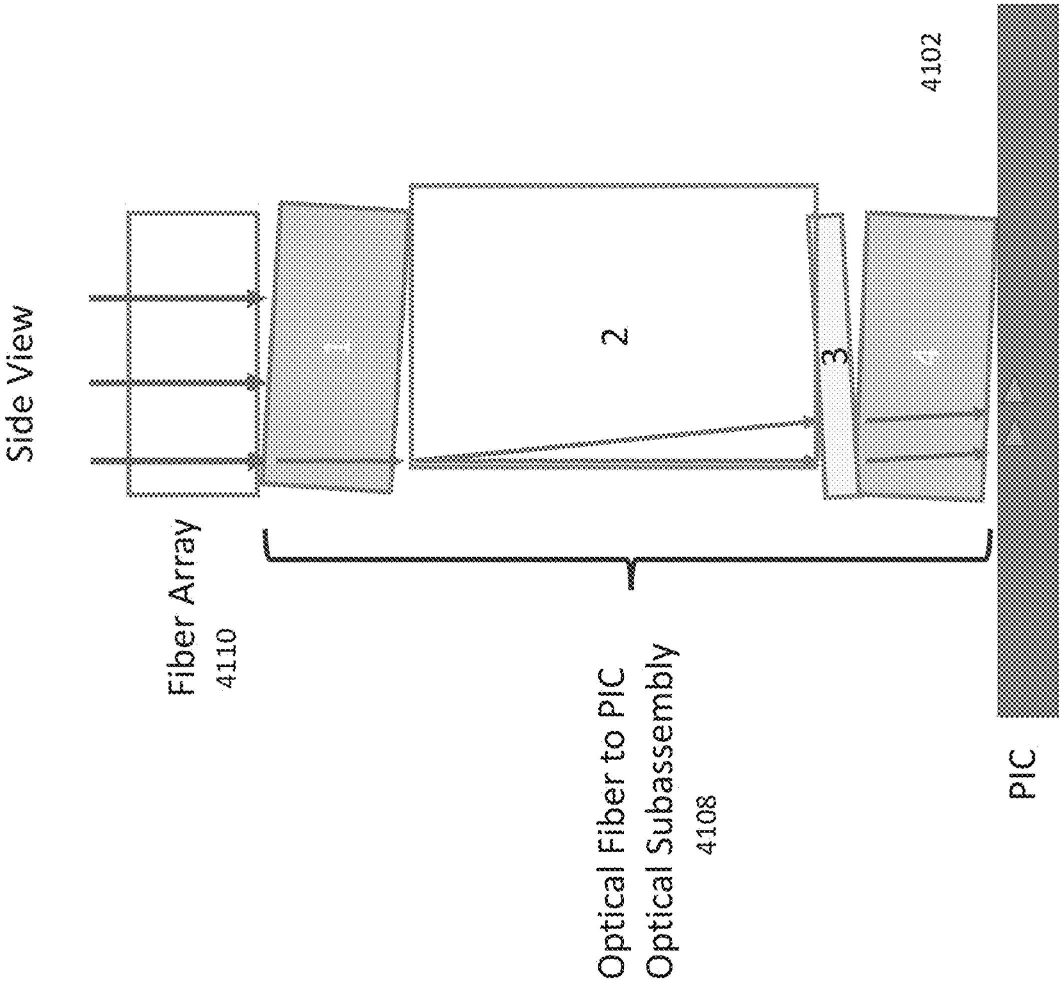

As shown in FIGS. 67A and 67B, each component in the optical subassembly 6508 can have 6 degrees of mechanical motion, and the various components may not be entirely aligned, e.g., the end surfaces of the components may not be entirely parallel to one another. In this example, there are 4 optical elements between the optical fiber array 6510 and the photonic integrated circuit 6502, each with 6 degrees of freedom which results in a large assembly space that can lead to high photonic integrated circuit-to-fiber coupling loss. Additionally, each optical element has fabrication tolerances which may result in loss variations. As the optical stack is built with components bonded together, passive alignment (e.g., vision system aligning to device features or fiducials) and active alignment (e.g., measurement of coupled light from the optical fiber to the photonic integrated circuit) can be used to position the component before bonding. The last alignment and bonding step may be the most critical in terms of positional and angular assembly tolerance.

Figures 68, 69:
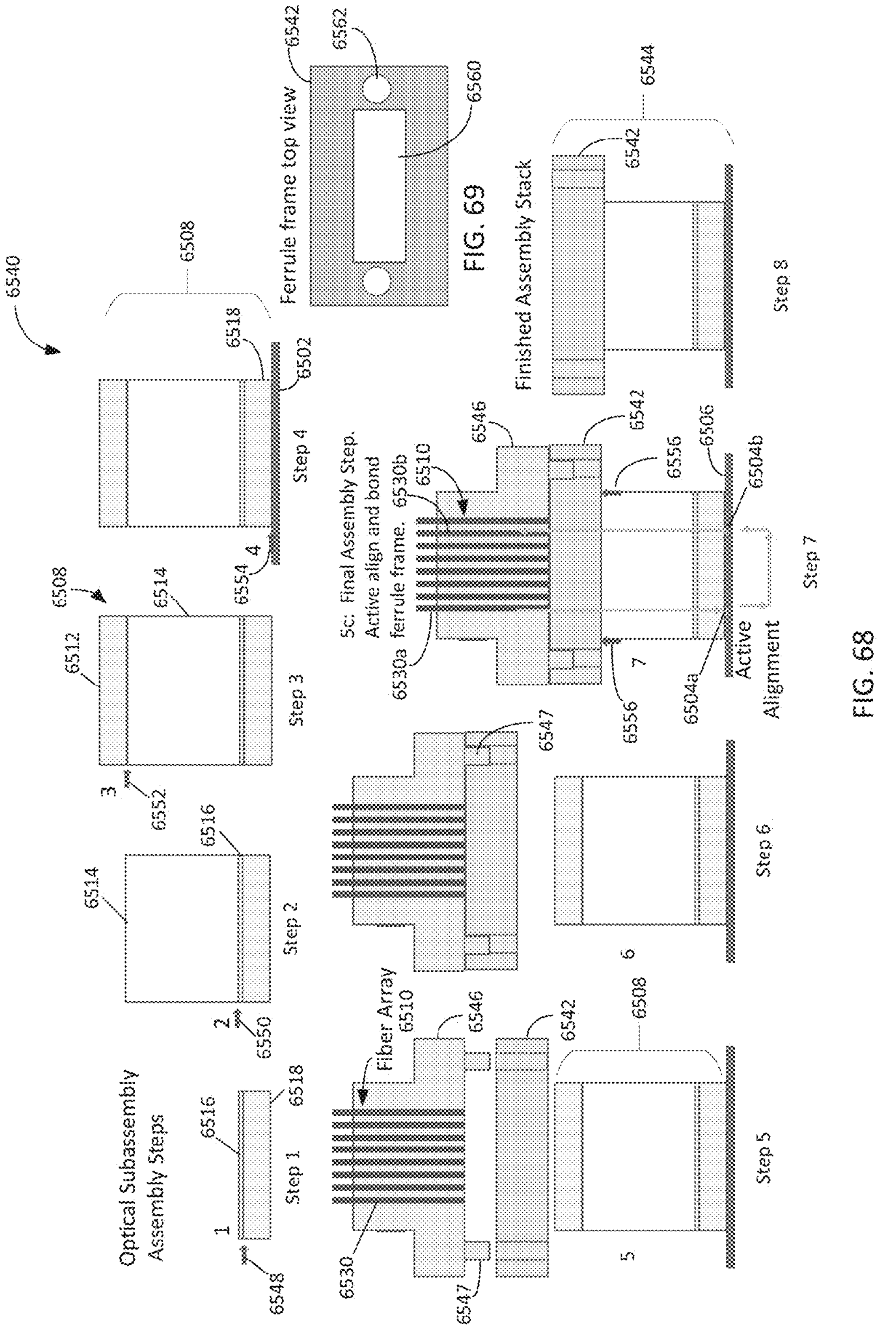
FIG. 68 is a diagram of an example of a process for assembling an optical stack that includes the photonic integrated circuit, the optical subassembly, and a ferrule frame.
FIG. 69 is a top view of an example of the ferrule frame.

FIG. 68 shows an example of a process 6540 for assembling an optical stack 6544 that includes the photonic integrated circuit 6502, the optical subassembly 6508, and a ferrule frame 6542. FIG. 69 shows a top view of the ferrule frame 6542. This example is a novel assembly approach in which the final critical alignment and bond is done actively with the ferrule frame 6542 that is bonded to the optical subassembly stack. The ferrule frame 6542 is a high precision component that is the connection interface for the optical fiber array 6510. The ferrule frame 6542 is designed to enable the optical fiber array 6510 to be removably attached to the ferrule frame 6542 and aligned to optimize the efficiency of light transfer between the photonic integrated circuit 6502 and the fiber cores 6530.

For example, the process 6540 includes assembling the optical subassembly 6508, attaching the optical subassembly 6508 to the photonic integrated circuit 6502, removably attaching the optical fiber array 6510 to the ferrule frame 6542, aligning the ferrule frame 6542 to the optical subassembly 6508 using an active alignment process, securely attaching the ferrule frame 6542 to the optical subassembly 6508 after the active alignment process is completed, and removing the fiber array 6510 from the ferrule frame 6542.

The process 6540 shown in FIG. 68 is suitable for assembling the optical subassembly 6508 using the components shown in FIG. 66. In some implementations, the optical subassembly can have components different from those shown in FIG. 66, and the process 6540 can be modified accordingly.

Referring to FIG. 68, in some implementations, the process 6540 includes a first step in which a lower surface of the half wave plate 6516 is attached or bonded to the upper surface of the second lens array 6518. An arrow 6548 shows the location where glue or bonding material is placed to firmly attach the half wave plate 6516 to the second lens array 6518. In a second step, the lower surface of the beam displacer 6514 is attached or bonded to the upper surface of the half wave plate 6516. An arrow 6550 shows the location where glue or bonding material is placed to firmly attach the beam displacer 6514 to the half wave plate 6516.

In a third step, the lower surface of the first lens array 6512 is attached or bonded to the upper surface of the beam displacer 6514. An arrow 6552 shows the location where glue or bonding material is placed to firmly attach the first lens array 6512 to the beam displacer 6514. In a fourth step, the lower surface of the second lens array 6518 is attached or bonded to the main surface (upper surface) of the photonic integrated circuit 6502. An arrow 6554 shows the location where glue or bonding material is placed to firmly attach the second lens array 6518 to the photonic integrated circuit 6502.

Steps 1 to 4 described above include steps up to the attachment of the optical subassembly 6508 to the photonic integrated circuit 6502. The order of stack assembly up to step 4 can vary. For example, the bottom surface of the first lens array 6512 can be attached to the upper surface of the beam displacer 6514, followed by attaching the bottom surface of the beam displacer 6514 to the upper surface of the half wave plate 6516.

In some implementations, the array of optical fibers 6510 is attached to a fiber connector 6546, which is configured to be removably attached to the ferrule frame 6542. The process 6540 includes a fifth step in which the ferrule fame 6542 is positioned between the fiber connector 6546 and the optical subassembly 6508.

In a sixth step, the fiber connector 6546 is removably attached to the ferrule frame 6542 using, e.g., one or screws, or one or more clamps. In a seventh step, the ferrule frame 6542 is placed on the optical subassembly 6508, and an active alignment process is used to align the ferrule frame 6542 (with the fiber connector 6546 attached) relative to the optical subassembly 6508. In some examples, the ferrule frame 6542 defines an opening 6560 that is slightly larger than the outer circumference of the optical subassembly 6508. In the seventh step, the ferrule frame 6542 is moved toward the photonic integrated circuit 6502 with the upper portion of the optical subassembly 6508 extending into the opening 6560 until the end surface of the fiber array 6510 contacts the upper surface of the optical subassembly 6508. In the example shown in FIG. 68, the ferrule frame 6542 includes two screw holes 6562 that enable two screws 6547 to secure the fiber connector 6546 to the ferrule frame 6542.

In some implementations, the active alignment process uses an optical loopback (e.g., two grating couplers connected by an optical waveguide) on the photonic integrated circuit 6502 to enable injecting of reference light into one fiber and collecting the looped-back light in another fiber. For example, the active alignment process includes providing light from a first fiber core 6530*a* of the fiber array 6510 and passing the light through the optical subassembly 6508 to a first vertical-coupling element 6504*a*. The light is transmitted from the first vertical-coupling element 6504*a* to a second vertical-coupling element 6504*b* through, e.g., an optical waveguide on the photonic integrated circuit 6502. The light is transmitted from the second vertical-coupling element 6504*b* through the optical subassembly 6508 to a second fiber core 6530*b* of the fiber array 6510. The light received at the second fiber core 6530*b* is measured, and the position and/or orientation of the ferrule frame 6542 relative to the optical subassembly 6508 is adjusted to optimize the efficiency of light transfer between the fiber cores 6530 and the photonic integrated circuit 6502. For example, the first and second vertical-coupling elements 6504*a*, 6504*b* can be the unused transmit-grating couplers 2210*a* and 2210*b* of FIG. 22. For example, the waveguide that optically couples the first vertical-coupling element 6504*a* to the second vertical-coupling element 6504*b* can be the waveguide 2212.

In an eighth step, the fiber connector 6546 is removed from the ferrule frame 6542, leaving the finished assembly stack 6544. When the communication devices 101$_1$ to 101$_6$ are deployed in the field, such as in a data center, the assembly stacks 6544 are ready to receive the fiber connectors 6546. This allows an operator to quickly connect optical fiber cables to the communication devices and at the same time accurately align the fiber cores to achieve a high efficiency of light transfer between the fiber cores and the photonic integrated circuits.

Steps 5 to 7 described above include the final active alignment and bonding. The red arrows 6556 below the ferrule frame 6542 in step 7 indicate the locations where glue/bonding material is placed to firmly attach the ferrule frame 6542 to the optical subassembly 6508 once optimal alignment is achieved. For example, the ferrule frame 6542 can be made of glass, metal, or plastic. For example, the ferrule frame 6542 can be made of a material that is transparent or semi-transparent to ultra-violet (UV) light, and the ferrule frame 6542 can be bonded to the optical subassembly 6508 using an UV-curing adhesive.

For example, in step 7, the position of the ferrule frame 6542 can be adjusted along a plane substantially parallel to the main surface 6506 of the photonic integrated circuit 6502. The position of the ferrule frame 6542 can be adjusted along an x-axis relative to the main surface 6506, and/or along a y-axis relative to the main surface 6506. The ferrule frame 6542 can be rotated about a z-axis relative to the main surface 6506. In this example, the x- and y-axes are substantially parallel to the main surface 6506, and the z-axis is substantially perpendicular to the main surface 6506.

In some implementations, adjusting the position of the ferrule frame 6542 relative to the optical subassembly 6508 can include (i) adjusting a distance of an end of the fiber connector 6546 relative to the optical subassembly 6508, and/or (ii) adjusting a tilt angle of an end surface of the fiber connector 6546 relative to the optical subassembly 6508. For example, the alignment of the ferrule frame 6542 relative to the optical subassembly 6508 can have a precision of at least 10 μm accuracy, at least 1 μm accuracy, or at least 0.1 μm accuracy. In this context, a precision of at least 0.1 μm accuracy means that when the ferrule frame 6542 is bonded to the optical submodule 6508, the ferrule frame 6542 can be positioned within 0.1 μm of the optimal position that optimizes light transfer between the fiber cores 6530 and the photonic integrated circuit 6502.

For example, the array of optical fibers can include at least 10 fiber cores, at least 50 fiber cores, or at least 100 fiber cores. Because the fiber cores are densely packed together, accurate alignment of the fiber cores relative to the optical subassembly 6508 is important for achieving high efficiency of light transfer between the fiber cores and the photonic integrated circuit 6502.

The mechanism that enables the fiber connector 6546 to be removably connected to the ferrule frame 6542 is made with high precision. In the example in which the fiber connector 6546 is removably connected to the ferrule frame 6542 using screws, the screws and the screw holes are made with high precision so that the fiber connector 6546 can be attached to the ferrule frame 6542 with a precision in a range of, e.g., 10 nm, or 100 nm, or 1 μm. In this context, a precision of 10 nm means that each time the fiber connector 6546 is removably attached to the ferrule frame 6542, the position of the fiber connector 6546 will be consistently within 10 nm relative to the optimal position of the fiber connector 6546 determined by the active alignment process in step 7 of the process 6540.

In some implementations, the fiber connector 6546 includes the first lens array 6512. In this example, the optical subassembly 6508 includes the beam displacer 6514, the half wave plate 6516, and the second lens array 6518.

FIGS. 46A, 46B, and 48 show examples in which the fiber array (e.g., 4604, 4802) has end facets polished at an angle of, e.g., about 8°. In these examples, the lenses (e.g., 4604, 4608, 4610, 4622, 4624) are adapted such that the fiber-to-PIC connector outputs light beams to the fiber array at the proper angle compatible with the bevel end facets of the fiber array. The following describes a beveled fiber array ferrule adapter that can be used to adapt between any combination of dissimilar bevels between a fiber array connector and an optical assembly.

MPO connectors are commonly used for mating fiber cable connectors to fiber array cable connectors. The connector end faces of both connector ferrules can be beveled to lower optical back reflections from the fiber end faces.

Figure 70:
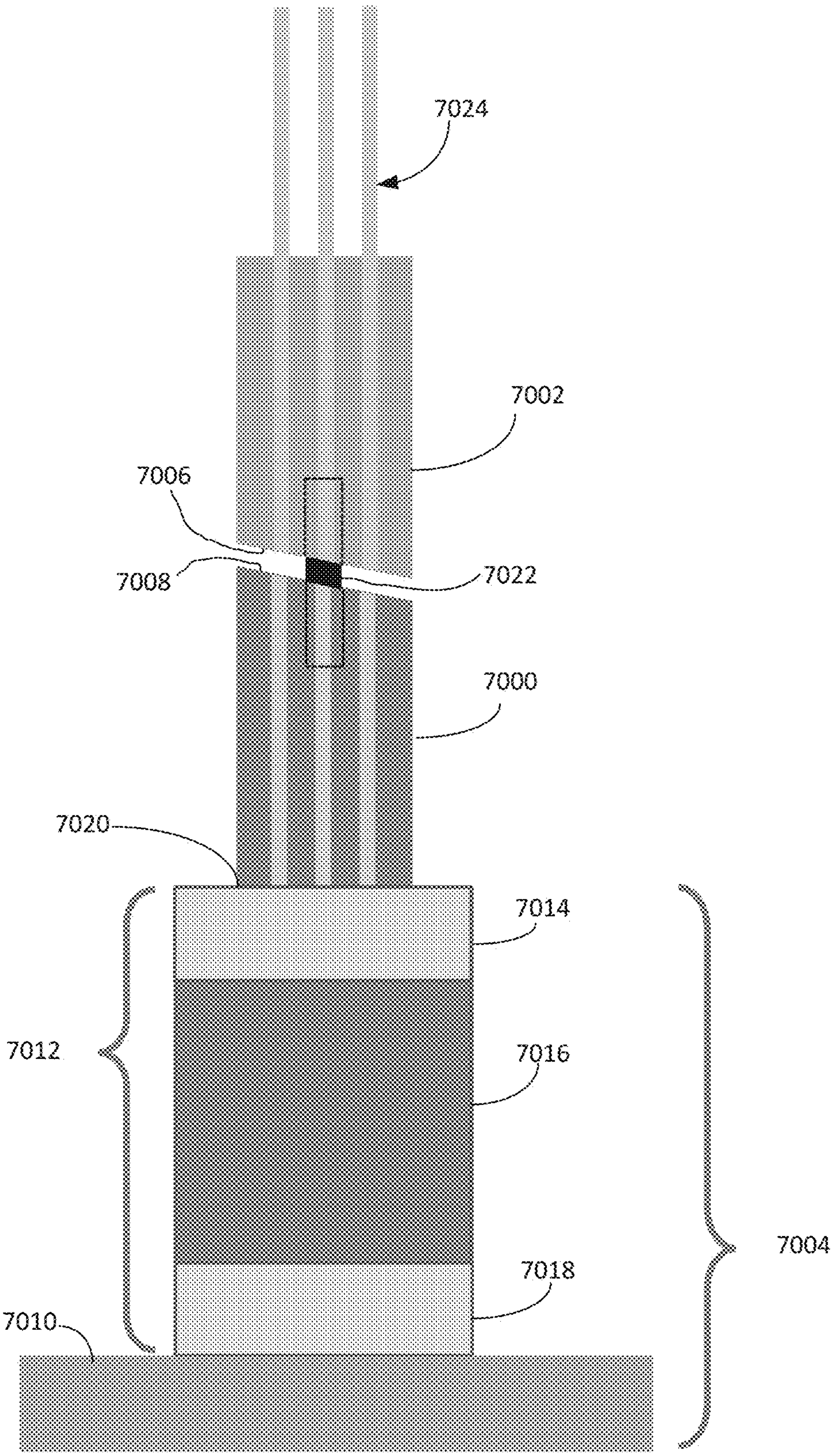
FIG. 70 is a diagram of an example fiber array ferrule adapter coupled between an MPO connector and an optical assembly.

FIG. 70 is a diagram of an example beveled fiber array ferrule adapter 7000 coupled between a beveled MPO-like fiber array ferrule of an MPO-like fiber connector 7002 and an optical assembly 7004. The MPO-like fiber connector 7002 is connected to a plurality of optical fibers 7024. The optical assembly 7004 can include, e.g., a photonic integrated circuit 7010 and a fiber-to-PIC connector 7012 described above. For example, the fiber-to-PIC connector 7012 can include a first lens array 7014, a birefringent beam displacement element 7016, and a second lens array 7018. The optical assembly 7004 can generate output optical beams to and receive input optical beams from the MPO-like fiber connector 7002 through the beveled fiber array ferrule adapter 7004.

The MPO-like fiber connector 7002 has an end 7006 that is beveled, and the beveled fiber array ferrule adapter 7000 has an end 7008 that is also beveled to the same angle as the end 7006 of the MPO-like fiber connector ferrule. The beveled fiber array ferrule adapter 7000 can be made as nominally the same ferrule type as the MPO-like fiber connector 7002 in which optical fibers are inserted in the ferrule holes and polished down to be nominally flush on both optical faces of the beveled fiber array ferrule adapter 7000. The beveled fiber array ferrule adapter 7000 enables a low-loss connection between the MPO-like fiber connector 7002 and the optical assembly 7004 whose mating surface is not beveled at the correct angle to directly mate to the MPO-like fiber connector 7002. In some implementations, the fiber array ferrule adapter 7000 is permanently bonded to the optical subassembly 7004 at the interface 7020.

An MPO-like connector has optical fibers that are inserted in the ferrule holes and polished down to be nominally flush on the optical face of the MPO-like connector, similar to those of a standard MPO connector. The MPO-like connector can have alignment pins or holes similar to those of a standard MPO connector. The cross-sectional profile of the MPO-like connector ferrule can be different from that of the standard MPO connector in order to accommodate various arrangements of optical fibers. For example, an MPO-like connector can be used to connect to an optical fiber cable having a two-dimensional arrangement of optical fibers, such as a two-dimensional array of optical fibers. The two-dimensional array of optical fibers can have multiple rows and multiple columns of optical fibers, e.g., at least 2 rows and at least 4 columns of optical fibers, or at least 2 rows and at least 8 columns of optical fibers, or at least 3 rows and at least 8 columns of optical fibers.

The beveled fiber array ferrule adapter 7000 can also be configured to be coupled between a beveled MPO fiber array ferrule of a standard MPO fiber connector and an optical assembly whose output light beams are configured to be compatible with a standard MPO fiber connector.

While the figure shows the optical assembly 7004 with a 0° bevel optical face, the fiber array ferrule adapter 7000 can be used to adapt between any combination of dissimilar bevels between a fiber array connector (e.g., 7002) and an optical assembly (e.g., 7004).

In some examples, the fiber array ferrule adapter 7000 is a male connector that has alignment pins 7022 that are mated with alignment holes in the beveled MPO connector 7002. In some examples, the MPO connector 7002 is a male connector that has alignment pins 7022 that are mated with alignment holes in the beveled fiber array ferrule adapter 7000. The interface of the fiber array ferrule adapter 7000 can have a configuration similar to a conventional ferrule-to-ferrule connector such that the fiber array ferrule adapter 7000 can be mated with a standard MPO connector or an MPO-like connector.

In some implementations, a laser source that is configured generate circularly polarized light can be used in the examples shown in FIGS. 27 and 54 to 60 without the need to use the quarter-wave plate or the quarter-wave polarization rotator.

In an example, a first system includes a data processor configured to process data, and a photonic integrated circuit configured to convert optical signals received from one or more optical fibers to electrical signals that are transmitted to the data processor.

In an example, a second system includes a data processor configured to process data, and a photonic integrated circuit configured to convert electronic signals from the data processor to optical signals that can be output to one or more optical fibers.

In an example, a third system includes a data processor configured to process data, and a photonic integrated circuit configured to convert optical signals received from one or more optical fibers to electrical signals that are transmitted to the data processor. The photonic integrated circuit is also configured to convert electronic signals from the data processor to optical signals that can be output to the one or more optical fibers.

In some implementations, each of the first, second, and third systems can include a fiber-to-PIC connector that is optically coupled to the one or more optical fibers, and also optically coupled to coupling elements of the photonic integrated circuit. The coupling elements can be, e.g., grating couplers or edge couplers. The fiber-to-PIC connector can include one or more of the features described above, such as one or more features of the fiber-to-PIC connector arrangement 500 of FIG. 5, the fiber-to-PIC connector arrangement 600 of FIG. 6, the fiber-to-PIC connector arrangement 700 of FIG. 7, fiber-to-PIC connector 900 of FIG. 9, the fiber-to-PIC connector 1000 of FIGS. 10A, 10B, 12, 13, the fiber-to-PIC connector 1100 of FIG. 11A, the fiber-to-PIC connector 2300 of FIG. 23, the fiber-to-PIC connector 2400 of FIG. 24A, 24B, the fiber-to-PIC connector 2800 of FIG. 28, the fiber-to-PIC connector 3310 of FIG. 33C, the fiber-to-PIC connector 3400 of FIG. 34A, 34B, the fiber-to-PIC connector 3500 of FIG. 35, the fiber-to-PIC connector 3800 of FIG. 38, the fiber-to-PIC connector 3900 of FIG. 39, and the fiber-to-PIC connector 4000 of FIG. 40.

Each of the first, second, and third systems can include one or more features or components described in U.S. patent application Ser. No. 16/822,103, filed on Mar. 18, 2020, U.S. patent application Ser. No. 16/847,705, filed on Apr. 14, 2020, U.S. patent application Ser. No. 16/888,890, filed on Jun. 1, 2020, U.S. provisional patent application 63/080,528, filed on Sep. 18, 2020, U.S. provisional patent application 63/088,914, filed on Oct. 7, 2020, U.S. provisional patent application 63/116,660, filed on Nov. 20, 2020, and U.S. provisional patent application 63/146,421, filed on Feb. 5, 2021. The entire contents of the above applications are incorporated by reference.

It should be appreciated by those of ordinary skill in the pertinent art that at least some embodiments described herein in the context of coupling light from one or more fibers 202 to PIC 210 can be equally operable to couple light from PIC 210 to one or more fibers 202. This reversibility of the coupling direction is a general feature of at least some embodiments described herein, including some of those using polarization diversity.

Example optical systems disclosed herein should only be viewed as some of many possible embodiments that can be used to perform polarization demultiplexing and independent array pattern scaling, array geometry re-arrangement, spot size scaling, and angle-of-incidence adaptation using diffractive, refractive, reflective, and polarization-dependent optical elements, 3D waveguides and 3D printed optical components. Other implementations achieving a similar set of functionalities can be made and used by persons of ordinary skill in the pertinent art, in view of this disclosure and without any undue experimentation.

According to an example embodiment disclosed above, e.g., in the summary section and/or in reference to any one or any combination of some or all of FIGS. 1-8, provided is an apparatus comprising: one or more optical fibers (e.g., 202, FIG. 5) having a plurality of fiber cores (e.g., 302, FIGS. 3A-3G); a photonic integrated circuit (e.g., 210, FIG. 5) including a plurality (e.g., 230, FIG. 5) of vertical-coupling elements (e.g., 231, FIG. 5) disposed along a main surface of the photonic integrated circuit; and a fiber-optic connector (e.g., 240/250, FIG. 5) connected between the one or more optical fibers and the photonic integrated circuit to communicate light therebetween through the main surface, the fiber-optic connector comprising optics configured to transfer light between the plurality of fiber cores and the plurality of vertical-coupling elements such that: a distance (e.g., $S_{min}$, FIGS. 3A-3G) between a first pair of the fiber cores is optically scaled by a first scaling factor (e.g., A); and a diameter (e.g., $D_{core}$, FIGS. 3A-3G) of at least one of the fiber cores is optically scaled by a second scaling factor (e.g., $C_1$) that is different from the first scaling factor.

In some embodiments of the above apparatus, the optics is further configured to transfer the light such that a distance (e.g., $S_{max}$, FIGS. 3A-3G) between a second pair of the fiber cores is optically scaled by a third scaling factor (e.g., B) that is different from the second scaling factor.

In some embodiments of any of the above apparatus, the optics is configured to transfer the light such that the third scaling factor is different from the first scaling factor.

In some embodiments of any of the above apparatus, the optics is configured to transfer the light such that the first scaling factor is substantially equal to the third scaling factor.

In some embodiments of any of the above apparatus, the optics comprises: one or more first lenses (e.g., 551, FIG. 5) located at a first offset distance from the main surface; a plurality of second lenses (e.g., 541, FIG. 5) located at a second offset distance from the main surface, the second offset distance being smaller than the first offset distance; and a plurality of third lenses (e.g., 542, FIG. 5) located at a third offset distance from the main surface, the third offset distance being smaller than the second offset distance.

In some embodiments of any of the above apparatus, the optics comprises at least one lens (e.g., 542, FIG. 5) configured to communicate light with a single one of the fiber cores and a single one of the vertical-coupling elements.

In some embodiments of any of the above apparatus, the optics comprises a plurality of optical waveguides (e.g., 652, FIG. 6), each optically connecting a respective one of the fiber cores and a respective one of the vertical-coupling elements.

In some embodiments of any of the above apparatus, at least some of the optical waveguides are tapered.

In some embodiments of any of the above apparatus, the optics comprises one or more polarization beam splitters (e.g., 810 and 820, FIG. 8A and FIG. 8B).

In some embodiments of any of the above apparatus, the optics comprises one or more polarization-rotating elements (e.g., 861, 862, FIG. 8B).

In some embodiments of any of the above apparatus, the fiber-optic connector comprises a first connector part (e.g., 250, FIG. 5) and a second connector part (e.g., 240, FIG. 5) disconnectably connected to one another.

In some embodiments of any of the above apparatus, the optics is configured to produce, at a mating surface between the first and second connector parts, light spots (e.g., 560, FIG. 5) of a larger size, by at least a factor of two, than corresponding diameters of the fiber cores.

In some embodiments of any of the above apparatus, the optics is configured to communicate light between a first number of the fiber cores and a second number of the vertical-coupling elements, the second number being greater than the first number.

In some embodiments of any of the above apparatus, the one or more optical fibers include a multi-core optical fiber.

In some embodiments of any of the above apparatus, each of the vertical-coupling elements is selected from an element set consisting of: a single-polarization vertical grating coupler, a turning mirror, a polarization-diversity vertical grating coupler, a vertical cavity surface emitting laser, a surface-normal modulator, and a photodiode.

According to another example embodiment disclosed above, e.g., in the summary section and/or in reference to any one or any combination of some or all of FIGS. 1-8, provided is a fiber-optic connector comprising: a first connector part (e.g., 240, FIG. 5) connectable at a first side thereof (e.g., 555, FIG. 5) to one or more optical fibers (e.g., 202, FIG. 5) having a plurality of fiber cores (e.g., 302, FIGS. 3A-3G), the first connector part having a second side that is opposite to the first side (e.g., 556, FIG. 5); a second connector part (e.g., 250, FIG. 5) connectable at one side thereof (e.g., 545, FIG. 5) to the second side of the first connector part and further connectable at an opposite side thereof (e.g., 546, FIG. 5) to a photonic integrated circuit (e.g., 210, FIG. 2); and optics configured to transfer light between the first side of the first connector part and the opposite side of the second connector part such that: a distance (e.g., $S_{min}$, FIGS. 3A-3G) between a first pair of the fiber cores is optically scaled by a first scaling factor (e.g., A); and a diameter (e.g., $D_{core}$, FIGS. 3A-3G) of at least one of the fiber cores is optically scaled by a second scaling factor (e.g., $C_1$) that is different from the first scaling factor.

As used herein, the term "opposite" refers to a relative orientation and/or position of two corresponding sides or edges of the part and should be construed to cover any of the relative orientations/positions in which: (i) such two sides are substantially (e.g., to within 15 degrees) parallel to one another but located at different ends of the part; (ii) such two sides are not parallel to one another, i.e., can be oriented at a relative angle in the range between 15 degrees and 165 degrees; (iii) such two sides are substantially perpendicular to one another; (iv) at least one of such two sides is not strictly planar and has some features deviating from the planar geometry; (v) such two sides have no point of contact with one another; and (vi) such two sides have a common edge or area of contact, e.g., at the corner of the part. The sides 545, 546, 555, and 556 shown in FIG. 5 should be viewed as providing non-limiting illustrative examples of such sides.

In some embodiments of the above fiber-optic connector, the optics is further configured to transfer the light such that a distance (e.g., $S_{max}$, FIGS. 3A-3G) between a second pair of the fiber cores is optically scaled by a third scaling factor (e.g., B) that is different from the second scaling factor.

In some embodiments of any of the above fiber-optic connectors, the optics is configured to transfer the light such that the third scaling factor is different from the first scaling factor.

In some embodiments of any of the above fiber-optic connectors, the optics is configured to transfer the light such that the first scaling factor is substantially equal to the third scaling factor.

In some embodiments of any of the above fiber-optic connectors, the optics comprises:

one or more first lenses (e.g., 551, FIG. 5) located at a first offset distance from the opposite side of the second connector part; a plurality of second lenses (e.g., 541, FIG. 5) located at a second offset distance from the opposite side of the second connector part, the second offset distance being smaller than the first offset distance; and a plurality of third lenses (e.g., 542, FIG. 5) located at a third offset distance from the opposite side of the second connector part, the third offset distance being smaller than the second offset distance, said first, second, and third distances being measured with the first and second connector parts being connected to one another.

In some embodiments of any of the above fiber-optic connectors, the optics comprises at least one lens (e.g., 542, FIG. 5) configured to communicate light with a single one of the fiber cores and a single one of vertical-coupling elements of the photonic integrated circuit.

In some embodiments of any of the above fiber-optic connectors, the optics comprises a plurality of optical waveguides (e.g., 652, FIG. 6), each disposed to optically connect a respective one of the fiber cores and a respective one of vertical-coupling elements of the photonic integrated circuit.

In some embodiments of any of the above fiber-optic connectors, at least some of the optical waveguides are tapered.

In some embodiments of any of the above fiber-optic connectors, the optics comprises one or more polarization beam splitters (e.g., 810 and 820, FIG. 8A and FIG. 8B).

In some embodiments of any of the above fiber-optic connectors, the optics comprises one or more polarization-rotating elements (e.g., 861, 862, FIG. 8B).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure can be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

As used in this application, the term "circuitry" can refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

Although the present invention is defined in the attached claims, it should be understood that the present invention can also be defined in accordance with the following sets of embodiments:

First Set of Embodiments

Embodiment 1: An apparatus comprising:

one or more optical fibers having a plurality of fiber cores;

a photonic integrated circuit including a plurality of vertical-coupling elements disposed along a main surface of the photonic integrated circuit; and a fiber-optic connector connected between the one or more optical fibers and the photonic integrated circuit to communicate light therebetween through the main surface, the fiber-optic connector comprising optics configured to transfer light between the plurality of fiber cores and the plurality of vertical-coupling elements such that:

a distance between a first pair of the fiber cores is optically scaled by a first scaling factor; and a diameter of at least one of the fiber cores is optically scaled by a second scaling factor that is different from the first scaling factor.

Embodiment 2: The apparatus of embodiment 1, wherein the optics is further configured to transfer the light such that a distance between a second pair of the fiber cores is optically scaled by a third scaling factor that is different from the second scaling factor.

Embodiment 3: The apparatus of embodiment 1, wherein the optics comprises:

one or more first lenses located at a first offset distance from the main surface;

a plurality of second lenses located at a second offset distance from the main surface, the second offset distance being smaller than the first offset distance; and a plurality of third lenses located at a third offset distance from the main surface, the third offset distance being smaller than the second offset distance.

Embodiment 4: The apparatus of embodiment 1, wherein the optics comprises at least one lens configured to communicate light with a single one of the fiber cores and a single one of the vertical-coupling elements.

Embodiment 5: The apparatus of embodiment 1, wherein the optics comprises a plurality of optical waveguides, each optically connecting a respective one of the fiber cores and a respective one of the vertical-coupling elements.

Embodiment 6: The apparatus of embodiment 5, wherein at least some of the optical waveguides are tapered.

Embodiment 7: The apparatus of embodiment 1, wherein the optics comprises one or more polarization beam splitters.

Embodiment 8: The apparatus of embodiment 1, wherein the optics comprises one or more polarization-rotating elements.

Embodiment 9: The apparatus of embodiment 1, wherein the fiber-optic connector comprises a first connector part and a second connector part disconnectably connected to one another.

Embodiment 10: The apparatus of embodiment 9, wherein the optics is configured to produce, at a mating surface between the first and second connector parts, light spots of a larger size, by at least a factor of two, than corresponding diameters of the fiber cores.

Embodiment 11: The apparatus of embodiment 1, wherein the optics is configured to communicate light between a first number of the fiber cores and a second number of the vertical-coupling elements, the second number being greater than the first number.

Embodiment 12: The apparatus of embodiment 1, wherein each of the vertical-coupling elements is selected from an element set consisting of: a single-polarization vertical grating coupler, a turning mirror, a polarization-diversity vertical grating coupler, a vertical cavity surface emitting laser, a surface-normal modulator, and a photodiode.

Embodiment 13: A fiber-optic connector comprising:

a first connector part connectable at a first side thereof to one or more optical fibers having a plurality of fiber cores, the first connector part having a second side that is opposite to the first side;

a second connector part connectable at one side thereof to the second side of the first connector part and further connectable at an opposite side thereof to a photonic integrated circuit; and optics configured to transfer light between the first side of the first connector part and the opposite side of the second connector part such that:

a distance between a first pair of the fiber cores is optically scaled by a first scaling factor; and a diameter of at least one of the fiber cores is optically scaled by a second scaling factor that is different from the first scaling factor.

Embodiment 14: The fiber-optic connector of embodiment 13, wherein the optics is further configured to transfer the light such that a distance between a second pair of the fiber cores is optically scaled by a third scaling factor that is different from the second scaling factor.

Embodiment 15: The fiber-optic connector of embodiment 13, wherein the optics comprises:

one or more first lenses located at a first offset distance from the opposite side of the second connector part;

a plurality of second lenses located at a second offset distance from the opposite side of the second connector part, the second offset distance being smaller than the first offset distance; and a plurality of third lenses located at a third offset distance from the opposite side of the second connector part, the third offset distance being smaller than the second offset distance, said first, second, and third distances being measured with the first and second connector parts being connected to one another.

Embodiment 16: The fiber-optic connector of embodiment 13, wherein the optics comprises at least one lens configured to communicate light with a single one of the fiber cores and a single one of vertical-coupling elements of the photonic integrated circuit.

Embodiment 17: The fiber-optic connector of embodiment 13, wherein the optics comprises a plurality of optical waveguides, each disposed to optically connect a respective one of the fiber cores and a respective one of vertical-coupling elements of the photonic integrated circuit.

Embodiment 18: The fiber-optic connector of embodiment 17, wherein at least some of the optical waveguides are tapered.

Embodiment 19: The fiber-optic connector of embodiment 13, wherein the optics comprises one or more polarization beam splitters.

Embodiment 20: The fiber-optic connector of embodiment 13, wherein the optics comprises one or more polarization-rotating elements.

Embodiment 21: The apparatus of embodiment 1 in which the fiber-optic connector comprises a birefringent plate having holes.

Embodiment 22: The apparatus of embodiment 21 in which the holes comprise at least one of circular holes, square holes, rectangular holes, or strip holes.

Embodiment 23: The apparatus of embodiment 21 in which the birefringent plate comprises a half-wave plate.

Embodiment 24: The apparatus of embodiment 1 in which the fiber-optic connector comprises multiple strip platelets spaced apart from each other, in which the strip platelets are configured to rotate a polarization of optical beam components having a first polarization state, and the space between the strip platelets allows optical beam components having a second polarization state to pass through without rotation of polarization.

Embodiment 25: The apparatus of embodiment 8 in which the one or more polarization-rotating elements are implemented as a birefringent plate having holes.

Embodiment 26: The apparatus of embodiment 1 in which the fiber-optic connector comprises:

one or more walk-off elements configured to receive input optical beams from one or more of the fiber cores, and separate each input optical beam into a first optical beam component having a first polarization and a second optical beam component having a second polarization, and a birefringent plate having holes, in which the birefringent plate is positioned relative to the one or more walk-off elements such that each hole is aligned with a corresponding first optical beam component, wherein the birefringent plate rotates a polarization of each of the second optical beam components to cause the second optical beam component to have a same polarization as the corresponding first optical beam component.

Embodiment 27: The apparatus of embodiment 26 in which each of the first and second optical beam components is directed towards one of the vertical-coupling elements.

Embodiment 28: The apparatus of embodiment 26 in which the fiber cores are configured to transmit single wavelength signals, and the number of vertical-coupling elements for transferring input light from the fiber-optic connector to the photonic integrated circuit is twice the number of fiber cores that provide the input optical beams.

Embodiment 29: The apparatus of embodiment 26 in which the fiber cores are arranged in one or more rows, wherein each walk-off element is configured to allow the first optical beam component to pass through without displacement, and cause the second optical beam component to be displaced at a distance relative to the first optical beam component, wherein the second optical beam is displaced in a walk-off direction that is parallel to a row direction.

Embodiment 30: The apparatus of embodiment 26 in which the fiber cores are arranged in one or more rows, wherein each walk-off element is configured to allow the first optical beam component to pass through without displacement, and cause the second optical beam component to be displaced at a distance relative to the first optical beam component, wherein the second optical beam is displaced in a walk-off direction that is perpendicular to a row direction.

Embodiment 31: The apparatus of embodiment 26 in which each walk-off element is configured to allow the first optical beam component to pass through without displacement, and cause the second optical beam component to be displaced at a distance relative to the first optical beam component, wherein the vertical-coupling elements are configured to couple optical signals that have electric fields along a first direction with maximum efficiency, wherein the second optical beam is displaced relative to the first optical beam in a walk-off direction that is parallel to the first direction.

Embodiment 32: The apparatus of embodiment 31 in which the fiber cores are arranged in one or more rows, and the first direction is perpendicular to the row direction.

Embodiment 33: The apparatus of embodiment 31 in which the fiber cores are arranged in one or more rows, the first direction is at an angle relative to the row direction, and the angle is in a range from 10° to 80°.

Embodiment 34: The apparatus of embodiment 26 in which each walk-off element is configured to allow the first optical beam component to pass through without displacement, and cause the second optical beam component to be displaced at a distance relative to the first optical beam component, wherein the vertical-coupling elements are configured to couple optical signals that have electric fields along a first direction with maximum efficiency, wherein the second optical beam is displaced relative to the first optical beam in a walk-off direction that is perpendicular to the first direction.

Embodiment 35: The apparatus of embodiment 34 in which the fiber cores are arranged in one or more rows, and the first direction is parallel to the row direction.

Embodiment 36: The apparatus of embodiment 34 in which the fiber cores are arranged in one or more rows, and the first direction is at an angle relative to the row direction, and the angle is in a range from 10° to 80°.

Embodiment 37: The apparatus of embodiment 1 in which the vertical-coupling elements comprise a first set of vertical-coupling elements that transfer light between the plurality of fiber cores and the photonic integrated circuit, and a second set of vertical-coupling elements that do not transfer light between the plurality of fiber cores and the photonic integrated circuit, wherein at least one pair of vertical-coupling elements in the second set of vertical-coupling elements are connected by an alignment waveguide that enables active alignment of the vertical-coupling elements and the fiber-optic connector.

Embodiment 38: The apparatus of embodiment 37 in which the vertical coupling elements are located within an overall rectangular footprint, and the second set of vertical-coupling elements is positioned within the overall rectangular footprint.

Embodiment 39: The apparatus of embodiment 1 in which the fiber-optic connector comprises an optical power supply fiber port that is configured to receive a first optical power supply beam from an optical fiber, wherein the fiber-optic connector comprises a first polarization beam splitter that is configured to split the first optical power supply beam into a second optical power supply beam and a third optical power supply beam.

Embodiment 40: The apparatus of embodiment 39 in which the fiber-optic connector comprises a polarization-rotating element that rotates a polarization direction of the second optical power supply beam or the third optical power supply beam to cause the second and third optical power supply beam to have the same polarization.

Embodiment 41: The apparatus of embodiment 39 in which the fiber-optic connector comprises a second polarization beam splitter that is configured to split the second and third optical power supply beams into four optical power supply beams.

Embodiment 42: The apparatus of embodiment 41 in which the first polarization beam splitter has a first walk-off direction, and the second polarization beam splitter has a second walk-off direction that is different from the first walk-off direction.

Embodiment 43: The apparatus of embodiment 41 in which the fiber-optic connector comprises a third polarization beam splitter that is configured to split the four optical power supply beams into eight optical power supply beams.

Embodiment 44: The apparatus of embodiment 1 in which the fiber-optic connector comprises a wavelength division multiplexer that multiplexes two or more optical signal that have two or more different wavelengths into a single WDM output optical signal.

Embodiment 45: The apparatus of embodiment 44 in which the wavelength division multiplexer comprises a first walk-off element and a birefringent hole plate.

Embodiment 46: The apparatus of embodiment 45 in which the wavelength division multiplexer comprises a second walk-off element and a waveplate, wherein the waveplate is configured to preserve polarization of light having a first wavelength and rotate polarization of light have a second wavelength.

Embodiment 47: The apparatus of embodiment 46 in which the waveplate is configured to rotate polarization of light having a third wavelength and preserve polarization of light having a fourth wavelength, in which the first, second, third, and fourth wavelengths are all different from one another.

Embodiment 48: The apparatus of embodiment 47 in which the first wavelength is smaller than the second wavelength, the second wavelength is smaller than the third wavelength, and the third wavelength is smaller than the fourth wavelength.

Embodiment 49: The apparatus of embodiment 46 in which the birefringent hole plate comprises quartz, and the waveplate comprises yttrium orthovanadate ($YVO_4$).

Embodiment 50: The apparatus of embodiment 44 in which the wavelength division multiplexer is configured to multiplex light have wavelengths compatible with 200GBASE-FR4 wavelength-division-multiplexed lane assignments.

Embodiment 51: The apparatus of embodiment 44 in which the wavelength division multiplexer is configured to multiplex light have wavelengths compatible with 200GBASE-LR4 wavelength-division-multiplexed lane assignments.

Embodiment 52: The apparatus of embodiment 44 in which the wavelength division multiplexer is configured to multiplex light have wavelengths compatible with 400GBASE-FR8 wavelength-division-multiplexed lane assignments.

Embodiment 53: The apparatus of embodiment 7, wherein the optics comprises one or more polarization-rotating elements, wherein the polarization beam splitter and the polarization-rotating element are aligned along a direction substantially parallel to a top surface of the photonic integrated circuit, wherein the fiber-optic connector comprises a turning mirror to redirect light from the polarization-rotating element toward the vertical-coupling element.

Embodiment 54: The apparatus of embodiment 7, wherein the optics comprises one or more polarization-rotating elements, wherein the polarization beam splitter and the polarization-rotating element are aligned along a direction substantially perpendicular to a top surface of the photonic integrated circuit.

Embodiment 55: The apparatus of embodiment 7, wherein the optics comprises one or more polarization-rotating elements, wherein the polarization beam splitter and the polarization-rotating element are configured to enable edge coupling of light from the plurality of fiber cores to the photonic integrated circuit.

Embodiment 56: The apparatus of embodiment 1 in which the fiber-optic connector comprises a wavelength division demultiplexer that includes one or more wavelength dependent filters.

Embodiment 57: The apparatus of embodiment 56 in which the wavelength division demultiplexer is configured to direct light having a first wavelength to a first set of one or more grating couplers, and direct light having a second wavelength to a second set of one or more grating couplers.

Embodiment 58: The apparatus of embodiment 56 in which the wavelength division demultiplexer is configured to convert K rows of N fibers to an N×2MK array of grating couplers, K, N, and M are positive integers, and M represents the number of wavelengths that is processed by the wavelength division demultiplexer.

Embodiment 59: The apparatus of embodiment 1 in which the fiber-optic connector comprises a wavelength division multiplexer that includes one or more wavelength dependent filters.

Embodiment 60: The apparatus of embodiment 59 in which the wavelength division multiplexer is configured to combine light having a first wavelength from a first set of one or more grating couplers and light having a second wavelength from a second set of one or more grating couplers into a combined optical beam.

Embodiment 61: The apparatus of embodiment 59 in which the wavelength division multiplexer is configured to convert an N×2MK array of grating couplers into K rows of N fibers, K, N, and M are positive integers, and M represents the number of wavelengths that is processed by the wavelength division multiplexer.

Embodiment 62: The apparatus of embodiment 1 in which the fiber-optic connector comprises a wavelength division demultiplexer that includes one or more broadband optical splitters.

Embodiment 63: The apparatus of embodiment 62 in which the wavelength division demultiplexer is configured to split incoming light into a first beam and a second beam, direct the first beam to a first bandpass optical filter that passes light having a first wavelength, and direct the second beam to a second bandpass optical filter that passes light having a second wavelength.

Embodiment 64: The apparatus of embodiment 62 in which the wavelength division demultiplexer is configured to convert K rows of N fibers to an N×2MK array of grating couplers, K, N, and M are positive integers, and M represents the number of wavelengths that is processed by the wavelength division demultiplexer.

Embodiment 65: The apparatus of embodiment 1 in which the fiber-optic connector comprises a wavelength division multiplexer that includes one or more broadband optical splitters.

Embodiment 66: The apparatus of embodiment 65 in which the wavelength division multiplexer is configured to combine light having a first wavelength from a first set of one or more grating couplers and light having a second wavelength from a second set of one or more grating couplers into a combined optical beam.

Embodiment 67: The apparatus of embodiment 65 in which the wavelength division multiplexer is configured to convert an N×2MK array of grating couplers into K rows of N fibers, K, N, and M are positive integers, and M represents the number of wavelengths that is processed by the wavelength division multiplexer.

Embodiment 68: The apparatus of embodiment 1 in which the fiber-optic connector comprises an isolator that is configured to direct egress light leaving the photonic integrated circuit in an egress path that is different from an ingress path traveled by ingress light, and the egress light is not coupled back into an optical fiber that provides the ingress light.

Embodiment 69: The apparatus of embodiment 68 in which the isolator comprises a walk-off element and at least one non-reciprocal rotator.

Embodiment 70: An apparatus comprising:

a laser configured to provide optical power supply light;

a first linear-polarization-maintaining fiber optically coupled to the laser to receive the optical power supply light;

a polarization beam splitter, in which the linear-polarization-maintaining fiber is oriented at an angle relative to the polarization beam splitter to achieve an optical power split of the optical power supply light to generate a first power supply light having a first polarization and a second power supply light having a second polarization;

a second linear-polarization-maintaining fiber optically coupled to a first port of the polarization beam splitter to receive the first power supply light; and a third linear-polarization-maintaining fiber optically coupled to a second port of the polarization beam splitter to receive the second power supply light.

Embodiment 71: An apparatus comprising:

a laser configured to provide linearly polarized optical power supply light;

a quarter-wave plate to convert the linear polarized optical power supply light to circular polarized optical power supply light;

a circular-polarization-maintaining fiber configured to propagate the circular polarized optical power supply light from the quarter-wave plate;

a polarization beam splitter configured to split the circular polarized optical power supply light to generate first power supply light having a first polarization and second power supply light having a second polarization;

a first linear-polarization-maintaining fiber optically coupled to a first port of the polarization beam splitter to receive the first power supply light; and a second linear-polarization-maintaining fiber optically coupled to a second port of the polarization beam splitter to receive the second power supply light.

Embodiment 72: An apparatus comprising:

a fiber-optic connector comprising:

- a set of fiber ports configured to be optically coupled to one or more optical fibers having a plurality of fiber cores;
- a set of optical ports configured to be optically coupled to a plurality of coupling elements of a photonic integrated circuit; and
- optics configured to transfer light between the set of fiber ports and the set of optical ports;
- wherein the optics comprise at least one of (i) one or more polarization beam splitters, (ii) one or more polarization-rotating elements, (iii) one or more walk-off elements, (iv) a birefringent hole plate, (v) a wavelength division multiplexer, (vi) a wavelength division demultiplexer, or (vii) an isolator.

Embodiment 73: The apparatus of embodiment 72 in which the fiber-optic connector is configured to receive a first optical power supply beam from the set of fiber ports, split the first optical power supply beam into a second optical power supply beam and a third optical power supply beam, and output the second and third optical power supply beams through the set of optical ports.

Embodiment 74: The apparatus of embodiment 73 in which the fiber-optic connector comprises the fiber-optic connector of any of embodiments 39 to 43.

Embodiment 75: The apparatus of any of embodiments 71 to 74 in which the birefringent hole plate comprises the birefringent hole plate of any of embodiments 21 to 23, 25 to 36, and 45 to 49.

Embodiment 76: The apparatus of any of embodiments 71 to 75 in which the one or more walk-off elements comprise the walk-off element of any of embodiments 26 to 36, 45 to 49, and 69.

Embodiment 77: The apparatus of any of embodiments 71 to 76 in which the wavelength division multiplexer comprises the wavelength division multiplexer of any of embodiments 44 to 52, 59 to 61, and 65 to 67.

Embodiment 78: The apparatus of any of embodiments 71 to 77 in which the wavelength division demultiplexer comprises the wavelength division demultiplexer of any of embodiments 56 to 58 and 62 to 64.

Embodiment 79: The apparatus of any of embodiments 71 to 78 in which the isolator comprises the isolator of embodiment 68 or 69.

Embodiment 80: A data center comprising the apparatus of any of embodiments 1 to 79.

Embodiment 81: A method of operating the apparatus of any of embodiments 1 to 79.

Embodiment 82: A method of operating the data center of embodiment 80.

Embodiment 83: A method of assembling the apparatus of any of embodiments 1 to 79.

Embodiment 84: A method of processing data using the apparatus of any of embodiments 1 to 79.

Embodiment 85: A method of providing optical power using the apparatus of any of embodiments 39 to 43, 70, and 71.

The following is a second set of embodiments. The embodiment numbers below refer to those in the second set of embodiments.

Embodiment 1: An apparatus comprising:

- a laser configured to provide linearly polarized optical power supply light;
- a quarter-wave plate to convert the linearly polarized optical power supply light to circularly polarized optical power supply light;
- a circular-polarization-maintaining fiber configured to propagate the circularly polarized optical power supply light from the quarter-wave plate;
- a polarization beam splitter configured to split the circularly polarized optical power supply light to generate first power supply light having a first polarization and second power supply light having a second polarization;
- a first linear-polarization-maintaining fiber optically coupled to a first port of the polarization beam splitter to receive the first power supply light; and
- a second linear-polarization-maintaining fiber optically coupled to a second port of the polarization beam splitter to receive the second power supply light.

Embodiment 2: An apparatus comprising:

- a first laser configured to generate first linearly polarized light;
- a first quarter-wave plate configured to convert the first linearly polarized light to first circularly polarized light;
- a first circular-polarization-maintaining fiber having a first end optically coupled to the first quarter-wave plate;
- a second quarter-wave plate optically coupled to a second end of the first circular-polarization-maintaining fiber, in which the first circular-polarization-maintaining fiber is configured to transmit the first circularly polarized light from the first quarter-wave plate to the second quarter-wave plate, and the second quarter-wave plate is configured to convert the first circularly polarized light to second linearly polarized light; and
- a first optical modulator configured to modulate the second linearly polarized light.

Embodiment 3: The apparatus of embodiment 2, comprising a first photonic integrated circuit including circuitry that is configured to generate a first electrical signal, in which the first optical modulator is part of the photonic integrated circuit, and the first optical modulator is configured to modulate the second linearly polarized light based on the first electrical signal.

Embodiment 4: The apparatus of embodiment 2 or 3, comprising:

- a second laser configured to generate third linearly polarized light, in which the first quarter-wave plate is configured to convert the third linearly polarized light to second circularly polarized light;
- a second circular-polarization-maintaining fiber having a first end optically coupled to the first quarter-wave plate and a second end optically coupled to the second quarter-wave plate, in which the second circular-polarization-maintaining fiber is configured to transmit the second circularly polarized light from the first quarter-wave plate to the second quarter-wave plate;
- wherein the second quarter-wave plate is configured to convert the second circularly polarized light to fourth linearly polarized light; and
- a second optical modulator configured to modulate the fourth linearly polarized light.

Embodiment 5: The apparatus of embodiment 4 in which the first laser and the second laser are aligned such that the first linearly polarized light has a polarization direction that is substantially parallel to the polarization direction of the third linearly polarized light.

Embodiment 6: The apparatus of embodiment 4 or 5, comprising a substrate, in which the first optical modulator and the second optical modulator are mounted on the substrate.

Embodiment 7: The apparatus of embodiment 6 in which the second quarter-wave plate is at least one of edge-coupled or vertically coupled to the substrate.

Embodiment 8: An apparatus comprising:

- a first substrate;
- a first laser mounted on the first substrate and configured to generate first linearly polarized light;
- a first quarter-wave polarization rotator mounted on the first substrate and configured to convert the first linearly polarized light to first circularly polarized light;
- a first circular-polarization-maintaining fiber having a first end optically coupled to the first quarter-wave polarization rotator;
- a second substrate;
- a second quarter-wave polarization rotator mounted on the second substrate and optically coupled to a second end of the first circular-polarization-maintaining fiber, in which the first circular-polarization-maintaining fiber is configured to transmit the first circularly polarized light from the first quarter-wave polarization rotator to the second quarter-wave polarization rotator, and the second quarter-wave polarization rotator is configured to convert the first circularly polarized light to second linearly polarized light; and
- a first optical modulator mounted on the second substrate and configured to modulate the second linearly polarized light.

Embodiment 9: The apparatus of embodiment 8 in which the first circular-polarization-maintaining fiber is at least one of edge-coupled or vertically coupled to the second substrate.

Embodiment 10: The apparatus of embodiment 8 or 9, comprising:

- a second laser mounted on the first substrate and configured to generate third linearly polarized light;
- a third quarter-wave polarization rotator mounted on the first substrate and configured to convert the third linearly polarized light to second circularly polarized light;

a second circular-polarization-maintaining fiber having a first end optically coupled to the second quarter-wave polarization rotator;

a fourth quarter-wave polarization rotator mounted on the second substrate and optically coupled to a second end of the second circular-polarization-maintaining fiber, in which the second circular-polarization-maintaining fiber is configured to transmit the second circularly polarized light from the third quarter-wave polarization rotator to the fourth quarter-wave polarization rotator, and the fourth quarter-wave polarization rotator is configured to convert the second circularly polarized light to fourth linearly polarized light; and a second optical modulator mounted on the second substrate and configured to modulate the fourth polarized light.

Embodiment 11: The apparatus of embodiment 10 in which the first laser and the second laser are aligned such that the first linearly polarized light has a polarization direction that is substantially parallel to the polarization direction of the third linearly polarized light.

Embodiment 12: An apparatus comprising:

a first laser configured to generate first linearly polarized light;

a second laser configured to generate second linearly polarized light;

a first polarization beam splitter configured to combine the first linearly polarized light and the second linearly polarized light to generate a first linearly polarized combined light;

a first quarter-wave plate or quarter-wave polarization rotator configured to convert the first linearly polarized combined light to first circularly polarized combined light;

a first circular-polarization-maintaining fiber having a first end optically coupled to the first quarter-wave plate or quarter-wave polarization rotator;

a second quarter-wave plate or quarter-wave polarization rotator optically coupled to a second end of the circular polarization maintaining fiber, in which the first circular-polarization-maintaining fiber is configured to transmit the first circularly polarized combined light from the first quarter-wave plate or quarter-wave polarization rotator to the second quarter-wave plate or quarter-wave polarization rotator, and the second quarter-wave plate or quarter-wave polarization rotator is configured to convert the first circularly polarized combined light to second linearly polarized combined light;

a second polarization beam splitter configured to separate the second linearly polarized combined light to a third linearly polarized light and a fourth linearly polarized light;

a first optical modulator configured to modulate the third linearly polarized light; and a second optical modulator configured to modulate the fourth linearly polarized light.

Embodiment 13: The apparatus of embodiment 12 in which the first linearly polarized light has a first polarization direction, and the second linearly polarized light has a second polarization direction that is substantially orthogonal to the first polarization direction.

Embodiment 14: The apparatus of embodiment 13 in which the third linearly polarized light has a third polarization direction, and the fourth linearly polarized light has a fourth polarization direction that is substantially orthogonal to the third polarization direction.

Embodiment 15: The apparatus of embodiment 13 or 14 in which the first circularly polarized combined light has a right-handed circularly polarized component and a left-handed circularly polarized component.

Embodiment 16: An apparatus comprising:

a photon source comprising a first laser source and a second laser source, in which the photon source is configured to generate first circularly polarized combined light based on light generated by the first laser source and the second laser source, the first circularly polarized combined light has a right-handed circularly polarized component and a left-handed circularly polarized component;

a first circular-polarization-maintaining fiber configured to receive the first circularly polarized combined light from the photon source; and a modulator module comprising a first modulator and a second modulator, in which the modulator module is configured to convert the first circularly polarized combined light to third linearly polarized light and fourth linearly polarized light, the first modulator is configured to modulate the third linearly polarized light, and the second modulator is configured to modulate the fourth linearly polarized light.

Embodiment 17: The apparatus of embodiment 16 in which the photon source comprises a first polarization beam splitter configured to combine light generated by the first laser source and light generated by the second laser source.

Embodiment 18: The apparatus of embodiment 17 in which the first laser source is configured to generate first linearly polarized light, and the second laser source is configured to generate second linearly polarized light having a polarization direction that is substantially orthogonal to the polarization direction of the first linearly polarized light.

Embodiment 19: The apparatus of embodiment 18 in which the second laser source comprises a second laser and a polarization rotator, the second laser is configured to generate linearly polarized light having a polarization direction that is substantially parallel to the polarization direction of the first linearly polarized light, and the polarization rotator is configured to rotate the polarization direction of the light from the second laser to cause the second linearly polarized light to have the polarization direction that is substantially orthogonal to the polarization direction of the first linearly polarized light.

Embodiment 20: The apparatus of any of embodiments 17 to 19 in which the photon source comprises a first quarter-wave plate configured to receive light from the polarization beam splitter, the first laser source is configured to generate first linearly polarized light, the second laser source is configured to generate second linearly polarized light having a polarization direction substantially orthogonal to the polarization direction of the first linearly polarized light, the first polarization beam splitter is configured to combine the first linearly polarized light and the second linearly polarized light to generate first linearly polarized combined light, and the first quarter-wave plate is configured to convert the first linearly polarized combined light to the first circularly polarized combined light.

Embodiment 21: The apparatus of any of embodiments 17 to 19 in which the photon source comprises a first quarter-wave plate configured to receive light from the first laser source and the second laser source, the first laser source is configured to generate first linearly polarized light, the second laser source is configured to generate second linearly polarized light having a polarization direction substantially orthogonal to the polarization direction of the first linearly polarized light, the first quarter-wave plate is configured to convert the first linearly polarized light to first circularly polarized light, and convert the second linearly polarized light to second circularly polarized light, and the first polarization beam splitter is configured to combine the first circularly polarized light and the second circularly polarized light to generate the first circularly polarized combined light.

Embodiment 22: The apparatus of any of embodiments 16 to 21 in which the modulator module comprises a second polarization beam splitter configured to separate the first circularly polarized combined light or light derived from the first circularly polarized combined light to a first light component that is provided to the first modulator and a second light component that is provided to the second modulator.

Embodiment 23: The apparatus of embodiment 22 in which the modulator module comprises a quarter-wave plate configured to receive the first circularly polarized combined light and generate second linearly polarized combined light, the second polarization beam splitter is configured to separate the second linearly polarized combined light to the third linearly polarized light and the fourth linearly polarized light.

Embodiment 24: The apparatus of embodiment 22 in which the modulator module comprises a quarter-wave plate configured to receive light from the second polarization beam splitter, the second polarization beam splitter is configured to separate the first circularly polarized combined light to a first circularly polarized component and a second circularly polarized component, the quarter-wave plate is configured to convert the first circularly polarized component to the third linearly polarized light, and convert the second circularly polarized component to the fourth linearly polarized light.

Embodiment 25: The apparatus of any of embodiments 22 to 24 in which the modulator module comprises a polarization rotator configured to rotate the polarization direction of the light that is provided to one of the modulators.

Embodiment 26: A method comprising:

at a first light source, generating first circularly polarized light;

transmitting the first circularly polarized light through a first circular-polarization-maintaining fiber from the first light source to a second location;

at the second location, converting the first circularly polarized light to second linearly polarized light; and modulating the second linearly polarized light.

Embodiment 27: The method of embodiment 26 in which generating the first circularly polarized light comprises generating first linearly polarized light, and converting the first linearly polarized light to the first circularly polarized light.

Embodiment 28: The method of embodiment 26 in which generating the first circularly polarized light comprises:

generating first linearly polarized light, generating third linearly polarized light, combining the first linearly polarized light and the third linearly polarized light to generate first linearly polarized combined light, and converting the first linearly polarized combined light to the first circularly polarized light, in which the first circularly polarized light includes a first circularly polarized component and a second circularly polarized component.

Embodiment 29: The method of embodiment 26 in which generating the first circularly polarized light comprises:

generating first linearly polarized light, generating third linearly polarized light, converting the first linearly polarized light to second circularly polarized light, converting the third linearly polarized light to third circularly polarized light, and combining the second circularly polarized light and the third circularly polarized light to generate the first circularly polarized combined light.

Embodiment 30: The method of embodiment 28 or 29 in which converting the first circularly polarized light to second linearly polarized light comprises converting the first circularly polarized light to third linearly polarized light, and separating the third linearly polarized light to fourth linearly polarized light and fifth linearly polarized light, wherein modulating the second linearly polarized light comprises modulating the fourth linearly polarized light and modulating the fifth linearly polarized light.

Embodiment 31: The method of embodiment 28 or 29 in which converting the first circularly polarized light to second linearly polarized light comprises separating the first circularly polarized light to a first circularly polarized component and a second circularly polarized component, converting the first circularly polarized component to third linearly polarized light, converting the second circularly polarized component to fourth linearly polarized light, wherein modulating the second linearly polarized light comprises modulating the third linearly polarized light and modulating the fourth linearly polarized light.

Embodiment 32: A method comprising:

using a first single quarter-wave plate to convert a first plurality of linearly polarized light to a plurality of circularly polarized light;

transmitting the plurality of circularly polarized light through a plurality of circular-polarization-maintaining fibers;

converting the circularly polarized light received from the plurality of circular-polarization-maintaining fibers to a second plurality of linearly polarized light; and modulating the second plurality of linearly polarized light.

Embodiment 33: The method of embodiment 32 in which converting the circularly polarized light received from the plurality of circular-polarization-maintaining fibers to the second plurality of linearly polarized light comprises using a second single quarter-wave plate to convert the circularly polarized light received from the plurality of circular-polarization-maintaining fibers to the second plurality of linearly polarized light.

Embodiment 34: A method comprising:

at a first photonic integrated circuit, generating a first plurality of linearly polarized light, and converting the first plurality of linearly polarized light to a plurality of circularly polarized light;

transmitting the plurality of circularly polarized light through a plurality of circular-polarization-maintaining fibers from the first photonic integrated circuit to a second location;

at the second location, converting the plurality of circularly polarized light to a second plurality of linearly polarized light; and modulating the second plurality of linearly polarized light.

Embodiment 35: The method of embodiment 34 in which converting the first plurality of linearly polarized light to the plurality of circularly polarized light comprises using a plurality of polarization converters to convert the first plurality of linearly polarized light to the plurality of circularly polarized light.

Embodiment 36: The method of embodiment 34 or 35 in which converting the plurality of circularly polarized light to the second plurality of linearly polarized light comprises using a plurality of polarization converters to convert the plurality of circularly polarized light to the second plurality of linearly polarized light.

Embodiment 37: An apparatus comprising:

a light source configured to generate first linearly polarized light;

a first quarter-wave plate configured to convert the first linearly polarized light to first circularly polarized light;

a first circular-polarization-maintaining fiber having a first end optically coupled to the first quarter-wave plate;

a second quarter-wave plate optically coupled to a second end of the first circular-polarization-maintaining fiber, in which the first circular-polarization-maintaining fiber is configured to transmit the first circularly polarized light from the first quarter-wave plate to the second quarter-wave plate, and the second quarter-wave plate is configured to convert the first circularly polarized light to second linearly polarized light; and a first optical device that accepts the second linearly polarized light.

Embodiment 38: The apparatus of embodiment 37 in which the first optical device comprise at least one of a lithium niobate optical modulator, a vertical grating coupler on a photonic integrated circuit, or a modulator integrated on a photonic integrated circuit.

Embodiment 39: The apparatus of embodiment 37 in which the light source comprises a local oscillator that is configured to generate a sequence of optical pulses, and the first optical device comprises a coherent optical receiver.

Embodiment 40: The apparatus of embodiment 37 in which the light source comprises a single-polarization optical transmitter and the first optical device comprises a single-polarization optical receiver.

Embodiment 41: The apparatus of embodiment 37, comprising a first photonic integrated circuit including circuitry that is configured to generate a first electrical signal, in which the first optical device is part of the photonic integrated circuit, and the first optical device is configured to process the second linearly polarized light based on the first electrical signal.

Embodiment 42: The apparatus of any of embodiments 37 to 41, comprising:

a second light source configured to generate third linearly polarized light, in which the first quarter-wave plate is configured to convert the third linearly polarized light to second circularly polarized light;

a second circular-polarization-maintaining fiber having a first end optically coupled to the first quarter-wave plate and a second end optically coupled to the second quarter-wave plate, in which the second circular-polarization-maintaining fiber is configured to transmit the second circularly polarized light from the first quarter-wave plate to the second quarter-wave plate;

wherein the second quarter-wave plate is configured to convert the second circularly polarized light to fourth linearly polarized light; and a second optical device that accepts the fourth linearly polarized light.

Embodiment 43: The apparatus of embodiment 42 in which the first light source and the second light source are aligned such that the first linearly polarized light has a polarization direction that is substantially parallel to the polarization direction of the third linearly polarized light.

Embodiment 44: The apparatus of embodiment 42 or 43, comprising a substrate, in which the first optical device and the second optical device are mounted on the substrate.

Embodiment 45: The apparatus of embodiment 44 in which the second quarter-wave plate is at least one of edge-coupled or vertically coupled to the substrate.

Embodiment 46: An apparatus comprising:

a first substrate;

a first light source mounted on the first substrate and configured to generate first linearly polarized light;

a first quarter-wave polarization rotator mounted on the first substrate and configured to convert the first linearly polarized light to first circularly polarized light;

a first circular-polarization-maintaining fiber having a first end optically coupled to the first quarter-wave polarization rotator;

a second substrate;

a second quarter-wave polarization rotator mounted on the second substrate and optically coupled to a second end of the first circular-polarization-maintaining fiber, in which the first circular-polarization-maintaining fiber is configured to transmit the first circularly polarized light from the first quarter-wave polarization rotator to the second quarter-wave polarization rotator, and the second quarter-wave polarization rotator is configured to convert the first circularly polarized light to second linearly polarized light; and a first optical device mounted on the second substrate and configured to modulate the second linearly polarized light.

Embodiment 47: The apparatus of embodiment 46 in which the first circular-polarization-maintaining fiber is at least one of edge-coupled or vertically coupled to the second substrate.

Embodiment 48: The apparatus of embodiment 46 or 47, comprising:

a second light source mounted on the first substrate and configured to generate third linearly polarized light;

a third quarter-wave polarization rotator mounted on the first substrate and configured to convert the third linearly polarized light to second circularly polarized light;

a second circular-polarization-maintaining fiber having a first end optically coupled to the second quarter-wave polarization rotator;

a fourth quarter-wave polarization rotator mounted on the second substrate and optically coupled to a second end of the second circular-polarization-maintaining fiber, in which the second circular-polarization-maintaining fiber is configured to transmit the second circularly polarized light from the third quarter-wave polarization rotator to the fourth quarter-wave polarization rotator, and the fourth quarter-wave polarization rotator is configured to convert the second circularly polarized light to fourth linearly polarized light; and

- a second optical modulator mounted on the second substrate and configured to modulate the fourth polarized light.

Embodiment 49: The apparatus of embodiment 48 in which the first light source and the second light source are aligned such that the first linearly polarized light has a polarization direction that is substantially parallel to the polarization direction of the third linearly polarized light.

Embodiment 50: An apparatus comprising:

- a first light source configured to generate first linearly polarized light;
- a second light source configured to generate second linearly polarized light;
- a first polarization beam splitter configured to combine the first linearly polarized light and the second linearly polarized light to generate a first linearly polarized combined light;
- a first quarter-wave plate or quarter-wave polarization rotator configured to convert the first linearly polarized combined light to first circularly polarized combined light;
- a first circular-polarization-maintaining fiber having a first end optically coupled to the first quarter-wave plate or quarter-wave polarization rotator;
- a second quarter-wave plate or quarter-wave polarization rotator optically coupled to a second end of the circular polarization maintaining fiber, in which the first circular-polarization-maintaining fiber is configured to transmit the first circularly polarized combined light from the first quarter-wave plate or quarter-wave polarization rotator to the second quarter-wave plate or quarter-wave polarization rotator, and the second quarter-wave plate or quarter-wave polarization rotator is configured to convert the first circularly polarized combined light to second linearly polarized combined light;
- a second polarization beam splitter configured to separate the second linearly polarized combined light to a third linearly polarized light and a fourth linearly polarized light;
- a first optical device configured to process the third linearly polarized light; and
- a second optical device configured to process the fourth linearly polarized light.

Embodiment 51: The apparatus of embodiment 50 in which the first linearly polarized light has a first polarization direction, and the second linearly polarized light has a second polarization direction that is substantially orthogonal to the first polarization direction.

Embodiment 52: The apparatus of embodiment 51 in which the third linearly polarized light has a third polarization direction, and the fourth linearly polarized light has a fourth polarization direction that is substantially orthogonal to the third polarization direction.

Embodiment 53: The apparatus of embodiment 51 or 52 in which the first circularly polarized combined light has a right-handed circularly polarized component and a left-handed circularly polarized component.

Embodiment 54: An apparatus comprising:

- a photon source comprising a first light source and a second light source, in which the photon source is configured to generate first circularly polarized combined light based on light generated by the first light source and the second light source, the first circularly polarized combined light has a right-handed circularly polarized component and a left-handed circularly polarized component;
- a first circular-polarization-maintaining fiber configured to receive the first circularly polarized combined light from the photon source; and
- an optical module comprising a first optical device and a second optical device, in which the optical module is configured to convert the first circularly polarized combined light to third linearly polarized light and fourth linearly polarized light, the first optical device is configured to process the third linearly polarized light, and the second optical device is configured to process the fourth linearly polarized light.

Embodiment 55: The apparatus of embodiment 54 in which the photon source comprises a first polarization beam splitter configured to combine light generated by the first light source and light generated by the second light source.

Embodiment 56: The apparatus of embodiment 55 in which the first light source is configured to generate first linearly polarized light, and

- the second light source is configured to generate second linearly polarized light having a polarization direction that is substantially orthogonal to the polarization direction of the first linearly polarized light.

Embodiment 57: The apparatus of embodiment 56 in which the second light source comprises a second light generating device and a polarization rotator, the second light generating device is configured to generate linearly polarized light having a polarization direction that is substantially parallel to the polarization direction of the first linearly polarized light, and

- the polarization rotator is configured to rotate the polarization direction of the light from the second light generating device to cause the second linearly polarized light to have the polarization direction that is substantially orthogonal to the polarization direction of the first linearly polarized light.

Embodiment 58: The apparatus of any of embodiments 55 to 57 in which the photon source comprises a first quarter-wave plate configured to receive light from the polarization beam splitter,

- the first light source is configured to generate first linearly polarized light, the second light source is configured to generate second linearly polarized light having a polarization direction substantially orthogonal to the polarization direction of the first linearly polarized light,
- the first polarization beam splitter is configured to combine the first linearly polarized light and the second linearly polarized light to generate first linearly polarized combined light, and
- the first quarter-wave plate is configured to convert the first linearly polarized combined light to the first circularly polarized combined light.

Embodiment 59: The apparatus of any of embodiments 55 to 57 in which the photon source comprises a first quarter-wave plate configured to receive light from the first light source and the second light source,

- the first light source is configured to generate first linearly polarized light, the second light source is configured to generate second linearly polarized light having a polarization direction substantially orthogonal to the polarization direction of the first linearly polarized light,
- the first quarter-wave plate is configured to convert the first linearly polarized light to first circularly polarized light, and convert the second linearly polarized light to second circularly polarized light, and the first polarization beam splitter is configured to combine the first circularly polarized light and the second circularly polarized light to generate the first circularly polarized combined light.

Embodiment 60: The apparatus of any of embodiments 54 to 59 in which the optical module comprises a second polarization beam splitter configured to separate the first circularly polarized combined light or light derived from the first circularly polarized combined light to a first light component that is provided to the first modulator and a second light component that is provided to the second optical device.

Embodiment 61: The apparatus of embodiment 60 in which the optical module comprises a quarter-wave plate configured to receive the first circularly polarized combined light and generate second linearly polarized combined light, the second polarization beam splitter is configured to separate the second linearly polarized combined light to the third linearly polarized light and the fourth linearly polarized light.

Embodiment 62: The apparatus of embodiment 60 in which the optical module comprises a quarter-wave plate configured to receive light from the second polarization beam splitter, the second polarization beam splitter is configured to separate the first circularly polarized combined light to a first circularly polarized component and a second circularly polarized component, the quarter-wave plate is configured to convert the first circularly polarized component to the third linearly polarized light, and convert the second circularly polarized component to the fourth linearly polarized light.

Embodiment 63: The apparatus of any of embodiments 60 to 62 in which the optical module comprises a polarization rotator configured to rotate the polarization direction of the light that is provided to one of the optical devices.

Embodiment 64: A method comprising:

at a first light source, generating first circularly polarized light;

transmitting the first circularly polarized light through a first circular-polarization-maintaining fiber from the first light source to a second location;

at the second location, converting the first circularly polarized light to second linearly polarized light; and processing the second linearly polarized light.

Embodiment 65: The method of embodiment 64 in which generating the first circularly polarized light comprises generating first linearly polarized light, and converting the first linearly polarized light to the first circularly polarized light.

Embodiment 66: The method of embodiment 64 in which generating the first circularly polarized light comprises:

generating first linearly polarized light, generating third linearly polarized light, combining the first linearly polarized light and the third linearly polarized light to generate first linearly polarized combined light, and converting the first linearly polarized combined light to the first circularly polarized light, in which the first circularly polarized light includes a first circularly polarized component and a second circularly polarized component.

Embodiment 67: The method of embodiment 64 in which generating the first circularly polarized light comprises:

generating first linearly polarized light, generating third linearly polarized light, converting the first linearly polarized light to second circularly polarized light, converting the third linearly polarized light to third circularly polarized light, and combining the second circularly polarized light and the third circularly polarized light to generate the first circularly polarized combined light.

Embodiment 68: The method of embodiment 66 or 67 in which converting the first circularly polarized light to second linearly polarized light comprises converting the first circularly polarized light to third linearly polarized light, and separating the third linearly polarized light to fourth linearly polarized light and fifth linearly polarized light, wherein processing the second linearly polarized light comprises processing the fourth linearly polarized light and processing the fifth linearly polarized light.

Embodiment 69: The method of embodiment 66 or 67 in which converting the first circularly polarized light to second linearly polarized light comprises separating the first circularly polarized light to a first circularly polarized component and a second circularly polarized component, converting the first circularly polarized component to third linearly polarized light, converting the second circularly polarized component to fourth linearly polarized light, wherein processing the second linearly polarized light comprises processing the third linearly polarized light and processing the fourth linearly polarized light.

Embodiment 70: A method comprising:

using a first single quarter-wave plate to convert a first plurality of linearly polarized light to a plurality of circularly polarized light;

transmitting the plurality of circularly polarized light through a plurality of circular-polarization-maintaining fibers;

converting the circularly polarized light received from the plurality of circular-polarization-maintaining fibers to a second plurality of linearly polarized light; and processing the second plurality of linearly polarized light.

Embodiment 71: The method of embodiment 70 in which converting the circularly polarized light received from the plurality of circular-polarization-maintaining fibers to the second plurality of linearly polarized light comprises using a second single quarter-wave plate to convert the circularly polarized light received from the plurality of circular-polarization-maintaining fibers to the second plurality of linearly polarized light.

Embodiment 72: A method comprising:

at a first photonic integrated circuit, generating a first plurality of linearly polarized light, and converting the first plurality of linearly polarized light to a plurality of circularly polarized light;

transmitting the plurality of circularly polarized light through a plurality of circular-polarization-maintaining fibers from the first photonic integrated circuit to a second location;

at the second location, converting the plurality of circularly polarized light to a second plurality of linearly polarized light; and processing the second plurality of linearly polarized light.

Embodiment 73: The method of embodiment 72 in which converting the first plurality of linearly polarized light to the plurality of circularly polarized light comprises using a plurality of polarization converters to convert the first plurality of linearly polarized light to the plurality of circularly polarized light.

Embodiment 74: The method of embodiment 72 or 73 in which converting the plurality of circularly polarized light to the second plurality of linearly polarized light comprises using a plurality of polarization converters to convert the plurality of circularly polarized light to the second plurality of linearly polarized light.

Embodiment 75: A data center comprising the apparatus of any of embodiments 1 to 25 and 37 to 63.

Embodiment 76: A method of operating the apparatus of any of embodiments 1 to 25 and 37 to 63.

Embodiment 77: A method of operating the data center of embodiment 75.

Embodiment 78: A method of assembly the apparatus of any of embodiments 1 to 25 and 37 to 63.

Embodiment 79: A method of processing data using the apparatus of any of embodiments 1 to 25 and 37 to 63.

The following is a third set of embodiments. The embodiment numbers below refer to those in the third set of embodiments.

Embodiment 1: An apparatus comprising:

a fiber-optic connector configured to optically couple a plurality of optical fibers to a plurality of vertical coupling elements on a photonic integrated circuit, in which the fiber-optic connector comprises a plurality of circularly asymmetric optical lenses configured to direct light toward the vertical coupling elements at one or more angles of incidence relative to a direction perpendicular to a main surface of the photonic integrated circuit.

Embodiment 2: An apparatus comprising:

a fiber-optic connector configured to optically couple a plurality of optical fibers to a plurality of vertical coupling elements on a photonic integrated circuit, in which the fiber-optic connector comprises a plurality of circularly asymmetric optical lenses configured to direct light from the optical fibers toward the vertical coupling elements, wherein each of at least some of the circularly asymmetric optical lenses is configured to direct a light beam towards the corresponding vertical coupling element at an angle of incidence relative to a direction perpendicular to a main surface of the photonic integrated circuit, and each of at least some of the circularly asymmetric optical lenses is asymmetric with respect to an optical axis that is perpendicular to the main surface of the photonic integrated circuit.

Embodiment 3: The apparatus of embodiment 1 or 2 in which the plurality of circularly asymmetric optical lenses are configured to direct light toward the vertical coupling elements at one or more angles of incidence in a range from 1° to 30° relative to the direction perpendicular to the main surface of the photonic integrated circuit.

Embodiment 4: The apparatus of any of embodiments 1 to 3 in which the plurality of optical fibers are arranged in a two-dimensional array.

Embodiment 5: The apparatus of embodiment 4 in which the two-dimensional array comprises at least 2 rows and at least 8 columns.

Embodiment 6: The apparatus of embodiment 4 or 5 in which the spacing between two adjacent rows in the two-dimensional array is identical to the spacing between two adjacent columns in the two-dimensional array.

Embodiment 7: The apparatus of any of embodiments 1 to 6 in which the fiber-optic connector comprises first optical elements configured to process light from the optical fibers to form light beams that are directed to the circularly asymmetric optical lenses.

Embodiment 8: The apparatus of embodiment 7 in which the first optical elements are configured to collimate light from the optical fibers to form collimated light beams that are directed to the circularly asymmetric optical lenses.

Embodiment 9: The apparatus of embodiment 7 or 8 in which each of at least some of the circularly asymmetric optical lenses has a surface profile that is configured to focus the light beam to a first location on the vertical coupling element, the circularly asymmetric optical lens has an optical axis that passes the first location, wherein the first optical element is positioned and oriented relative to the circularly asymmetric optical lens such that the light beam has a first axis that is parallel to, and offset at a first distance from, the optical axis of the circularly asymmetric optical lens.

Embodiment 10: The apparatus of embodiment 9 in which at least two circularly asymmetric optical lenses are spaced apart at a second distance in a range from 1.5 to 4.5 times the first distance between the first axis and the optical axis, the second distance represents the distance between the optical axes of the lenses, the first and second distances being measured along a plane parallel to the main surface of the photonic integrated circuit.

Embodiment 11: The apparatus of embodiment 10 in which the second distance is in a range from 2 to 3.5 times the first distance.

Embodiment 12: The apparatus of embodiment 11 in which the second distance is in a range from 2 to 3 times the first distance.

Embodiment 13: The apparatus of embodiment 9 in which the plurality of circularly asymmetric optical lenses comprise an array of circularly asymmetric optical lenses, and each of at least some of the circularly asymmetric optical lenses is spaced apart from a neighboring circularly asymmetric optical lens at a second distance in a range from 1.5 to 4.5 times the first distance between the first axis and the optical axis of the circularly asymmetric optical lens.

Embodiment 14: The apparatus of embodiment 13 in which the second distance is in a range from 2 to 3.5 times the first distance.

Embodiment 15: The apparatus of embodiment 14 in which the second distance is in a range from 2 to 3 times the first distance.

Embodiment 16: The apparatus of any of embodiments 7 to 15 in which the first axis and the optical axis are perpendicular to the main surface of the photonic integrated circuit.

Embodiment 17: The apparatus of any of embodiments 9 to 16 in which each of at least some of the circularly asymmetric optical lenses and the corresponding first optical element are positioned relative to the vertical coupling element such that the first distance between the first axis and the optical axis is in a range from 10% to 150% of the full width at half maximum of the light beam received at the circularly asymmetric optical lens.

Embodiment 18: The apparatus of embodiment 17 in which each of at least some of the circularly asymmetric optical lenses and the corresponding first optical element are positioned relative to the vertical coupling element such that the first distance between the first axis and the optical axis is in a range from 20% to 80% of the full width at half maximum of the light beam received at the circularly asymmetric optical lens.

Embodiment 19: The apparatus of any of embodiments 7 to 18 in which each of at least some of the circularly asymmetric optical lenses is positioned relative to the corresponding first optical element such that the portion of the light beam received at the circularly asymmetric optical lens having an intensity greater than half maximum is entirely offset from the optical axis of the circularly asymmetric optical lens.

Embodiment 20: The apparatus of any of embodiments 1 to 19 in which each of at least some of the circularly asymmetric optical lenses comprises a truncated version of a rotationally symmetric optical lens, the optical axis of the circularly asymmetric optical lens overlaps the optical axis of the rotationally symmetric optical lens, and the circularly asymmetric optical lens is asymmetric with respect to the optical axis.

Embodiment 21: The apparatus of embodiment 20 in which the circularly asymmetric optical lens has a dimension that is less than 1.5 times the radius of the rotationally symmetric optical lens, the dimension of the circularly asymmetric optical lens and the radius of the rotationally symmetric optical lens are measured along a plane parallel to the main surface of the photonic integrated circuit.

Embodiment 22: The apparatus of embodiment 21 in which the circularly asymmetric optical lens has a dimension that is less than 1.2 times the radius of the rotationally symmetric optical lens.

Embodiment 23: The apparatus of any of embodiments 20 to 22 in which each of at least some of the circularly asymmetric optical lenses has a footprint that is less than 50% of a footprint of the corresponding rotationally symmetric optical lens.

Embodiment 24: The apparatus of any of embodiments 1 to 23 in which each of at least some of the circularly asymmetric optical lenses has a dimension that is less than 1.5 times the diameter of the light beam received at the circularly asymmetric optical lens, and the diameter of the light beam is the full width at half maximum of the light beam.

Embodiment 25: The apparatus of embodiment 24 in which each of at least some of the circularly asymmetric optical lenses has a footprint having an area that is less than 2.25 times the area of the cross section of the light beam received at the circularly asymmetric optical lens, and the area of the cross section of the light beam is calculated based on the full width at half maximum of the light beam.

Embodiment 26: The apparatus of embodiment 24 or 25 in which each of at least some of the circularly asymmetric optical lenses is configured to receive the entire portion of the light beam that has an intensity at half maximum or more.

Embodiment 27: The apparatus of any of embodiments 7 to 26 in which the first optical elements are configured to collimate light from optical fibers having end facets that are polished at an angle in a range from 1 to 30 degrees relative to a plane that is perpendicular to the optical axes of the optical fibers.

Embodiment 28: The apparatus of embodiment 27 in which the first optical elements are configured to collimate light from optical fibers having end facets that are polished at an angle in a range from 4 to 15 degrees relative to the plane that is perpendicular to the optical axes of the optical fibers.

Embodiment 29: The apparatus of embodiment 28 in which the first optical elements are configured to collimate light from optical fibers having end facets that are polished at an angle in a range from 6 to 10 degrees relative to the plane that is perpendicular to the optical axes of the optical fibers.

Embodiment 30: The apparatus of any of embodiments 27 to 29 in which the first optical elements comprises a second plurality of circularly asymmetric optical lenses configured to optically couple the optical fibers to the first plurality of circularly asymmetric optical lenses.

Embodiment 31: The apparatus of embodiment 30 in which the second plurality of circularly asymmetric optical lenses have surface profiles that are substantially similar to the first plurality of circularly asymmetric optical lenses.

Embodiment 32: The apparatus of any of embodiments 1 to 31 in which the plurality of circularly asymmetric optical lenses are configured to direct light toward, or receive light from, the vertical coupling elements at one or more angles of incidence in a range from 4° to 15° relative to the direction perpendicular to the main surface of the photonic integrated circuit.

Embodiment 33: The apparatus of embodiment 32 in which the plurality of circularly asymmetric optical lenses are configured to direct light toward, or receive light from, the vertical coupling elements at one or more angles of incidence in a range from 5° to 12° relative to the direction perpendicular to the main surface of the photonic integrated circuit.

Embodiment 34: The apparatus of embodiment 33 in which the plurality of circularly asymmetric optical lenses are configured to direct light toward, or receive light from, the vertical coupling elements at one or more angles of incidence in a range from 6° to 10° relative to the direction perpendicular to the main surface of the photonic integrated circuit.

Embodiment 35: The apparatus of embodiment 33 in which the plurality of circularly asymmetric optical lenses are configured to direct light toward, or receive light from, the vertical coupling elements at one or more offset angles in a range from 7° to 9° relative to the direction perpendicular to the main surface of the photonic integrated circuit.

Embodiment 36: The apparatus of any of embodiments 1 to 35 in which each of at least some of the circularly asymmetric optical lenses has a circular or oval circumference.

Embodiment 37: The apparatus of any of embodiments 1 to 35 in which each of at least some of the circularly asymmetric optical lenses has a polygonal circumference.

Embodiment 38: The apparatus of any of embodiments 1 to 35 in which at least some of the circularly asymmetric optical lenses have a same shape.

Embodiment 39: The apparatus of any of embodiments 1 to 38 in which the plurality of circularly asymmetric optical lenses comprise an array of rows and columns of circularly asymmetric optical lenses.

Embodiment 40: The apparatus of any of embodiments 1 to 39, comprising the photonic integrated circuit.

Embodiment 41: The apparatus of any of embodiments 1 to 40, comprising a first connector element configured to be mechanically and optically coupled to a second connector element that is optically coupled to the plurality of optical fibers.

Embodiment 42: The apparatus of any of embodiments 1 to 41 in which the vertical coupling elements comprise vertical grating couplers.

Embodiment 43: The apparatus of any of embodiments 1 to 42 in which the plurality of circularly asymmetric optical lenses comprise silicon lenses.

Embodiment 44: The apparatus of any of embodiments 40 to 43 in which the photonic integrated circuit comprises optical waveguides that are coupled to the vertical coupling elements.

Embodiment 45: The apparatus of any of embodiments 1 to 44 in which the fiber-optic connector comprises one or more walk-off elements configured to receive input optical beams from one or more of the fiber cores, and separate each of at least some of the input optical beams into a first optical beam component having a first polarization and a second optical beam component having a second polarization, and a birefringent plate having holes, in which the birefringent plate is positioned relative to the one or more walk-off elements such that each of at least some of the holes is aligned with a corresponding first optical beam component, wherein the birefringent plate rotates a polarization of each of at least some of the of the second optical beam components to cause the second optical beam component to have a same polarization as the corresponding first optical beam component.

Embodiment 46: The apparatus of embodiment 45 in which the plurality of circularly asymmetric optical lenses comprise a plurality of pairs of circularly asymmetric optical lenses, each of at least some of the pairs of circularly asymmetric optical lenses are configured to couple corresponding first and second optical beam components to a pair of vertical coupling elements.

Embodiment 47: The apparatus of embodiment 45 or 46 in which the holes comprise at least one of circular holes, square holes, rectangular holes, or strip holes.

Embodiment 48: The apparatus of any of embodiments 1 to 47 in which a distance between two adjacent optical fibers is in a range from 225 μm to 275 μm, and a distance between two adjacent circularly asymmetric optical lenses is in a range from $100\sqrt{2}$ μm to $150\sqrt{2}$ μm.

Embodiment 49: A data center comprising the apparatus of any of embodiments 1 to 48.

Embodiment 50: A method of operating the apparatus of any of embodiments 1 to 48.

Embodiment 51: A method of operating the data center of embodiment 49.

Embodiment 52: A method of assembly the apparatus of any of embodiments 1 to 48.

Embodiment 53: A method of processing data using the apparatus of any of embodiments 1 to 48.

Embodiment 54: An apparatus comprising:

a fiber-optic connector configured to optically couple a plurality of optical fibers to a plurality of vertical coupling elements on a photonic integrated circuit, in which the fiber-optic connector comprises a plurality of free-form off-axis lenses configured to direct light toward the vertical coupling elements at one or more angles of incidence relative to a direction perpendicular to a main surface of the photonic integrated circuit.

Embodiment 55: The apparatus of embodiment 54 in which the plurality of free-form off-axis lenses are configured to direct light toward the vertical coupling elements at one or more angles of incidence in a range from 1° to 30° relative to the direction perpendicular to the main surface of the photonic integrated circuit.

Embodiment 56: The apparatus of embodiment 55 in which the plurality of optical fibers are arranged in a two-dimensional array.

Embodiment 57: The apparatus of embodiment 56 in which the two-dimensional array comprises at least 2 rows and at least 8 columns.

Embodiment 58: The apparatus of embodiment 57 in which the spacing between two adjacent rows in the two-dimensional array is identical to the spacing between two adjacent columns in the two-dimensional array.

Embodiment 59: The apparatus of any of embodiments 54 to 58 in which the fiber-optic connector comprises first optical elements configured to process light from the optical fibers to form light beams that are directed to the free-form off-axis lenses.

Embodiment 60: The apparatus of embodiment 59 in which the first optical elements are configured to collimate light from the optical fibers to form collimated light beams that are directed to the free-form off-axis lenses.

Embodiment 61: The apparatus of embodiment 59 or 60 in which each of at least some of the free-form off-axis lenses has a surface profile that is configured to focus the light beam to a first location on the vertical coupling element, the free-form off-axis lens has an optical axis that passes the first location, wherein the first optical element is positioned and oriented relative to the free-form off-axis lens such that the light beam has a first axis that is parallel to, and offset at a first distance from, the optical axis of the free-form off-axis lens.

Embodiment 62: An apparatus comprising:

a fiber-optic connector configured to optically couple a plurality of optical fibers to a plurality of vertical coupling elements on a photonic integrated circuit, wherein the fiber-optic connector comprises:

a plurality of first lenses configured to collimate light received from the optical fibers to generate collimated light beams, each of at least some of the first lenses having an optical axis; and a plurality of free-form lenses configured to direct the collimated light beams from the plurality of first lenses toward the vertical coupling elements at one or more angles of incidence relative to a direction perpendicular to a main surface of the photonic integrated circuit, wherein each free-form lens has an optical axis, each of at least some of the free-form lenses is asymmetric with respect to its optical axis, each of at least some of the free-form lenses has a focal point on its optical axis;

wherein each of at least some of the free-form lenses is configured to receive light from a corresponding first lens, the optical axis of the free-form lens is parallel to the optical axis of the corresponding first lens, and the optical axis of the free-form lens is spaced apart at a first distance relative to the optical axis of the first lens.

Embodiment 63: The apparatus of embodiment 62 in which the plurality of free-form lenses are configured to direct the collimated light beams from the plurality of first lenses toward the vertical coupling elements at one or more angles of incidence in a range from 1° to 30° relative to the direction perpendicular to the main surface of the photonic integrated circuit.

Embodiment 64: The apparatus of embodiment 63 in which the plurality of optical fibers are arranged in a two-dimensional array.

Embodiment 65: The apparatus of embodiment 64 in which the two-dimensional array comprises at least 2 rows and at least 8 columns.

Embodiment 66: The apparatus of embodiment 65 in which the spacing between two adjacent rows in the two-dimensional array is identical to the spacing between two adjacent columns in the two-dimensional array.

Embodiment 67: The apparatus of any of embodiments 62 to 66 in which each of at least some of the free-form off-axis lenses has a surface profile that is configured to focus the light beam to a first location on the vertical coupling element, the free-form off-axis lens has an optical axis that passes the first location.

Embodiment 68: The apparatus of any of embodiments 62 to 67 in which at least two free-form lenses are spaced apart at a second distance in a range from 1.5 to 4.5 times the first distance between the optical axis of the first lens and the optical axis of the free-form lens, the second distance represents the distance between the optical axes of the free-form lenses, the first and second distances being measured along a plane parallel to the main surface of the photonic integrated circuit.

Embodiment 69: The apparatus of embodiment 68 in which the second distance is in a range from 2 to 3.5 times the first distance.

Embodiment 70: The apparatus of embodiment 69 in which the second distance is in a range from 2 to 3 times the first distance.

Embodiment 71: The apparatus of any of embodiments 62 to 70 in which the plurality of free-form lenses comprise an array of circularly free-form lenses, and each of at least some of the free-form lenses is spaced apart from a neighboring free-form lens at a second distance in a range from 1.5 to 4.5 times the first distance between the optical axis of the first lens and the optical axis of the free-form lens.

Embodiment 72: The apparatus of embodiment 71 in which the second distance is in a range from 2 to 3.5 times the first distance.

Embodiment 73: The apparatus of embodiment 72 in which the second distance is in a range from 2 to 3 times the first distance.

Embodiment 74: The apparatus of any of embodiments 62 to 73 in which the first axis and the optical axis are perpendicular to the main surface of the photonic integrated circuit.

Embodiment 75: The apparatus of any of embodiments 62 to 74 in which each of at least some of the free-form lenses and the corresponding first lens are positioned relative to the vertical coupling element such that the first distance between the optical axis of the first lens and the optical axis of the free-form lens is in a range from 10% to 150% of the full width at half maximum of the light beam received at the free-form lens.

Embodiment 76: The apparatus of embodiment 75 in which each of at least some of the free-form lenses and the corresponding first lens are positioned relative to the vertical coupling element such that the first distance between the optical axis of the first lens and the optical axis of the free-form lens is in a range from 20% to 80% of the full width at half maximum of the light beam received at the free-form lens.

Embodiment 77: The apparatus of any of embodiments 62 to 76 in which each of at least some of the free-form lenses and the corresponding first lens are positioned relative to the vertical coupling element such that the portion of the light beam received at the free-form lens having an intensity greater than half maximum is entirely offset from the optical axis of the free-form lens.

Embodiment 78: The apparatus of any of embodiments 62 to 77 in which each of at least some of the free-form lenses comprises a truncated version of a rotationally symmetric optical lens, the optical axis of the free-form optical lens overlaps the optical axis of the rotationally symmetric optical lens, and the free-form lens is asymmetric with respect to the optical axis.

Embodiment 79: The apparatus of embodiment 78 in which the free-form lens has a dimension that is less than 1.5 times the radius of the rotationally symmetric optical lens, the dimension of the free-form lens and the radius of the rotationally symmetric optical lens are measured along a plane parallel to the main surface of the photonic integrated circuit.

Embodiment 80: The apparatus of embodiment 79 in which the free-form lens has a dimension that is less than 1.2 times the radius of the rotationally symmetric optical lens.

Embodiment 81: The apparatus of any of embodiments 78 to 80 in which each of at least some of the free-form lenses has a footprint that is less than 50% of a footprint of the corresponding rotationally symmetric optical lens.

Embodiment 82: The apparatus of any of embodiments 62 to 81 in which each of at least some of the free-form lenses has a dimension that is less than 1.5 times the diameter of the light beam received at the free-form lens, and the diameter of the light beam is the full width at half maximum of the light beam.

Embodiment 83: The apparatus of embodiment 82 in which each of at least some of the free-form lenses has a footprint having an area that is less than 2.25 times the area of the cross section of the light beam received at the free-form lens, and the area of the cross section of the light beam is calculated based on the full width at half maximum of the light beam.

Embodiment 84: The apparatus of any of embodiments 62 to 83 in which the first lenses are configure to collimate light from optical fibers having end facets that are polished at an angle in a range from 1 to 30 degrees relative to a plane that is perpendicular to the optical axes of the optical fibers.

Embodiment 85: The apparatus of embodiment 84 in which the first lenses are configured to collimate light from optical fibers having end facets that are polished at an angle in a range from 4 to 15 degrees relative to the plane that is perpendicular to the optical axes of the optical fibers.

Embodiment 86: The apparatus of embodiment 85 in which the first lenses are configured to collimate light from optical fibers having end facets that are polished at an angle in a range from 6 to 10 degrees relative to the plane that is perpendicular to the optical axes of the optical fibers.

Embodiment 87: The apparatus of any of embodiments 84 to 86 in which the first lenses comprises a second plurality of free-form lenses configured to optically couple the optical fibers to the first plurality of free-form lenses.

Embodiment 88: The apparatus of embodiment 87 in which the second plurality of free-form lenses have surface profiles that are substantially similar to the first plurality of free-form lenses.

Embodiment 89: The apparatus of any of embodiments 62 to 88 in which the first plurality of free-form lenses are configured to direct light toward, or receive light from, the vertical coupling elements at one or more angles of incidence in a range from 4° to 15° relative to the direction perpendicular to the main surface of the photonic integrated circuit.

Embodiment 90: The apparatus of embodiment 89 in which the first plurality of circularly asymmetric optical lenses are configured to direct light toward, or receive light from, the vertical coupling elements at one or more angles of incidence in a range from 5° to 12° relative to the direction perpendicular to the main surface of the photonic integrated circuit.

Embodiment 91: The apparatus of embodiment 90 in which the first plurality of free-form lenses are configured to direct light toward, or receive light from, the vertical coupling elements at one or more angles of incidence in a range from 6° to 10° relative to the direction perpendicular to the main surface of the photonic integrated circuit.

Embodiment 92: The apparatus of embodiment 91 in which the plurality of free-form lenses are configured to direct light toward, or receive light from, the vertical coupling elements at one or more offset angles in a range from 7° to 9° relative to the direction perpendicular to the main surface of the photonic integrated circuit.

Embodiment 93: The apparatus of any of embodiments 62 to 92 in which each of at least some of the free-form lenses has a circular or oval circumference.

Embodiment 94: The apparatus of any of embodiments 62 to 93 in which each of at least some of the free-form lenses has a polygonal circumference.

Embodiment 95: The apparatus of any of embodiments 62 to 94 in which at least some of the free-form lenses have a same shape.

Embodiment 96: The apparatus of any of embodiments 62 to 95 in which the plurality of free-form lenses comprise an array of rows and columns of free-form lenses.

Embodiment 97: The apparatus of any of embodiments 62 to 96, comprising the photonic integrated circuit.

Embodiment 98: The apparatus of any of embodiments 62 to 97, comprising a first connector element configured to be mechanically and optically coupled to a second connector element that is optically coupled to the plurality of optical fibers.

Embodiment 99: The apparatus of any of embodiments 62 to 98 in which the vertical coupling elements comprise vertical grating couplers.

Embodiment 100: The apparatus of any of embodiments 62 to 99 in which the plurality of free-form lenses comprise silicon lenses.

Embodiment 101: The apparatus of any of embodiments 97 to 100 in which the photonic integrated circuit comprises optical waveguides that are coupled to the vertical coupling elements.

Embodiment 102: The apparatus of any of embodiments 62 to 101 in which the fiber-optic connector comprises one or more walk-off elements configured to receive input optical beams from one or more of the fiber cores, and separate each of at least some of the input optical beams into a first optical beam component having a first polarization and a second optical beam component having a second polarization, and a birefringent plate having holes, in which the birefringent plate is positioned relative to the one or more walk-off elements such that each of at least some of the holes is aligned with a corresponding first optical beam component, wherein the birefringent plate rotates a polarization of each of at least some of the of the second optical beam components to cause the second optical beam component to have a same polarization as the corresponding first optical beam component.

Embodiment 103: The apparatus of embodiment 102 in which the plurality of first free-form lenses comprise a plurality of pairs of free-form lenses, each of at least some of the pairs of free-form lenses are configured to couple corresponding first and second optical beam components to a pair of vertical coupling elements.

Embodiment 104: The apparatus of embodiment 102 or 103 in which the holes comprise at least one of circular holes, square holes, rectangular holes, or strip holes.

Embodiment 105: The apparatus of any of embodiments 62 to 104 in which a distance between two adjacent optical fibers is in a range from 225 μm to 275 μm, and a distance between two adjacent circularly asymmetric optical lenses is in a range from $100\sqrt{2}$ μm to $150\sqrt{2}$ μm.

Embodiment 106: A data center comprising the apparatus of any of embodiments 54 to 105.

Embodiment 107: A method of operating the apparatus of any of embodiments 54 to 105.

Embodiment 108: A method of operating the data center of embodiment 106.

Embodiment 109: A method of assembly the apparatus of any of embodiments 54 to 105.

Embodiment 110: A method of processing data using the apparatus of any of embodiments 54 to 105.

Embodiment 111: A method comprising:

transmitting light from a plurality of optical fibers to a plurality of first lenses;

directing a plurality of light beams from the plurality of first lenses to a plurality of circularly asymmetric optical lenses; and directing, using the circularly asymmetric optical lenses, the plurality of light beams toward a plurality of vertical coupling elements on a photonic integrated circuit at one or more angles of incidence relative to a direction perpendicular to a main surface of the photonic integrated circuit.

Embodiment 112: The method of embodiment 111 in which directing the plurality of light beams toward the plurality of vertical coupling elements comprises directing the plurality of light beams toward the plurality of vertical coupling elements at one or more angles of incidence in a range from 1° to 30° relative to the direction perpendicular to the main surface of the photonic integrated circuit.

Embodiment 113: The apparatus of embodiment 112 in which the plurality of optical fibers are arranged in a two-dimensional array.

Embodiment 114: The method of embodiment 113 in which the two-dimensional array comprises at least 2 rows and at least 8 columns.

Embodiment 115: The method of any of embodiments 112 to 114 in which the spacing between two adjacent rows in the two-dimensional array is identical to the spacing between two adjacent columns in the two-dimensional array.

Embodiment 116: The method of any of embodiments 111 to 115 in which each of at least some of the circularly asymmetric optical lenses comprises a truncated version of a rotationally symmetric optical lens, the optical axis of the circularly asymmetric optical lens overlaps the optical axis of the rotationally symmetric optical lens, and the circularly asymmetric optical lens is asymmetric with respect to the optical axis.

Embodiment 117: The method of any of embodiments 111 to 116 in which transmitting light from a plurality of optical fibers to a plurality of first lenses comprises transmitting light from a plurality of optical fibers with a θ degree polish, $0<\theta<30°$ to a second plurality of circularly asymmetric lenses.

Embodiment 118: The method of any of embodiments 111 to 117 in which transmitting a plurality of light beams from the plurality of first lenses to a plurality of circularly asymmetric optical lenses comprises transmitting a plurality of collimated light beams from the plurality of first lenses to the plurality of circularly asymmetric optical lenses.

Embodiment 119: A method comprising:

transmitting light from a plurality of optical fibers to a plurality of first lenses;

directing a plurality of light beams from the plurality of first lenses to a plurality of circularly asymmetric optical lenses; and directing, using the plurality of circularly asymmetric optical lenses, the light beams to a plurality of vertical coupling elements on a photonic integrated circuit, comprising:

directing, using each of at least some of the circularly asymmetric optical lenses, a light beam towards the corresponding vertical coupling element at an angle of incidence relative to a direction perpendicular to a main surface of the photonic integrated circuit;

wherein each of at least some of the circularly asymmetric optical lenses is asymmetric with respect to an optical axis that is perpendicular to the main surface of the photonic integrated circuit.

Embodiment 120: The method of embodiment 119 in which directing the light beam towards the corresponding vertical coupling element comprises directing the light beam towards the corresponding vertical coupling element at an angle of incidence in a range from 1° to 30° relative to the direction perpendicular to the main surface of the photonic integrated circuit.

Embodiment 121: A method comprising:

transmitting light from a plurality of optical fibers to a plurality of first lenses;

directing a plurality of light beams from the plurality of first lenses to a plurality of free-form lenses; and directing, using the free-form lenses, the plurality of light beams toward a plurality of vertical coupling elements on a photonic integrated circuit at one or more angles of incidence relative to a direction perpendicular to a main surface of the photonic integrated circuit.

Embodiment 122: The method of embodiment 121 in which directing the plurality of light beams toward the plurality of vertical coupling elements comprises directing the plurality of light beams toward the plurality of vertical coupling elements at one or more angles of incidence in a range from 1° to 30° relative to the direction perpendicular to the main surface of the photonic integrated circuit.

Embodiment 123: A method comprising:

transmitting light from a two-dimensional array of optical fibers to a two-dimensional array of first lenses, wherein each first lens has an optical axis;

directing a plurality of collimated light beams from the two-dimensional array of first lenses to a two-dimensional array of free-form lenses; and directing, using a two-dimensional array of free-form lenses, the collimated light beams from the array of first lenses toward a two-dimensional array of vertical grating couplers on a photonic integrated circuit at one or more angles of incidence relative to a direction perpendicular to a main surface of the photonic integrated circuit, wherein each free-form lens has an optical axis, each of at least some of the free-form lenses is asymmetric with respect to its optical axis, and each of at least some of the free-form lenses has a focal point on its optical axis;

wherein each of at least some of the free-form lenses receives a collimated light beam from a corresponding first lens, the optical axis of the free-form lens is parallel to the optical axis of the corresponding first lens, and the optical axis of the free-form lens is spaced apart at a first distance relative to the optical axis of the first lens.

Embodiment 124: The method of embodiment 123 in which directing the collimated light beams from the array of first lenses toward the two-dimensional array of vertical grating couplers comprises directing the collimated light beams from the array of first lenses toward the two-dimensional array of vertical grating couplers at one or more angles of incidence in a range from 1° to 30° relative to the direction perpendicular to the main surface of the photonic integrated circuit.

Embodiment 125: The apparatus of any of embodiments 1 to 48, 54 to 105, and 123 in which the fiber-optic connector comprises a second plurality of circularly asymmetric optical lenses or a second plurality of free-form lenses that are not used to direct any light beam towards any vertical coupling element.

Embodiment 126: The apparatus of any of embodiments 8 to 48 in which the offset distance between the first axis of the light beam and the optical axis of the circularly asymmetric optical lens is at least 10 μm.

Embodiment 127: The apparatus of any of embodiments 8 to 48 in which the offset distance between the first axis of the light beam and the optical axis of the circularly asymmetric optical lens is at least 20 μm.

Embodiment 128: The apparatus of any of embodiments 8 to 48 in which the offset distance between the first axis of the light beam and the optical axis of the circularly asymmetric optical lens is at least 40 μm.

Embodiment 129: The apparatus of any of embodiments 62 to 105 and 123 in which the distance between the optical axis of the first lens and the optical axis of the free-form lens is at least 10 μm.

Embodiment 130: The apparatus of any of embodiments 62 to 105 and 123 in which the distance between the optical axis of the first lens and the optical axis of the free-form lens is at least 20 μm.

Embodiment 131: The apparatus of any of embodiments 62 to 105 and 123 in which the distance between the optical axis of the first lens and the optical axis of the free-form lens is at least 40 μm.

The following is a fourth set of embodiments. The embodiment numbers below refer to those in the fourth set of embodiments.

Embodiment 1: An apparatus comprising:

one or more optical fibers having a plurality of fiber cores;

a photonic integrated circuit including a plurality of vertical-coupling elements disposed along a main surface of the photonic integrated circuit; and a fiber-optic connector connected between the one or more optical fibers and the photonic integrated circuit to communicate light between the one or more optical fibers and the photonic integrated circuit, wherein the fiber-optic connector comprises a polarization beam splitter and a patterned birefringent plate;

wherein the polarization beam splitter is configured to split an incident light beam from a corresponding fiber core into a first beam having a first polarization and a second beam having a second polarization different from the first polarization;

wherein the patterned birefringent plate comprises a first region and a second region, the first region has a first optical birefringence, the second region has a second optical birefringence that is different from the first optical birefringence, the first region is produced by applying localized heating to a portion of a birefringent plate to reduce the birefringence at the first region, the second region is not subject to the localized heating and retains its original birefringence;

wherein the polarization beam splitter is configured to direct the first beam towards the first region and direct the second beam towards the second region;

wherein the first region is configured to rotate the polarization of the first beam by a first amount, the second region is configured to rotate the polarization of the second beam by a second amount that is different from the first amount, the first and second amounts are selected to cause the first and second beams to have substantially parallel polarization after passing the patterned birefringent plate.

Embodiment 2: The apparatus of embodiment 1 in which the patterned birefringent plate is made from a single piece of birefringent material.

Embodiment 3: The apparatus of embodiment 1 or 2 in which the first region is an integral portion of the patterned birefringent plate, and no glue or adhesive is used to bond the first region to other portions of the patterned birefringent plate.

Embodiment 4: The apparatus of any of embodiments 1 to 3 in which the patterned birefringent plate has a top surface and a bottom surface, and the first region extends from the top surface to the bottom surface.

Embodiment 5: The apparatus of any of embodiments 1 to 3 in which the patterned birefringent plate has a top surface and a bottom surface, the first region is positioned within the birefringent plate at a first distance from the top surface and a second distance from the bottom surface.

Embodiment 6: The apparatus of any of embodiments 1 to 3 in which the patterned birefringent plate has a top surface and a bottom surface, the first region extends from the top surface to a location within the birefringent plate at a distance from the bottom surface.

Embodiment 7: The apparatus of any of embodiments 1 to 6 in which the polarization beam splitter is configured to cause the second polarization of the second beam to be orthogonal to the first polarization of the first beam after the first and second beams exit the polarization beam splitter;

wherein the first region has substantially zero birefringence, and the second region is configured to rotate the polarization of the second beam by about $90°+n×180°$, $0≤n$, n being an integer.

Embodiment 8: The apparatus of any of embodiments 1 to 7 in which the one or more optical fibers comprise an array of at least 2 rows and at least 8 columns of fiber cores;

wherein the patterned birefringent plate comprises at least two first regions, each first region has an elongated shape that extends along a direction parallel to the row direction;

wherein the second region comprises the birefringent material adjacent to the first regions;

wherein the polarization beam splitter is configured to split 8 incident light beams from 8 corresponding fiber cores of a row into 8 first beams having the first polarization and 8 second beams having the second polarization, direct the 8 first beams toward a first region, and direct the 8 second beams to the second region;

wherein upon the 8 first beams passing through the first region and the 8 second beams passing through the second region, the 8 first beams and the 8 second beams have substantially parallel polarization.

Embodiment 9: The apparatus of any of embodiments 1 to 7 in which the one or more optical fibers comprise an array of at least 2 rows and at least 8 columns of fiber cores;

wherein the patterned birefringent plate comprises an array of at least 2 rows and at least 8 columns of first regions;

wherein the second region comprises the birefringent material adjacent to the first regions;

wherein the polarization beam splitter is configured to split 8 incident light beams from 8 corresponding fiber cores of a row into 8 first beams having the first polarization and 8 second beams having the second polarization different from the first polarization, direct the 8 first beams toward 8 corresponding first regions, and direct the 8 second beams towards the second region;

wherein upon the 8 first beams passing through the 8 first regions and the 8 second beams passing through the second region, the 8 first beams and the 8 second beams have substantially parallel polarization.

Embodiment 10: The apparatus of any of embodiments 1 to 9 in which the fiber-optic connector comprises a first connector part and a second connector part, the first connector part is removably coupled to the second connector part, the first connector part is optically coupled to the plurality of fiber cores, the second connector part is optically coupled to the plurality of vertical-coupling elements, and both the polarization beam splitter and the patterned birefringent plate are included in the first connector part.

Embodiment 11: The apparatus of any of embodiments 1 to 9 in which the fiber-optic connector comprises a first connector part and a second connector part, the first connector part is removably coupled to the second connector part, the first connector part is optically coupled to the plurality of fiber cores, the second connector part is optically coupled to the plurality of vertical-coupling elements, and both the polarization beam splitter and the patterned birefringent plate are included in the second connector part.

Embodiment 12: The apparatus of any of embodiments 1 to 9 in which the fiber-optic connector comprises a first connector part and a second connector part, the first connector part is removably coupled to the second connector part, the first connector part is optically coupled to the plurality of fiber cores, the second connector part is optically coupled to the plurality of vertical-coupling elements, the polarization beam splitter is included in the first connector part, and the patterned birefringent plate is included in the second connector part.

Embodiment 12a: The apparatus of any of embodiments 1 to 12 in which the first region is configured to rotate the polarization of the first beam by an amount less than 5°.

Embodiment 12b: The apparatus of embodiment 12a in which the first region is configured to rotate the polarization of the first beam by an amount less than 1°.

Embodiment 12c: The apparatus of embodiment 12b in which the first region is configured to rotate the polarization of the first beam by an amount equal to zero.

Embodiment 13: An apparatus comprising:

a fiber-optic connector configured to be connected between one or more optical fibers having a plurality of fiber cores and a photonic integrated circuit including a plurality of vertical-coupling elements disposed along a main surface of the photonic integrated circuit, wherein the fiber-optic connector comprises a polarization beam splitter and a patterned birefringent plate;

wherein the polarization beam splitter is configured to split an incident light beam from a corresponding fiber core into a first beam having a first polarization and a second beam having a second polarization different from the first polarization;

wherein the patterned birefringent plate comprises a first region and a second region, the first region has a first optical birefringence, the second region has a second optical birefringence that is different from the first optical birefringence, the difference in the first and second optical birefringence is caused by performing at least one of (i) applying localized heating to the first region without applying localized heating to the second region to cause the first region to have a lower birefringence as compared to the second region, or (ii) applying different amounts of localized heating to the first and second regions to cause the first region to have a first birefringence and the second region to have a second birefringence different from the first birefringence;

wherein the polarization beam splitter is configured to direct the first beam towards the first region and direct the second beam towards the second region;

wherein the first region is configured to rotate the polarization of the first beam by a first amount, the second region is configured to rotate the polarization of the second beam by a second amount that is different from the first amount, the first and second amounts are selected to cause the first and second beams to have substantially parallel polarization after passing the patterned birefringent plate.

Embodiment 14: The apparatus of embodiment 13 in which the first region is an integral portion of the patterned birefringent plate, and no glue or adhesive is used to bond the first region to other portions of the patterned birefringent plate.

Embodiment 14a: The apparatus of embodiment 13 or 14 in which the first region is configured to rotate the polarization of the first beam by an amount less than 5°.

Embodiment 14b: The apparatus of embodiment 14a in which the first region is configured to rotate the polarization of the first beam by an amount less than 1°.

Embodiment 14c: The apparatus of embodiment 14b in which the first region is configured to rotate the polarization of the first beam by an amount substantially equal to zero.

Embodiment 15: An apparatus comprising:

a first connector part that is part of a fiber-optic connector configured to be connected between one or more optical fibers having a plurality of fiber cores and a photonic integrated circuit including a plurality of vertical-coupling elements disposed along a main surface of the photonic integrated circuit, wherein the fiber-optic connector comprises a polarization beam splitter, and the first connector part comprises a patterned birefringent plate;

wherein the polarization beam splitter is configured to split an incident light beam from a corresponding fiber core into a first beam having a first polarization and a second beam having a second polarization different from the first polarization;

wherein the patterned birefringent plate comprises non-uniform birefringence produced by applying localized heating to the birefringent plate to cause one or more regions of the birefringent plate to have reduced birefringence as compared to one or more other regions of the birefringent plate, resulting in at least one lower-birefringence region and at least one higher-birefringence region in the patterned birefringent plate;

wherein the polarization beam splitter is configured to direct the first beam towards a lower-birefringence region in the patterned birefringent plate and direct the second beam towards a higher-birefringence region in the patterned birefringent plate;

wherein the lower-birefringent region is configured to rotate the polarization of the first beam by a first amount, the higher-birefringent region is configured to rotate the polarization of the second beam by a second amount that is different from the first amount, the first and second amounts are selected to cause the first and second beams to have substantially parallel polarization after passing the patterned birefringent plate.

Embodiment 16: The apparatus of embodiment 15 in which the lower-birefringence region has substantially zero birefringence.

Embodiment 17: The apparatus of embodiment 15 or 16 in which the first connector part comprises the polarization beam splitter.

Embodiment 18: The apparatus of any of embodiments 15 to 17 in which the lower-birefringence region is an integral portion of the patterned birefringent plate, and no glue or adhesive is used to bond the lower-birefringence region to other portions of the patterned birefringent plate.

Embodiment 19: An apparatus comprising:

a patterned birefringent plate that is part of a fiber-optic connector configured to be connected between one or more optical fibers having a plurality of fiber cores and a photonic integrated circuit including a plurality of vertical-coupling elements disposed along a main surface of the photonic integrated circuit;

wherein the patterned birefringent plate comprises non-uniform birefringence produced by applying localized heating to the birefringent plate to cause one or more regions of the birefringent plate to have reduced birefringence as compared to one or more other regions of the birefringent plate, resulting in at least one lower-birefringence region and at least one higher-birefringence region in the patterned birefringent plate;

wherein the lower-birefringence region is configured to rotate the polarization of a first light beam by a first amount, the higher-birefringence region is configured to rotate the polarization of a second light beam by a second amount that is different from the first amount, the first and second light beams are transmitted between one or more of the plurality of fiber cores and one or more of the vertical-coupling elements.

Embodiment 20: The apparatus of embodiment 19 in which the fiber-optic connector comprises a first connector part removably coupled to a second connector part, the first connector part optically coupled to the plurality of fiber cores, the second connector part coupled to the vertical coupling elements, and the first connector part comprises the polarization beam splitter.

Embodiment 21: The apparatus of embodiment 19 or 20 in which the lower-birefringence region has substantially zero birefringence and is configured to rotate the polarization of a first light beam by a substantially zero amount.

Embodiment 22: An apparatus comprising:

a fiber-optic connector configured to optically couple a plurality of optical fibers to a plurality of vertical coupling elements on a photonic integrated circuit, in which the fiber-optic connector comprises:

a patterned birefringent plate comprising a plurality of first regions and a plurality of second regions, the first regions comprising a material having birefringence that is different from the birefringence of the material of the second regions, the first and second regions form an integrated piece of optical element;

wherein the fiber-optic connector is configured to enable light beams to be transmitted between the plurality of optical fibers and the plurality of vertical coupling elements, and the patterned birefringent plate is configured to modify an optical property of a selected portion of light that passes through the patterned birefringent plate.

Embodiment 23: The apparatus of embodiment 22 in which the patterned birefringent plate is configured to modify the polarization of a first portion of the light that passes through the patterned birefringent plate by a first amount, and modify the polarization of a second portion of the light that passes through the patterned birefringent plate by a second amount.

Embodiment 24: An apparatus comprising:

a fiber-optic connector configured to optically couple a plurality of optical fibers to a plurality of vertical coupling elements on a photonic integrated circuit, in which the fiber-optic connector comprises a patterned birefringent plate comprising non-uniform birefringence produced by chemical etching one or more portions of a birefringent plate to cause the patterned birefringent plate to have one or more first regions of birefringent material having a first thickness and one or more second regions of birefringent material having a second thickness that is different from the first thickness;

wherein the fiber-optic connector is configured to enable light beams to be transmitted between the plurality of optical fibers and the plurality of vertical coupling elements, and the patterned birefringent plate is configured to modify an optical property of a selected portion of light that passes through the patterned birefringent plate.

Embodiment 25: The apparatus of embodiment 24 in which the first region has a dimension in a range from 50 μm to 1000 μm, the dimension is measured along a plane parallel to a top surface of the patterned birefringent plate.

Embodiment 26: The apparatus of embodiment 25 in which the first region has a dimension in a range from 100 μm to 600 μm, the dimension is measured along a plane parallel to a top surface of the patterned birefringent plate.

Embodiment 27: The apparatus of embodiment 26 in which the first region has a dimension in a range from 200 μm to 400 μm, the dimension is measured along a plane parallel to a top surface of the patterned birefringent plate.

Embodiment 28: The apparatus of any of embodiments 24 to 27 in which the thickness of the birefringent material in the first region is substantially zero.

Embodiment 29: The apparatus of any of embodiments 24 to 28 in which the patterned birefringent plate is configured to modify a polarization state of a first set of light beams that pass through the first regions relative to a polarization state of a second set of light beams that pass through the second regions of the birefringent plate.

Embodiment 30: A method comprising:

fabricating a fiber-optic connector, comprising applying localized heating to a birefringent plate to produce a patterned birefringent plate, in which the localized heating modifies birefringence of a plurality of first regions in the birefringent plate to cause the first regions to have birefringence that is different from the birefringence of second regions that do not receive the localized heating;

aligning the patterned birefringent plate to other optical components in the fiber-optic connector; and bonding the patterned birefringent plate to the other optical components in the fiber-optic connector.

Embodiment 31: A method of fabricating a fiber-optic connector, the method comprising:

applying localized heating to a birefringent plate to produce a patterned birefringent plate, in which the localized heating modifies birefringence of a plurality of first regions in the birefringent plate to cause the first regions to have birefringence that is different from the birefringence of second regions that do not receive the localized heating; and attaching the patterned birefringent plate to a second component to form a fiber-optic connector that is configured to be coupled to at least one of a plurality of optical fibers or a plurality of coupling elements on a photonic integrated circuit.

Embodiment 32: The method of embodiment 31 in which the localized heating causes the first regions to have reduced birefringence.

Embodiment 33: The method of embodiment 31 in which the localized heating causes the first regions to have substantially zero birefringence.

Embodiment 34: The method of any of embodiments 31 to 33 in which applying localized heating comprises applying a laser beam to the first regions to locally heat the first regions.

Embodiment 35: The method of any of embodiments 31 to 34 in which the first regions comprise elongated strips, the elongated strips have lengthwise directions that are parallel to one another, and the strips are spaced apart in a direction perpendicular to the lengthwise direction.

Embodiment 36: The method of any of embodiments 31 to 34 in which the patterned birefringent plate comprises an array of at least 2 rows and at least 8 columns of first regions.

Embodiment 37: The method of any of embodiments 31 to 36 in which prior to applying the localized heating, the birefringent plate comprises a crystalline quartz plate having predefined birefringence, and the localized heating produces amorphous fused silica having modified, lower, or substantially no birefringence in the first regions.

Embodiment 38: The method of any of embodiments 31 to 37 in which applying localized heating comprises sequentially applying localized heating to the first regions one after another.

Embodiment 39: The method of any of embodiments 31 to 37 in which applying localized heating comprises applying localized heating to multiple first regions in parallel.

Embodiment 40: The method of any of embodiments 31 to 39 in which the birefringent plate is configured to modify a polarization state of a first set of light beams that pass through the first regions of the birefringent plate relative to a polarization state of a second set of light beams that pass through the second regions of the birefringent plate.

Embodiment 41: The method of any of embodiments 31 to 40 in which applying localized heating to the birefringent plate comprises applying localized heating to the birefringent plate to modify birefringence of a two-dimensional array of first regions in the birefringent plate to cause the array of first regions to have birefringence that is different from the birefringence of second regions that do not receive the localized heating, and the two-dimensional array comprises at least 2 rows and at least 8 columns.

Embodiment 42: The method of embodiment 41 in which the spacing between two adjacent rows in the two-dimensional array is identical to the spacing between two adjacent columns in the two-dimensional array.

Embodiment 43: The method of embodiment 41 or 42 in which the fiber-optic connector is configured to be optically coupled to a two-dimensional array of optical fibers.

Embodiment 44: The method of embodiment 43 in which the fiber-optic connector is configured to enable a first set of light beams and a second set of light beams to be transmitted between the two-dimensional array of optical fibers and a two-dimensional array of vertical coupling elements, and the birefringent plate is configured to modify a polarization state of the first set of light beams that pass through the first regions of the birefringent plate relative to a polarization state of the second set of light beams that pass through the second regions of the birefringent plate.

Embodiment 45: The method of any of embodiments 41 to 44 in which the fiber-optic connector is configured to be optically coupled to a two-dimensional array of vertical coupling elements on the photonic integrated circuit.

Embodiment 46: The method of embodiment 45 in which the fiber-optic connector is configured to enable a first set of light beams and a second set of light beams to be transmitted between a two-dimensional array of optical fibers and the two-dimensional array of vertical coupling elements, and the birefringent plate is configured to modify a polarization state of the first set of light beams that pass through the first regions of the birefringent plate relative to a polarization state of the second set of light beams that pass through the second regions of the birefringent plate.

Embodiment 47: The method of any of embodiments 41 to 46 in which each of at least some of the first regions has a substantially circular, oval, triangular, square, or rectangular shape.

Embodiment 48: The method of any of embodiments 41 to 46 in which the two-dimensional array of first regions comprise at least 2 parallel strips, and applying localized heating to the birefringent plate comprises applying localized heating to modify birefringence of the at least 2 parallel strips in the birefringent plate to cause the at least 2 parallel strips to have birefringence that is different from the birefringence of the second regions that do not receive the localized heating.

Embodiment 49: The method of embodiment 48 in which each strip has a width in a range from 50 μm to 1000 μm.

Embodiment 50: The method of embodiment 49 in which each strip has a width in a range from 100 μm to 600 μm.

Embodiment 51: The method of embodiment 50 in which each strip has a width in a range from 200 μm to 400 μm.

Embodiment 52: The method of any of embodiments 31 to 51 in which the fiber-optic connector is configured to be optically coupled to a plurality of vertical coupling elements on the photonic integrated circuit, and the fiber-optic connector is configured to enable the first set of light beams and the second set of light beams to be transmitted between the plurality of optical fibers and the plurality of vertical coupling elements.

Embodiment 53: The method of any of embodiments 31 to 52 in which applying the localized heating to the birefringent plate comprises applying the localized heating to the birefringent plate to reduce the birefringence at the first regions.

Embodiment 54: The method of embodiment 53 in which applying the localized heating to the birefringent plate comprises applying the localized heating to the birefringent plate to reduce the birefringence at the first regions to substantially zero birefringence.

Embodiment 55: The method of any of embodiments 31 to 54 in which applying the localized heating to the birefringent plate comprises applying the localized heating to the birefringent plate to reduce the birefringence at the first regions such that the second set of light beams that pass through the second regions have polarization that is rotated about 90°+n×180°, 0≤n, n being an integer, relative to polarization of the first set of light beams that pass through the first regions.

Embodiment 56: The method of any of embodiments 31 to 55 in which attaching the patterned birefringent plate to a second component comprising attaching the patterned birefringent plate to a walk-off element that is configured to:

receive a plurality of light beams from the plurality of optical fibers, split the light beams into first beam components and second beam components, the second beam components have polarization that is orthogonal to the polarization of the first beam components, direct the first beam components toward the first regions having lower birefringence, and direct the second beam components toward the second regions having higher birefringence.

Embodiment 57: The method of embodiment 56 in which applying the localized heating to the birefringent plate comprises applying the localized heating to the birefringent plate to reduce the birefringence at the first regions such that the second set of light beams that pass through the second regions have polarization that is rotated about 90°+n×180°, 0≤n, n being an integer, relative to polarization of the first set of light beams that pass through the first regions, wherein the walk-off element is configured such that upon exiting the walk-off element the first beam components have first polarization, and the second beam components have second polarization that is substantially orthogonal to the first polarization, wherein the first and second regions of the birefringent plate are configured such that after passing the first and second regions the first beam components have polarization that is substantially parallel to the polarization of the second beam components.

Embodiment 58: The method of embodiment 56 or 57 in which the walk-off element is configured to separate the first beam component and the second beam component along a walk-off direction, each of at least some of the first regions has a dimension measured along a direction parallel to the walk-off direction in a range from 50 μm to 1000 μm.

Embodiment 59: The method of any of embodiments 31 to 58 in which each of at least some of the first regions has a dimension measured along a direction parallel to the walk-off direction in a range from 100 μm to 600 μm.

Embodiment 60: The method of embodiment 59 in which each of at least some of the first regions has a dimension measured along a direction parallel to the walk-off direction in a range from 200 μm to 400 μm.

Embodiment 61: The method of any of embodiments 31 to 60 in which applying localized heating to the birefringent plate comprises applying localized heating to the birefringent plate to modify birefringence of a two-dimensional pattern of first regions in the birefringent plate such that the birefringent plate is configured to modify polarization of light passing the birefringent plate in a way that is equivalent to modification of polarization of light passing a half-wave plate having openings at the two-dimensional pattern of first regions.

Embodiment 62: The method of any of embodiments 31 to 60 in which the birefringent plate comprises a first surface and a second surface, wherein applying localized heating to the birefringent plate comprises applying localized heating to first regions that extend from the first surface to the second surface.

Embodiment 63: The method of any of embodiments 31 to 60 in which the birefringent plate comprises a first surface and a second surface, wherein applying localized heating to the birefringent plate comprises applying localized heating to first regions that are positioned within the birefringent plate and spaced at a first distance from the first surface and a second distance from the second surface.

Embodiment 64: The method of any of embodiments 31 to 60 in which the birefringent plate comprises a first surface and a second surface, the first surface is closer to the plurality of optical fibers relative to the second surface, wherein applying localized heating to the birefringent plate comprises applying localized heating to first regions that extend from the first surface to a location inside the birefringent plate, the first regions are spaced at a distance from the second surface.

Embodiment 65: The method of any of embodiments 31 to 60 in which the birefringent plate comprises a first surface and a second surface, the first surface is closer to the plurality of coupling elements relative to the second surface, wherein applying localized heating to the birefringent plate comprises applying localized heating to first regions that extend from the second surface to a location inside the birefringent plate, the first regions are spaced at a distance from the first surface.

Embodiment 66: The method of any of embodiments 31 to 65 in which applying localized heating comprises using one or more laser beams to apply the localized heating.

Embodiment 67: A method of fabricating a fiber-optic connector, the method comprising:

applying one or more particle beams to a birefringent plate to locally energize regions of the birefringent plate to produce a patterned birefringent plate, in which the localized energizing modifies birefringence of a plurality of first regions in the birefringent plate to cause the first regions to have birefringence that is different from the birefringence of second regions that do not receive the localized energizing; and attaching the patterned birefringent plate to a second component to form a fiber-optic connector that is configured to be coupled to at least one of a plurality of optical fibers or a plurality of coupling elements on a photonic integrated circuit.

Embodiment 68: A method of fabricating a fiber-optic connector, the method comprising:

applying localized heating to a birefringent plate to modify birefringence of a two-dimensional array of first regions in the birefringent plate to cause the array of first regions to have birefringence that is different from the birefringence of second regions that do not receive the localized heating, the array comprising at least 2 rows and at least 8 columns; and coupling the birefringent plate to a first connector part and a second connector part to form the fiber-optic connector, in which the first connector part is configured to be coupled to a plurality of optical fibers, the second connector part is configured to be coupled to a photonic integrated circuit;

wherein the first optical connector part comprises a walk-off element configured to:

receive a plurality of light beams from the plurality of optical fibers, split the light beams into first beam components and second beam components, the second beam components having polarization that is orthogonal to the polarization of the first beam components, direct the first beam components toward the first regions having lower birefringence, and direct the second beam components toward the second regions having higher birefringence.

Embodiment 69: The method of embodiment 68 in which the birefringent plate is configured to modify a polarization state of the second beam components that pass through the second regions of the birefringent plate relative to a polarization state of the first beam components that pass through the first regions of the birefringent plate.

Embodiment 70: The method of embodiment 68 or 69 in which the second connector part is configured to be optically coupled to a two-dimensional array of vertical coupling elements on the photonic integrated circuit, and the fiber-optic connector is configured to enable light to be transmitted between the two-dimensional array of optical fibers and the two-dimensional array of vertical coupling elements.

Embodiment 71: The method of any of embodiments 68 to 70 in which applying the localized heating to the birefringent plate comprises applying the localized heating to the birefringent plate to reduce the birefringence at the first regions.

Embodiment 72: The method of embodiment 71 in which applying the localized heating to the birefringent plate comprises applying the localized heating to the birefringent plate to reduce the birefringence at the first regions to substantially zero birefringence.

Embodiment 73: The method of embodiment 71 or 72 in which applying the localized heating to the birefringent plate comprises applying the localized heating to the birefringent plate to reduce the birefringence at the first regions such that the second beam components that pass through the second regions have polarization that is rotated about $90°+n\times180°$, $0\leq n$, n being an integer, relative to polarization of the first beam components that pass through the first regions.

Embodiment 74: The method of any of embodiments 68 to 73 in which the walk-off element is configured such that upon exiting the walk-off element the first beam components have first polarization, and the second beam components have second polarization that is substantially orthogonal to the first polarization, wherein the first and second regions of the birefringent plate are configured such that after passing the first and second regions the first beam components have polarization that is parallel to the polarization of the second beam components.

Embodiment 75: The method of any of embodiments 68 to 74 in which the walk-off element separates the first beam component and the second beam component along a walk-off direction, each of at least some of the first regions has a dimension measured along a direction parallel to the walk-off direction in a range from 50 μm to 1000 μm.

Embodiment 76: The method of embodiment 75 in which each of at least some of the first regions has a dimension measured along a direction parallel to the walk-off direction in a range from 100 μm to 600 μm.

Embodiment 77: The method of embodiment 76 in which each of at least some of the first regions has a dimension measured along a direction parallel to the walk-off direction in a range from 200 μm to 400 μm.

Embodiment 78: A method of fabricating a fiber-optic connector, the method comprising:

applying localized heating or localized energizing to a birefringent plate to modify birefringence of a plurality of first regions in the birefringent plate to cause each of at least some of the plurality of first regions to have a birefringence that is different from the birefringence of second regions that do not receive the localized heating or localized energizing; and attaching the birefringent plate to a first interface module and a second interface module, in which the first interface module is configured to be coupled to a plurality of optical fibers, the second interface module is configured to be coupled to a plurality of vertical coupling elements on a photonic integrated circuit, the birefringent plate is positioned in optical paths between the first interface module and the second interface module, and the birefringent plate is configured to modify an optical property of light differently depending on whether the light passes through the first regions or the second regions.

Embodiment 79: The method of embodiment 78 in which the first interface module is configured to be coupled to a two-dimensional array of optical fibers, the two-dimensional array comprising at least 2 rows and at least 8 columns, the second interface module is configured to be coupled to a two-dimensional array of vertical coupling elements, the birefringent plate is configured to modify a polarization state of a first set of light beams relative to a second set of light beams that are transmitted between the two-dimensional array of optical fibers and the two-dimensional array of vertical coupling elements.

Embodiment 80: The method of embodiment 79 in which after applying localized heating or localized energizing to the birefringent plate, the birefringent plate comprises a plurality of first regions that have lower birefringence and a plurality of second regions that have higher birefringence, the first regions alternate with the second regions, the first interface module comprises a walk-off element configured to receive a plurality of light beams from the plurality of optical fibers, split each of at least some of the light beams into a first beam component and a second beam component, direct the first beam component toward one of the first regions having the lower birefringence, and direct the second beam component toward one of the second regions having the higher birefringence.

Embodiment 81: The method of embodiment 80 in which the walk-off element is configured such that upon exiting the walk-off element the first beam component has a first polarization, and the second beam component has a second polarization that is orthogonal to the first polarization, the first and second regions of the birefringent plate are configured such that after passing the first and second regions the first beam component has a polarization that is parallel to the polarization of the second beam component.

Embodiment 82: The method of embodiment 80 in which the walk-off element separates the first beam component and the second beam component along a walk-off direction, each of at least some of the first regions has a dimension measured along a direction parallel to the walk-off direction in a range from 50 μm to 1000 μm.

Embodiment 83: The method of embodiment 82 in which each of at least some of the first regions has a dimension measured along a direction parallel to the walk-off direction in a range from 100 μm to 600 μm.

Embodiment 84: The method of embodiment 83 in which each of at least some of the first regions has a dimension measured along a direction parallel to the walk-off direction in a range from 200 μm to 400 μm.

Embodiment 85: The method of embodiment 80 in which the walk-off element is configured to direct a first beam component of a light beam to a first region, direct a second beam component of the light beam to a second region, and a center of the first region and a center of the second region are spaced apart at a distance in a range from 50 μm to 1000 μm.

Embodiment 86: The method of embodiment 85 in which the center of the first region and the center of the second region are spaced apart at a distance in a range from 100 μm to 600 μm.

Embodiment 87: The method of embodiment 86 in which the center of the first region and the center of the second region are spaced apart at a distance in a range from 200 μm to 400 μm.

Embodiment 88: A method comprising:

generating a birefringent plate by performing:

attaching a birefringent element comprising an optically birefringent material to a second optical element, and applying a removal process to remove portions of the optically birefringent material at a plurality of first regions such that after the removal process the plurality of first regions have no optically birefringent material or have optically birefringent material with reduced thickness; and attaching the birefringent plate to a first connector part and a second connector part to form the fiber-optic connector, in which the first connector part is configured to be coupled to a plurality of optical fibers, the second connector part is configured to be coupled to a photonic integrated circuit, and the birefringent plate is positioned between the first connector part and the second connector part.

Embodiment 89: The method of embodiment 88 in which the birefringent plate is configured to modify a polarization state of a first set of light beams that pass through the first regions to a polarization state of a second set of light beams that pass through second regions of the optically birefringent element that have optically birefringent material with an original thickness.

Embodiment 90: The method of embodiment 88 in which applying the removal process comprises etching the optical birefringent material at the plurality of first regions.

Embodiment 91: The method of embodiment 90, comprising disposing an etch stop layer between the optically birefringent element and the second optical element before etching the optical birefringent material, wherein etching the optical birefringent material at the plurality of first regions comprises etching the optical birefringent element at the plurality of first regions until the etch stop layer is reached.

Embodiment 92: The method of embodiment 91 in which the etch stop layer comprises an anti-reflective coating.

Embodiment 93: The method of embodiment 88 in which removing portions of the optically birefringent element comprises laser ablation of the optical birefringent element at the plurality of first regions.

Embodiment 94: The method of embodiment 88 in which removing portions of the optically birefringent material comprises mechanical removal of material from the optical birefringent element at the plurality of first regions.

Embodiment 95: The method of embodiment 88 in which removing portions of the optically birefringent material at the plurality of first regions comprises removing portions of the optically birefringent material at a two-dimensional array of first regions, the two-dimensional array comprises at least 2 rows and at least 8 columns.

Embodiment 96: The method of embodiment 95 in which the birefringent element is attached to a first surface of the second optical element, wherein each of the first regions has a shape substantially resembling a circle, an oval, a triangle, a square, a rectangle, or a polygon having n sides, n being an integer greater than 4, and the shape is measured along a plane parallel to the first surface of the second optical element.

Embodiment 97: The method of embodiment 95 in which each first region has a footprint that fits within a square having a side in a range from 50 μm to 1000 μm.

Embodiment 98: The method of embodiment 97 in which each first region has a footprint that fits within a square having a side in a range from 100 μm to 600 μm.

Embodiment 99: The method of embodiment 98 in which each first region has a footprint that fits within a square having a side in a range from 200 μm to 400 μm.

Embodiment 100: The method of embodiment 88 in which the first optical connector part comprises a walk-off element configured to:

receive a plurality of light beams from the plurality of optical fibers, split the light beams into first beam components and second beam components, direct the first beam components toward the first regions, and direct the second beam components toward second regions that are not subject to the removal process.

Embodiment 101: The method of embodiment 100 in which applying the removal process comprises removing the birefringent material or reducing the height of the birefringent material at the first regions such that the second set of light beams that pass through the second regions have polarization that is rotated about 90°+n×180°, 0≤n, n being an integer, relative to polarization of the first set of light beams that pass through the first regions.

Embodiment 102: The method of embodiment 101 in which the walk-off element is configured such that upon exiting the walk-off element the first beam components have first polarization, and the second beam components have second polarization that is substantially orthogonal to the first polarization, wherein the first and second regions of the birefringent plate are configured such that after passing the first and second regions the first beam components have polarization that is substantially parallel to the polarization of the second beam components.

Embodiment 103: The method of embodiment 100 in which the walk-off element separates the first beam component and the second beam component along a walk-off direction, each of at least some of the first regions has a dimension measured along a direction parallel to the walk-off direction in a range from 50 μm to 1000 μm.

Embodiment 104: The method of embodiment 103 in which each of at least some of the first regions has a dimension measured along a direction parallel to the walk-off direction in a range from 100 μm to 600 μm.

Embodiment 105: The method of embodiment 104 in which each of at least some of the first regions has a dimension measured along a direction parallel to the walk-off direction in a range from 200 μm to 400 μm.

Embodiment 106: The method of embodiment 88 in which applying the removal process comprises applying the removal process to remove portions of the optically birefringent material at the first regions such that the birefringent plate is configured to modify polarization of light passing through the birefringent plate in a way that is equivalent to modification of polarization of light passing through a half-wave plate having openings at the first regions.

Embodiment 107: The method of embodiment 88 in which generating the birefringent plate comprises applying the removal process to generate strips of birefringent material each having an original thickness, each strip has a width in a range from 50 μm to 1000 μm, and a length at least 2000 μm.

Embodiment 108: The method of embodiment 107 in which each strip has a width in a range from 100 μm to 600 μm, and a length at least 1200 μm.

Embodiment 109: The method of embodiment 108 in which each strip has a width in a range from 200 μm to 400 μm, and a length at least 800 μm.

Embodiment 110: A method of fabricating a fiber-optic connector, the method comprising:

applying a particle beam to locally energize portions of a birefringent plate to generate a patterned birefringent plate by modifying birefringence of a two-dimensional pattern of first regions in the birefringent plate to cause the first regions to have birefringence that is different from the birefringence of second regions that do not receive the localized energizing by the particle beam; and coupling the patterned birefringent plate to a second component to form the fiber-optic connector;

wherein the fiber-optic connector is configured to be coupled to at least one of a plurality of optical fibers or a plurality of vertical coupling elements on a photonic integrated circuit, and the patterned birefringent plate comprises non-uniform birefringence properties with respect to light that passes through the patterned birefringent plate.

Embodiment 111: A method of fabricating fiber-optic connectors, the method comprising:

providing a first module comprising a plurality of unsingulated lens arrays;

providing a second module comprising a plurality of unsingulated patterned birefringent plates, in which each patterned birefringent plate comprises birefringent material, the patterned birefringent plate comprises a plurality of first regions having reduced or no birefringence as compared to a plurality of second regions;

aligning the plurality of unsingulated lens arrays in the first module to the plurality of unsingulated patterned birefringent plates in the second module;

bonding the first module to the second module to form a first assembly;

cutting the first assembly to singulate the first and second modules to produce a plurality of fiber-optic connector parts, in which each fiber-optic connector part comprises a singulated birefringent plate and a singulated lens array.

Embodiment 112: A method of fabricating fiber-optic connectors, the method comprising:

providing a first module comprising a plurality of unsingulated first connector units, in which each first connector unit is configured to be coupled to a plurality of optical fibers;

providing a second module comprising a plurality of unsingulated patterned birefringent plates, in which each patterned birefringent plate comprises birefringent material, the patterned birefringent plate comprises a plurality of first regions having reduced or no birefringence as compared to a plurality of second regions, and the second module has a first side and a second side;

aligning the plurality of unsingulated first connector units in the first module to the plurality of unsingulated patterned birefringent plates in the second module;

bonding the first module to the first side of the second module;

providing a third module comprising a plurality of unsingulated second connector units, in which each second connector unit is configured to be coupled to a photonic integrated circuit;

aligning the plurality of unsingulated second connector units in the third module to the plurality of unsingulated patterned birefringent plates in the second module;

bonding the third module to the second side of the second module to form a first assembly; and cutting the first assembly to singulate the first, second, and third modules to produce a plurality of fiber-optic connectors, in which each fiber-optic connector comprises:

a singulated birefringent plate, a singulated first connector unit, and a singulated second connector unit.

Embodiment 113: An apparatus comprising:

a fiber-optic connector configured to optically couple a plurality of optical fibers to a plurality of vertical coupling elements on a photonic integrated circuit, in which the fiber-optic connector comprises a patterned birefringent plate comprising an optically birefringent material, the birefringent plate having a plurality of first regions that have birefringence that is different from the birefringence of second regions, the first regions are formed by localized heating or localized energizing that modifies the birefringence of the first regions, and the second regions are not subject to the localized heating or localized energizing;

wherein the fiber-optic connector is configured to enable light beams to be transmitted between the plurality of optical fibers and the plurality of vertical coupling elements, and the patterned birefringent plate is configured to modify an optical property of a first set of the light beams relative to the optical property of a second set of the light beams.

Embodiment 114: The apparatus of embodiment 113 in which the first regions have reduced birefringence as compared to the second regions.

Embodiment 115: The apparatus of embodiment 114 in which the first regions have substantially zero birefringence.

Embodiment 116: The apparatus of embodiment 113 in which the patterned birefringent plate is configured to modify a polarization state of a first set of light beams that pass through the first regions relative to a polarization state of a second set of light beams that pass through the second regions of the birefringent plate.

Embodiment 117: The apparatus of embodiment 113 in which the patterned birefringent plate comprises a plurality of strips of birefringent material that are spaced apart from one another, the first set of light beams pass through the plurality of strips of birefringent material, and the second set of light beams pass through spacing between the plurality of strips of birefringent material.

Embodiment 118: The apparatus of any of embodiments 113 to 117 in which the patterned birefringent element is configured to rotate the polarization of the first set of the light beams relative to the polarization of the second set of the light beams by an amount substantially equal to $90°+n\times180°$, $0\leq n$, n being an integer.

Embodiment 119: The apparatus of any of embodiments 113 to 118 in which the patterned birefringent element is configured to modify two light beams that have polarizations orthogonal to each other prior to passing through the patterned birefringent element such that the two light beams have polarizations parallel to each other after passing through the patterned birefringent element.

Embodiment 120: The apparatus of any of embodiments 113 to 118 in which the patterned birefringent element is configured to modify two light beams that have polarizations parallel to each other prior to passing through the patterned birefringent element such that the two light beams have polarizations orthogonal to each other after passing through the patterned birefringent element.

Embodiment 121: The apparatus of any of embodiments 113 to 120 in which the fiber-optic connector comprises one or more walk-off elements configured to receive one or more input optical beams from one or more of the optical fibers, and separate each of at least some of the input optical beams into a first optical beam component having a first polarization and a second optical beam component having a second polarization;

wherein the patterned birefringent element is configured to modify the polarization of first optical beam component relative to the polarization of second optical beam component such that the polarization state of the first optical beam component relative to the second optical beam component changes after the first and second optical beam component pass through the patterned birefringent element.

Embodiment 122: An apparatus comprising:

a fiber-optic connector configured to optically couple a plurality of optical fibers to a plurality of vertical coupling elements on a photonic integrated circuit, in which the fiber-optic connector comprises a volume of birefringent material, one or more portions of the volume of birefringent material has or have modified birefringence compared to other portions of the volume of birefringent material, and light beams transmitted between the plurality of optical fibers and the plurality of vertical coupling elements pass through the volume of birefringent material;

wherein the volume of birefringent material is configured to modify a polarization state of a first set of the light beams relative to a second set of the light beams such that the polarization state of the first set of the light beams relative to the second set of the light beams changes after the first and second sets of light beams pass through the volume of birefringent material.

Embodiment 123: The apparatus of embodiment 122 in which the volume of birefringent material comprises a plurality of strips of birefringent material that are spaced apart from one another, the first set of light beams pass through the plurality of strips of birefringent material, and the second set of light beams pass through spacing between the plurality of strips of birefringent material.

Embodiment 124: The apparatus of embodiment 122 or 123 in which the patterned birefringent element is configured to rotate the polarization of the first set of the light beams relative to the polarization of the second set of the light beams by an amount substantially equal to 90°+n×180°, 0≤n, n being an integer.

Embodiment 125: The apparatus of any of embodiments 122 to 124 in which the patterned birefringent element is configured to modify two light beams that have polarizations orthogonal to each other prior to passing through the patterned birefringent element such that the two light beams have polarizations parallel to each other after passing through the patterned birefringent element.

Embodiment 126: The apparatus of any of embodiments 122 to 124 in which the patterned birefringent element is configured to modify two light beams that have polarizations parallel to each other prior to passing through the patterned birefringent element such that the two light beams have polarizations orthogonal to each other after passing through the patterned birefringent element.

Embodiment 127: The apparatus of any of embodiments 122 to 126 in which the fiber-optic connector comprises one or more walk-off elements configured to receive one or more input optical beams from one or more of the optical fibers, and separate each of at least some of the input optical beams into a first optical beam component having a first polarization and a second optical beam component having a second polarization;

wherein the patterned birefringent element is configured to modify the polarization of first optical beam component relative to the polarization of second optical beam component such that the polarization state of the first optical beam component relative to the second optical beam component changes after the first and second optical beam component pass through the patterned birefringent element.

Embodiment 128: The apparatus of any of embodiments 13 to 29 and 113 to 127, comprising the photonic integrated circuit.

Embodiment 129: The apparatus of any of embodiments 1 to 29 and 113 to 127 in which the vertical coupling elements comprise vertical grating couplers.

Embodiment 130: The method of any of embodiments 30 to 112 in which the vertical coupling elements comprise vertical grating couplers.

Embodiment 131: The apparatus of any of embodiments 1 to 29 and 113 to 127 in which the photonic integrated circuit comprises optical waveguides that are coupled to the vertical coupling elements.

Embodiment 132: A data center comprising the apparatus of any of embodiments 1 to 29 and 113 to 127.

Embodiment 133: A method of operating the apparatus of any of embodiments 1 to 29 and 113 to 127.

Embodiment 134: A method of operating the data center of embodiment 132.

Embodiment 135: A method of assembly the apparatus of any of embodiments 1 to 29 and 113 to 127.

Embodiment 136: A method of processing data using the apparatus of any of embodiments 1 to 29 and 113 to 127.

Embodiment 137: A method comprising:

transmitting light from a plurality of optical fiber cores to a polarization beam splitter;

at the polarization beam splitter, splitting an incident light beam from a corresponding fiber core into a first beam having a first polarization and a second beam having a second polarization different from the first polarization;

directing the first and second beams toward a patterned birefringent plate comprising a first region and a second region, in which the first region has a first optical birefringence, the second region has a second optical birefringence that is different from the first optical birefringence, the first region is produced by applying localized heating to a portion of a birefringent plate to reduce the birefringence at the first region, the second region is not subject to the localized heating and retains its original birefringence, the first beam is directed towards the first region, the second beam is directed towards the second region;

at the first and second regions, rotating the polarization of the first beam by a first amount and rotating the polarization of the second beam by a second amount that is different from the first amount, the first and second amounts are selected to cause the first and second beams to have substantially parallel polarization after passing the patterned birefringent plate.

Embodiment 138: The apparatus of embodiment 137 in which the plurality of optical fiber cores are arranged in a two-dimensional array.

Embodiment 139: The method of embodiment 138 in which the two-dimensional array comprises at least 2 rows and at least 8 columns.

Embodiment 140: The method of any of embodiments 137 to 139 in which the spacing between two adjacent rows in the two-dimensional array is identical to the spacing between two adjacent columns in the two-dimensional array.

The following is a fifth set of embodiments. The embodiment numbers below refer to those in the fifth set of embodiments.

Embodiment 1: A method comprising:

providing a photonic integrated circuit including a plurality of vertical-coupling elements disposed along a main surface of the photonic integrated circuit;

attaching an optical subassembly to the photonic integrated circuit;

removably connecting a fiber connector to a ferrule frame, wherein the fiber connector is attached to an array of optical fibers;

aligning the ferrule frame to the optical subassembly using an active alignment process; and securely connecting the ferrule frame to the optical subassembly after the active alignment process.

Embodiment 2: The method of embodiment 1 wherein the active alignment process comprises:

transferring light between at least one optical fiber in the array of optical fibers and the photonic integrated circuit through the optical subassembly and at least one of the vertical-coupling elements, and adjusting a position of the ferrule frame relative to the optical subassembly based on at least one characteristic of the light transferred between the at least one optical fiber and the photonic integrated circuit.

Embodiment 3: The method of embodiment 1 or 2, comprising removing the fiber connector from the ferrule frame.

Embodiment 4: The method of embodiment 1 or 3 wherein the ferrule frame comprises an opening to allow light from the array of optical fibers to be transmitted to the optical subassembly.

Embodiment 5: The method of embodiment 4, comprising passing a portion of the fiber connector through the opening of the ferrule frame and positioning an end of the fiber connector in proximity to the optical subassembly.

Embodiment 6: The method of any of embodiments 1 to 5 wherein removably connecting the array of optical fibers to the ferrule frame comprises at least one of (i) using one or more screws to secure the array of optical fibers to the ferrule frame, (ii) using one or more clamps to secure the array of optical fibers to the ferrule frame, (iii) using one or more magnets to connect the array of optical fibers to the ferrule frame.

Embodiment 7: The method of any of embodiments 1 to 6 wherein the array of optical fibers comprises a two-dimensional array of optical fibers.

Embodiment 8: The method of embodiment 7 wherein the two-dimensional array of optical fibers comprises at least two rows of optical fibers.

Embodiment 9: The method of any of embodiments 1 to 8 wherein the array of optical fibers comprise at least 10 fiber cores.

Embodiment 10: The method of embodiment 9 wherein the array of optical fibers comprise at least 50 fiber cores.

Embodiment 11: The method of embodiment 10 wherein the array of optical fibers comprise at least 100 fiber cores.

Embodiment 12: The method of any of embodiments 1 to 11 wherein the optical subassembly comprises a first lens array, and the active alignment process comprises projecting light from the array of optical fibers through the first lens array, including passing light from at least one of the optical fibers through a corresponding lens to a corresponding vertical-coupling element.

Embodiment 13: The method of embodiment 12 wherein the optical subassembly comprises a beam displacer, and the active alignment process comprises projecting light from the array of optical fibers through the first lens array and the beam displacer to the at least one vertical-coupling element.

Embodiment 14: The method of embodiment 13 wherein the optical subassembly comprises a second lens array, and the active alignment process comprises projecting light from the array of optical fibers through the first lens array, the beam displacer, and the second lens array to the at least one vertical-coupling element.

Embodiment 15: The method of embodiment 14 wherein the optical subassembly comprises a half wave plate, and the active alignment process comprises projecting light from the array of optical fibers through the first lens array, the beam displacer, the half wave plate, and the second lens array to the at least one vertical-coupling element.

Embodiment 16: The method of any of embodiments 1 to 11 wherein the fiber connector comprises a first lens array, and the active alignment process comprises projecting light from the array of optical fibers through the first lens array, including passing light from at least one of the optical fibers through a corresponding lens to a corresponding vertical-coupling element.

Embodiment 17: The method of embodiment 16 wherein the optical subassembly comprises a beam displacer, and the active alignment process comprises projecting light from the array of optical fibers through the first lens array and the beam displacer to the at least one vertical-coupling element.

Embodiment 18: The method of embodiment 17 wherein the optical subassembly comprises a second lens array, and the active alignment process comprises projecting light from the array of optical fibers through the first lens array, the beam displacer, and the second lens array to the at least one vertical-coupling element.

Embodiment 19: The method of embodiment 18 wherein the optical subassembly comprises a half wave plate, and the active alignment process comprises projecting light from the array of optical fibers through the first lens array, the beam displacer, the half wave plate, and the second lens array to the at least one vertical-coupling element.

Embodiment 20: The method of any of embodiments 1 to 19 wherein the active alignment process comprises adjusting the position of the ferrule frame relative to the optical subassembly to maximize an overall efficiency of light transfer between the array of optical fibers and the photonic integrated circuit.

Embodiment 21: The method of any of embodiments 1 to 20 wherein the ferrule frame comprises at least one of glass, metal, or plastic.

Embodiment 22: The method of any of embodiments 1 to 20 wherein the ferrule frame comprises a material that is transparent or semi-transparent to ultra-violet (UV) light, and securely connecting the ferrule frame to the optical subassembly comprises attaching the ferrule frame to the optical subassembly using an UV-curing adhesive.

Embodiment 23: The method of any of embodiments 1 to 22 wherein adjusting the position of the ferrule frame relative to the optical subassembly comprises adjusting the position of the ferrule frame along a plane substantially parallel to the main surface of the photonic integrated circuit.

Embodiment 24: The method of embodiment 23 wherein adjusting the position of the ferrule frame along the plane substantially parallel to the main surface of the photonic integrated circuit comprises at least one of (i) adjusting the position of the ferrule frame along an x-axis relative to the main surface of the photonic integrated circuit, (ii) adjusting the position of the ferrule frame along a y-axis relative to the main surface of the photonic integrated circuit, or (iii) rotating the ferrule frame about a z-axis relative to the main surface of the photonic integrated circuit;

wherein the x- and y-axes are substantially parallel to the main surface of the photonic integrated circuit, and the z-axis is substantially perpendicular to the main surface of the photonic integrated circuit.

Embodiment 25: The method of any of embodiments 1 to 24 wherein adjusting the position of the ferrule frame relative to the optical subassembly comprises adjusting a distance of an end of the fiber connector relative to the optical subassembly.

Embodiment 26: The method of any of embodiments 1 to 25 wherein adjusting the position of the ferrule frame relative to the optical subassembly comprises adjusting a tilt angle of an end surface of the fiber connector relative to the optical subassembly.

Embodiment 27: The method of any of embodiments 1 to 26 wherein aligning the ferrule frame to the optical subassembly comprises aligning the ferrule frame to the optical subassembly with a precision of at least 10 μm accuracy.

Embodiment 28: The method of embodiment 27 wherein aligning the ferrule frame to the optical subassembly comprises aligning the ferrule frame to the optical subassembly with a precision of at least 1 μm accuracy.

Embodiment 29: The method of embodiment 28 wherein aligning the ferrule frame to the optical subassembly comprises aligning the ferrule frame to the optical subassembly with a precision of at least 0.1 μm accuracy.

Embodiment 30: The method of any of embodiments 1 to 29, wherein each of the vertical-coupling elements comprises at least one of a single-polarization vertical grating coupler, a turning mirror, a polarization-diversity vertical grating coupler, a vertical cavity surface emitting laser, a surface-normal modulator, or a photodiode.

Embodiment 31: The method of any of embodiments 1 to 15 and 20 to 30 wherein the beam displacer comprises a polarization-dependent optical element.

Embodiment 32: An apparatus comprising:

a photonic integrated circuit including a plurality of vertical-coupling elements disposed along a main surface of the photonic integrated circuit;

an optical subassembly attached to the photonic integrated circuit;

a ferrule frame that is configured to enable a fiber connector to be removably connected to the ferrule frame and aligned with the optical subassembly;

wherein the fiber connector is connected to an array of optical fibers, and the optical subassembly is configured to transfer light between the array optical fibers and the vertical-coupling elements on the photonic integrated circuit;

wherein the ferrule frame is aligned to the optical subassembly using an active alignment process in which light is transferred between at least one optical fiber in the array of optical fibers and the photonic integrated circuit through the optical subassembly and at least one of the vertical-coupling elements, and a position of the ferrule frame relative to the optical subassembly is adjusted based on at least one characteristic of the light transferred between the at least one optical fiber and the photonic integrated circuit; and wherein the ferrule frame is securely connected to the optical subassembly after the active alignment process.

Embodiment 33: The apparatus of embodiment 32 wherein the ferrule frame enables the array of optical fibers to be aligned with the optical subassembly with a precision of at least 10 μm.

Embodiment 34: The apparatus of embodiment 32 wherein the ferrule frame enables the array of optical fibers to be aligned with the optical subassembly with a precision of at least 1 μm.

Embodiment 35: The apparatus of embodiment 32 wherein the ferrule frame enables the array of optical fibers to be aligned with the optical subassembly with a precision of at least 0.1 μm.

Embodiment 36: The apparatus of any of embodiments 32 to 35 wherein the optical subassembly comprises a first lens array, and the ferrule module is configured to align the array of optical fibers with the lens array.

Embodiment 37: The apparatus of embodiment 36 wherein the optical subassembly comprises a beam displacer attached to the first lens array.

Embodiment 38: The apparatus of embodiment 37 wherein the optical subassembly comprises a second lens array, the beam displacer is positioned between the first lens array and the second lens array, and the second lens array is positioned between the beam displacer and the vertical-coupling elements.

Embodiment 39: The apparatus of embodiment 38 wherein the optical subassembly comprises a half wave plate positioned between the beam displacer and the second lens array.

Embodiment 40: The apparatus of embodiment 38 wherein the optical subassembly comprises a birefringent plate having holes, and the birefringent plate is positioned between the beam displacer and the second lens array.

Embodiment 41: The apparatus of any of embodiments 32 to 35 wherein the fiber connector comprises a first lens array, and the ferrule module is configured to align the first lens array with the optical subassembly.

Embodiment 42: The apparatus of embodiment 41 wherein the optical subassembly comprises a beam displacer.

Embodiment 43: The apparatus of embodiment 42 wherein the optical subassembly comprises a second lens array positioned between the beam displacer and the vertical-coupling elements.

Embodiment 44: The apparatus of embodiment 43 wherein the optical subassembly comprises a half wave plate positioned between the beam displacer and the second lens array.

Embodiment 45: The apparatus of embodiment 43 wherein the optical subassembly comprises a birefringent plate having holes, and the birefringent plate is positioned between the beam displacer and the second lens array.

Embodiment 46: The apparatus of any of embodiments 32 to 35, wherein each optical fiber comprises one or more fiber cores, the optical subassembly comprises at least one lens configured to communicate light with a single one of the fiber cores and a single one of the vertical-coupling elements.

Embodiment 47: The apparatus of any of embodiments 32 to 35, wherein each optical fiber comprises one or more fiber cores, the optical subassembly comprises a plurality of optical waveguides, each optical waveguide optically connecting a respective one of the fiber cores and a respective one of the vertical-coupling elements.

Embodiment 48: The apparatus of embodiment 47, wherein at least some of the optical waveguides are tapered.

Embodiment 49: The apparatus of any of embodiments 32 to 48, wherein the optical subassembly comprises one or more polarization beam splitters.

Embodiment 50: The apparatus of any of embodiments 32 to 49, wherein the optical subassembly comprises one or more polarization-rotating elements.

Embodiment 51: The apparatus of any of embodiments 32 to 35, wherein each optical fiber comprises one or more fiber cores, the optical subassembly is configured to communicate light between a first number of the fiber cores and a second number of the vertical-coupling elements, and the second number is greater than the first number.

Embodiment 52: The apparatus of any of embodiments 32 to 51, wherein each of the vertical-coupling elements comprises at least one of a single-polarization vertical grating coupler, a turning mirror, a polarization-diversity vertical grating coupler, a vertical cavity surface emitting laser, a surface-normal modulator, or a photodiode.

Embodiment 53: The apparatus of any of embodiments 32 to 52 wherein the ferrule frame comprises at least one of glass, metal, or plastic.

Embodiment 54: The apparatus of any of embodiments 32 to 52 wherein the ferrule frame comprises a material that is transparent or semi-transparent to ultra-violet (UV) light, and an UV-curing adhesive is used to securely attach the ferrule frame to the optical subassembly.

Embodiment 55: The apparatus of any of embodiments 37 to 40 and 42 to 45 wherein the beam displacer comprises a polarization-dependent optical element.

What is claimed is:

1. An apparatus comprising:

a photonic integrated circuit including a plurality of vertical-coupling elements disposed along a main surface of the photonic integrated circuit;

an optical subassembly attached to the photonic integrated circuit; and a ferrule frame that is configured to enable a fiber connector to be removably connected to the ferrule frame and aligned with the optical subassembly;

wherein the fiber connector is connected to an array of optical fibers, and the optical subassembly is configured to transfer light between the array of optical fibers and the vertical-coupling elements on the photonic integrated circuit, wherein the optical subassembly comprises a first lens array, and the ferrule frame is configured to align the array of optical fibers with the first lens array, wherein the ferrule frame is aligned to the optical subassembly using an active alignment process in which light is transferred between at least one optical fiber in the array of optical fibers and the photonic integrated circuit through the optical subassembly and at least one of the vertical-coupling elements, and a position of the ferrule frame relative to the optical subassembly is adjusted based on at least one characteristic of the light transferred between the at least one optical fiber and the photonic integrated circuit, and wherein the ferrule frame is securely connected to the optical subassembly after the active alignment process.

2. The apparatus of claim 1 wherein the ferrule frame enables the array of optical fibers to be aligned with the optical subassembly with a precision of at least 10 μm.

3. The apparatus of claim 1 wherein the ferrule frame enables the array of optical fibers to be aligned with the optical subassembly with a precision of at least 1 μm.

4. The apparatus of claim 1 wherein the ferrule frame enables the array of optical fibers to be aligned with the optical subassembly with a precision of at least 0.1 μm.

5. The apparatus of claim 1, wherein the optical subassembly comprises a beam displacer attached to the first lens array.

6. The apparatus of claim 5 wherein the optical subassembly comprises a second lens array, the beam displacer is positioned between the first lens array and the second lens array, and the second lens array is positioned between the beam displacer and the vertical-coupling elements.

7. The apparatus of claim 6 wherein the optical subassembly comprises a half wave plate positioned between the beam displacer and the second lens array.

8. The apparatus of claim 1 wherein the optical subassembly comprises a beam displacer.

9. The apparatus of claim 8 wherein the optical subassembly comprises a second lens array positioned between the beam displacer and the vertical-coupling elements.

10. The apparatus of claim 9 wherein the optical subassembly comprises a half wave plate positioned between the beam displacer and the second lens array.

11. The apparatus of claim 1, wherein each optical fiber in the array of optical fibers comprises one or more fiber cores, the optical subassembly comprises at least one lens configured to communicate light with a single one of the fiber cores and a single one of the vertical-coupling elements.

12. The apparatus of claim 1, wherein each optical fiber in the array of optical fibers comprises one or more fiber cores, the optical subassembly comprises a plurality of optical waveguides, each optical waveguide optically connecting a respective one of the fiber cores and a respective one of the vertical-coupling elements.

13. The apparatus of claim 12, wherein at least some of the optical waveguides are tapered.

14. The apparatus of claim 1, wherein each optical fiber in the array of optical fibers comprises one or more fiber cores, the optical subassembly is configured to communicate light between a first number of the fiber cores and a second number of the vertical-coupling elements, and the second number is greater than the first number.

15. The apparatus of claim 1, wherein each of the vertical-coupling elements comprises at least one of a single-polarization vertical grating coupler, a turning mirror, a polarization-diversity vertical grating coupler, a vertical cavity surface emitting laser, a surface-normal modulator, or a photodiode.

16. The apparatus of claim 1 wherein the ferrule frame comprises at least one of glass, metal, or plastic.

17. The apparatus of claim 1 wherein the ferrule frame comprises a material that is transparent or semi-transparent to ultra-violet (UV) light, and an UV-curing adhesive is used to securely attach the ferrule frame to the optical subassembly.

18. An apparatus comprising:

a photonic integrated circuit including a plurality of vertical-coupling elements disposed along a main surface of the photonic integrated circuit;

an optical subassembly attached to the photonic integrated circuit; and a ferrule frame that is configured to enable a fiber connector to be removably connected to the ferrule frame and aligned with the optical subassembly;

wherein the fiber connector is connected to an array of optical fibers, and the optical subassembly is configured to transfer light between the array of optical fibers and the vertical-coupling elements on the photonic integrated circuit, wherein the fiber connector comprises a first lens array, and the ferrule frame is configured to align the first lens array with the optical subassembly, wherein the ferrule frame is aligned to the optical subassembly using an active alignment process in which light is transferred between at least one optical fiber in the array of optical fibers and the photonic integrated circuit through the optical subassembly and at least one of the vertical-coupling elements, and a position of the ferrule frame relative to the optical subassembly is adjusted based on at least one characteristic of the light transferred between the at least one optical fiber and the photonic integrated circuit, and wherein the ferrule frame is securely connected to the optical subassembly after the active alignment process.

19. An apparatus comprising:

a photonic integrated circuit including a plurality of vertical-coupling elements disposed along a main surface of the photonic integrated circuit;

an optical subassembly attached to the photonic integrated circuit; and a ferrule frame that is configured to enable a fiber connector to be removably connected to the ferrule frame and aligned with the optical subassembly;

wherein the fiber connector is connected to an array of optical fibers, and the optical subassembly is configured to transfer light between the array of optical fibers and the vertical-coupling elements on the photonic integrated circuit, wherein the ferrule frame is aligned to the optical subassembly using an active alignment process in which light is transferred between at least one optical fiber in the array of optical fibers and the photonic integrated circuit through the optical subassembly and at least one of the vertical-coupling elements, and a position of the ferrule frame relative to the optical subassembly is adjusted based on at least one characteristic of the light transferred between the at least one optical fiber and the photonic integrated circuit, wherein the ferrule frame is securely connected to the optical subassembly after the active alignment process, and wherein each optical fiber in the array of optical fibers includes one or more fiber cores, the optical subassembly includes at least one lens configured to communicate light with a single one of the one or more fiber cores and a single one of the vertical-coupling elements.

* * * * *